(12) United States Patent
Gainsboro et al.

(10) Patent No.: US 7,106,843 B1
(45) Date of Patent: Sep. 12, 2006

(54) COMPUTER-BASED METHOD AND APPARATUS FOR CONTROLLING, MONITORING, RECORDING AND REPORTING TELEPHONE ACCESS

(75) Inventors: Jay L. Gainsboro, Framingham, MA (US); Charles Margosian, Wayland, MA (US)

(73) Assignee: T-Netix, Inc., Englewood, CO (US)

( * ) Notice: Subject to any disclaimer, the term of this patent is extended or adjusted under 35 U.S.C. 154(b) by 0 days.

(21) Appl. No.: 09/144,313

(22) Filed: Aug. 31, 1998

Related U.S. Application Data

(63) Continuation-in-part of application No. 08/904,784, filed on Aug. 1, 1997, now Pat. No. 6,560,323, which is a continuation of application No. 08/510,327, filed on Aug. 2, 1995, now Pat. No. 5,655,013, which is a continuation of application No. 08/229,517, filed on Apr. 19, 1994, now abandoned.

(51) Int. Cl.
*H04M 3/00* (2006.01)

(52) U.S. Cl. .................... 379/191; 379/249; 455/411

(58) Field of Classification Search ............... 379/188, 379/199, 200, 88.01, 265.01, 67.1, 114.01, 379/88.26, 88.02, 93.06, 114.21, 196, 32.01, 379/32.02, 191, 192, 193, 194, 114.26, 88.18, 379/198, 88.03; 340/5.52
See application file for complete search history.

(56) References Cited

U.S. PATENT DOCUMENTS

| | | | |
|---|---|---|---|
| 3,851,121 A | 11/1974 | Marvin | 179/175.2 |
| 4,001,513 A | 1/1977 | Naylor | 179/18 |
| 4,002,848 A | 1/1977 | Stein | 179/18 |
| 4,188,508 A | 2/1980 | Rogers et al. | 179/18 |
| 4,310,726 A | 1/1982 | Asmuth | 179/18 |
| 4,405,833 A | 9/1983 | Cave et al. | |
| 4,518,825 A | 5/1985 | Brikerhoff et al. | 179/11 |
| 4,559,416 A | 12/1985 | Theis et al. | 179/7.1 |
| 4,602,129 A | 7/1986 | Matthews et al. | 179/18 |
| 4,696,031 A | 9/1987 | Freudberg et al. | 379/386 |
| 4,726,057 A | 2/1988 | Doerry et al. | 379/145 |
| 4,782,516 A | 11/1988 | Maybach et al. | |
| 4,794,642 A | 12/1988 | Arbabzadah et al. | |

(Continued)

FOREIGN PATENT DOCUMENTS

| | | | |
|---|---|---|---|
| JP | 5-30193 | 5/1993 | 379/249 |

OTHER PUBLICATIONS

Bahl, L. "A Maximum Likelihood Approach to Continuous Speech Recovery", Readings in Speech Recognition Ed. A. Waibel and K. Lee, Morgan Kaufmann Publishers, pp. 308-319, IEEE 1983.

(Continued)

*Primary Examiner*—Ovidio Escalante
*Assistant Examiner*—Gerald Gauthier
(74) *Attorney, Agent, or Firm*—Fenwick & West LLP

(57) ABSTRACT

A method and apparatus for managing institutional telephone activity utilizing a computer-based telephony management unit to connect institutional telephones with outside telephone lines. The unit provides institutional users with fully automated, direct dial and collect calling privileges for local, long distance, and international calls. The unit contains a database for storing the calling privileges and restrictions of institutional users, for recording calling transactions made by the users, and for managing user monetary accounts. The unit can record up to 400 hours of conversation in a digital format. The unit provides various administrative capabilities, including user account management, audit trails, transaction reports, centralized management and report capabilities, and detection of fraudulent calling.

34 Claims, 32 Drawing Sheets

U.S. PATENT DOCUMENTS

| | | | | |
|---|---|---|---|---|
| 4,799,255 | A | 1/1989 | Billinger et al. | 379/189 |
| 4,815,120 | A | 3/1989 | Kosich et al. | 379/34 |
| 4,885,765 | A | 12/1989 | Shirakawa | 379/93 |
| 4,896,348 | A | 1/1990 | Grantland et al. | 379/145 |
| 4,899,375 | A * | 2/1990 | Bauer et al. | 379/260 |
| 4,901,341 | A | 2/1990 | Carter et al. | 379/67 |
| 4,922,519 | A * | 5/1990 | Daudelin | 379/88.01 |
| 4,922,520 | A | 5/1990 | Bernard et al. | 379/88 |
| 4,924,488 | A | 5/1990 | Kosich | 379/34 |
| 4,933,966 | A | 6/1990 | Hird et al. | 379/132 |
| 4,933,967 | A | 6/1990 | Lo et al. | 379/207 |
| 4,935,956 | A | 6/1990 | Hellwarth et al. | 379/112 |
| 4,937,862 | A | 6/1990 | Kosich | 380/3 |
| 4,993,068 | A | 2/1991 | Piosenka et al. | 380/23 |
| 5,023,869 | A | 6/1991 | Grover et al. | 370/84 |
| 5,023,906 | A | 6/1991 | Novas | 379/372 |
| 5,033,088 | A | 7/1991 | Shipman | 381/43 |
| 5,054,059 | A * | 10/1991 | Stern et al. | 379/114.01 |
| 5,063,593 | A | 11/1991 | Kwon | 379/386 |
| 5,109,405 | A * | 4/1992 | Morganstein | 379/88.21 |
| 5,131,024 | A | 7/1992 | Pugh et al. | 379/67 |
| 5,150,357 | A | 9/1992 | Hopner et al. | 370/68.1 |
| 5,163,083 | A | 11/1992 | Dowden et al. | 379/88 |
| 5,187,740 | A | 2/1993 | Swaim et al. | 379/209 |
| 5,200,995 | A | 4/1993 | Gaukel et al. | 379/200 |
| 5,210,789 | A | 5/1993 | Jeffus et al. | |
| 5,222,120 | A | 6/1993 | McLeod et al. | 379/88 |
| 5,229,764 | A * | 7/1993 | Matchett et al. | 340/5.52 |
| 5,274,698 | A * | 12/1993 | Jang | 379/198 |
| 5,276,731 | A | 1/1994 | Arbel et al. | 379/88 |
| 5,305,312 | A | 4/1994 | Fornek et al. | 370/62 |
| 5,309,505 | A | 5/1994 | Szlam et al. | 379/88 |
| 5,311,589 | A | 5/1994 | Bennett et al. | 379/386 |
| 5,319,702 | A | 6/1994 | Kitchin et al. | 379/189 |
| 5,325,427 | A | 6/1994 | Dighe | 379/386 |
| 5,327,489 | A | 7/1994 | Anderson et al. | 379/207 |
| 5,329,578 | A | 7/1994 | Brennan et al. | 379/67 |
| 5,345,595 | A | 9/1994 | Johnson et al. | 455/33.1 |
| 5,351,287 | A | 9/1994 | Bhattacharyya et al. | 379/95 |
| 5,355,403 | A * | 10/1994 | Richardson et al. | 379/88.26 |
| 5,375,161 | A | 12/1994 | Fuller et al. | 379/57 |
| 5,425,087 | A * | 6/1995 | Gerber et al. | 379/112.01 |
| 5,442,696 | A | 8/1995 | Lindberg et al. | |
| 5,452,347 | A | 9/1995 | Iglehart et al. | 379/199 |
| 5,461,665 | A * | 10/1995 | Shur et al. | 379/88.11 |
| 5,465,293 | A | 11/1995 | Chiller et al. | 379/188 |
| 5,471,519 | A * | 11/1995 | Howe et al. | 379/88.26 |
| 5,483,582 | A | 1/1996 | Pugh et al. | 379/144 |
| 5,483,593 | A | 1/1996 | Gupta et al. | 379/386 |
| 5,535,261 | A | 7/1996 | Brown et al. | 379/88 |
| 5,539,812 | A | 7/1996 | Kitchin et al. | 379/189 |
| 5,566,229 | A * | 10/1996 | Hou et al. | 379/88.02 |
| 5,583,934 | A | 12/1996 | Zhou | 379/399 |
| 5,606,604 | A | 2/1997 | Rosenblatt | 379/198 |
| 5,617,471 | A | 4/1997 | Rogers et al. | 379/212 |
| 5,627,887 | A * | 5/1997 | Freedman | 379/88.18 |
| 5,651,056 | A | 7/1997 | Eting et al. | 379/88 |
| 5,655,013 | A | 8/1997 | Gainsboro | |
| 5,722,418 | A | 3/1998 | Bro | 128/732 |
| 5,724,404 | A | 3/1998 | Garcia et al. | 379/34 |
| 5,745,553 | A | 4/1998 | Mirville et al. | 379/67 |
| 5,796,811 | A | 8/1998 | McFarlen | 379/189 |
| 5,799,068 | A * | 8/1998 | Kikinis et al. | 379/93.06 |
| 5,805,685 | A | 9/1998 | McFarlen | 379/189 |
| 5,809,125 | A | 9/1998 | Gammino | 379/189 |
| 5,844,978 | A * | 12/1998 | Reuss et al. | 379/196 |
| 5,883,945 | A | 3/1999 | Richardson et al. | 379/189 |
| 5,926,533 | A | 7/1999 | Gainsboro | |
| 5,943,403 | A | 8/1999 | Richardson, Jr. et al. | |
| 5,960,064 | A | 9/1999 | Foladare et al. | 379/88.26 |
| 6,031,895 | A * | 2/2000 | Cohn et al. | 379/88.11 |
| 6,052,454 | A | 4/2000 | Kek et al. | 379/188 |
| 6,072,860 | A | 6/2000 | Kek et al. | 379/88.25 |
| 6,141,406 | A | 10/2000 | Johnson | 379/189 |
| RE37,073 | E | 2/2001 | Hammond | |
| 6,188,751 | B1 | 2/2001 | Scherer | 379/88.22 |
| 6,560,323 | B1 | 5/2003 | Gainsboro | |
| 6,611,583 | B1 | 8/2003 | Gainsboro | |

OTHER PUBLICATIONS

Batten, A. "Personal Communications Service and the Intelligent Network", British Telecommunications Engineering, vol. 9, pp. 88-91, Aug. 1990.

Lee, K. "Large-Vocabulary Speaker-Independent Continuous Speech Recognition Using HMM", Carnegie Mellon University Department of Electrical and Computer Engineering, CMU-CS-88-148 Apr. 1988.

System 20, Nov. 1992, Specially designed for correctional facilities, from County Jails to State and Federal Prisons. VAC.

Telematic "ConQuest III Intimate Telephone System" Nov. 1992.

LazerVoice, Digital Recording System Inmate Srevices, 1997-98 Schlumberger Technologies, Inc./LazerVoice ,STIL V0222 LazerVoice User's Manual—Version 2.22.

LazerPhone User Reference Manual.

LazerPhone, Inmate Telephone System, Users Manual, 1998 Schlumberger Technologies, Inc./Global Tel*Link, LazerPhone User's User's Manual—Version 1.0.

LazerPhone, Powerful Performance Uncompromising Standards, 1998.

LazerPhone Technical Manual, System Overview.

* cited by examiner

Inmate Information Maintenance

| Field | Value |
|---|---|
| Register #: | 22222-222 |
| Facility: | ATL |
| Status: | A-Active |
| Last Name: | Capone |
| First Name: | Al |
| Middle Name: | Joseph |

Tabs: Profile | Call Records | Transactions | Class of Service

Profile:
- Accord Activation Date: 01-JAN-97
- Living Unity: Unit A
- Date of Arrival at Facility: 01-JAN-0097
- Enable Date: 01-JAN-97
- 0 Days Suspended
- Language: English
- ☑ Alert
- PAC: 123456789
- Current balance: $100.00
- Remaining for: August 1997
- Total Mins.: 40
- Total Calls: 100
- Direct Mins.: 30
- Direct Calls: 80
- Collect Mins.: 10
- Called Calls: 20

Comments: In good Standing

Record 1/1

FIG. 4A

Report Date Aug. 7, 1997 15:26 /dev/pts000

Frequently Dialed Number Detail Report
FCI OPUS

Report Specifications

Start Date: 01-Jun-97
End Date: 07-Aug-97
Minimum Number of Calls: 10

Living Units
%

| Phone Number | Register Number | Inmate Name | Start Date | Start Time | Duration | Trunk |
|---|---|---|---|---|---|---|
| 03156857691 | 99999999 | Jester, Leste | 04-Jun-97 | 23:09 | 0:00:00 | 11 |
| 03156857691 | 99999999 | Jester, Leste | 04-Jun-97 | 23:09 | 0:00:00 | 11 |
| 03156857691 | 99999999 | Jester, Leste | 04-Jun-97 | 23:09 | 0:00:00 | 11 |
| 03156857691 | 99999999 | Jester, Leste | 04-Jun-97 | 23:09 | 0:00:00 | 11 |
| 03156857691 | 99999999 | Jester, Leste | 04-Jun-97 | 23:09 | 0:00:00 | 11 |
| 03156857691 | 99999999 | Jester, Leste | 04-Jun-97 | 23:09 | 0:00:00 | 11 |
| 03156857691 | 99999999 | Jester, Leste | 04-Jun-97 | 23:09 | 0:00:00 | 11 |
| 03156857691 | 99999999 | Jester, Leste | 04-Jun-97 | 23:09 | 0:00:00 | 11 |
| 03156857691 | 99999999 | Jester, Leste | 04-Jun-97 | 23:09 | 0:00:00 | 11 |
| 03156857691 | 99999999 | Jester, Leste | 04-Jun-97 | 23:09 | 0:00:00 | 11 |
| 03156857691 | 99999999 | Jester, Leste | 04-Jun-97 | 23:09 | 0:00:00 | 11 |
| 03156857691 | 99999999 | Jester, Leste | 04-Jun-97 | 23:09 | 0:00:00 | 11 |
| 03156857691 | 99999999 | Jester, Leste | 04-Jun-97 | 23:09 | 0:00:01 | 1 |
| 05183772345 | 111111111 | The Molester | 04-Jun-97 | 23:13 | 0:00:01 | 13 |

Total Calls: 217

End of Report

FIG. 5

COMPUTER-BASED METHOD AND APPARATUS FOR CONTROLLING, MONITORING, RECORDING AND REPORTING TELEPHONE ACCESS

CROSS-REFERENCE TO RELATED APPLICATIONS

This application is filed as a continuation-in-part of application Ser. No. 08/904,784, filed Aug. 1, 1997 (now U.S. Pat. No. 6,560,323), which is a continuation of application Ser. No. 08/510,327, filed Aug. 2, 1995 (now U.S. Pat. No. 5,655,013), which is a continuation of application Ser. No. 08/229,517, filed Apr. 19, 1994, now abandoned.

FIELD OF THE INVENTION

The present invention relates generally to the fields of telecommunications and penal institution management. More particularly, the invention relates to a computer-based method and apparatus for controlling, monitoring, recording, and reporting access to audio, video, and/or data signals entering a controlled, institutional environment, such as a prison, military base, hospital, school, business or government organization.

BACKGROUND OF THE INVENTION

Generally, the need to control access to outside information sources—i.e. via a telephone line—in an institutional environment is well recognized. In order to prevent individuals from incurring large, unaccountable telephone costs which the institution ultimately bears, one must either restrict access to outside telephone lines or institute accounting controls whereby the costs of unauthorized calls can be billed to the responsible individuals.

Telephone systems in correctional environments require additional security considerations. Without appropriate controls on telephone access, inmates have been known to use the telephones to harass outside parties (such as witnesses who testified against them, attorneys who prosecuted their case, employees of the courts, etc.), to perpetrate fraudulent schemes, and to participate in criminal conspiracies (such as arranging the smuggling of contraband into the prison, directing an outside criminal enterprise, plotting escape attempts or credit card fraud). Therefore, it is critically important for correctional management officials to carefully plan, control, monitor and record inmate access to outside telephone lines.

One of the most fundamental problems—which exists both in correctional and other business-oriented institutions—is cost control. To achieve cost control, it is critical that there be individual accountability for each call that incurs a charge to the institution. Such accountability is typically achieved through use of a personal identification numbers ("PIN"). Before making a call from an institution telephone, an individual must enter his PIN. The telephone service provider is then able to deliver to the institution an end-of-the-month telephone bill which lists, in addition to the cost of each call, the PIN or name of the individual who made the call. From this information, the institution can then collect reimbursement from individuals for the costs of certain calls.

While this system of end-of-the-month call accounting functions reasonably effectively in a business like environment, it does not work well in a penal institution. The reason is that inmates show little concern for phone bills they can't afford to pay. Thus, the institution is often forced to absorb the costs of phone calls by its delinquent inmates. Moreover, the fact that account balances are only computed periodically—i.e., every month, week, or even every day—permits the inmate to accrue large, uncollectible phone bills before his access to the phones can be terminated.

Traditionally, penal institutions have addressed this problem by restricting inmates to collect calls only. This, however, still provides the inmates with relatively unlimited access to the outside world, leaving open numerous opportunities for fraudulent and criminal activity, as explained below. Therefore, in a penal environment, it is highly desirable to regulate phone access on an individual, pay-in-advance basis, and to immediately and automatically terminate an individual's phone access when his/her paid-up account reaches a zero balance. Another problem in penal institutions is the inmates' desire to make threatening or harassing phone calls to witnesses, prosecutors, police officers, parol officers, psychologists, judges, and the relatives and family of such persons. Limiting the inmates' access to collect calls only does not effectively address this problem, since an inmate can easily identify himself (to an operator) as someone from whom the recipient would likely accept a collect call. Rather, one should, at a minimum, provide a means that permits a potential call recipient to identify the caller as an inmate before accepting the call, whether that call is placed on a prepaid or collect basis. Conventionally, this is done by initially placing the inmate on hold and playing a pre-recorded message telling the recipient that a call has been placed from a correctional facility and that, if the recipient wishes not to receive the call, he/she should hang up before the call is connected.

This approach mitigates, but does not fully solve, the harassment problem. In particular, it is still possible for an inmate to repetitively call an outside party; even if the recipient hangs up after hearing the pre-recorded message, the harassing effect of receiving repetitive calls from inside the correctional institution remains. Therefore, it would be highly desirable to provide an institutional telephone system that automatically prohibits inmates from attempting to call certain outside persons. Moreover, it would also be highly desirable to provide a method and apparatus for allowing a recipient of an undesired call from an inmate to easily and automatically prohibit all future calls from that particular inmate, or from all inmates generally.

Still another concern in correctional institutions is the regulation of access to telephone systems. For various security and management reasons, it often desirable to restrict a given inmate's telephone access to particular phones, calling times, and to limit the length of calls, number of calls, and number of calls to the same number. Also, to enhance security and discipline, it should be possible to instantaneously revoke an inmate's calling privileges, or to otherwise modify the extent of a particular inmate's calling privileges.

Correctional institutions also typically wish to monitor and/or record outgoing calls. Inmate-to-attorney calls, however, cannot legally be monitored or recorded. Moreover, certain inmates—those who represent particular security risks—deserve live monitoring, as opposed to mere recording. Thus, it would be highly desirable to have a system which automatically initiates the appropriate monitoring and/or recording depending upon the identity of the inmate placing a call and the recipient of the call (i.e., attorney or non-attorney). Likewise, it may be desirable that calls to certain numbers are to be monitored live, while others need only be recorded.

Because the message content of inmate-to-attorney calls cannot be legally recorded or monitored, such calls can serve as a conduit for the inmate's illegal telephone activity. Therefore, it would be highly desirable to have a system which could passively—that is, without in any way monitoring or recording what is actually being said—monitor inmate-to-attorney calls to ensure that: (1) the only two people speaking on the line are the inmate and attorney, and/or (2) no DTMF tones, rapid line impedance changes, off-hook conditions or voltage spikes appear on the line.

The institutional phone system features identified above are well-known in the penal industry and have been implemented in a fragmented fashion in a variety of analog and hybrid analog-digital systems. One example is presented in Brown et al. U.S. Pat. No. 5,535,261, entitled SELECTIVELY ACTIVATED INTEGRATED REAL-TIME RECORDING OF TELEPHONE CONVERSATIONS. Brown taught the utilization of a personal computer ("PC") to interface, via a parallel port, to so-called "conventional" line control cards, wherein the cards were presumably installed as part of a Private Branch Exchange (PBX) switching system. The system in Brown also included a digitizing board and disk storage, which connected to the PC via a standard ISA bus and which enabled the PC to digitize and record a call. Thus, Brown is an example of hybrid analog-digital systems, which provide analog PBX switching combined with digital control and/or recording.

The system of Brown, however, has very limited application. The parallel port has a severely limited bandwidth; so small, in fact, that only a very limited quantity of phone lines can be accessed, monitored and recorded at any one time. Similarly, the speech digitizing board appears capable only of generating a single stream of output, and therefore seems able to synthesize voice signals on only one phone line at a time. Unfortunately, the patent of Brown does not disclose how many phone lines may be monitored and recorded at any given time. Also, Brown does not disclose the actual techniques and physical means used to detect SIT's, rings, busy tones, three-way calls, additional DTMF digits, etc. Brown further does not disclose exactly how the digitizer is presented with an analog signal from the phone lines. Thus, Brown basically discloses only the specific computer software modules, used in the Gateway CPS-4000 system, which implement the basic database and decision-making required to enable the disclosed hardware system to provide event-based recording.

Another system which provided most of the above-mentioned features was disclosed in Gainsboro U.S. Pat. No. 5,655,013, entitled COMPUTER-BASED METHOD AND APPARATUS FOR CONTROLLING, MONITORING, RECORDING, AND REPORTING TELEPHONE ACCESS. Gainsboro, similar to Brown, taught a hybrid analog-digital system, wherein the telephone line circuit interface was primarily analog. Analog line signals were interpreted via a DTMF receiver, and analog modules for current and voltage detection of ring, tip, busy tones, etc, were included. Similarly, line signals were generated via a DTMF generator and a dial tone generator. Ultimately, the inmate subscriber line and the central office trunk line were directly physically connected to one another, with no delay or isolation between the inmate's telephone and the outgoing telephone line.

Similar to Brown, Gainsboro disclosed the use of a personal computer to provide database, control, and terminal functions. Gainsboro also disclosed the use of remote, administrative terminals, which were interfaced to the personal computer via a standard multi-port serial card. In addition, Gainsboro taught an interface of the analog line cards with an optional, stand-alone "voice message system".

However, the system disclosed in Gainsboro had three major drawbacks. First, it did not provide integrated recording functionality; the system was only able to output record signals to a separate recording unit. Second, although the system of Gainsboro was computer-based, the system was very limited in functionality and required separate equipment to provide phone line interfacing, recording, and voice messaging. Third, the output to the external recording units was implemented via analog switches; when recording was initiated, an inmate would hear a click and know that her call was being recorded. Thus, the system remained subject to the limitations of hybrid analog-digital systems.

As the above discussion shows, there is a present need for an integrated system for managing institutional phone activity, which would incorporate all of the above features, avoid the problems of analog architecture, and build upon modern digital telecommunications technology to integrate computer control and switching functions within one functional unit.

SUMMARY OF THE INVENTION

In light of the above, one object of the invention is a method of managing telephone activity in an institutional environment to achieve improved security and reduced cost. Another object of the invention is a system adapted to perform such improved institutional telephone management.

Another object of the invention is a method and apparatus for passively monitoring a telephone connection to detect security breaches.

Yet another object of the invention is an institutional telephone management system wherein the parameters that control the operation of the system as well as the records of system activity are stored in a central database, thereby permitting simple customization of system operation, generation of reports and monitoring of status.

A still further object of the invention is an institutional telephone management system, wherein the system may communicate with a centrally located administrative facility for the purpose of archiving data and for the purpose of providing central reporting and system maintenance features.

Further, the systems of the present invention may be used in conjunction with conventional "truth" software which detects the harmonic levels of voice signal to trigger the various features of the system described herein.

In accordance with one aspect of the invention, a method of managing telephone activity in an institution includes the steps of:

(1) receiving, on an in-house telephone line, a communication connection placed by institutional caller (the "calling party"), who wishes to call an outside recipient (the "called party");

(2) identifying the calling party and the number of the outside recipient, and, optionally, the identity of the called party;

(3) verifying the calling party's account against predetermined administrative parameters, such as (a) whether the calling party is permitted to place outside calls, (b) whether the calling party has an active account, (c) whether the calling party is permitted to call the dialed number, etc;

(4) on a second communication connection via an outside line, automatically setting up the call which the calling party wishes to place (i.e. a collect call or direct dial call), while the calling party remains on hold on the first communication connection, by: (a) calling said outside recipient (called party), (b) providing the identity of said institutional caller to said outside recipient and (c) receiving a response from said outside recipient; and (d) determining, based upon said response, whether to connect the institutional caller to the outside recipient, and optionally, whether to indicate any of a plurality of messages to the calling party;

(5) providing the outside recipient with the option, via a voice prompt menu, of prohibiting any future calls from the particular institutional caller or, if desired, prohibiting calls from any person within the institution and/or related institutions;

(6) based upon the results of (4) and (5) above, connecting the calling party to the called party;

(7) monitoring the coupled communication connection for any of the following: (a) an indication that the parties have hung up, (b) an indication that the called party no longer wishes to receive communications from the calling party, (c) failure of the call to satisfy any longer any of the administrative parameters (i.e. insufficient funds in account, maximum calling minutes per day exceeded, etc), (d) keywords which indicate that illegal or fraudulent activity is being transacted, or (e) other communication signals that indicate that illegal or fraudulent activity is being transacted;

(8) optionally recording the communication connection, based upon administrative parameters and the results of (7) above, without the parties having any indication of the recording; and (9) monitoring, in real-time, the communication connection without the parties having any indication of the monitoring.

Any multitude of call prohibitions can be established as to any particular inmate by the prison administration or the called party, including total blocking based on the called party's telephone number, blocking during particular time periods, blocking based on the class of the crime associated with a particular inmate, etc.

In accordance with another aspect of the invention, an apparatus for managing telephone activity in an institution includes: a plurality of institutional telephones located within the institution; a digitally-based facilities management unit (FMU) for selectively connecting the institutional telephones to one or more outside telephone lines, wherein the FMU includes a means for receiving and interpreting signals present on either the institutional or external telephone lines, a means for controlling the connection of the institutional telephones to the outside telephone lines based upon signals received from the outside telephone lines, a means to generate signals to either the called party or the calling party, and a means to store (i.e. as in a database) information regarding the calling privileges of each person within the institution and regarding the calls made by each person.

Other features of the FMU provide security and monitoring functions. The invention provides three levels of monitoring, any or all of which may be active for any given call. The first level is "live" call monitoring, where the prison officials actively listen to a live call.

The second level is call recording. The FMU can be programmed either to enable associated recording equipment to record telephone calls or to digitally record the call itself, the latter of which enables calls to be more easily queued, retrieved, searched, and generally accessed. The call recording can be enabled for all calls, or can be specifically enabled upon the occurrence of a specified event. For example, the recording may be enabled based upon the number dialed, the time of day, or any other administrative parameter. Further, the FMU can be programmed to annotate the recordings with a voice message, either at the beginning and/or end of the call only, or intermittently indicating, for example, the date and time.

The third level is "passive" line monitoring, where the FMU detects, for example, DTMF tones, off-hook conditions, voltage spikes, or sudden line impedance changes, in order to thwart attempts at unauthorized three-way calling, call conferencing, call transferring, call forwarding or redialing via various alternate common carriers, many of whom now offer "1-800" or local telephone number (e.g., "950") access numbers. Additionally, the passive line monitoring may consist of the "listening" by a digital signal processor to the words of the call, and, upon the "hearing" of a certain word or phrase, the call may be recorded or the institution authorities alerted.

Care is taken to avoid disrupting calls that do not represent security breaches, by preventing false triggering of the above "passive" line monitoring features. For example, with respect to DTMF tone blocking, the FMU will look for any additional digits entered by an institutional caller, such as an inmate, to prevent the inmate from re-dialing to other telephone numbers that may not be authorized. However, to prevent "talkoff", whereby the normal telephone conversation can falsely trigger a disconnect signal (because the FMU may interpret the conversation as DTMF dialing), the FMU can be set to look at the number of digits dialed within a specified time period (e.g., six (6) digits within a fifteen (15) second time period, or any variation of the two parameters) and thereby, determine whether the audio information is indicative of unauthorized DTMF re-dialing or just a normal speech or voice pattern.

In accordance with the preferred embodiment of the invention, all calls are passively monitored and all calls that can be legally recorded—i.e., all but inmate-to-attorney calls—are recorded. At any time, prison officials can selectively invoke live monitoring to listen in on any call in progress, except an inmate-to-attorney call. System alarms, which trigger any time a particular inmate places a call or calls a certain person, allow officials to determine when live call monitoring is appropriate.

Likewise, the telephone system of the present invention can be programmed to default in any manner. For example, the system can be set to place only those telephone calls that are among a pre-approved list of telephone numbers. Conversely, the system can be set to place all telephone calls except those that are among a list of restricted telephone numbers. Optionally, the telephone system of the present invention can include speed-dialing, whereby upon entering a PIN, for example, an inmate can enter "11" followed by the "#" key. In that case, the prison administrator may have established that "11" is the speed-dialing sequence for that inmate's mother. Of course, the system could be configured so that the inmates themselves can program the telephone system with speed-dialing digits, however, a principal objective of speed-dialing is to save time at the telephone, thus making the telephones available to the largest number of inmates in the shortest possible time period.

From an administrator/user perspective, the system of the present invention supports the following general functions:

(1) establishment and configuration of individual inmate data and monetary accounts;

(2) checking of inmate debit (i.e. paid-in-advance) accounts;

(3) setting of global (i.e. institution wide) and individual restrictions on telephone access;

(4) real-time monitoring of inmate telephone calls and alerts (based on call content, security breaches, etc.), along with the ability to cut off inmate calls individually or globally;

(5) storing and reporting of call details and account information, including attempted calls;

(6) storing and reporting of telephone usage data; and

These administrative functions are achieved through the use of a relational database management system (RDBMS), such as Oracle, which provides data integrity, true client/server architecture, database and network security, audit capabilities, and a flexible, scalable application development environment.

This database is combined with a customized graphical user interface make the system user-friendly.

The system software includes a structured query language (SQL) interface, in order to allow those who are experienced database users to access specific database information. However, two simpler methods of performing queries are also provided: (1) query by example, in which administrative staff enter the desired search information directly into a data field displayed as part of a system information screen, and (2) query by drag-and-drop query tool, in which the query tool provides a user-friendly "view" of the relational database information in an already-related, more usable format. An example of such a "view" is that when a user asks for an inmate's 'account', the user is provided with all the data which is related to the inmate, including data from multiple facility locations and the inmate's relevant status and call information. A "wizard" is also provided to walk new users through the steps of creating a query.

Forms may be created via an Oracle development tool with a graphical user interface. The forms generator includes a built-in SQL interface to the database. In addition, a commercially-available SQL report writer is also integrated within the system. This program can generate specialized reports of calling activity or other system usage; however, many reports are preprogrammed and can be selected from the graphical user interface.

The invention further includes biometric voice verification features. The FMU, for example, digitizes a sample of the caller's (and called party's voice, if desired); then, at a later date, the FMU can compare the digitized sample with a stored voice print, to verify the identity of the caller. Such biometric monitoring can also be used in a passive call monitoring mode, wherein periodic samples of the caller's voice are recorded—and checked against a list of authorized voice prints—to ensure that no unauthorized callers are participating in a call, and to ensure that inmates are not sharing or selling relatively liberal calling privileges associated with a particular PIN or inmate account to other inmates that are subject to more limited calling privileges.

In general, the use of biometric voice verification (or "voice prints") can prevent PIN abuse. For example, if a particular inmate with restricted calling privileges, or no available funds, attempted to force (e.g., by threatening physical attack) another inmate with relatively non-restricted calling privileges (or available funds) to turn over his PIN, biometric voice verification would obviate this problem, as the voice would be used to validate entry into any inmate account. The biometric voice verification, if used in cooperation with other police authorities with access to voiceprints, can also be used to determine the identity of the called party.

Optionally, digitized voice samples can be taken for each call made, whereby such samples are sufficient in length to provide verification that the inmate indeed participated in a conversation with a particular called party on a particular date and at a particular time. Because prison administrators may not wish to charge inmates (or in the case of collect calls, called parties) for certain calls (for example, calls the administrator deems incomplete), it is critical that administrators have the ability to verify actual telephone communications. Incomplete telephone calls may include, for example, busy signals, calls that do not "go through", calls that are not answered (as distinct from calls that reach answering machines, which may be deemed complete), etc. Thus, if an inmate or a called party subsequently claims that a particular telephone communication never occurred (e.g., a busy signal was reached, the called party never answered, or no voices were spoken at all), the prison administer can retrieve the voice verification record to evaluate whether, e.g., a credit is due, telephone system repair is required, or whether claims that certain calls were incomplete are false.

Advantageously, the FMU's digital recording feature also permits the recording of the pronunciation of inmate's name and subsequent retrieval each time the message is generated. This eliminates the risk of an inmate interjecting a short message in place of his/her name. The pronunciation of an inmate's name can alternatively be synthesized from well-known commercially available electronic phoneme sets, or can be reproduced from a voice data file created by the actual inmate or administrator. For example, when an inmate first enters a corrections facility, he/she may be instructed to recite his/her name into a voice recorder via a microphone. Then, that voice can be stored permanently into a file associated with that inmate's calling account and/or PIN, and can be automatically replayed as desired.

Speech recognition capabilities may also be incorporated within the FMU. For example, a speech-to-text algorithm would permit a transcript of a call to be made automatically and printed out. Keyword recognition may also be used to identify calls which may be of an illegal or fraudulent nature, and the appropriate authority may be alerted or the call may be recorded.

In accordance with another aspect of the invention, the above apparatus for managing telephone activity in an institution further includes a connection to a centrally located operations facility, wherein data may be exchanged and system maintenance may be performed from the central facility.

BRIEF DESCRIPTION OF THE DRAWINGS

The detailed description below describes the preferred embodiments of the invention and is intended to be read in conjunction with the set of drawings, in which:

FIGS. 4A through 4C are exemplary screens showing an institutional user's calling privileges and activity;

FIG. 5 is a sample report which may be created by the preferred embodiment of the invention, showing the telephone numbers which were most frequently dialed by institutional users;

DETAILED DESCRIPTION OF THE PREFERRED EMBODIMENTS

Figure 1:
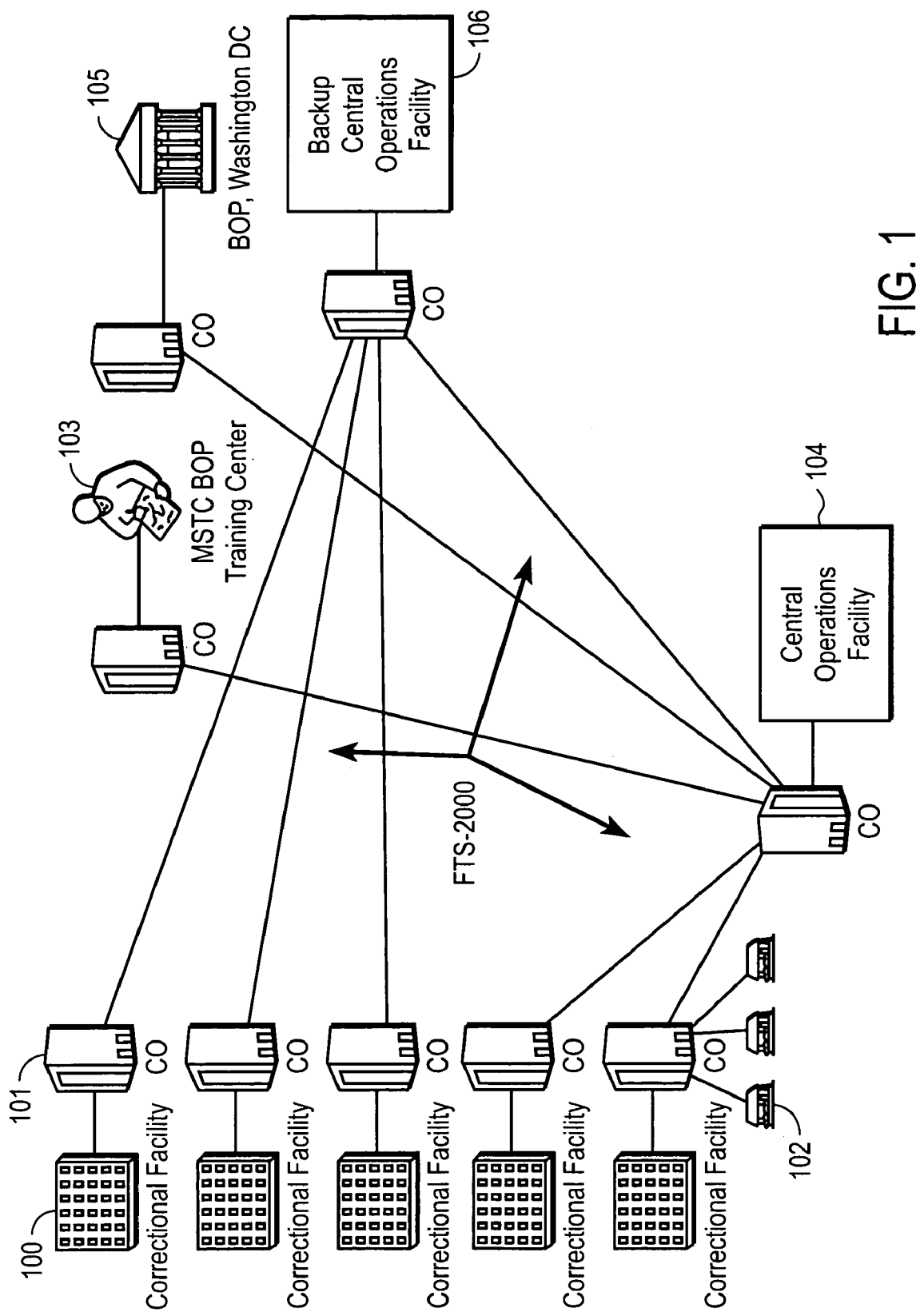
FIG. 1 is a block diagram showing an overview of the facilities involved in the preferred embodiment of the present invention.

The preferred embodiment(s) will be described with reference to prison based call management. This, however, should not be viewed as limiting, since the invention is also applicable in other institutional settings such as military bases, schools, mental institutions and business organizations.

I. Introduction:

The current invention was developed for the Federal Bureau of Prisons ("BOP"), as an upgrade to the current BOP Inmate Telephone System (ITS). The BOP currently operates approximately 90 federal prisons throughout the U.S. and Puerto Rico. Each correctional facility houses between 300 and 4,500 inmates, and the total inmate population is approximately 100,000 inmates. The facilities range from "low-security" to "Ad-Max security," and inmate phone access accordingly varies from highly restricted access to minimally restricted access.

The new inmate telephone system, designated "ITS-II," provides correctional facility inmates with fully-automated direct-dial and collect calling privileges for local, long distance, and international calls, using the Federal Telecommunications System (FTS or FTS2000) proprietary telephone circuits wherever possible. The ITS-II architecture is fully modular and expandable. The ITS-II is designed to handle at least 150,000 inmates at 150 correctional facilities; however, call traffic is limited only by the number of inmate telephone stations within the correctional facilities.

Further, the ITS-II is a controlled-access system. An inmate's ability to make telephone calls may be limited on the basis of the security rating of the inmate, the facility which the inmate is at, the number the inmate is attempting to call, the quantity of time the inmate is permitted to call per day, the amount of money which the inmate has available to use for calls, etc. Each inmate is provided with a telephone billing account, and the inmate may purchase credits for the account. The balance of the account must stay positive.

The ITS-II is designed as a national network of local correctional facility telephone systems, combined with a centralized database management system. The long-distance telephone circuits are generally provided by the Federal Telecommunications System (FTS or FTS2000), but circuits from other telephone service providers may also be incorporated. Database records are kept for each inmate, containing information on the inmate's calling history, calling permissions, billing account, etc. Each correctional facility system maintains this database information for each inmate at that facility; in addition, complete database records are stored at a Central Operations Facility. The Central Operations Facility also houses an E-mail server which provides system-wide E-mail capability.

In addition to inmate direct dial and collect call services, the ITS-II provides various administrative capabilities to ensure the financial integrity of the inmate telephone account system. These capabilities include inmate account management, audit trails, transaction reports, centralized management and report capabilities, and detection and elimination of fraudulent schemes to use telephone service providers other than the FTS.

Because of the importance of the ITS-II in maintaining inmate morale at a correctional facility, the ITS-II is designed as a highly reliable, high-quality transmission system which conforms to all appropriate industry standards for voice communications in office environments.

In the detailed description which follows, reference will be made to the BOP, the Federal Telecommunications System (FTS or FTS2000), and the Federal Prison Point-of-sale (FPPOS) or Commissary system. One skilled in the art will recognize, however, that although the ITS-II was designed around the BOP requirements, the disclosed system has a wide range of applications restricted neither to the BOP nor, in fact, to prison facilities. The BOP is only one institutional customer, of many, who can make use of this system. Furthermore, although this system is designed around the FTS telephone circuits, the system is equally able to be used with the telephone circuits of any other telephone service provider. Likewise, the Commissary may be understood as a typical account-based point-of-sale system. Therefore, references herein to the BOP, the FTS, the FPPOS, or the Commissary are not intended to limit the scope of the application of this invention.

II. ITS-II Equipment Overview:

Accordingly, as shown on FIG. 1, the ITS-II consists of local inmate phone systems located at each high-security correctional facility 100 and low-security facility 102, which interface over the FTS Central Offices 101 to the Primary Central Operations Facility ("PCOF") 104 via a wide-area network. The PCOF contains central database servers, backup storage, mail servers, routers, system maintenance, etc. Also connected are the Backup Central Operations Facility ("BCOF") 106, a Management and Specialty Training Center ("MSTC") 103, and the BOP Central Office Headquarters 105, which provides both administrative support and training.

Figure 2:
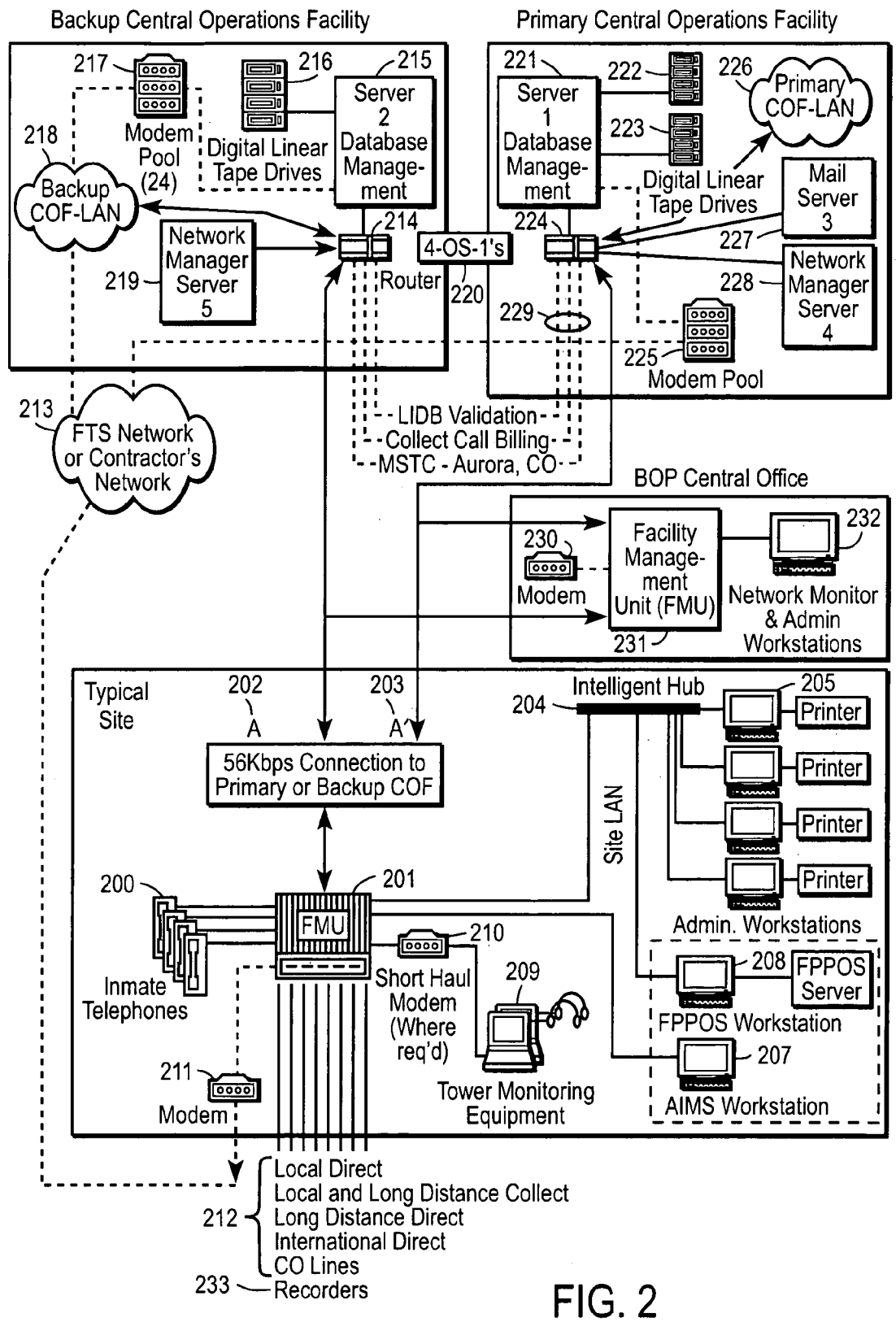
FIG. 2 is a block diagram showing the system architecture of the preferred embodiment, including equipment located at a typical site, at a Primary Central Operations Facility, at a Backup Central Operations Facility, and at a customer headquarters (BOP Central Office)

The ITS-II components are more specifically shown in FIG. 2.

At a typical site, the backbone of the local equipment is the "Facilities Management Unit" or "FMU" 201, which controls and connects a plurality of inmate telephone stations 200 with a plurality of outside telephone lines 212. The FMU is locally networked via an intelligent hub 204 to local administrative workstations 205 and to the local Federal Prison Point-of-Sale ("FPPOS") system workstation 206 and server 208. Via a serial port, the FMU also may connect in a send-only manner to the Automated Intelligence Management System ("AIMS") 207, which is used by correctional facility investigative staff. Local terminals 209 are provided for the purpose of real-time monitoring of phone conversations; where the distance from the FMU 201 to the terminals 209 is far, these terminals may be connected via short haul modems 210.

The FMU 201 exchanges database and call record information both with the PCOF 104 and with the BCOF 106 via two dedicated 56 Kbps digital T0 FTS lines 202, 203 and routers 214, 224. The routers 214, 224 coordinate the intercommunication among the FMU 201, the primary Database Management Server "1" 221, the secondary Database Management Server "2" 215, the Mail Server "3" 227, the primary Network Manager Server "4" 228, and the backup Network Manager Server "5" 219. The two routers are themselves interconnected via four DS1 digital FTS lines, representing a link of 1.5 Mbit/s. The routers 214, 224 additionally provide a link to the PCOF and BCOF local area networks 218, 226 for administrative terminals at each facility.

In the event that the FTS direct lines should fail, the FMU 201 may also connect to the PCOF and BCOF via one or more modems 211. Both facilities have modem pools 217, 225 for the purpose of receiving these modem connections and communicating between both facilities. For maximum reliability, the modem connection can be established either via FTS circuits or via another telephone service provider's circuits 213.

Inmate information and call records are maintained on both the Primary Database Management Server "1" 221 and the Secondary Database Management Server "2" 215. The secondary server 215 functions ordinarily as a backup server. Replication software automatically maintains a copy of data at the two locations. The servers 215, 221 are in continuous operation, each server maintaining a current version of the entire inmate and call record database as a backup to the other. In the event that either of the servers fails, the remaining server continues to provide full database management operation for the ITS-II. Each server has disk storage capacity in the form of a Redundant Array of Independent Disks (RAID storage), in order to securely maintain the critical database information.

Additional database protection is provided by large-scale backup tapes for each server. The database management server at the PCOF has two large-capacity Digital Linear Tape drives, as manufactured by, one to perform database backups 223, and the other to archive 7 years of data for immediate on-line access 222. The Alpha server at the backup location also has a Digital Linear Tape drive 216 to archive continuous daily/weekly backups.

A third server 227 provides e-mail service and operates independently of the call processing hardware and software of the ITS-II. Its purpose is to provide an efficient means of inter- and intra-site, on-line, workstation-to-workstation communication. While the server is located at the PCOF, the e-mail network links all correctional facilities 100, the MSTC 103, and the BOP Central Office 105.

A fourth and fifth servers 219, 228 provide network management capability. The network management system is responsible for monitoring the operational aspects of each node on the network and its associated components. Information concerning network performance is monitored at both the PCOF 104 and at the MSTC 103 so that problems associated with the network can be rapidly identified and remedied by the technical support organization.

All of the servers are protected by surge and UPS protection. However, a backup generator is also provided at the PCOF 104 to power all of the ITS-II equipment at this site in the event of a utility power failure to the facility. In the event of such a failure, the UPS will provide sufficient power duration until the generator's transfer switch can automatically start the generator. Once in operation, the generator can essentially provide continued power until the utility service is restored to the facility.

Additionally connected to the routers 214, 224 are an (LIDB) Validation Interface, a Collect Call Billing Interface, and MSTC 229. The Line Information Database (LIDB) Verification is achieved via an X.25 gateway to an (LIDB) provider, and the return codes are stored as part of an inmate's call record. The Collect Call Billing interface consists of transmitting details regarding collect calls placed via the ITS-II to a billing agent, who then collects the charges through collection agreements with local exchange carriers. The MSTC has an FMU system connected via a 56 Kbit/s FTS Dedicated Transmission Service link to each central office facility. The modem pools 217, 225 also serve as a backup line of communication to the LIDB service and the MSTC FMU.

The ITS-II is further configured to support the new Locked-Martin Local Number Portability (LNP) database for accurate billing of collect calls as Local Number Portability is deployed.

Lastly, the routers 214, 224 are connected to an FMU system 231 at the BOP Central Office 105 via a 56 Kbit/s FTS Dedicated Transmission Service link to each central operations facility. Network monitors and administrative workstations 232 are also located at the BOP Central Office 105. Modem 230 provides a backup link to the PCOF 104 or BCOF 106.

III. FMU Hardware:

The FMU is a modular digital implementation of the TMU system described in Gainsboro U.S. Pat. No. 5,655,013, entitled COMPUTER-BASED METHOD AND APPARATUS FOR CONTROLLING, MONITORING, RECORDING, AND REPORTING TELEPHONE ACCESS. The FMU incorporates all of the features of the TMU, Voice Board and Answer Supervision Board, as well as provides significant new functionality specific to working within the digital framework.

Figure 3A:
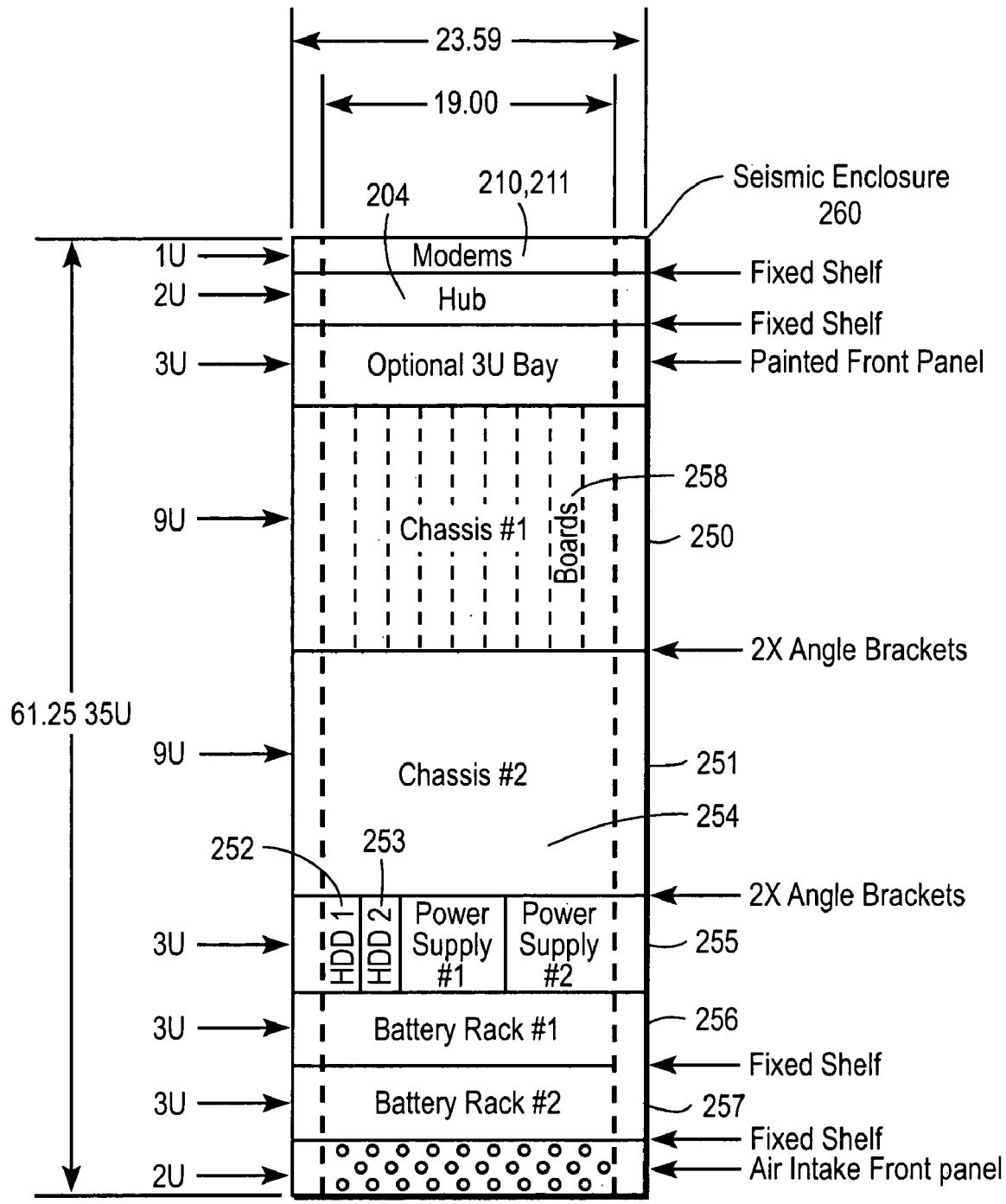
FIG. 3 is a block diagram of a FMU.

With reference to FIG. 3A, the FMU in the preferred embodiment is contained within a seismic enclosure 260. The FMU comprises two modular chassis 250,251, having backplanes which allow the FMU to be configured with up to 16 modular boards 258 each. The backplanes connects modular boards 258 together and provides external I/O to rear-mounted connectors. Separate configuration and TDM (Time Division Multiplex) busses are included on the backplane. Power supply modules 254,255 control the batteries in battery racks 256,257 and provide power to the chassis 250,251. Hard disk drives 252,252 are further connected to the chasses. The backup modem 211 and short haul modems 210 are located at the top of the seismic enclosure 260, along with the intelligent hub 204.

Figure 3B:
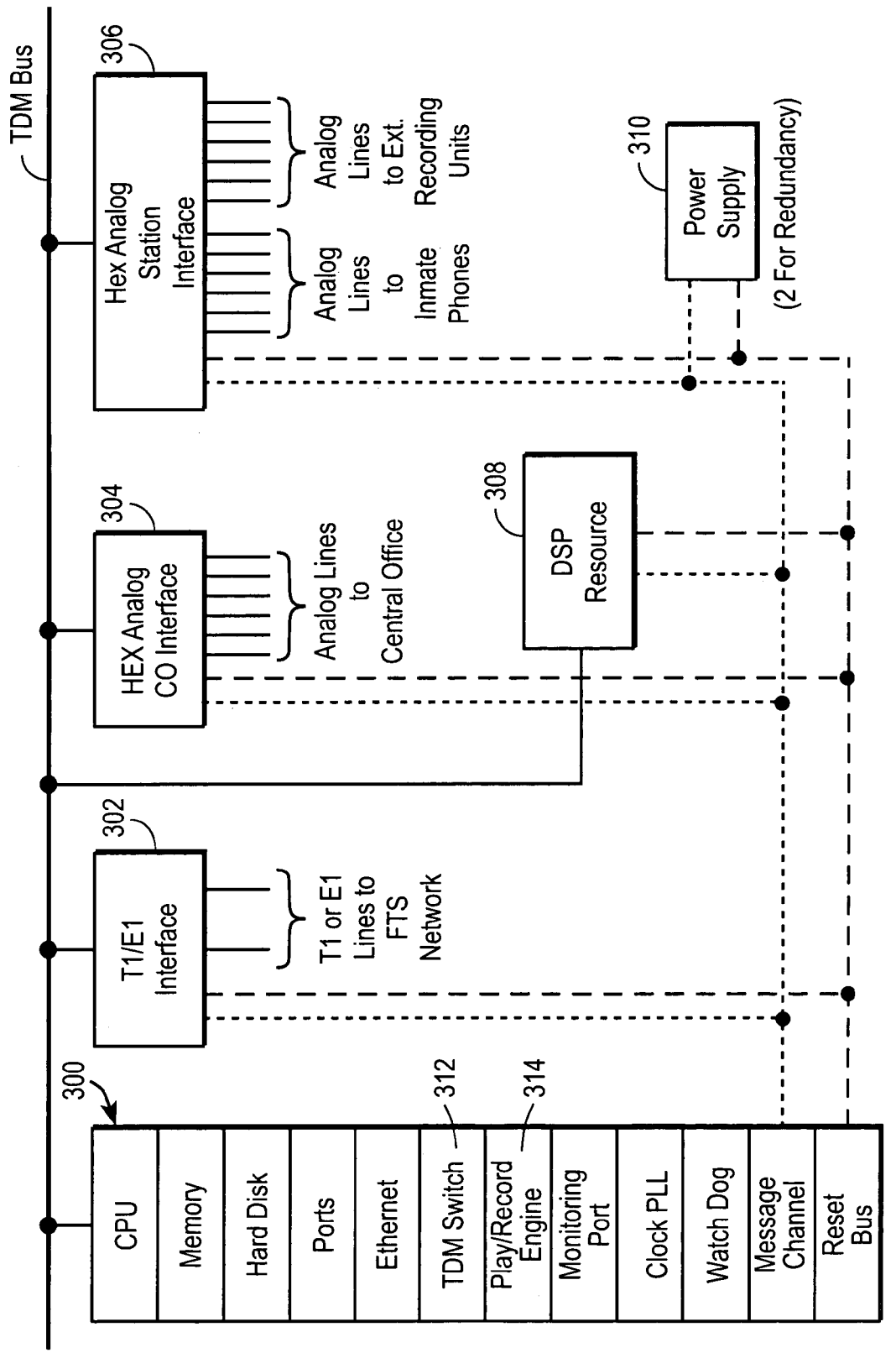

With reference to FIG. 3B, the modular boards 258 which are available in the FMU are: CPU Card 300, Dual T1/E1 Interface Card 302, Hex Analog CO Interface Card 304, Hex Analog Station Interface Card 306, and Quad Digital Signal Processor Resource 308. Further, power supply modules 310 (reference numbers 254 and 255 on FIG. 3A) are included. Each modular board is assigned unique configuration and TDM addresses by a hard-wired slot address on the backplane. These modular boards, and the power supply module 310, are designed to be "HOT-SWAPable" (HOT-SWAP is a trademark of Linear Technology).

The overall operation including connections and circuitry of the modular boards 258 will be clear to one of skill in the art; additional description is considered generally redundant, although limited descriptions will be provided below, in order to highlight and summarize the functions provided by the cards.

A. Power Supply 310. This module is a 500 watt off-line switching power supply with power factor correction, a battery charging circuit, DC—DC converters, and fault detection and monitoring circuitry.

1. The FMU modular cards and FMU power supply 310 are designed to allow hot power supply insertion and removal. Power sequencing and current limiting is employed to prevent connector arcing and output voltage sags during board insertion and removal. The power supply is designed to operate in parallel with a second identical power supply, for redundancy.
2. Output voltages are monitored to be within specific tolerances by a local microprocessor/controller. Input line voltage and input line current values are also monitored via transformers.
3. Faults may be reset via a local fault reset switch or via the local microprocessor. The power supply is self-protecting under short-circuit and over-load conditions.
4. The power factor corrected off-line supply and current-sharing DC—DC convertors are constructed using commercially available, packaged assemblies.
5. An unbalanced (battery side) ring generator is implemented to allow 10 to 15 phones to ring simultaneously.
6. The power suppy 310 is designed to interface automatically with external batteries and to take power from the external battery when AC power is removed. Battery protection circuitry is included in a controller and a trickle charger. Each power suppy 310 is connected to a separate set of external batteries. The controller and trickle charger monitor the condition of the battery cells and adjust battery charging parameters to ambient temperature. The batteries may be rated to provide two hours of backup power.
7. The power supply microprocessor monitors the following conditions using on-board sensors and a 12-bit on-board A/D: power supply failure, battery failure, high temperature, low airflow, −48 voltage, +5 voltage, external battery attached, battery charging, battery voltage, AC voltage, current from offline −48V supply, current into DC—DC convertors, and board serial number. When errors occur, fault conditions are sent to the CPU board (below), and an on-board LED is flashed.

B. CPU Consolidation Card 300. This card integrates system control and inter-system communication onto a single card.
1. This card contains a "CPU Module" consisting of an 80486 processor, 32 MB DRAM, 128 kB EPROM, watchdog, clock-switching PLL, and an IDE hard disk controller connected to the enclosure-mounted IDE 2.0 GB disk drives. Also provided on this card are eight RS-232 ports, two configurable synchronous ports, a '10 Base T' Ethernet controller, redundant TDM switching resources, TDM record/playback logic, a TDM Monitoring port which may be configured to access any ST-BUS channel, and a custom, field-programmable, "glue logic" controller which interfaces the various signals to the various circuits on this card.
2. This card communicates with other cards via two HDLC synchronous half-duplex 2.048 Mbit/s "Message Channel" ports; each other card similarly contains an HDLC controller to receive messages.
3. This card, transmitting via a 300 baud UART onto a redundant "Reset Bus," can reset or power cycle each card in the FMU 201. Each plug-in card has a small microcontroller, or "Fault Reset Sequencer," that supervises that card's hot-swap controller and monitors the Reset Bus for commands. The bus supports such commands as: (1) "Test," whereby CPU card toggles a control line that can be read by the destination card to test the Reset Bus operation; (2) "Reset Breaker," whereby the destination card's circuit breakers are reset one at a time; (3) "Power cycle," whereby the destination card's circuit breakers are power cycled; and (4) "Broadcast Reset," whereby all tripped circuit breakers in the FMU are sequentially reset at 10 mS intervals.
4. This card is designed to provide redundancy; two such processing cards are installed in the FMU 201. When one CPU card fails, the other card takes over. The Message Channel is used to monitor for CPU card failure.

C. Dual T1/E1 Interface Card 302. This card includes two T1 or E1 communication ports, a TDM bus interface and error management. Each T1/E1 Interface Card takes one outgoing TDM stream and one ingoing TDM stream. The T1 or E1 controller may be implemented via commercially available T1 or E1 integrated circuits, which incorporate all the necessary interface logic, i.e., elastic store and line drivers, line receivers, clock equalization, signaling detection, and signaling generation. A digital signal processor, in combination with a field-programmable, "glue logic" controller, controls the card.

D. Hex Analog CO Interface Card 304. This card provides six outside lines to the analog telephone network. Standard analog line interfaces are implemented, with separate ground start relays on ring and tip lines, ring detection, TIP ground detection via a ground start relay, line current detection, and analog loopback. A digital signal processor, along with a glue logic/timing controller, is used to control the card and to exchange call channel data with the TDM bus.

E. Hex Analog Station Interface Card 306. This card implements six interfaces to local institutional phones.
1. Most of the functions involved in setting up, operating, and closing a phone call are performed by the DSP on this card, including: (a) recognizing a local telephone off-hook condition, based upon an output from the Station Line Interface Circuit (SLIC); (b) generating a dial tone to the telephone; (c) detecting DTMF and rotary dialing signals; (d) generating outgoing DTMF tones; (e) detecting progress tones from the Central Office ("CO"); (f) monitoring for DTMF tones present on either the inmate station lines or the outside line during a call; (g) filtering out DTMF tones if required; (h) cutting off a call, as required, as soon as illegal DTMF tones are detected; (I) combining the "inmate voice" signal, coming in from the inmate station, with the "outside party voice" signal reaching the card over the ST-BUS stream, for recording purposes; (j) recording, in on-board memory, the first 10 seconds and last 10 seconds of all calls, for use in billing dispute resolution and fraud investigations; (k) forwarding recordings to the CPU Card for storage; (l) transmitting combined voices over the TDM bus for external monitoring and recording by equipment connected to the FMU ports or networked through the intelligent hub; and (m) outputting the combined voice signals in analog form to external recording equipment which is not networked through the intelligent hub. Where the call is an approved attorney-inmate call which may not legally be recorded, a constant tone, instead of the signal of (m) above, is output to the recording equipment by switching the "Attorney Relay" to select the tone. The tone lasts for the duration of the call, so that prison officials know how long the call lasted.

2. This card provides standard analog line interface features, such as constant current feed, ring generation, line polarity reversal, ground start detection, off-hook detection, etc., via the Station Line Interface Circuit (SLIC).
3. A digital signal processor, along with a glue-logic controller, controls this card. The DSP provides the signal processing features listed above, as well as speech recognition; for example, the DSP will detect the word, "yes," in order to identify whether a called party wishes to accept a collect call.
4. This card is designed to maximize the reliability of inmate phone service. The card contains a seventh inmate station channel coder/decoder (codec), which is used as a test access circuit under normal conditions. However, in the event of a failure, this extra channel can be software configured to replace any one of the six other line circuits. This feature is implemented by having a "test circuit interface" chip present before the coding/decoding circuitry, which functions as a controllable double-pole, double-throw relay. One such chip is inserted on each incoming channel. The outputs of these six chips are tied together and connected to the input of the seventh inmate station channel circuitry. The data from the seventh channel can be inserted by the processing circuitry into any of the six normal ST-BUS streams. Thus, this seventh channel provides a fully redundant codec, to replace any of the six normal line circuits.
5. Furthermore, the processing circuitry receives incoming inmate call data coming from the seven channel codecs in a redundant fashion. The first three inmate channel codecs supply data through one bus connection, the second three through a second bus connection, and the seventh channel through still a third bus connection. In this way, disruption of one bus connection results in the loss of at most three inmate channels, one of which can be replaced by the redundant seventh channel described above.
6. This card has a reverse-polarity circuit for each station line. On most existing inmate telephone stations, this inverse polarity on the tip/ring lines has the effect of shutting off the DTMF tone pad at the phone. On newer inmate telephone stations, which have a backward diode connected on the tip/ring lines, this card can verify wiring continuity to and from the inmate station by detecting current flow, when polarity is reversed. The reverse polarity circuit is implemented via the SLIC.
7. This card interfaces with the CPU Card to store call parameter information regarding each call established by this card. In the unlikely event that a station card is removed during a phone call—as by maintenance personnel, the call can automatically be reeestablished by the FMU without the inmate re-entering the call information.

F. Quad Digital Signal Processor Resource Card 308. This optional card provides additional processing capacity: for specific ITS-II features which have unusually high signal processing requirements, such as biometric voiceprint recognition and speech-to-text and keyword recognition means to monitor the harmonic voice signals to ascertain the truth of the statements made. This card contains four digital signal processors. Software updates can be received over the "Message Channel" HDLC port. No block diagram is available for this card; however, the basic interfaces would be similar to those shown in the diagrams of the cards described above.

Each of the above cards can selectively place on, and get data off, the TDM bus, which is implemented as a standard 32-stream computer telephony bus with several redundant signals added. This bus can be implemented according to the "CT bus" standard defined by the Enterprise Computer Telephony Forum (ECTF) in Interoperability Agreement ECTF H.110. The H.110 standard describes the Computer Telephony (CT) Bus implementation on the Compact PCI (cPCI) form factor. This bus structure allows a robust, open system architecture. However, the telecom bus may also be implemented in accordance with any other appropriate TDM bus protocol.

The redundant signals include the 8.192 MHz data clock, the 8 kHz frame clock, and the 8.192 Mhz Scbus compatibility data clock.

The TDM Switching 312 (shown on FIG. 3B) is implemented on the CPU Card 300 as two redundant sixteen channel switches, each using an FMIC interface circuit with integral master clock switching capability. The TDM bus operates at the industry-standard 2.048 MBPS speed and provides 32 channels on each of sixteen streams, for a total capacity of 256 bi-directional channels. Each FMIC circuit supports sixteen global and four local busses. Each chip's global busses connect to the backplane, and the local busses connect to the on-board TDM Playback/Record Engine. The local busses run at 4.096 M/s.

The TDM Playback/Record Engine 314 (shown on FIG. 3B) supports both (1) the playing of up to 64 TDM streams from the CPU Card memory to any ST-BUS channel and (2) the recording of up to 16 ST-BUS channel streams to the CPU Card memory. A total of 80 streams may be active at a given time. Data is transferred between the CPU and the Playback/Record Engine as 16-bit words. The Playback/Record Engine 314 also connects selectively to either of the two redundant TDM Switches.

An example of the mechanics of "starting" a call is as follows: At the end of a call, or at the end of FMU initialization, the CPU Card sends a message over the Message Channel to the Station Card, telling the Station Card to 'prime' an outgoing analog channel for the start of a new call. After the Station Card channel has been primed, it is ready to perform certain autonomic functions. When the inmate station in question goes off-hook, the Station Card will automatically clear a "digit buffer", enable DTMF reception, and play a dial tone to the inmate. When the fist DTMF digit is detected by the Station Card, the dial tone will be stopped. These actions take place without CPU Card intervention.

If the caller goes off-hook before the Station Card channel has been primed, the caller will not receive a dial tone, and DTMF digits will not be collected. If the channel is subsequently primed while the off-hook condition still exists, the caller will receive a dial tone, and operation will continue as above.

It will be readily apparent that the autonomous nature of the Station Card, as controlled by the on-board DSP, gives a very fast real-time response to the caller; much faster, in fact, than would be the case if the CPU Card had more control over the Station Card. This increase in speed is partially due to the avoidance of any delay in the message channel due to heavy message channel traffic, and partially due to the general burden which would be placed on the CPU Card.

Figure 6:
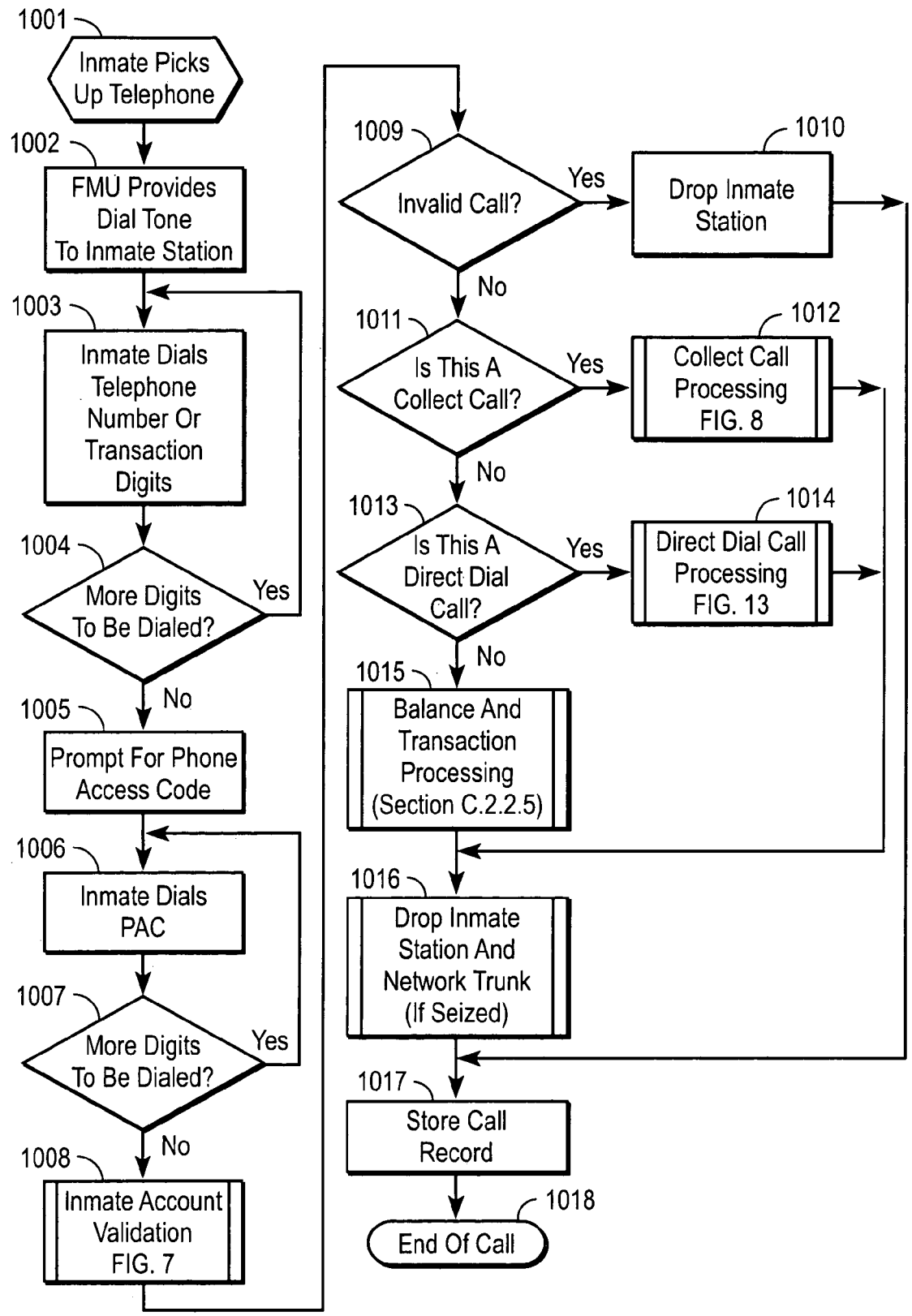
FIGS. 6 through 17 are flow diagrams depicting the operation of processing a call.

IV. Call Processing:

Referring now to FIG. 6, "Call Processing Flowchart," the method of connecting an inmate call in the preferred embodiment can now be discussed. In step 1001, an inmate first picks up a telephone 1001, and the FMU responds by generating a dial tone to the inmate station 1002. On the telephone keypad, the inmate then dials a digit 1003 of the telephone number he wishes to call or, alternatively, the number sequence associated with an ITS-II function he desires. If the FMU identifies that more digits are to be dialed 1004, the FMU returns to step 1003.

Figure 7:
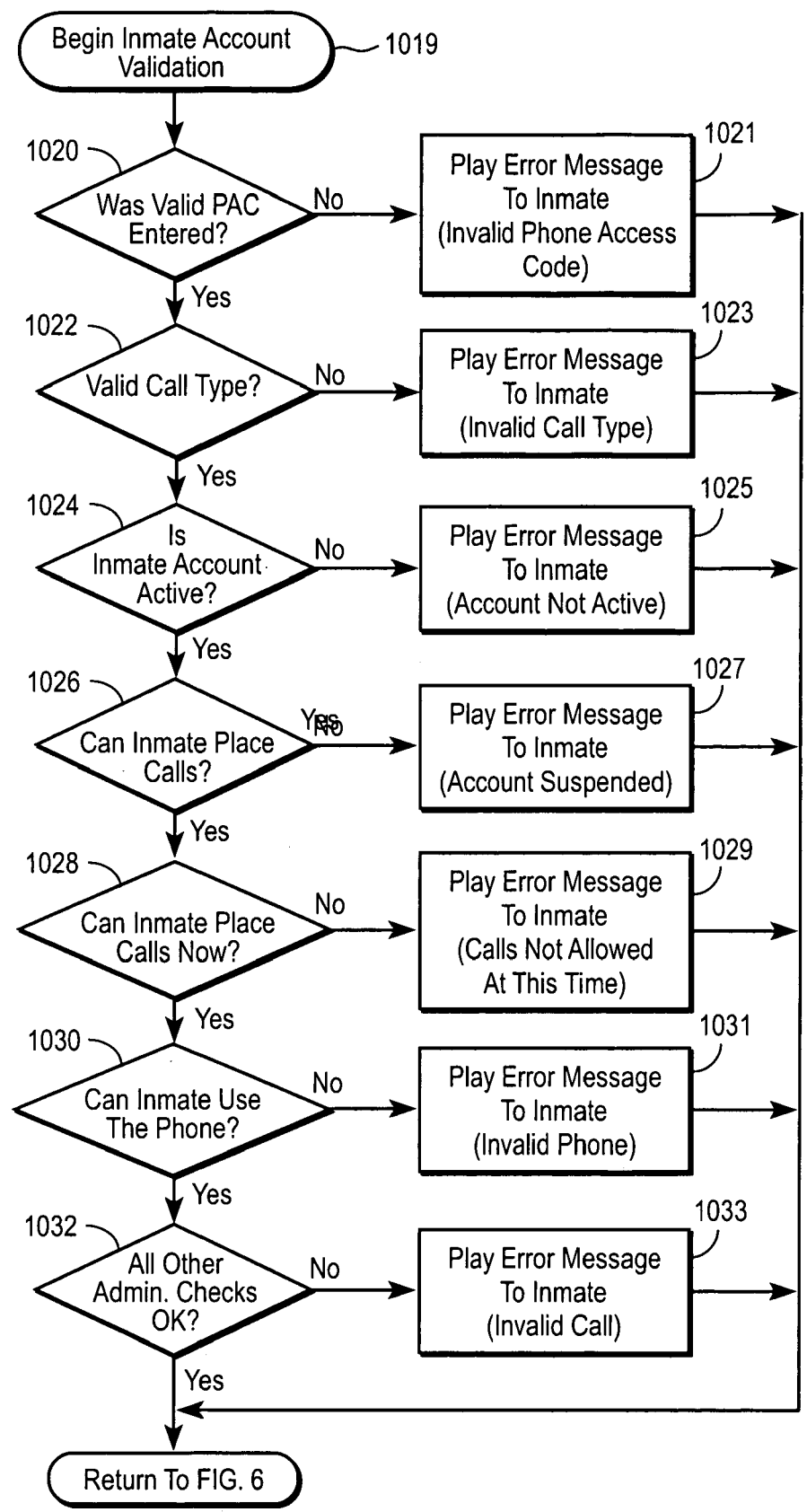

When all the digits have been dialed, the FMU prompts the inmate for his "Phone Access Code" (PAC) 1005. The inmate dials the first digit of his PAC 1006, and, once again, the FMU returns to step 1006 until all the digits of the PAC are entered 1007. The FMU then carries out the "Inmate Account Validation" subprocess 1008, which is shown in FIG. 7 and described in detail below. The FMU checks the result of this subprocess in step 1009. If the call is found invalid, the FMU drops the inmate station 1010, stores a record of the call locally and remotely on the databases on the Central Operations Facilities' servers 1017, and ceases processing the call 1018.

On the other hand, if the call is found valid in step 1009, the FMU determines whether the call is a collect call 1011 or a direct dial call 1013. If the call is a collect call, the FMU carries out the "Collect Call Processing" subprocess in FIGS. 8 to 12, which are described in detail below and represented here as step 1012. If the call is a direct dial call, the FMU carries out the "Direct Call Processing" subprocess shown in FIGS. 13 to 16 which are described in detail below and represented here as step 1014. If the dialed digits represent a number sequence associated with inmate financial transactions, the FMU carries out the steps shown in FIGS. 18 to 25 which are described in detail below and represented here as step 1015. Otherwise, the FMU drops the inmate station and the network trunk line (if seized) 1016, stores a record of the call attempt 1017, and ceases processing the call 1018.

FIG. 7 shows the "Inmate Account Validation" subprocess, which is represented as step 1008 above. Inmate account validation consists of a number of simple checks. In steps 1020, 1022, 1024, 1026, 1028, 1030, and 1032, the following questions are determined by the FMU:
 1. Was a valid PAC entered?
 2. Is the call type valid? In other words, if the inmate is attempting to make a direct dial (debit) call, is the inmate permitted to make direct dial calls? If the inmate is attempting to make a collect call, is the inmate permitted to make collect calls?
 3. Is the inmate account active?
 4. Is the inmate allowed to place calls?
 5. Is the inmate allowed to place calls at the present time?
 6. Is the inmate allowed to use the present telephone station?
 7. Are there other administrative parameters which are not satisfied?

If any of these checks fail, an appropriate error message is played to the inmate in steps 1021, 1023, 1025, 1027, 1029, 1031, and 1033. At step 1044, the FMU returns either to step 1010 above, if the call is valid, or to step 1011 above, if the call is not valid.

Figure 8:
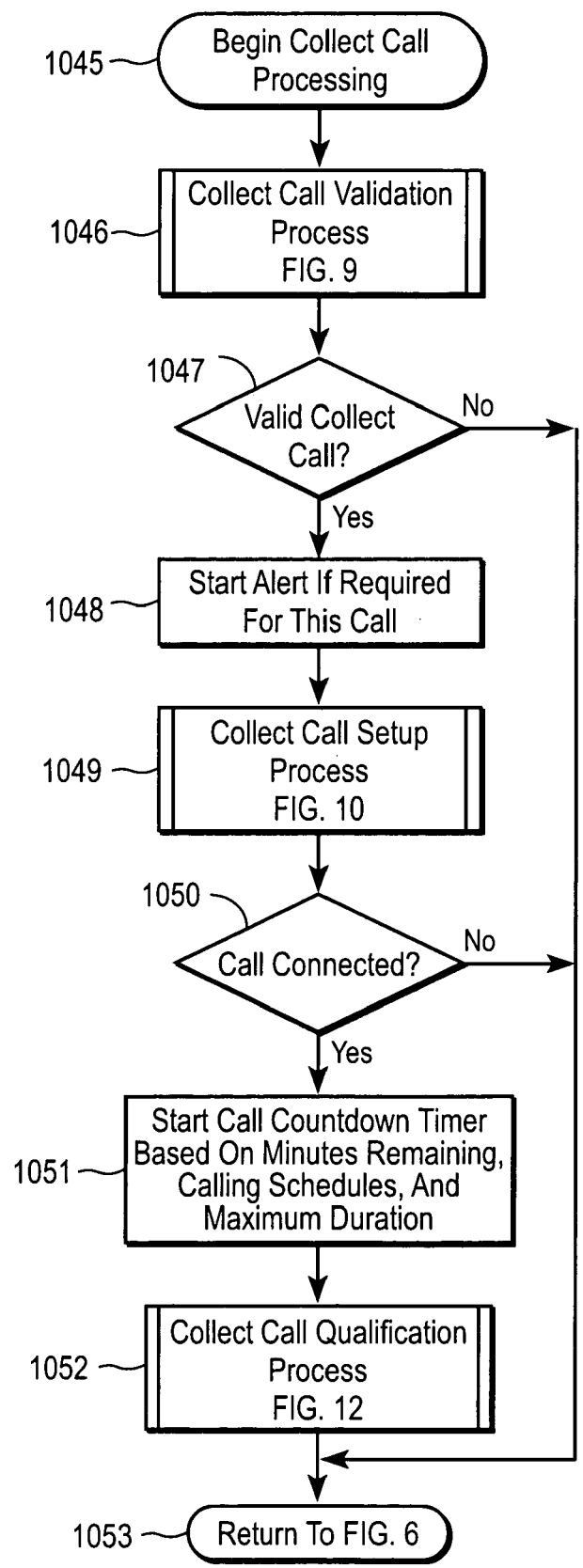

FIG. 8 is an overview of the "Collect Call Processing" subprocess, which was identified as step 1012 above. Collect call processing begins at step 1045. The collect call is validated in step 1046 through the "Collect Call Validation" subprocess shown on FIG. 9. If the collect call is not found valid in step 1047, the collect call processing terminates at step 1053 and goes to step 1016 above, where the FMU drops the inmate station and network trunk 1016, stores the call record 1017, and ceases call processing 1018.

If the call is found valid in step 1047, the FMU checks to see whether the call is flagged as requiring alert processing 1048, that is, as requiring active, real-time monitoring by prison personnel and/or automatic recording. If so, the "alert" is started: a prison administrator is notified in some way (beeping noise, flashing on-screen message, paper printout, automatic paging, etc) that a call should be monitored. The 'alert flag' may be set based upon the identity of the inmate making the call, the number she is trying to reach, the time of day, etc. The administrator may optionally be required to press a key, or otherwise acknowledge the alert, before the call processing continues.

Figure 12:
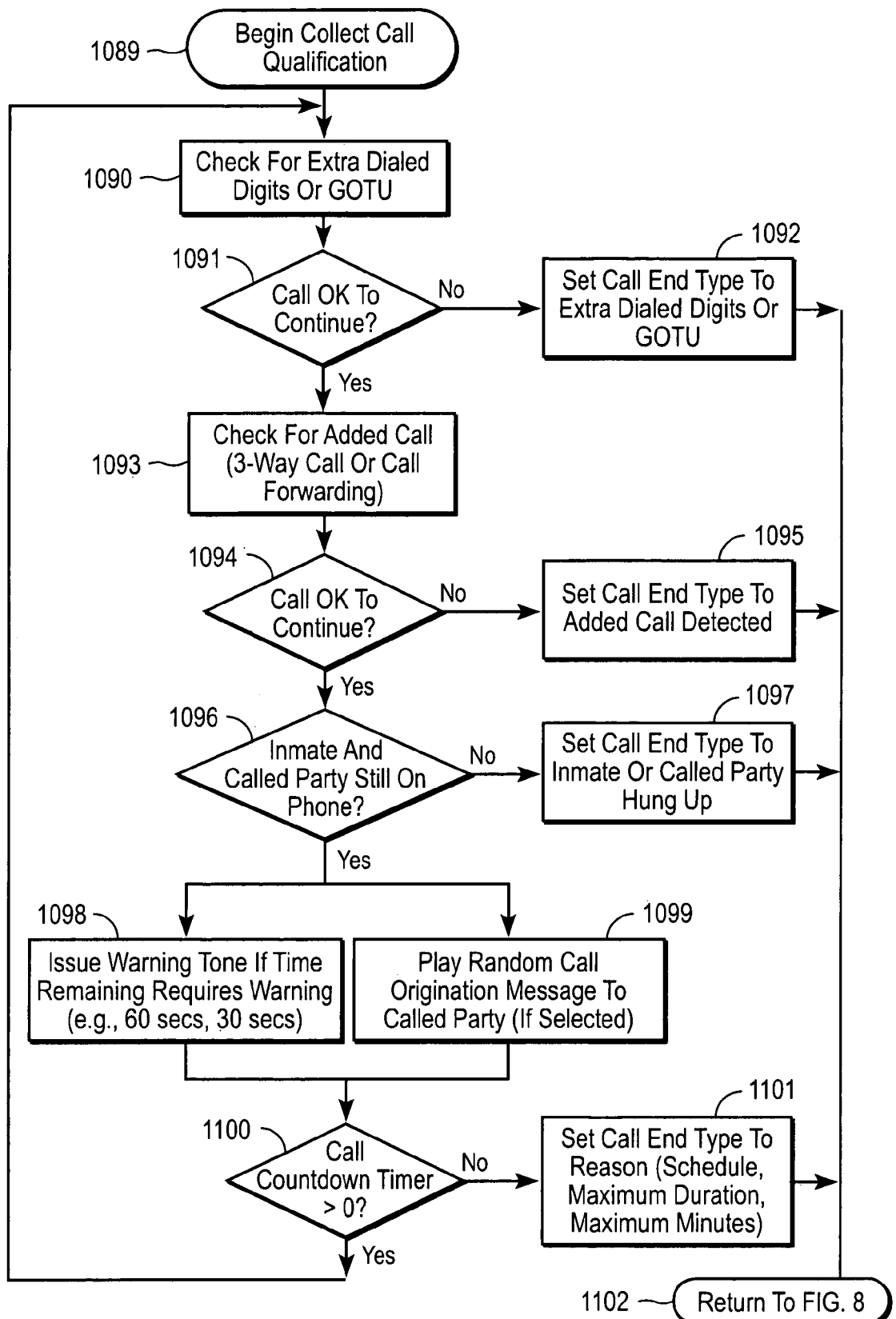

After the alert is initiated (if required), the call is established at step 1049, through the "Collect Call Setup" subprocess, which is shown on FIG. 10 and described in detail below. In step 1050, the FMU identifies whether the call was connected in step 1049, and, if so, starts the call countdown timer 1051, which counts down the minutes available to the inmate for the call. The "available minutes" are based on the "minutes remaining per day/week/month" parameter, permitted calling schedules, and the "maximum duration per call" parameter. In step 1052, the FMU carries out the "Collect Call Qualification" subprocess, which is shown in FIG. 12 and described below.

When the call is completed, the "Collect Call Processing" subprocess terminates 1053. The FMU returns to step 1016, where the FMU drops the inmate station and network trunk, stores the call record 1017, and ceases call processing 1018.

Figure 9:
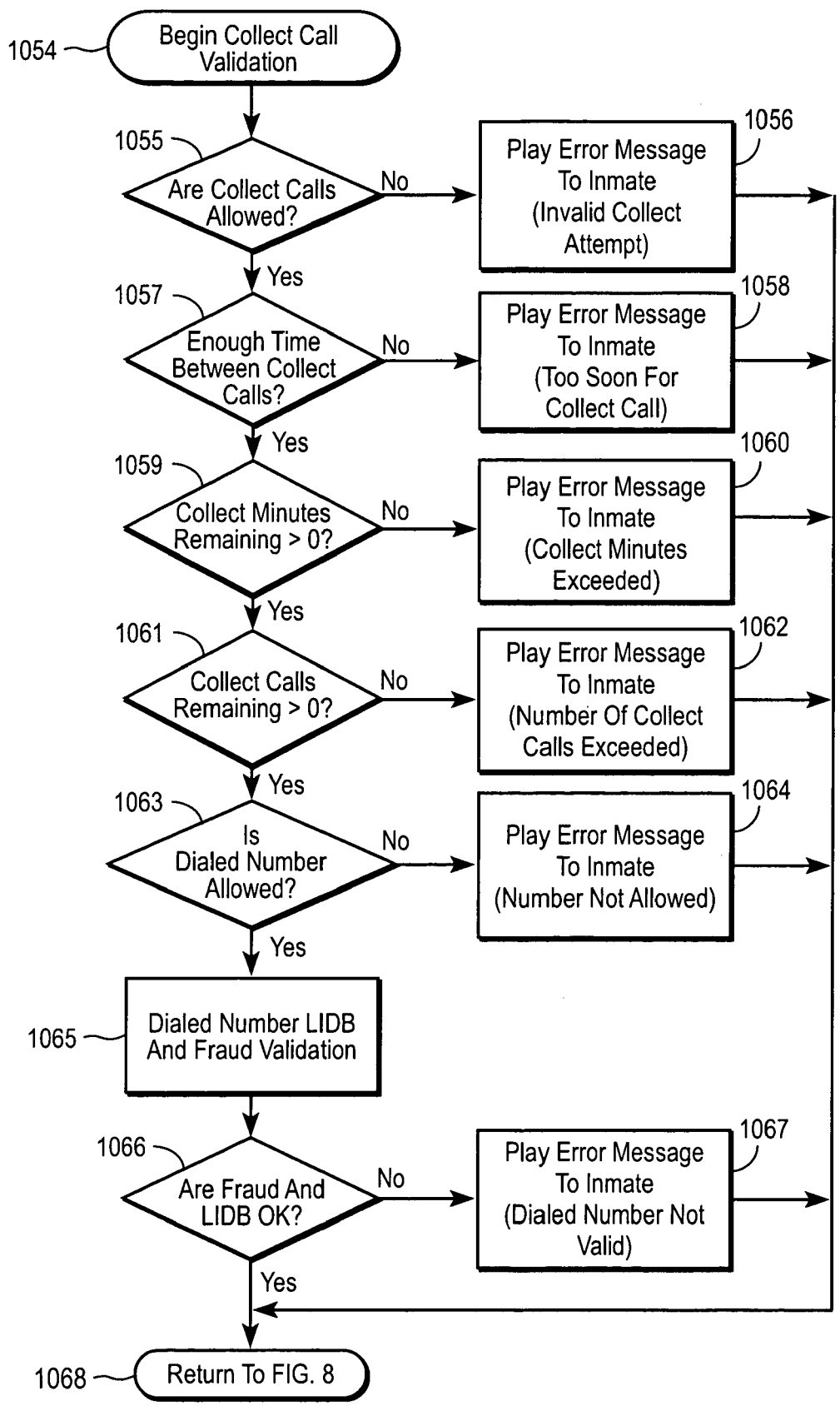

Referring now to FIG. 9, the "Collect Call Validation" subprocess, represented as step 1046 above, begins at step 1054. In steps 1055, 1057, 1059, 1061, and 1063, the FMU checks to verify that the prospective call meets the database control parameters.

The following checks are made:
 1. Are collect calls allowed to this inmate?
 2. Has the required amount of time passed between collect calls by this inmate?
 1. Does this inmate have collect call minutes remaining?
 2. Is the dialed number allowed?
 3. Is the dialed number verified by the Line Information Database (LIDB) system?
 4. Is there any indication of fraudulent calling, such unusual or suspicious dialing, third party calls, or call forwarding?

If any of the checks fail, an appropriate error message is played to the inmate in steps 1056, 1058, 1060, 1062, 1064, and 1067. The result of the "Collect Call Validation" subprocess is returned 1068 to the "Collect Call Processing" subprocess, shown on FIG. 8, for use in step 1047 above.

Figure 10:
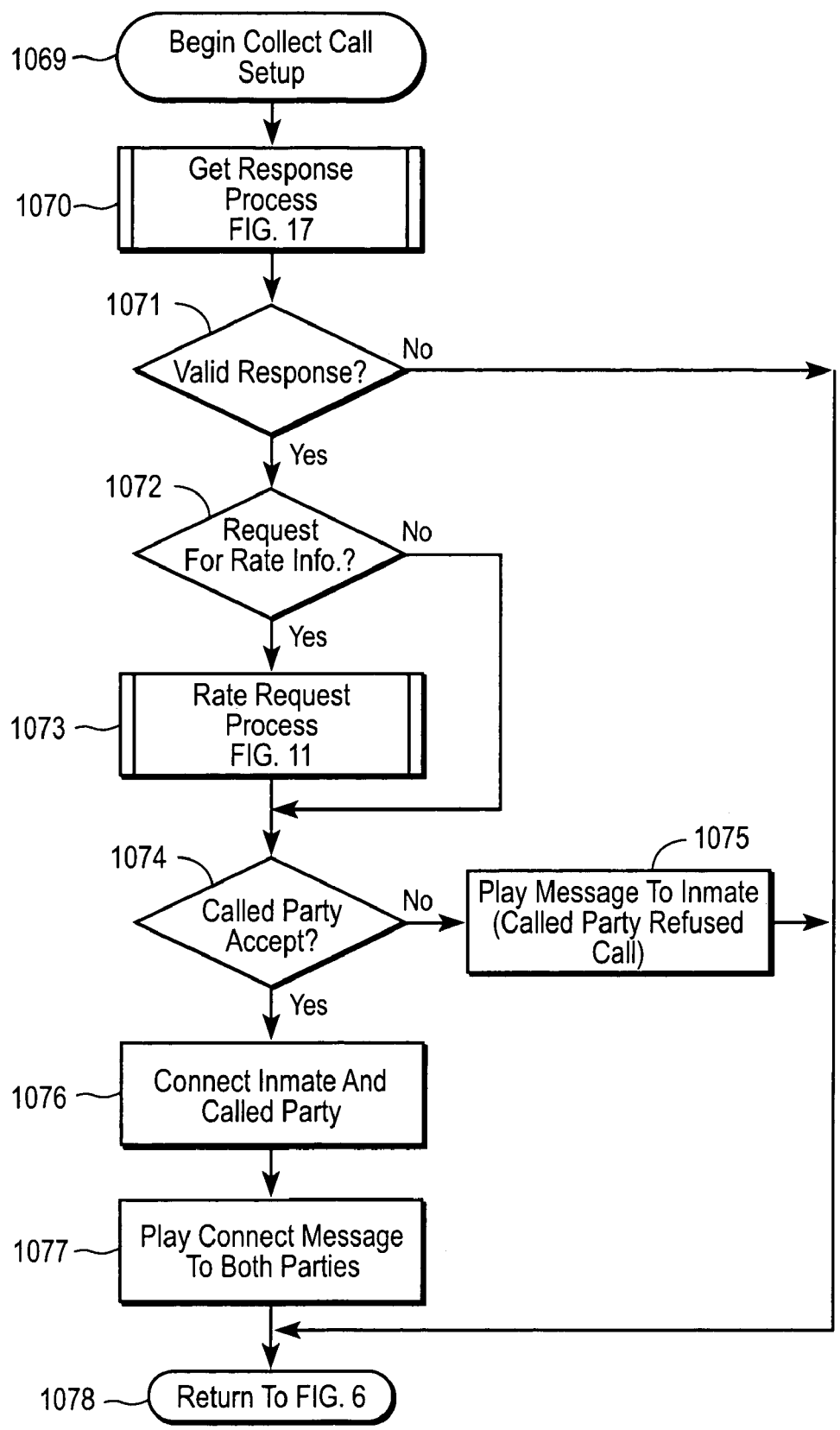
Figure 17:
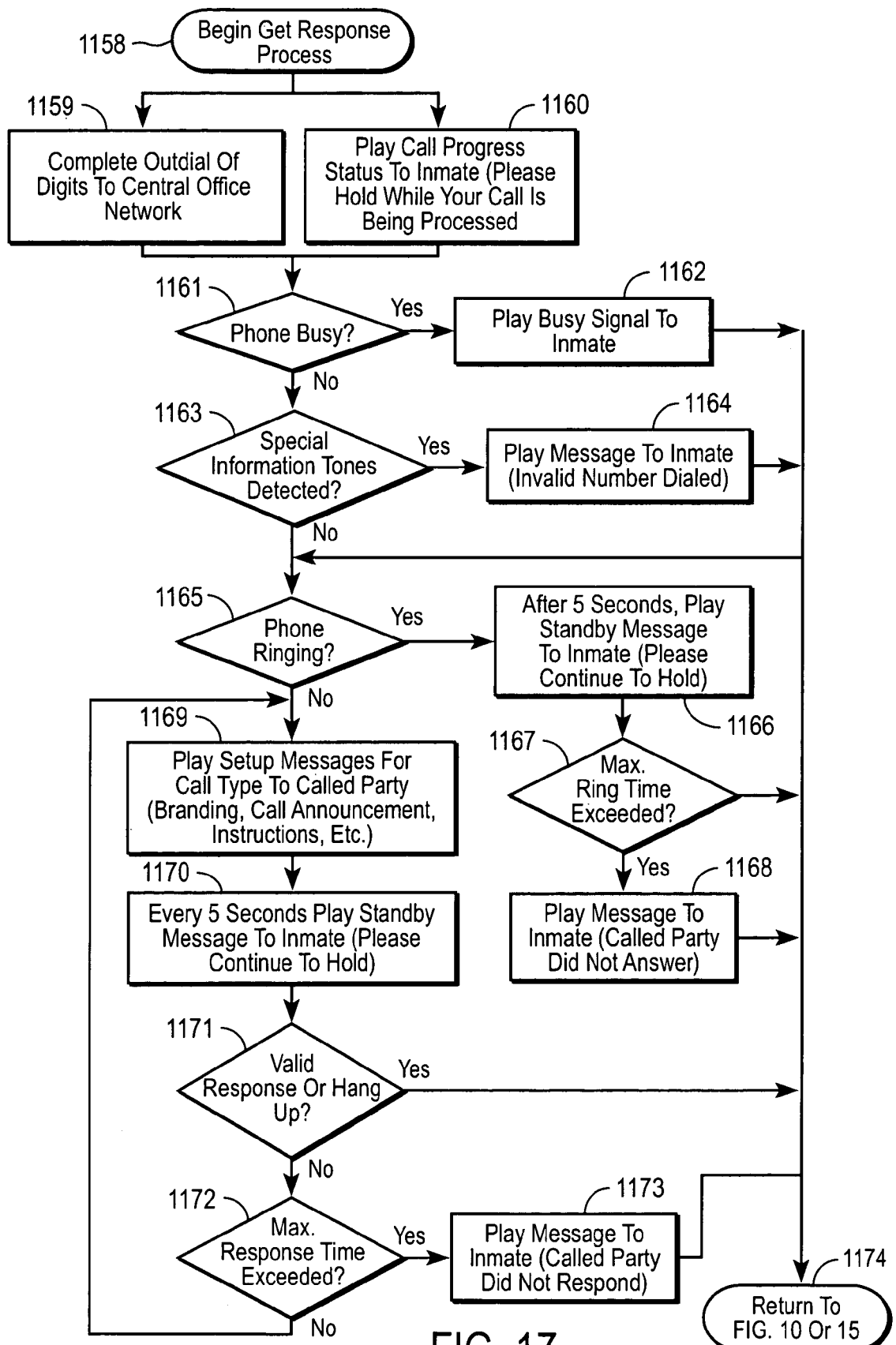

Referring now to FIG. 10, the "Collect Call Setup" subprocess, represented as step 1049 above, begins at step 1069. In step 1070, the "Get Response" subprocess is represented, in which the FMU detects whether the phone was answered, and, if so, invites the called party either to accept or to reject the call. This subprocess is shown in FIG. 17 and described in detail below. At step 1071, if the party does not accept with a valid response, the "Collect Call Setup" subprocess terminates 1078 and returns to step 1016 on FIG. 6, where the FMU drops the inmate station and network trunk 1016, stores the call record 1017, and ceases call processing 1018.

If the party does accept with a valid response 1071, the FMU determines in step 1072 whether the response was a request for more information regarding the rate at which the call will be charged. If so, in step 1073 the FMU carries out the "Rate Request" subprocess, shown in FIG. 11 and described below, in which the FMU plays the rates to the called party and checks for acceptance. If the called party does not accept 1074, a message is played to the inmate 1075, indicating that the called party refused the call. If the called party does accept the call, the inmate and the called party are connected 1076, and a message is played 1077 indicating to the parties that the call may proceed. At step 1078, the "Collect Call Setup" subprocess terminates, and the FMU continues with step 1050, above, on FIG. 8.

Figure 11:
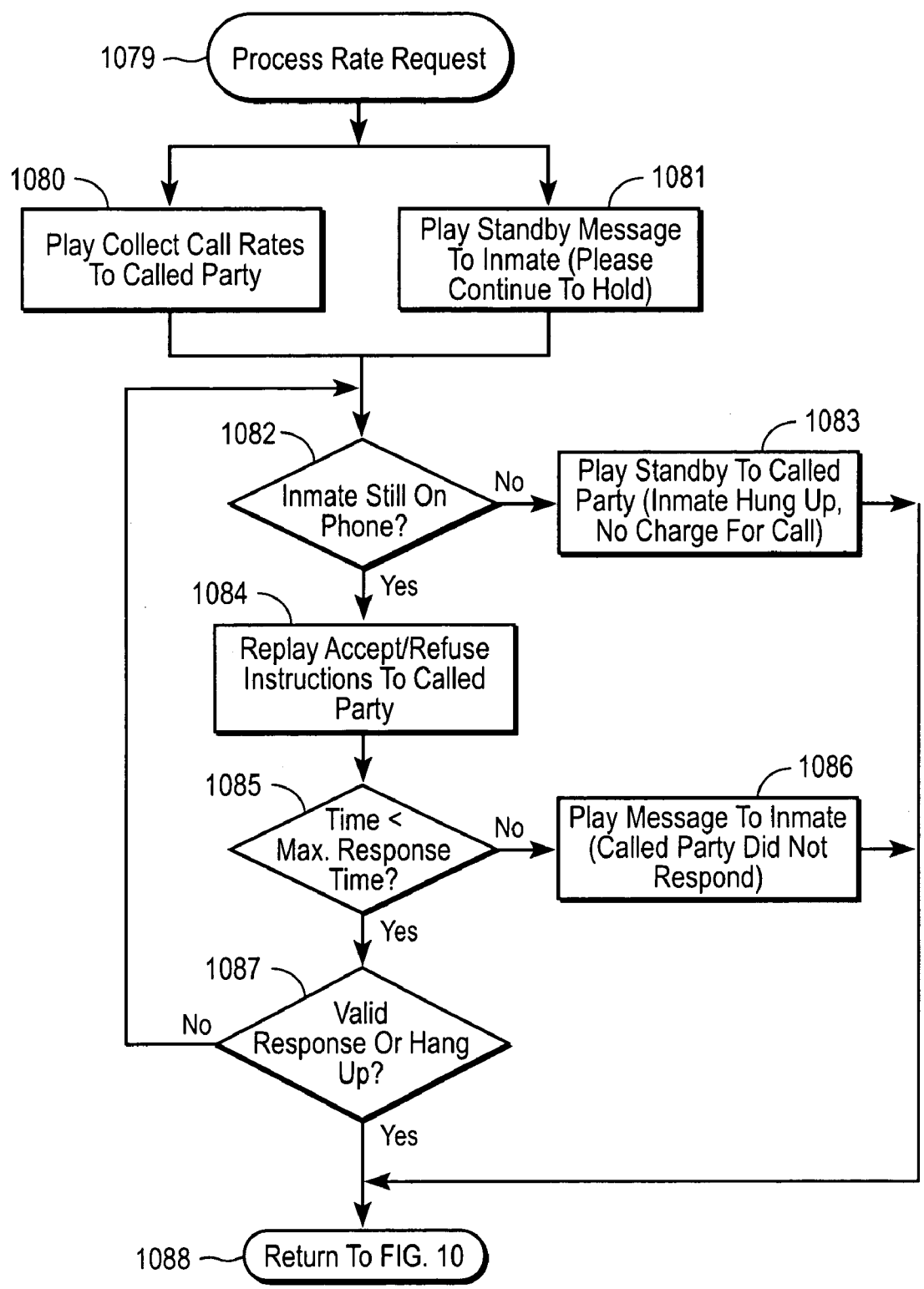

FIG. 11 shows the "Rate Request" subprocess, which was represented as step 1073 above. At 1079, the subprocess begins. The FMU plays the collect call rates to the called party 1080, and simultaneously plays a standby message to the inmate, asking her to "please continue to hold." In step 1082, the FMU checks to verify that the inmate is still on the phone; if the inmate has hung up, the FMU plays a message to the called party 1083, indicated that the inmate hung up and that there is no charge for the call.

If the inmate is still on the line, the FMU replays the instructions to the called party, describing how to accept or decline the collect call 1084: The FMU waits for a response and keeps track of the wait time. When the time exceeds a predetermined maximum response time 1085, the FMU plays a message to the inmate that the called party did not respond 1086, and, at step 1088, returns to step 1071 above. If the accumulated time does not exceed the maximum response time 1085, and if the called party has not entered a valid response or hung up 1087, then the FMU loops back to 1082. If the called party has entered a valid response or hung up, at step 1088 the FMU terminates the "Process Rate Request" subprocess and returns to step 1071 above.

FIG. 12 shows the "Collect Call Qualification" subprocess, which was represented as step 1052 on FIG. 8, entitled "Collect Call Processing." In step 1089, the subprocess initializes. The FMU checks for extra dialed digits or for the GOTU™ (4688) sequence 1090. If either are detected 1091, the variable 'call end type' is set to "extra dialed digits or GOTU™" 1092, and the subprocess terminates 1102. If not, the FMU checks for any added calls 1093. If an added call is detected 1094, the variable 'call end type' is set to "added call detected" 1095, and the subprocess terminates 1102. If no added call was detected, the FMU checks whether both the inmate and the called party are still on the phone 1096. If not, the variable 'call end type' is set to "inmate or called party hung up" 1097, and the subprocess terminates 1102.

If both parties are still on the line, the FMU issues a warning tone if the time remaining is less than a preset amount (e.g. 60 seconds, 30 seconds, etc.) 1098. The FMU also randomly plays a call origination message to the called party—if the appropriate database parameter is set—so that the called party is occasionally informed where the call originated 1099. At step 1100, the FMU checks whether the call countdown timer is greater than zero, and, if so, loops back to step 1090. If not, the variable 'call end type' is set to the variable exceeded, i.e. scheduled hours, maximum call duration, maximum call minutes per day or month, etc. The FMU then terminates the "Collect Call Qualification" subprocess 1102 and returns to step 1053, above on FIG. 8, to continue the "Collect Call Processing" subprocess.

Figure 13:
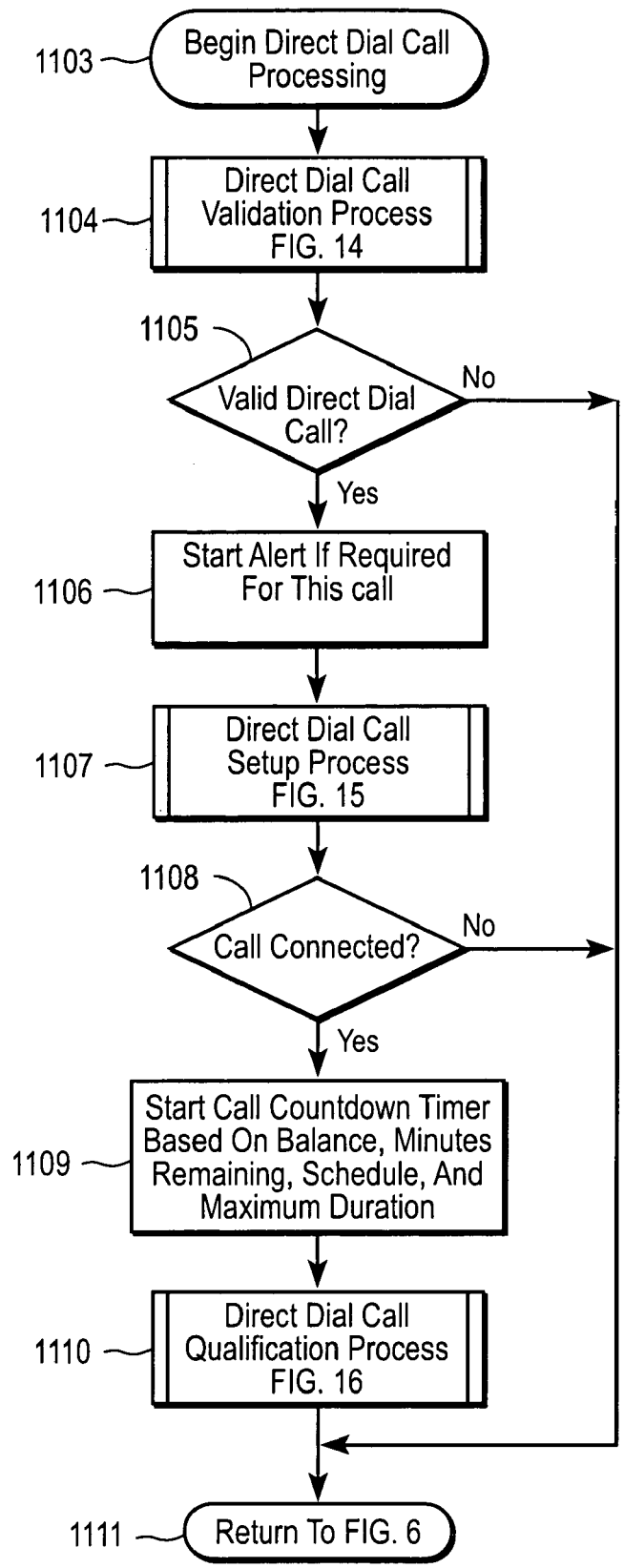
Figure 14:
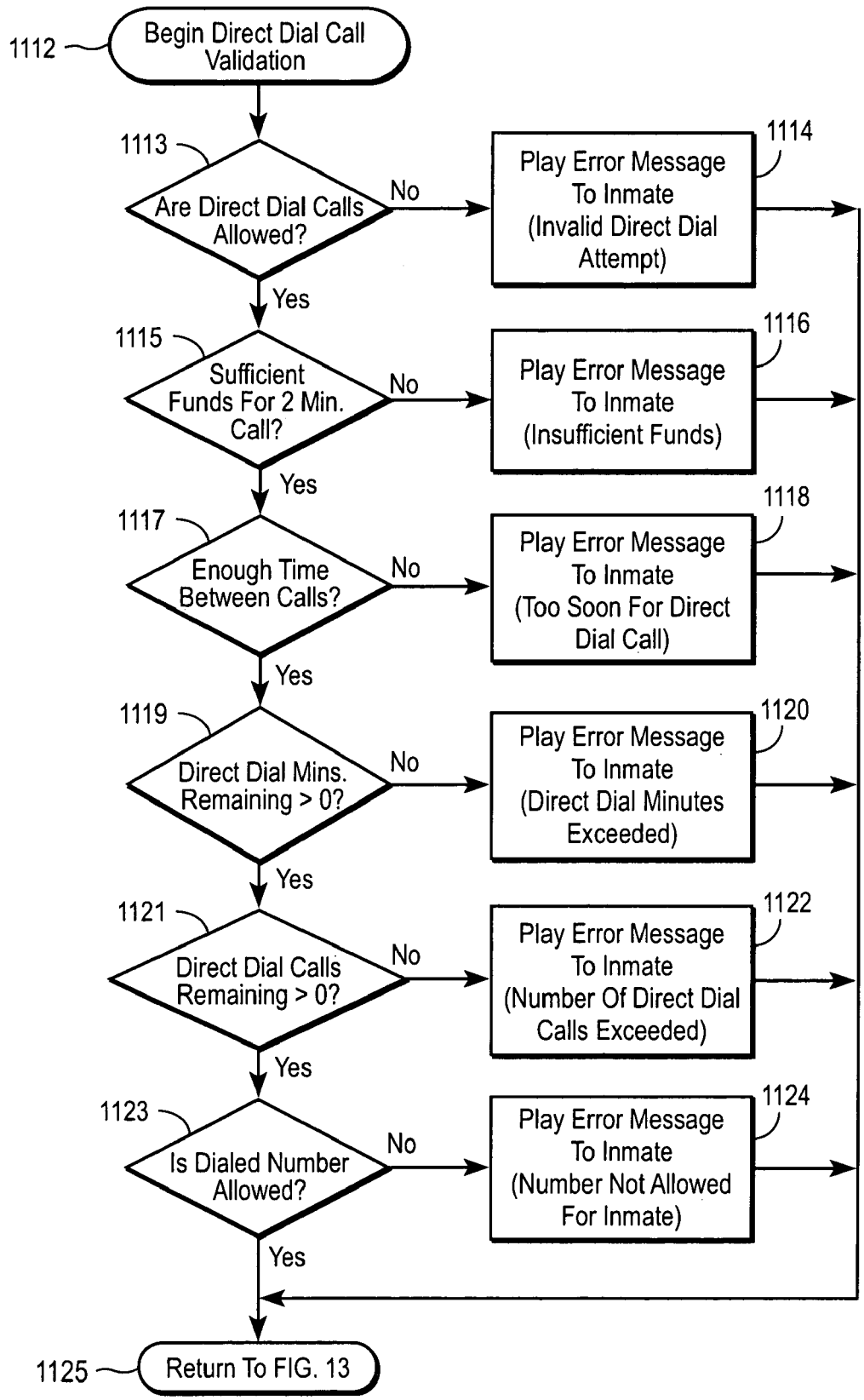

FIG. 13 is an overview of the "Direct Dial Call Processing" subprocess, which was represented as step 1014 on FIG. 6, entitled "Call Processing." In step 1103, the subprocess initializes. Step 1104 represents the "Direct dial Call Validation" subprocess, in which a number of simple database parameter checks are run. This subprocess is shown in FIG. 14 and described in detail below. The output from this subprocess is evaluated in step 1105. If the direct dial call is not valid, the "Direct Dial Call Processing" subprocess terminates 1111 and the FMU returns to step 1016 on FIG. 6, where the inmate station and network trunk are dropped, the call record stored 1017, and the call processing terminated 1018.

However, if the direct dial call is valid, the FMU checks to see if the call is flagged as requiring "alert processing" 1106, that is, as requiring active, real-time monitoring by prison personnel and/or automatic recording. If so, the "alert" is started: a prison administrator is notified in some way (beeping noise, flashing on-screen message, paper printout, automatic paging, etc) that a call should be monitored. The 'alert flag' may be set based upon the identity of the inmate making the call, the number she is trying to reach, the time of day, etc. The administrator may optionally be required to press a key, or otherwise acknowledge the alert, before the call processing continues.

After the alert is initiated (if required), the call is established at step 1107, through the "Direct Dial Call Setup" subprocess, which is shown on FIG. 15 and described in detail below. In step 1108, the FMU identifies whether the call was connected in step 1107, and, if so, starts the call countdown timer 1109, which counts down the minutes available to the inmate for the call. The "available minutes" are based on the inmate's account balance, "minutes remaining per day/week/month" parameter, permitted calling schedules, and the "maximum duration per call" parameter. In step-1110, the FMU carries out the "Direct Dial Call Qualification" subprocess, which is shown in FIG. 16 and described below.

When the call is completed, the "Direct Dial Call Processing" subprocess terminates 1111. The FMU returns to step 1016, where the FMU drops the inmate station and network trunk, stores the call record 1017, and ceases call processing 1018.

Referring now to FIG. 14, the "Direct Dial Call Validation" subprocess, represented as step 1104 above, begins at step 1112. In steps 1113, 1115, 1117, 1119, 1121, and 1123, the FMU checks to verify that the prospective call meets the database control parameters. The following checks are made:

1. Are direct dial calls allowed to this inmate?
2. Are there sufficient funds in the inmate's account for at least a two (2) minute call?
3. Has the required amount of time passed between calls by this inmate?
4. Does this inmate have direct dial call minutes remaining?
5. Has this inmate exceeded the number of calls per day/week/month permitted to her?
6. Is the dialed number allowed?

If any of the checks fail, an appropriate error message is played to the inmate in steps 1114, 1116, 1118, 1120, 1122, and 1124. The result of the "Direct Dial Call Validation" subprocess is returned 1125 to the "Direct Dial Call Processing" subprocess, shown on FIG. 13, for use in step 1105 above.

Figure 15:
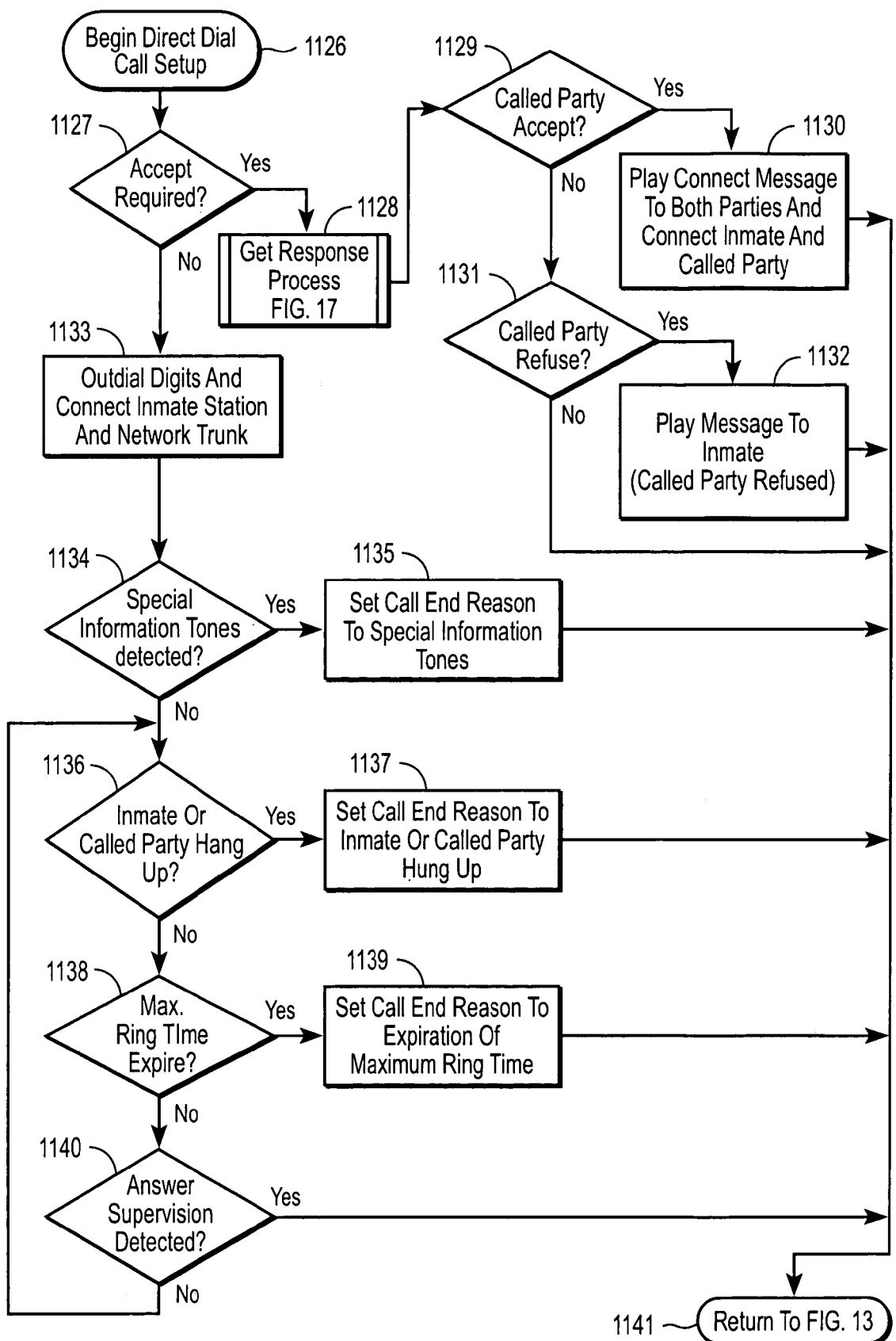
Figure 16:
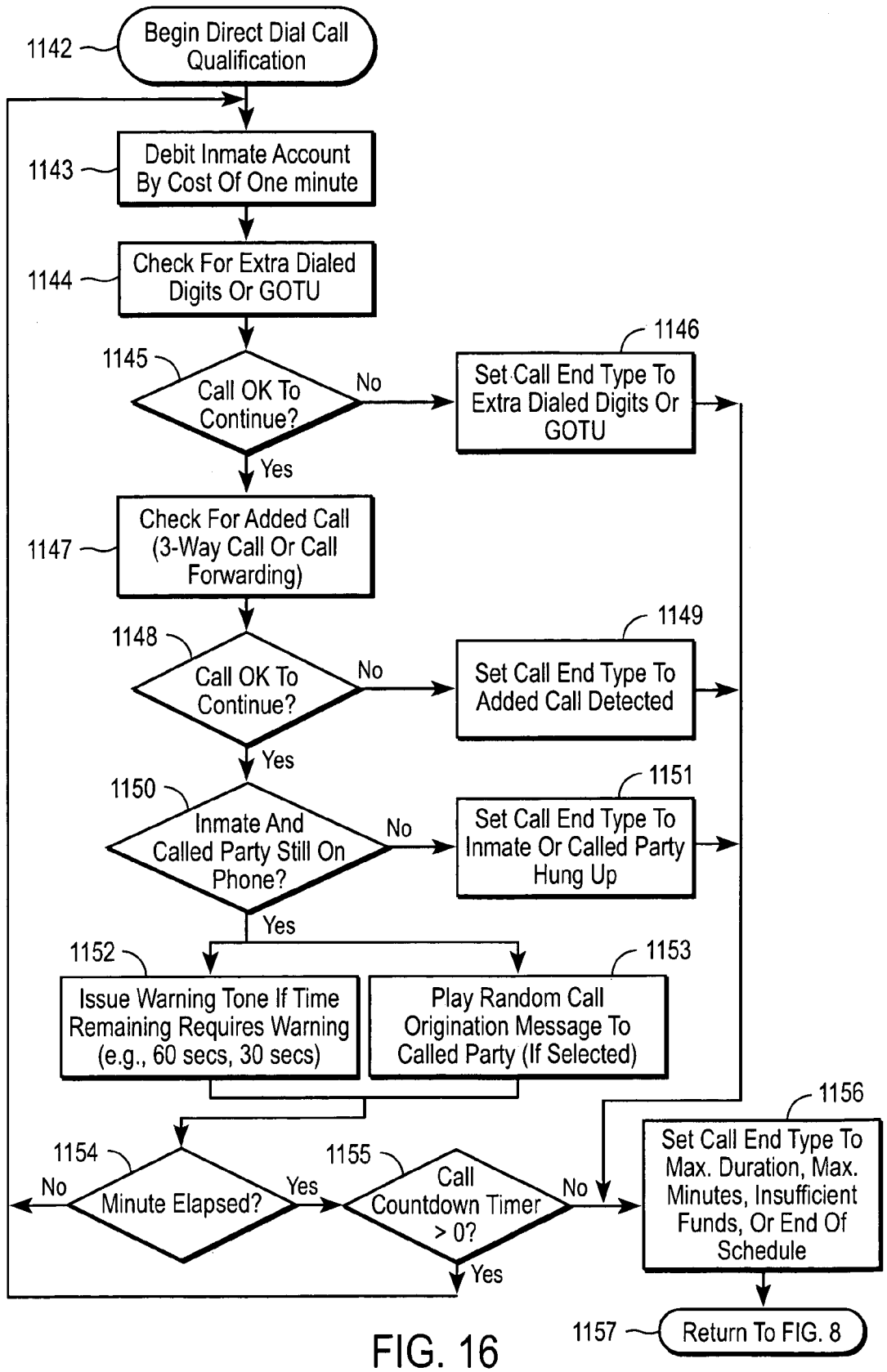

FIG. 15 shows the "Direct Dial Call Setup" subprocess, which is represented as step 1107 on FIG. 13, "Direct Dial Call Processing." This subprocess initiates at step 1126. In step 1127, the FMU checks the database to determine whether, for a given number, the called party must be given an opportunity to accept or reject the call.

If the called party is required to accept the call before the call is connected, the FMU carries out the "Get Response" subprocess 1128, shown on FIG. 17 and described below. Basically, in this subprocess the FMU detects whether the phone was answered, and, if so, invites the called party either to accept or to reject the call. The result is returned to step 1129, in which the FMU evaluates the results of the "Get Response" subprocess. If the called party accepts the call, a message is played to both parties 1130, indicating the acceptance, and the call is connected. If the called party refuses the call, a message is played to the inmate 1132, indicating the refusal, and the "Direct Dial Call Setup" subprocess terminates 1141. If the called party does not respond, the "Direct Dial Call Setup" subprocess also terminates 1141.

On the other hand, if the called party is not required to accept the call, the FMU dials the digits of the desired phone number (which were input in step 1003 on FIG. 6), and connects the inmate station and network trunk 1133.

Next, the FMU goes through several checks to see that the call is connected as dialed. First, if the FMU detects special information tones (SIT) 1134, the variable 'call end reason' is set to "special information tones," and the subprocess terminates 1141. Second, if the FMU detects that either the inmate or the called party hung up, the variable 'call end reason' is set to "inmate or called party hung up," and the subprocess terminates 1141. Third, if the FMU determines that a predetermined "maximum ring time" has been exceeded, the variable 'call end reason' is set to "expiration of maximum ring time," and the subprocess terminates 1141. Lastly, if the FMU detects "answer supervision," i.e., the called party is speaking with the inmate, the subprocess ends normally 1141, and the fact of a successful connection is returned to step 1108 in FIG. 13. If the FMU does not detect answer supervision, the FMU loops back to step 1136 above.

FIG. 16 shows the "Direct Dial Call Qualification" subprocess, which was represented as step 1110 on FIG. 13, entitled "Direct Dial Call Processing." In step 1142, the subprocess initializes. The FMU then debits the inmate account by the cost of one minute 1143 and checks for extra dialed digits or for the GOTU™ (4688) sequence 1144. If dialed digits are detected 1145, the variable 'call end type' is set to "extra dialed digits or GOTU™", 1146, and the subprocess terminates 1157. If not, the FMU checks for any added calls 1147. If an added call is detected 1148, the variable 'call end type' is set to "added call detected" 1149, and the subprocess terminates 1157. If no added call was detected, the FMU checks whether both the inmate and the called party are still on the phone 1150. If not, the variable 'call end type' is set to "inmate or called party hung up" 1151, and the subprocess terminates 1157.

If both parties are still on the line, the FMU issues a warning tone if the time remaining is less than a preset amount (e.g. 60 seconds, 30 seconds, etc.) 1152. The FMU also randomly plays a call origination message to the called party—if the appropriate database parameter is set—so that the called party is occasionally informed where the call originated 1153. At step 1154, the FMU determines whether one full minute has passed, and, if not, loops back to step 1144 above.

If a minute has passed, at step 1155 the FMU checks whether the call countdown timer is greater than zero, and, if so, loops back to step 1143. If not, the variable 'call end type' is set to the variable exceeded, i.e. scheduled hours, maximum call duration, maximum call minutes per day or month, insufficient account funds, etc. The FMU then terminates the "Direct Dial Call Qualification" subprocess 1157 and returns to step 1111, above on FIG. 13, to continue the "Direct Dial Call Processing" subprocess.

FIG. 17 shows the "Get Response" subprocess, which was represented as step 1070 on FIG. 10, "Collect Call Setup," and as step 1128 on FIG. 15, "Direct Dial Call Setup." The subprocess begins at step 1158. In step 1159, the FMU dials the digits of the number which the inmate wishes to reach, and plays a call progress messages to the inmate, saying "Please hold while your call is being processed." If the FMU detects that the called number is busy 1161, a busy signal is played to the inmate 1162, and the subprocess terminates 1174. If the called number is not busy, the FMU goes on to step 1163 and checks for special information tones (SIT), which are generated by the local phone company if a number is changed or no longer in service. If SIT are detected, a message is played to the inmate 1164, saying that an invalid number was dialed.

If SIT are not detected, the FMU checks whether the called number is ringing 1165. If so, after five seconds, a message is played to the inmate, telling her to "please continue to hold." In step 1167, the FMU checks whether the maximum ring time is exceeded, and, if so, a message is played to the inmate, indicating that "the called party did not answer." If the maximum ring time is not exceeded, the FMU loops back to step 1165.

When the called number is connected, the FMU plays the appropriate setup messages to the called party 1169. The messages can include call branding, call announcement, instructions, etc, in which the called party is invited to respond or hang up. Call announcement can, of course, include playing the inmate's previously recorded name. Meanwhile, a message is played to the inmate every five seconds 1170, inviting the inmate to continue to hold while the call is established. The FMU then checks if a valid response is given or if the called party hangs up 1171. If the party has hung up or entered a valid response such as pressing a key pad digit or saying "yes", the subprocess ends 1174. If neither a response nor an on-hook signal is detected, the FMU determines whether the maximum response time has been exceeded 1172. If so, a message is played to the inmate, indicating that "the called party did not respond" 1173, and the subprocess ends 1174. If the maximum response time has not been exceeded, the FMU loops back to step 1169 above.

When the "Get Response" subprocess terminates 1174, the acceptance or lack of acceptance is returned to the main process from which the "Get Response" subprocess was initiated. On FIG. 10, "Collect Call Setup," above, the FMU continues with step 1071. On FIG. 15, "Direct Dial Call Setup," above, the FMU continues with step 1129.

FIGS. 18 through 26 show the financial transactions which can be performed by the FMU. The FMU allows both inmate and staff members to access telephone accounts, and provides an interface to a separate point-of-sale accounting system (FPPOS). The financial transactions can be initiated by an inmate at an inmate station by dialing the code sequence for "Financial Transaction," in step 1003 above on FIG. 6, or via automatic debiting during a telephone call. The transactions can also be initiated by prison personnel via an administrative terminal. The transactions shown on FIGS. 18 through 26 are represented on FIG. 6 as step 1015, above.

Figure 18A:
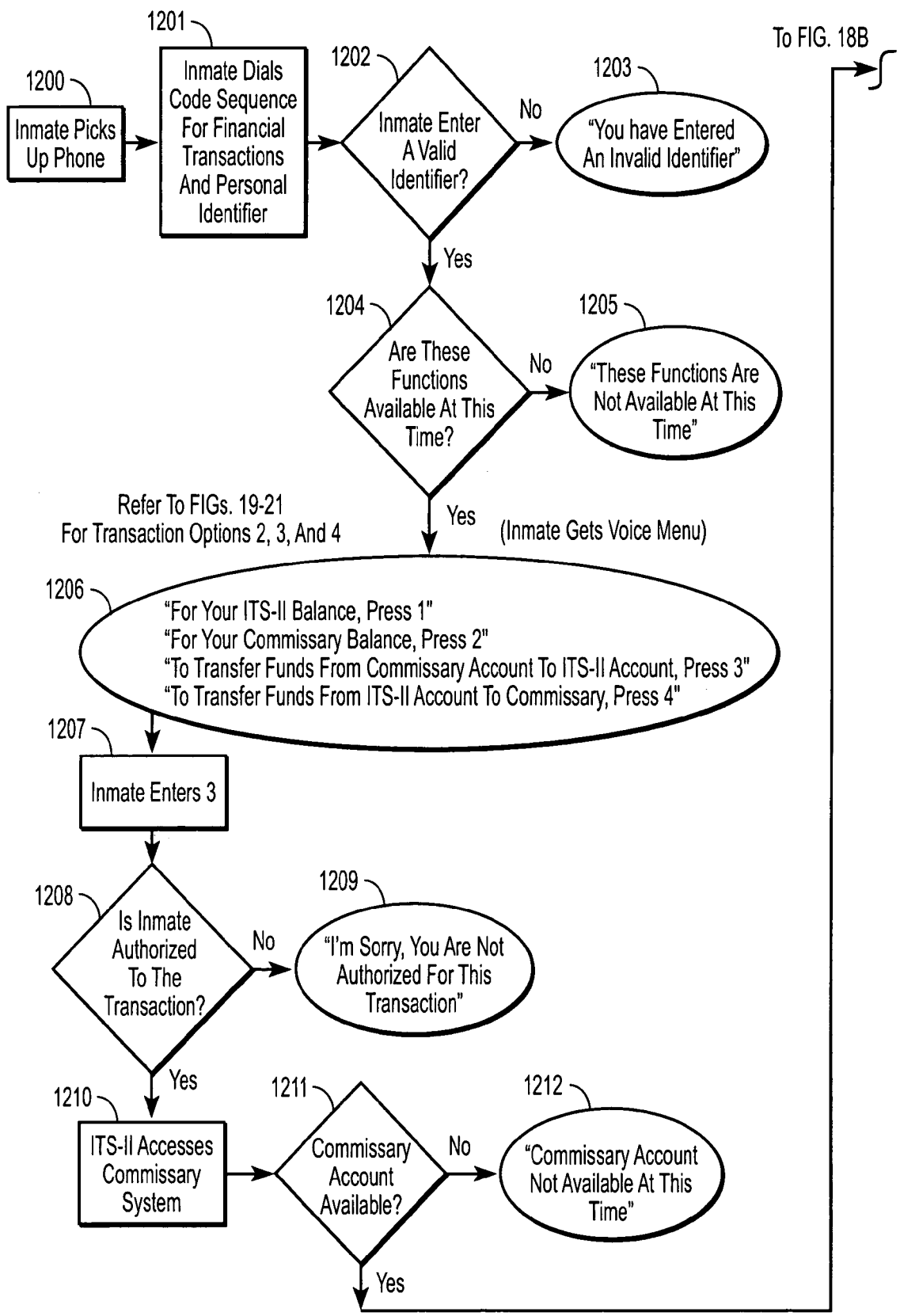
FIGS. 18 through 25 are flow diagrams depicting the financial transactions available through the preferred embodiment.
Figure 18B:
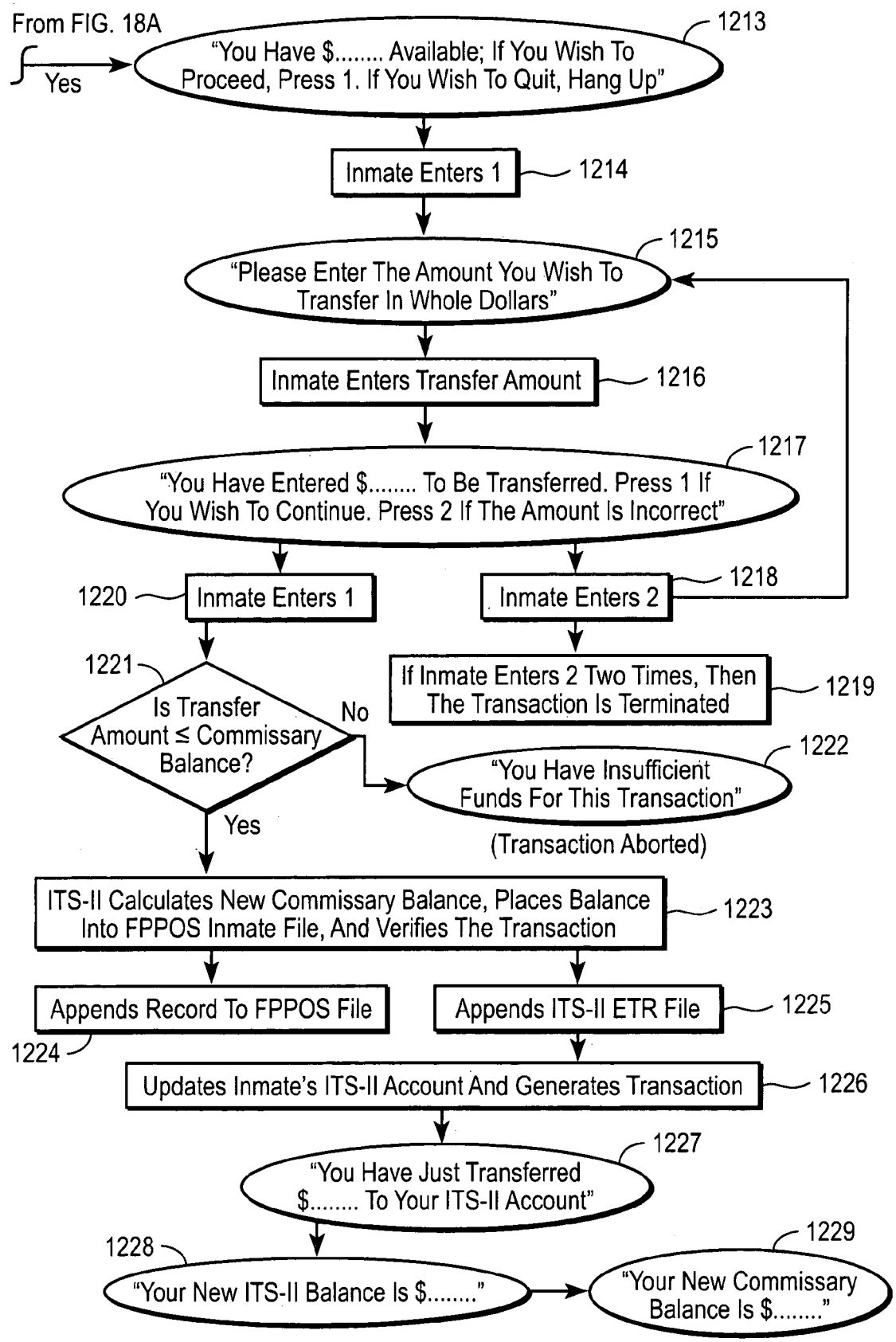

Referring now specifically to FIG. 18, there is shown a flowchart of the steps involved in an inmate's transferring funds from a "Commissary Account" (a federal prison point-of-sale (FPPOS) account) to an "ITS-II Account," via the FMU. In step 1200, an inmate picks up the handset of an inmate telephone station. The inmate dials the code sequence for "Financial Transactions" and also inputs his personal identifier 1201. If the inmate does not enter a valid identifier 1202, the FMU plays a message to the inmate 1203, indicating she did not enter a valid identifier.

Otherwise, the FMU continues with step 1204, where it checks whether the desired function is available at the time of dialing. For example, if the FMU were communicating with the central institutional database in order to store backup copies of inmate records, the financial functions would not be available. If the functions are indeed not available, a message is played 1205, indicating, "These functions are not available at this time." However, if the financial functions are available, the inmate receives a message indicating the functions which may be selected by pressing a digit on the keypad 1206.

In step 1207, the inmate presses the "3" key, indicating that she wishes to transfer funds from a Commissary Account to an ITS-II Account. The FMU checks whether the inmate is authorized for the transaction 1208. In this step, the FMU performs validation checks, such as:

1. Is the inmate authorized to transfer funds?
2. Does the inmate have an active ITS-II account?
3. Is the current day and time within the times authorized for transferring funds?
4. Has the inmate reached the maximum permitted number of times per day or week for transferring funds?
5. Does the inmate have funds available for transfer?

If the inmate is not authorized to perform the requested transaction, the FMU plays a message to the inmate to that effect 1209. However, if the inmate is authorized, the FMU accesses the Commissary system 1210 via a local area network (LAN) within the prison facility. (For information regarding the network interface between the FMU and the FPPOS system, please refer to Federal Prison Point of Sale (FPPOS) System below.) If the Commissary account is not available 1211, a message is played 1212, stating, "Commissary account is not available at this time." Otherwise, a different message is played 1213: "You have $_Available. If you wish to proceed, Press '1'. If you wish to quit, hang up."

If the inmate does not hang up and instead presses the "1" key 1214, a message is played 1215, indicating, "Please enter the amount you wish to transfer in whole dollars." The inmate enters the transfer amount 1216, and the FMU acknowledges with the following message 1217: "You have entered $_to be transferred. Press '1' if you wish to continue. Press '2' if the amount is incorrect."

If the inmate enters "2" 1218, the FMU loops back to step 1215 and prompts the inmate to reenter the amount to transfer. After the amount is reentered and the validation message played, if the inmate enters "2" once again, the transaction processing is terminated 1219, and the FMU drops the inmate station (step 1016 on FIG. 6), stores a record of the attempted transaction (step 1017 on FIG. 6), and ends the call processing.

However, if the inmate enters "1" 1220, the FMU checks whether the transfer amount exceeds the available commissary account balance 1221. If so, a message is played 1222, indicating "You have insufficient funds for this transaction." Otherwise, the FMU deducts the specified amount from the inmate's Commissary account, places the balance into the FPPOS inmate file, and verifies the deduction 1223. Next, the FMU appends a record of the transaction to the FPPOS file on the Commissary system 1224 and stores a transaction detail record on the inmate database of the Central Operations Facilities' servers 1225. Finally, the FMU credits the inmate's ITS-II account and generates a transaction record 1226, and plays messages to the inmate confirming the transaction and providing the new ITS-II and Commissary account balances 1227, 1228, 1229.

Figure 19A:
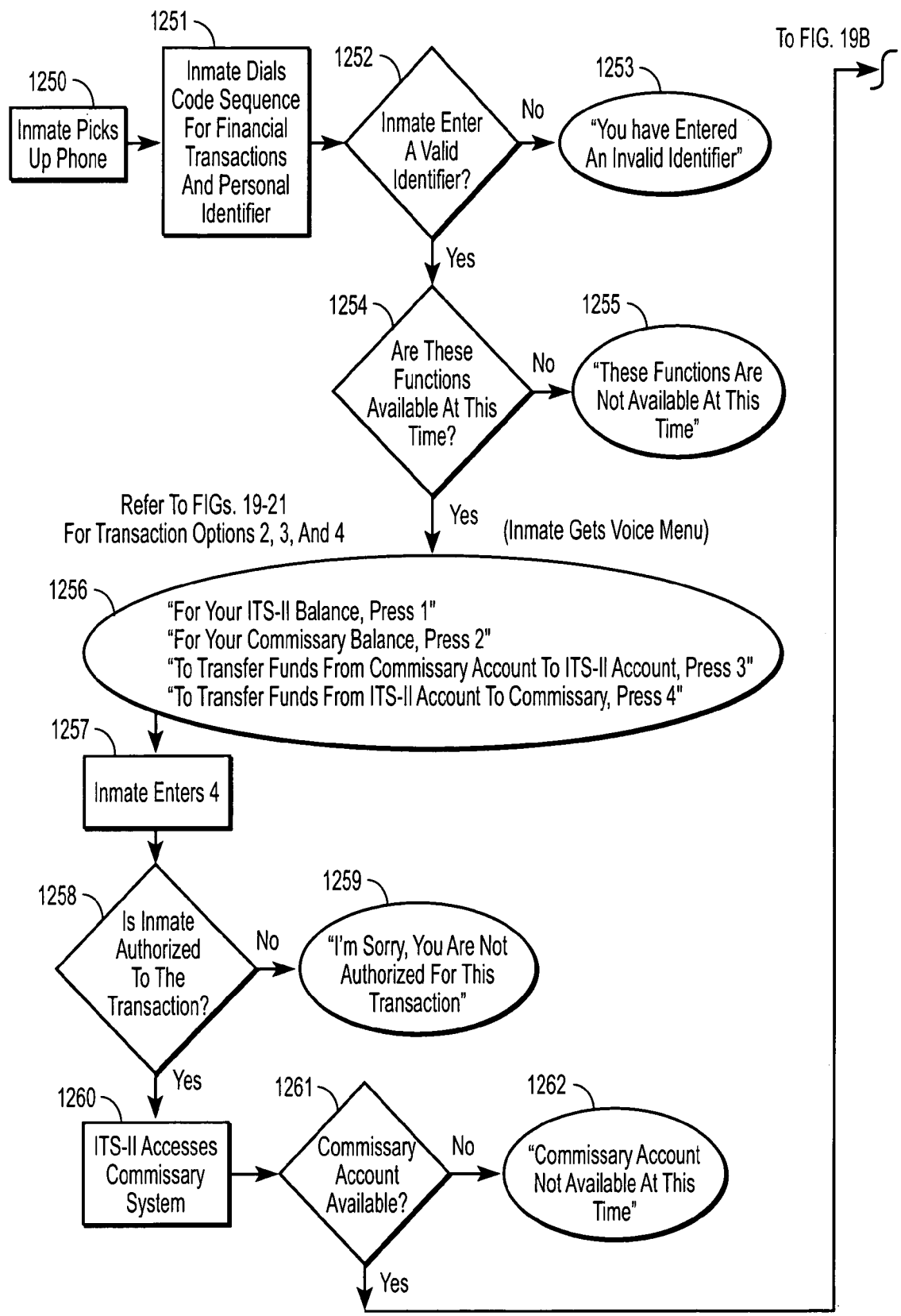
Figure 19B:
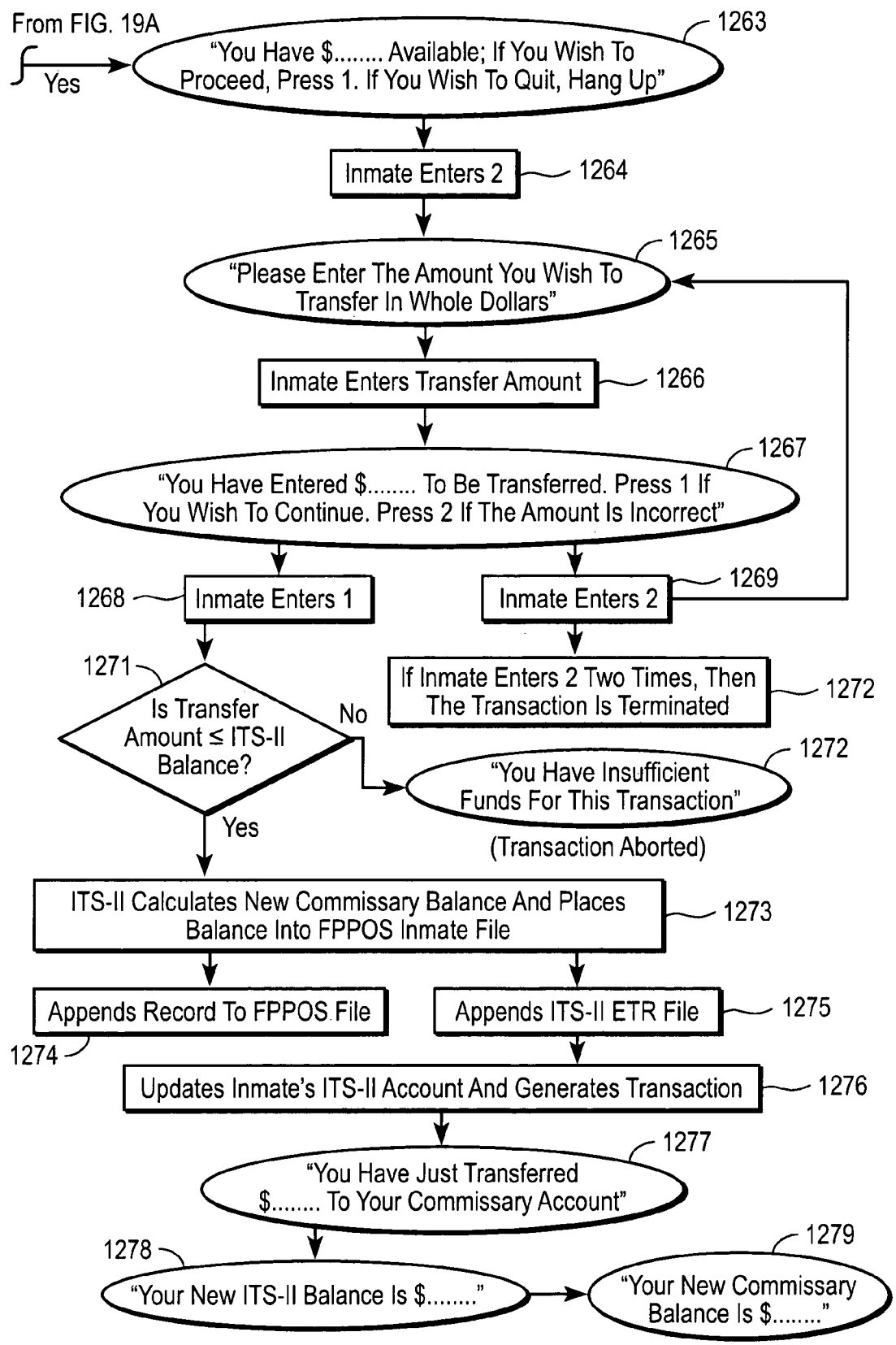

FIG. 19 shows the steps involved in an inmate's transferring funds from an ITS-II account to a Commissary Account via the FMU.

Because the transaction here is the reverse of the transaction shown in FIG. 18, this chart is nearly identical to that of FIG. 18. A description here would therefore be repetitive and redundant; it is sufficient to note that in step 1257, the inmate enters "4" rather than "3" above.

Figure 20:
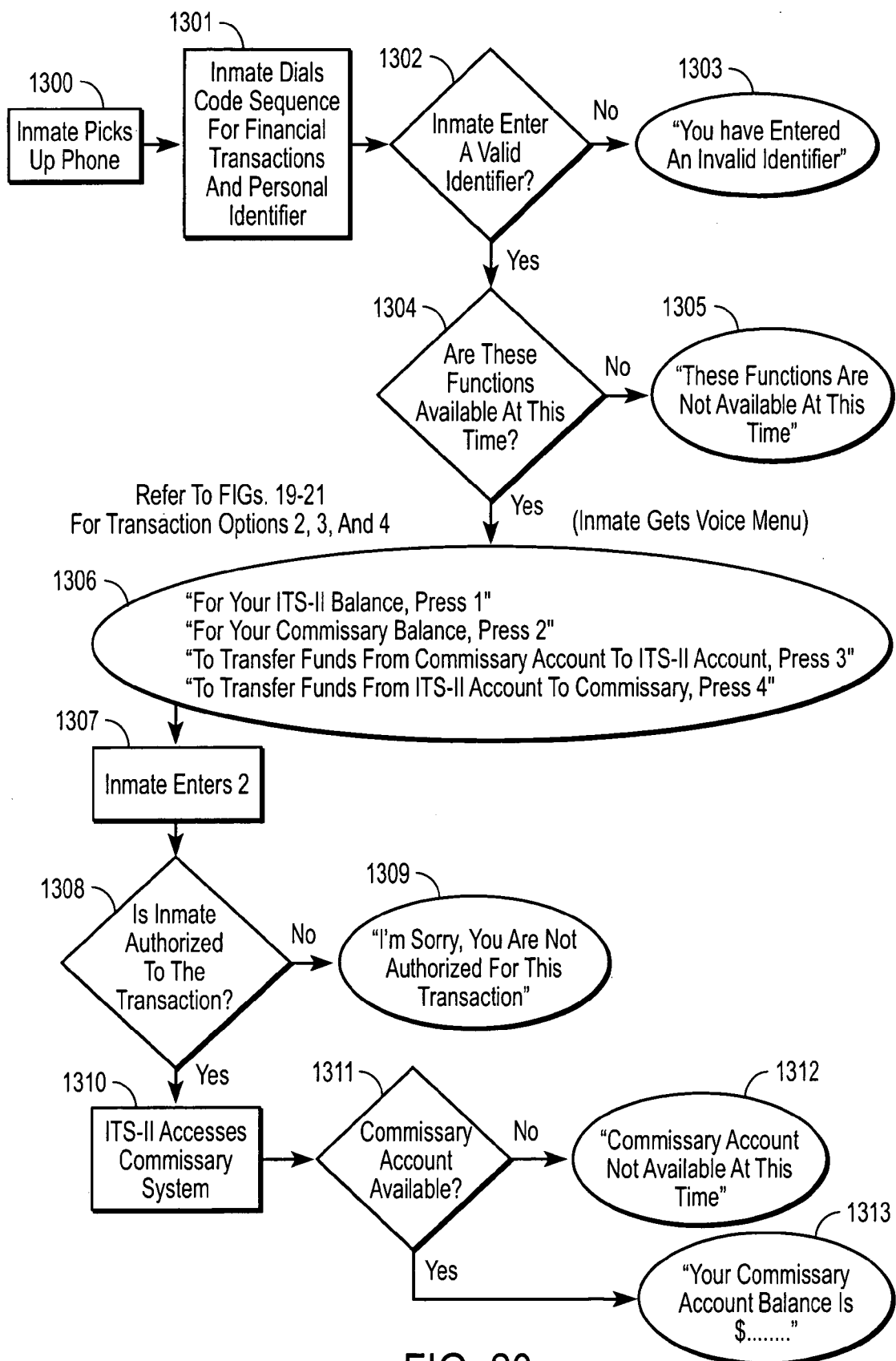

FIG. 20 shows the steps involved in an inmate getting her Commissary account balance via the FMU. Steps 1300 through 1306 are the same as steps 1200 through 1206, described above. In step 1307, the inmate enters "2", indicating that she wishes to obtain her Commissary account balance. The FMU performs the authorization checks described above as step 1208 on FIG. 18, and, if the inmate is not authorized, plays a corresponding message to the inmate 1309. If the inmate is authorized, the FMU accesses the Commissary system 1310. If the inmate's Commissary account is not available 1311, a message is played to that effect 1312. Otherwise, the Commissary account balance is given to the inmate 1313.

Figure 21A:
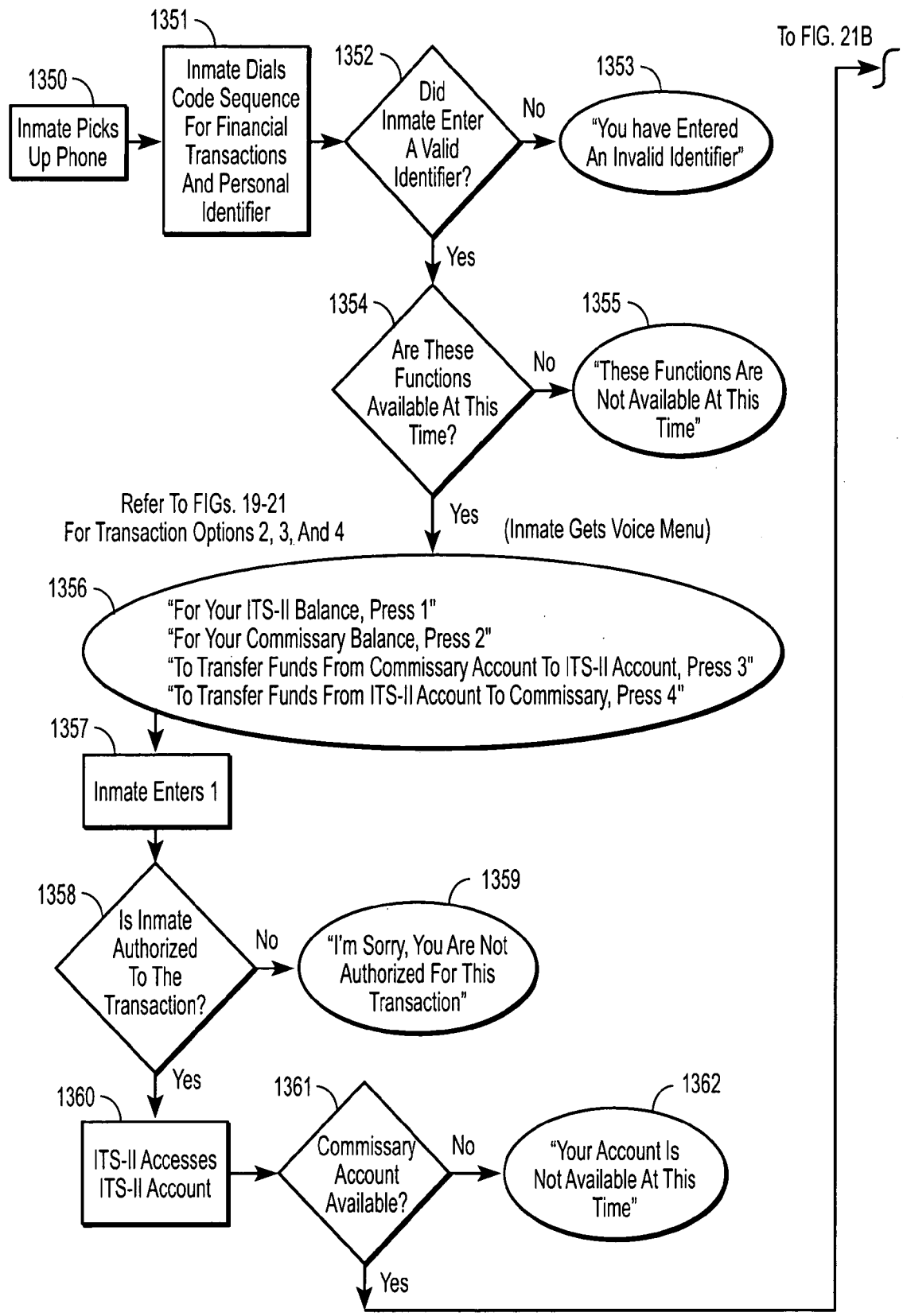
Figure 21B:
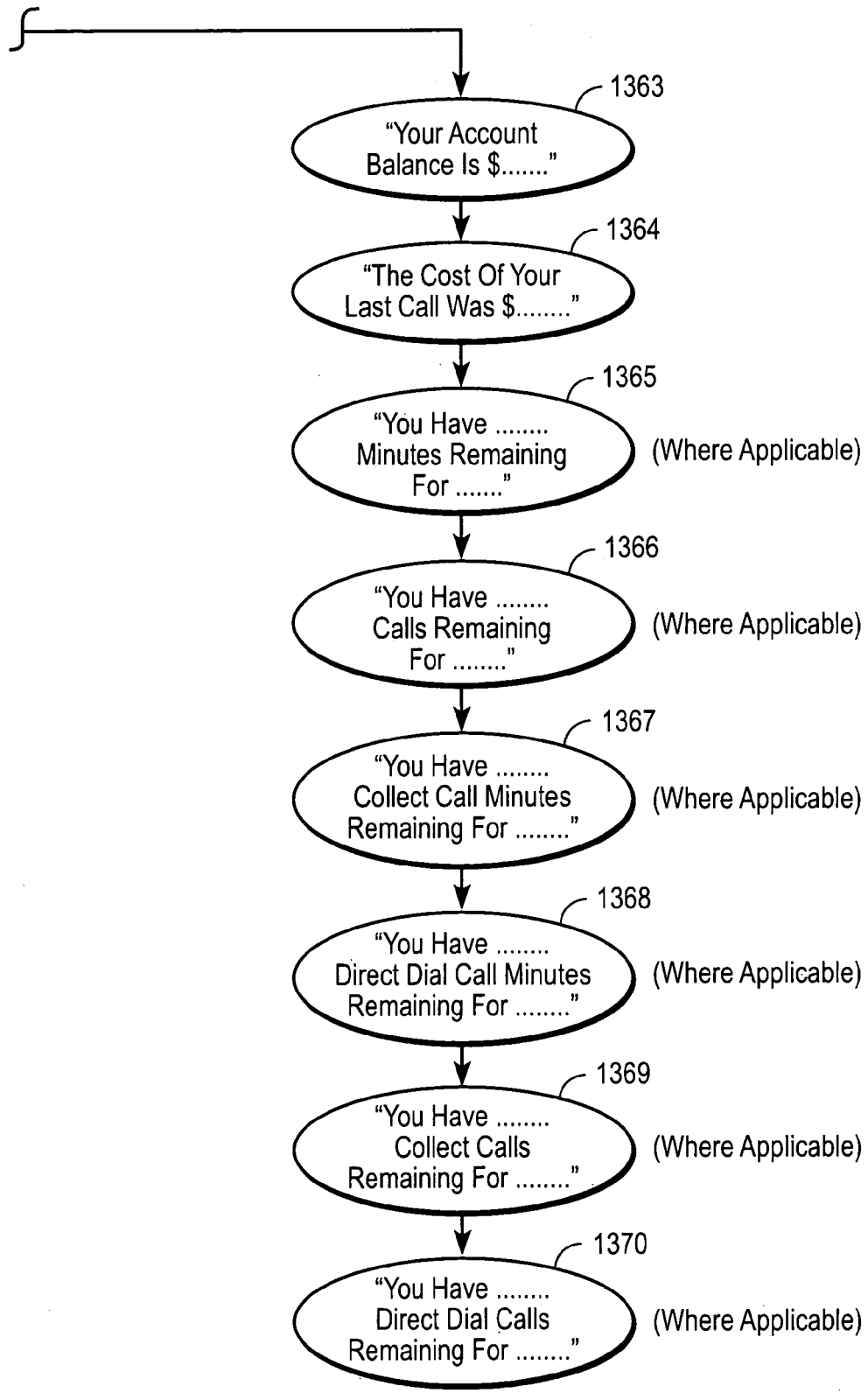

FIG. 21 shows the steps involved in an inmate getting her ITS-II account balance via the FMU. Steps 1350 through 1356 are the same as steps 1200 through 1206, described above. In step 1357, the inmate enters "1", indicating that she wishes to obtain her ITS-II account balance. The FMU performs the authorization checks described above as step 1208 on FIG. 18, and, if the inmate is not authorized, plays a corresponding message to the inmate 1359.

If the inmate is authorized, the FMU attempts to retrieve the inmate's ITS-II account information from the local database 1360. If the inmates's ITS-II account is locked by another activity 1361, then the inmate receives a message, "Your account is not available at this time."

Otherwise, the ITS-II account balance is given to the inmate in steps 1363 through 1370. The inmate is informed:

1. "Your account balance is $_."
2. "The cost of your last call was $_."
3. "You have minutes remaining for this week."(where applicable)
4. "You have calls remaining for this week."(where applicable)
5. "You have_collect call minutes remaining for this week." (where applicable)
6. "You have_direct dial call minutes remaining for this week." (where applicable)
7. "You have_direct dial calls remaining for this week." (where applicable)

Figure 22:
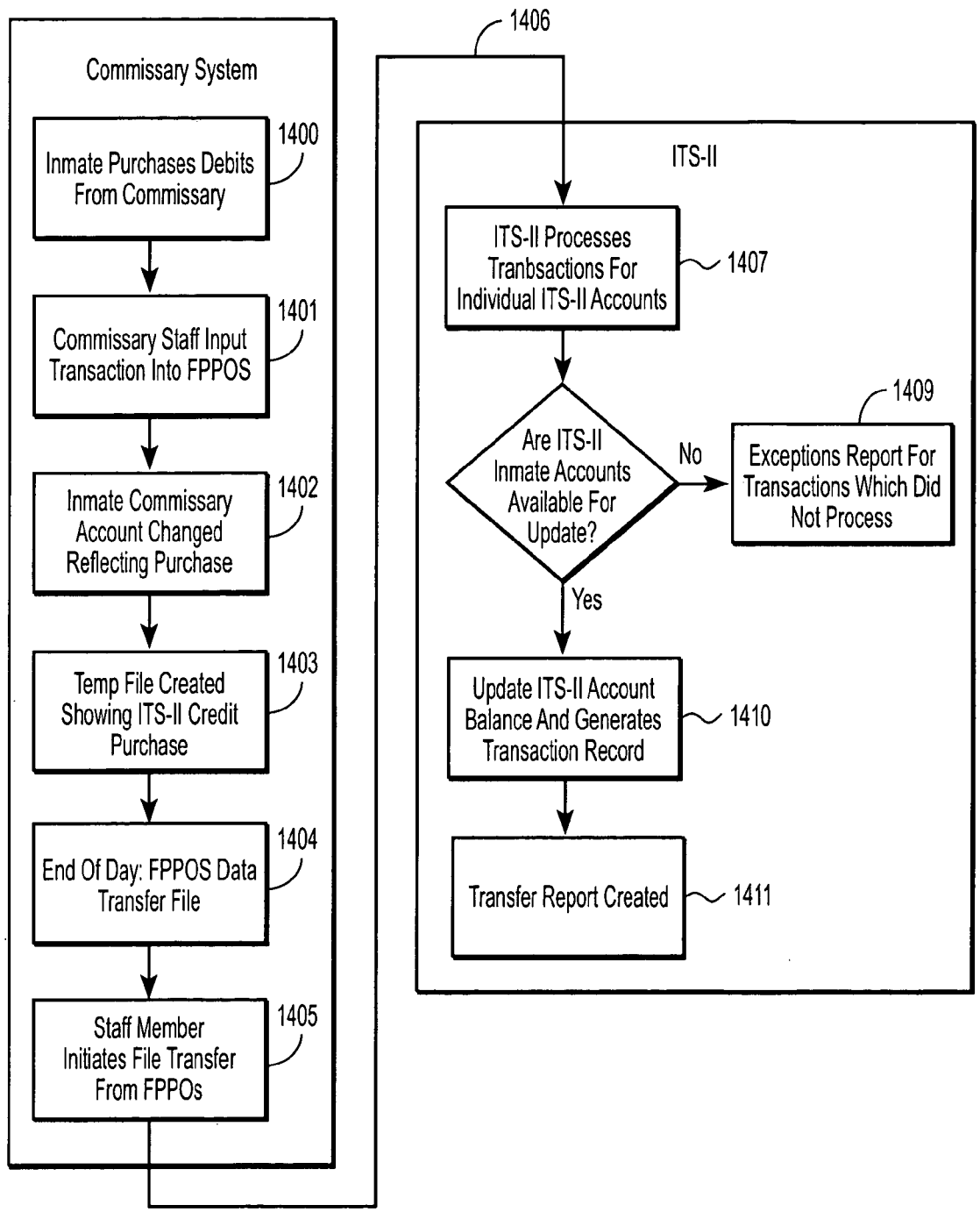

FIG. 22 shows the steps involved in a electronic transfer of funds, from a Commissary account to the ITS-II account, which is initiated by prison personnel at the inmate's request. In step 1400, an inmate "purchases" debits from the Commissary. The Commissary staff input the transaction into the FPPOS system 1401. The inmate's Commissary account is changed to reflect the purchase 1402, and a temp file is created showing the ITS-II Credit purchases 1403.

At the end of the day, the FPPOS automatically generates an ASCII data transfer file 1404 and, at the instruction of a Commissary staff member 1405, transfers this file to the FMU 1406. Those skilled in the art will recognize that this data transfer is not necessarily restricted to end-of-day transfers only; many POS systems provide real-time, automatic updates, and the FMU would easily accommodate such updates. The current FPPOS system, however, requires that a Commissary staff member enable the file transfer.

The FMU, in turn, processes the transactions for the individual ITS-II accounts 1407. This processing includes validation checks, such as:

1. Is the inmate assigned to the correctional facility?
2. Is the inmate's account active?
3. Is the inmate on the telephone?
4. Are there any other transaction locks on the account?

The FMU also checks whether the accounts are available 1408. If the account is invalid or unavailable, that fact is recorded as an "exception" which is reported on a Transfer Exceptions Report 1409. If the transfer is approved, the FMU simultaneously stores the transaction record locally and on the databases on the Central Operations Facilities servers, and updates the net transaction amount for the day on the inmate's daily account balance summary record 1410. Upon completion of the FPPOS file processing, the FMU automatically generates and prints the Exceptions Report and an Electronic Funds Transfer Report 1411, which includes the inmate's name, the inmate's register number, the transaction date, and the amount of the transaction.

Figure 23:
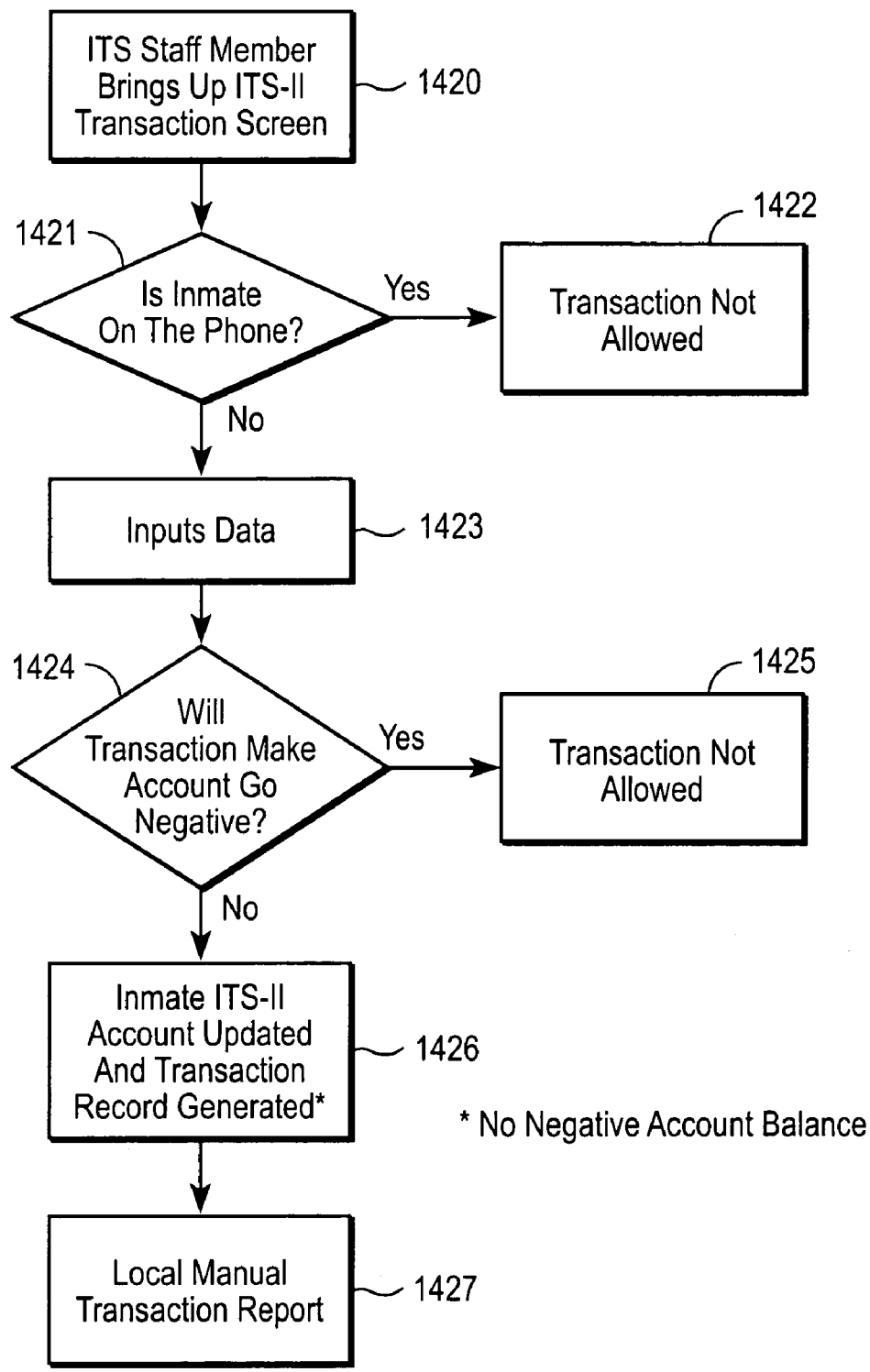

A staff member of the prison institution may also manually initiate financial transactions, as shown in FIG. 23. Such transactions may include deposits, withdrawals and exceptions. In step 1420, a staff member brings up the "ITS-II Transaction Screen" (shown on FIG. 4B), which provides a complete listing of all transactions for a given inmate. The staff member then selects the "Enter Transaction" option. The FMU checks whether the inmate is in the middle of a telephone call and whether the inmate's account has been locked by another transaction process 1421. If either of these are true, the staff member receives a message that the transaction is not allowed. 1422.

Otherwise, the staff member inputs the data 1423, which includes the inmate's register number, transaction type, amount of transaction, and comments. If the entered transaction will make the inmate's account go negative 1424, then a message is displayed to the staff member that the transaction is not allowed. If the account will still have a positive balance, then the FMU generates a transaction record, updates the inmate's ITS-II account locally and on the databases on the Central Operations Facilities' servers 1426, and generates a line for the "Manual Transaction Report" 1427.

Figure 24:
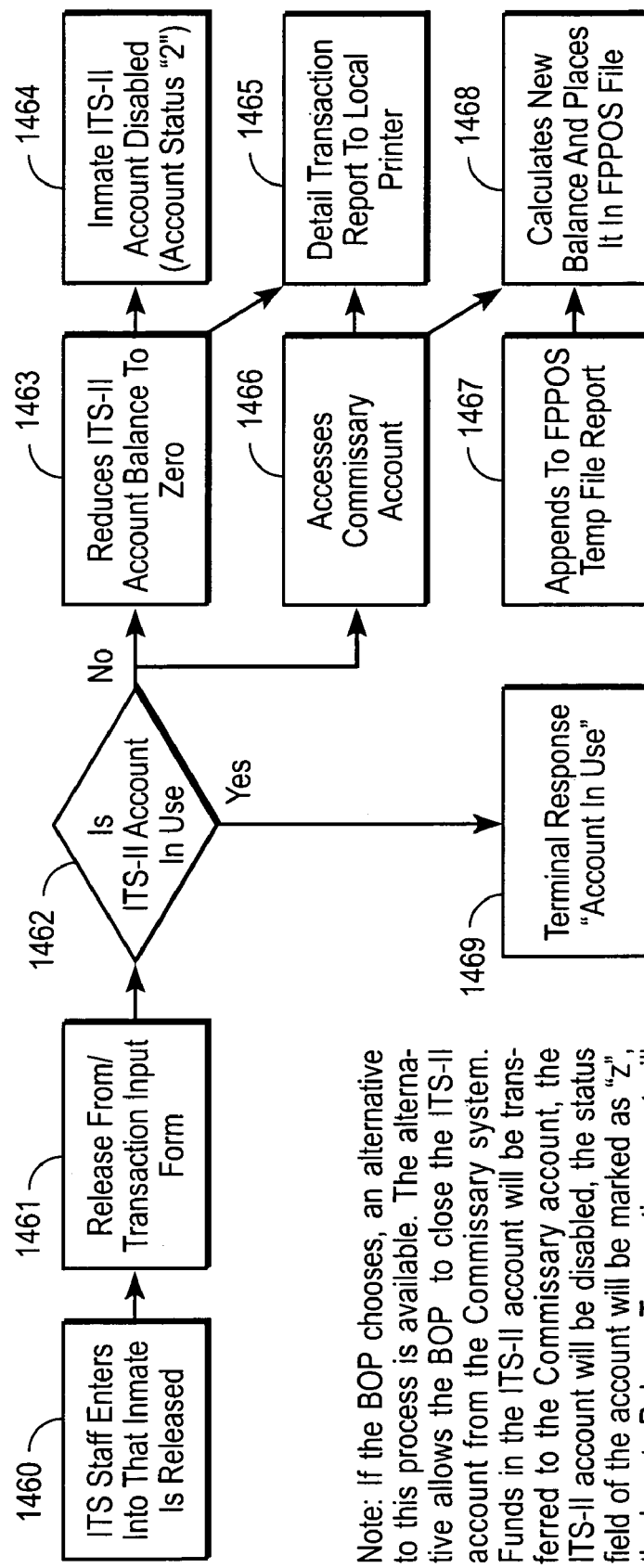

Referring now to FIG. 24, there is shown the process of releasing an inmate. In step 1460, a staff member enters the information that an inmate is released, at the "ITS Transactions Screen" at the "Profile" tab (shown in FIG. 4A), by changing status to 'Z-Released'. The FMU generates a release form 1461 and checks whether the inmate's ITS-II account is in use or otherwise locked 1462. If so, a message to that effect is displayed 1469. If not, the FMU:

1. locks the account to prevent other processes from accessing it,
2. reduces the ITS-II account balance to zero 1463,
3. identifies the account as "disabled" 1464,
4. prints a Detail Transaction Report to a local printer 1465,
5. access the inmate's Commissary account 1466
6. appends a record to the FPPOS temp file for reporting 1467, and
7. adds the prior ITS-II balance to the FPPOS account and places the new balance in the FPPOS file.

Alternatively, the preferred embodiment could also process inmate release transactions directly off of the FPPOS system. In this way, the prison staff would be saved the effort of entering inmate release information into two separate systems.

Figure 25:
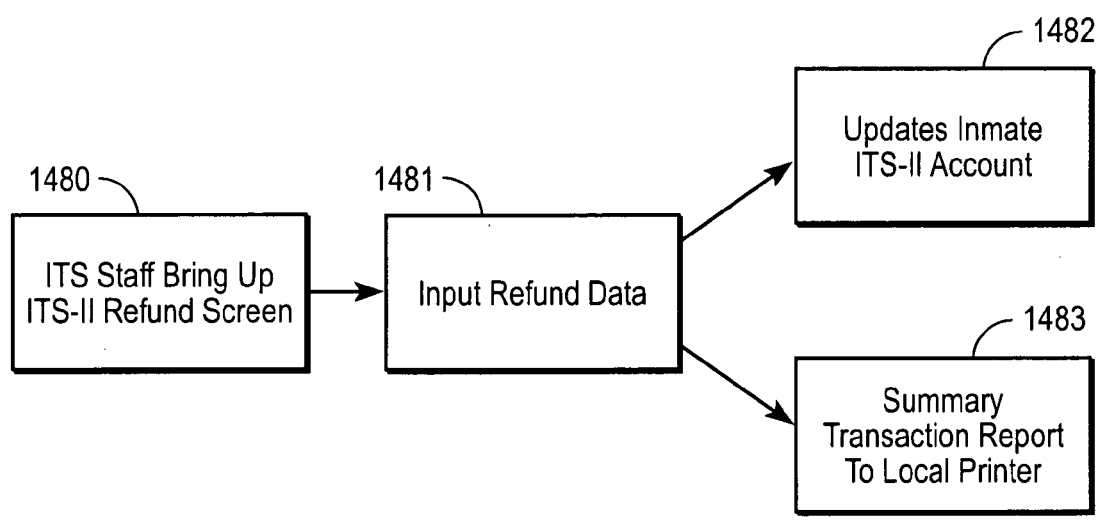
Figure 26:
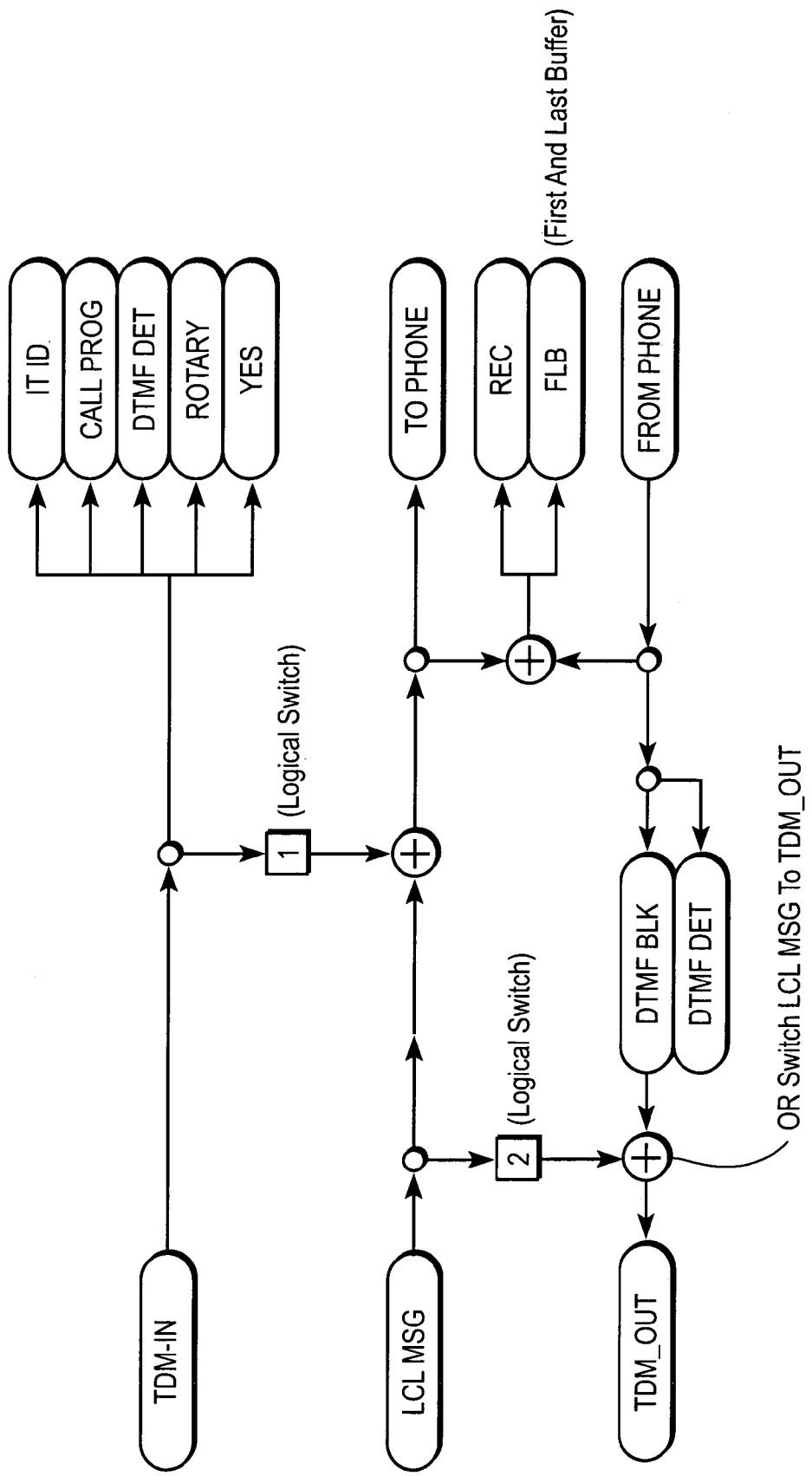

Finally, FIG. 25 shows the steps involved in a call charge refund. Inmate refund transactions are entered at the ITS-II Transactions Screen (shown on FIG. 4B) as a "refund" transaction type 1480. The refund data is entered 1481, including the inmate's register number; the phone number for which the refund is being given, and the number of minutes to be refunded. The FMU calculates and displays the amount of the refund. The inmate's ITS-II account is then updated locally and on the databases on the Central Operations Facilities' servers 1482, and a Summary Transaction Report is generated 1483, which indicates the inmate's name and register number, the date and time of the transaction, the date of the call, the type of the transaction, the amount of the refund, comments, the telephone number called, and the name of the user who entered the transaction.

General Service Requirements

The ITS-II architecture supports an inmate population growth to at least 150,000 inmates and 150 correctional facilities. The ITS-II provides for direct dial and collect call traffic at facilities in the United States and Puerto Rico limited only by the number of inmate telephone stations. Two Digital Equipment Corporation ALPHA Servers (a trademark of Digital Equipment Corporation) located at geographically dispersed, secure Central Operations Facilities will house the full ITS-II database and provide call processing and administrative access to the data for all BOP facilities. The ITS-II wide area network that provides the connectivity among the correctional facilities and the Central Operations Facilities will provide the data path for storing all inmate and call record data from the sites onto the servers in real time. Using replication technology, updates to the database on the primary server will be sent immediately over the wide area network to update the database on the backup server. Each of these servers has the capacity to store a minimum of one year of call record history.

The server at the Primary Central Operations Facility will also house a larger database capable of storing a minimum of seven years of inmate data. This database will contain a copy of the data from the central inmate database and be dedicated to providing rapid, read-only access for running reports and queries.

The Facilities Management Unit (FMU), located at each correctional facility, routes and controls inmate calls, maintains uninterrupted communications with the Central Operations Facilities servers for storing call records and transactions and providing database access for the administrative workstations, and manages communications within the facility for monitoring and recording calls and supporting the FPPOS and AIMS interfaces.

Also located at each Central Operations Facility is a dedicated network management server responsible for monitoring all network activity over the wide area network as well as the local area networks at each of the correctional facilities, the Management and Specialty Training Center and the BOP Central Office.

An electronic mail server for providing e-mail capability among all facilities including the MSTC and the BOP Central Office and the Central Operations Facilities servers will be located at the Primary Central Operations Facility.

In order to develop, deploy and maintain the multi-site telephone system of the size and complexity specified by the Bureau of Prisons, the inventor developed a specific design and support strategy called "Maximum Uptime Management System" (MUMS). MUMS has governed the development of every component that contributes to system uptime, including but not limited to: hardware, WAN and LAN architecture, software, and carrier network implementation.

Compliance with Regulatory Agencies

All telecommunications services and equipment are designed to comply with all applicable local, state and federal regulatory requirements.

Call Processing Information

In order to maintain up-to-date call rating and call processing information (such as local exchanges, area codes, country codes, vertical and horizontal coordinates, etc), the ITS-II requires an active subscription to a telecommunications database service. Monthly updates from the service are processed and all relevant changes are transmitted to the central servers and facilities, including the MSTC and the BOP Central Office.

The ITS-II is also capable of generating a monthly report to each facility indicating impending changes to numbers on inmates' allow lists. Optionally, the BOP can elect to provide a permissive dialing period to inmates when an allowed number's area code has changed. During the permissive period, an inmate would be able to dial either the old area code or the new area code, and the FMU would out dial the new area code. The FMU would also play a voice message to the inmate to warn of the area code change. At the end of the grace period, the inmate's list would be updated to reflect the new area code.

The Rate Table Maintenance window in the ITS-II graphical user interface provides the BOP with call processing and call rating information for each correctional facility.

Number Blocking

Calls to telephone numbers that incur excess charges, to long distance carriers, and to numbers that access long distance carriers, are blocked at three levels:

(1) All NPA/NXX combinations in the rate center file from the telecommunications database service (described above in the section entitled "Call Processing Information") that are labeled 'illegal' are blocked.

(2) The dialing patterns file, used by the FMU for out dialing inmates' calls, designates as illegal any other NPA/NXX combinations requested by the BOP and not included in the service's monthly rate information. Blocked NPA/NXX combinations in the dialing patterns file for each correctional facility, a group of facilities, or all facilities are entered and modified on the Calling Features tab on the National Information Maintenance and Facility Information Maintenance windows on the ITS-II graphical user interface.

(3) Inmates are restricted to placing 1+NPANXX, 0+NPANXX, and seven digit local NXX calls. All attempts to dial other patterns are cut off. Dialing patterns for balance inquiries and funds transfers are distinct from actual call types and are never routed to CO lines.

(4) Local, collect, and international calls to numbers deemed illegal by the BOP and carrier will be blocked by the carrier.

Communications Interfaces

The FMU is configured with the necessary analog and digital interfaces to support connection to industry-accepted telecommunications network interfaces required for connectivity to telecommunications carriers to support all outbound calling services, including the BOP provided FTS services. These interfaces support DTMF as well as rotary dialing and include support for ground start and loop start trunks. Connection to BOP internal telephone wiring is provided via Amphenol connectors.

In order to reduce the amount of equipment required at each correctional facility and improve reliability, the FMU's built-in multiplexer and router capability will carry the BOP provided 56 Kbps line on a DS0 port on the T1 interface.

Communications Interfaces-Direct T-1 Digital Interface

In order to minimize the space required for the ITS-II and telephone line interface equipment, the FMU will be directly connected to T-1 lines. The serial data stream in a T-1 line can represent up to 24 channels of voice and/or data, hence the space savings. No channel banks are required. The FMU is configured with 4 T-1 lines which would allow 96 inmate phones to be used at the same time. Expansion capacity up to 6 T-1s is included for backup T-1 access. Because there is not a direct connection from the inmate phone to the T-1 line, there can be more inmate phones than outbound lines.

A switching scheme called time division multiplexing (TDM) is used to dynamically match T-1 open slots with new inmate phone calls.

Outbound Only Calls

The FMU will allow inmates to process only outbound calls; conversely, inbound calls are not processed by the FMU. The FMU electronically isolates the inmate stations from the carrier networks. Thus, there is no way for an incoming call to be connected to an inmate station.

Outbound Only Calls-Second Dial Tone Calls Prevented

The FMU utilizes four different protection methods for preventing inmates from getting a second dial tone without hanging up the telephone after the first call:

(1) The Added Call Detection (ACD) feature is constantly listening for signals that indicate that the inmate or called party is attempting to bridge a call to a third party or has obtained a new dial tone. Any time an added call attempt is detected, the call is cut off.

(2) The system will detect an open switching interval when the called party phone goes on-hook.

(3) Where available, ground start trunks will be ordered from the local exchange carrier. These will prevent inmates from obtaining a second dial tone without hanging up after a call.

(4) The FMU prevents a direct electrical connection between the station side and the network side. Thus, the inmate station side is isolated from the network.

Outbound Only Calls-Time to Dial Tone

The FMU is capable of providing an industry standard dial tone to the inmate telephone in less than 100 ms when the receiver is lifted off hook.

Outbound Only Calls-Call Setup and Process Time

The ITS-II is designed to provide the required call setup and processing in less than ten seconds. As soon as the inmate has completed dialing, the call processor will seize the appropriate network trunk and begin the out dial process while the call is being validated. The call processor will hold the last digit until call validation is complete. If the call is denied, the network trunk will be dropped before the last digit is out dialed. If the call is allowed, call processing will continue.

Outbound Only Calls-Maximum Ring Time

By default, the maximum ring time for all calls will be set to two minutes. If the FMU does not receive answer supervision within two minutes after a call is out dialed to the network, it will drop the trunk and play a voice message to the inmate indicating that the called party did not answer. The "maximum ring time" feature can be adjusted either nationally or on a site by site basis.

Outbound Only Calls-Call Process Notification

An inmate is notified of the progress of a call as follows: Once a direct dial or collect call requiring called party acceptance has been approved, a call progress message is played to the inmate to indicate that the call is in progress. Informational messages are played at ringing intervals. If the called party phone is busy, the FMU plays a busy signal to the inmate telephone. The inmate is electronically isolated from the network until the called party has explicitly accepted the call.

When the FMU approves a direct dial that does not required called party acceptance, it connects the inmate station to the network trunk, and the inmate hears the actual call progress tones.

Outbound Only Calls-Call Answer Notification

As soon as the FMU receives "answer supervision," i.e. as soon as the called party picks up her phone and says "hello", the FMU begins playing the necessary voice interaction scripts to the called party. It replays them until the called party responds or until the maximum accept time expires. These messages vary depending on the type of call. Collect call messages announce the carrier and the inmate's pre-recorded name and provide instructions for accepting or refusing charges for the call. If acceptance by the called party is required for direct dial calls, the FMU plays the inmate's pre-recorded name and provides instructions for accepting or refusing to speak with the inmate.

Outbound Only Calls-Separation of Voice Path Until Call Acceptance

For all collect calls and direct dial calls that required called party acceptance, the FMU maintains the electronic isolation between the inmate station and the network trunk until the call has been accepted by the called party. The FMU then establishes the connection between the inmate station to the selected network trunk and announces to both parties that they are connected.

Electrical Conditioning

The need for maximum protection in the event of service outages was a major factor in the development of the ITS-II architecture. The ITS-II Maximum Uptime Management Strategy (MUMS) electrical conditioning design has been incorporated into the Primary Central Operations Facility, the Backup Operations Facility and the equipment at each of the Bureau's correctional facilities. The design of the FMU is the result of several years of experience with a full range of environmental and electrical conditions. The hardware design of the FMU takes into consideration the need to provide a constant DC voltage regardless of the external conditions such as outages, surges and reduced voltage.

Electrical Conditioning—Conditioning Equipment

Each component at the primary Central Operations Facility, the Backup Operations Facility and each correctional facility is protected from power outages, electrical surges, reduced voltages, and/or poor electrical qualities with surge protection strips and un-interruptible power supplies. A backup generator is located at the Primary Central Operations Facility.

The FMU is configured with an integrated UPS and AC-charged battery that provides total isolation from the power source and two hours of backup in the event of a power outage. In addition, the internal UPS filters AC power line transients for added protection from power surges.

The FMU's dual power supply is designed to operate over a wide range of input voltages. In the event one of the power supplies fails, the other is already online to take over automatically.

The central office quality line interface includes gas discharge tubes and PTC self-resetting fuses on all telephone line interfaces (inmate station and network), in order to provide surge protection from the network as well as inmate phone stations. The FMU also has the capability to monitor and generate alerts for phone line connectivity, system temperature, power supply, and battery condition. Should a fault occur, the FMU will report the trouble to the PCOF and activate the fault LED on the failed interface card. If the trouble cannot be resolved remotely, a field technician, on arrival at the site, will be directed to the trouble by the fault LED.

Electrical Conditioning-Recovery from Power Outage

The FMU will be protected by a 2-hour UPS. All other components are covered by UPS for power outages of 20 minutes. Automatic shutdown routines provided by the UPS's protect the equipment from longer power outages. The servers, workstations, FMUs, and routers will recover from power outages automatically. The operating system that runs the call processor on the FMU re-boots as soon as power is restored and restarts all of the processes required to resume normal call processing. In addition, the FMU's static memory with battery backup provides a means for recovering call detail information at the time of the outage.

Called Party Voice Message Announcements

The ITS-II has the capability of providing voice message announcements to the inmate, to the called party or to both the inmate and the called party at any time during a call. Once the exact wording of the messages is determined, the message is recorded, stored on the primary and backup servers, and downloaded to the FMUs at each correctional facility as well as the MSTC and the BOP Central Office. The BOP has the ability to change these messages.

In addition, the ITS-II graphical user interface will provide BOP administrative personnel with the ability to listen to the voice messages from the administrative workstations.

Called Party Voice Message Announcements-Deny Future Calls

When the "deny future calls" feature is set to yes for a call type (collect, direct dial, both, or free call), the FMU will play an additional instruction providing the called party with the opportunity to deny all future calls of that call type from the inmate placing the call. If the called party selects this option by dialing the designated digit, the call is denied and a called party deny flag is placed on the dialed number in the inmate's telephone number list for that call type. The flag prevents the number from being re-activated for the inmate by users other than those with a BOP specified access level.

The BOP can turn the "deny future calls" feature on and off using the Calling Feature tab on the National Information Maintenance window of the ITS-II graphical user interface. At the discretion of the Bureau, this feature can be set nationally or by facility for collect and/or debit calls. The ability to modify this feature is determined by the user's access level.

In addition, the ITS-II includes a feature disclosed in Gainsboro U.S. Pat. No. 5,655,013, which is called the GOTU™ feature. This feature allows the called party to dial '4688' (GOTU™) on a DTMF phone at any time during the conversation with the inmate (after accepting the call if positive call acceptance is required). The FMU constantly monitors the line for extra dialed digits. As soon as it detects the '4688' pattern, it cuts off the call and puts a called party deny flag on the dialed number in the inmate's telephone number list indicating the called party's refusal and preventing the number from being re-activated for the inmate by users other than those with a BOP specified access level.

Called Party Voice Message Announcements-Bilingual Messages

Messages played to the called party for both debit and collect calls can be played in the language (English or Spanish) specified by the inmate for that number in the inmate's telephone number list. In addition, the ITS-II can be configured to prompt the called party to enter the language preference upon receipt of a call requiring positive acceptance. In so doing, the called party can control the language in which the voice messages are played.

Called Party Voice Message Announcements-Form of Called Party Response

The ITS-II has the capability of accepting either keypad input or voice response from the called party. The called party will be offered the choice of accepting a call by dialing the prescribed accept DTMF or rotary digit or by saying "yes".

Called Party Voice Message Announcements-Intermittent Message

The ITS-II has the capability to interject messages into a telephone call at random intervals, based on the settings of the "play intermittent message" feature. When this feature is turned on for a call, the FMU interjects the message into the call at the specified intervals. Using the Class of Service tab on the ITS-II graphical user interface, the BOP has the ability to turn this feature on and off and to modify the intervals at which the message is played as well as the call types for which the message is played.

At the discretion of the BOP, this feature can be turned on and off nationally, on a site by site basis, by individual inmate, by group of inmates, by inmate telephone, or by specific allowed telephone number. The ability to modify this feature is determined by the user's access level.

Called Party Voice Message Announcements-Call Type Announcement

The ITS-II will play the appropriate message to the called party depending on the type of call. This message will always be played for collect calls. The message that a call is direct dial will be played if the "play direct dial message" feature is turned on. This feature can be turned on and off by the BOP using the Class of Service tab on the ITS-II graphical user interface.

The BOP may also elect to turn this feature on and off nationally, by facility, by individual inmate, by group of inmates, by inmate telephone, by call type or by specific allowed telephone number. The ability to modify this feature is determined by the user's access level.

Called Party Voice Message Announcements-Call Origin Announcement

The ITS-II has the capability of providing an announcement message to the called party at specified intervals that the call is originating from a Federal Prison. The BOP can turn the "call branding" feature on and off for collect and/or direct dial calls using the Class of Service tab on the ITS-II graphical user interface.

The BOP may also elect to turn this feature on and off nationally, by facility, by individual inmate, by group of inmates, by inmate telephone, by call type, or by specific allowed telephone number. The ability to modify this feature is determined by the user's access level.

Called Party Voice Message Announcements-Name of Called Party Announcement

The FMU has the capability of playing to the called party the name of the calling party for all calls requiring positive acceptance by the called party. The BOP can turn the "record inmate name" feature on and off for collect and/or debit calls using the Class of Service tab on the ITS-II graphical user interface.

When the "record inmate name" feature is turned on for a call, and the inmate name has not yet been recorded, the FMU will prompt the inmate to state his/her name at the tone. A two second window is provided for the name recording. When the call is announced to the called party, the FMU plays the inmate's recorded name. If the call is accepted, the inmate's recorded name is then stored on the hard disks on the FMU as well as on the primary and backup servers. When the "record inmate name" feature is turned off for a call, the FMU prompts the inmate to state his/her name at the tone and then plays that name to the called party.

The BOP may also elect to turn this feature on and off nationally, by facility, by individual inmate, by group of inmates, by inmate telephone, by call type, or by specific allowed telephone number. The ability to modify this feature is determined by the user's access level.

In addition, the FMU provides the BOP with the ability to listen to an inmate's recorded name and set a flag requiring the inmate to record his/her name the next time he/she places a call.

Called Party Voice Message Announcements-Call Acceptance Instructions

As soon as the FMU receives answer supervision from the called party, it plays the call announcement messages appropriate for the call type. For collect calls, it identifies the call and the carrier and plays the messages selected by the BOP followed by instructions for accepting, refusing, and permanently refusing the call, if that feature is turned on. For example: "This is [carrier name]. You have a collect call from [inmate name] [optional call branding message]. If you would like to accept the charges for this call, please dial [accept digit] or say "yes" now. If you would like to refuse all future collect calls from this inmate, dial [refuse digit]. If you do not wish to accept this call, hang up now."

For direct dial calls, the FMU plays the messages selected by the BOP followed by instructions for accepting, refusing, and permanently refusing the call, if that feature is turned on. For example: "You have a direct dial call from [inmate name] [optional call branding message]. You will not be charged for this call. If you would like to receive this call, please dial [accept digit] or say "yes" now. If you would like to refuse all future direct dial calls from this inmate, dial [refuse digit] now. If you do not wish to accept this call, hang up now."

Called Party Voice Message Announcements-Proceed Talking Instruction

When the called party has accepted a collect or direct dial call, the FMU plays a message announcing to both the called party and the inmate that they are connected and that they may begin their conversation. At the same time, it establishes the connection between the inmate and the called party.

Called Party Voice Message Announcements-Collect Call Rate Announcement

The ITS-II will provide the called party with the option of obtaining the collect call rate prior to accepting the call. The first time a call is completed to a dialed number, the following message is played: "This is [carrier name]. You have a collect call from [inmate name] [optional call branding message]. To receive rate information regarding this call, press [information digits] or stay on the line. To accept the charges for this call, dial [accept digit] or say "yes" now."

A different message is played for subsequent calls to the same dialed number: "This is [carrier name]. You have a collect call from [inmate name] [optional call branding message]. To accept the charges for this call, dial [accept digit] or say "yes" now. To receive rate information regarding this call, press [rate information digits] or stay on the line."

If the called party elects to hear the collect call rate prior to accepting the call, the appropriate message will be played to ask the inmate to continue to hold while the call is processed. If the inmate hangs up before the rate message has been played, the message will be played in its entirety, and the FMU will inform the called party that the inmate has hung up and there will be no charge for the call.

Trunk Group Availability

The ITS-II as designed contains sufficient FMU hardware and other ITS-II hardware to ensure the probability of blocking a call by an inmate does not exceed ten percent during the busiest hour at any institution.

The ITS-II can maintain call record data regarding the call types of calls denied due to all trunks busy. This information can be formatted in a monthly report to determine which call types are close to or exceed the minimum of ten percent call blocking.

Trunk Rotation

The ITS-II provides trunk rotation by call type on a next trunk available basis. When an inmate places a call, the FMU will route the call to the next available trunk of that call type (direct dial or collect local, direct long distance, etc.).

The FMU is configured such that there is not a one-to-one relationship between an inmate station and a network trunk. An outbound trunk is assigned to an inmate phone when an inmate places a call from that phone.

Call processing flowcharts are provided in FIGS. 6 through 17. See above for detailed descriptions.

Voice Quality

The FMU has been designed to meet or exceed all appropriate industry standards for transmitted and received levels, noise, cross-talk, and frequency range, including Bellcore, IEEE, ANSI, NIST, and FIPS. The voice quality level will be unaffected by any other ITS-II features, functions, or capabilities.

Direct Dial Service

The ITS-II debits inmate accounts on a per minute basis in real-time for charges for all completed inmate initiated direct dial calls. There are no additional inmate charges for direct dial services; inmates are not "billed" for direct dial services.

Rates

The BOP can enter the per minute BOP charge to be added to the direct dial rate for each direct dial call type using the Rate Table Maintenance window on the ITS-II graphical user interface. The window will include the subscription-based ITS-II direct dial rates as read only, provide data entry fields for the BOP charge for each call type and the date the rates are to be effective, and display the total per minute rate to be charged to inmates for each call type as the sum of ITS-II rate and the BOP charge. The BOP has the ability to set rates in advance to take effect automatically at midnight on the effective date.

The ITS-II sets a call countdown timer for each direct dial call based on the inmate's class of service as well as system and site calling parameters. As soon as a direct dial call is completed (i.e., when the called party answers or accepts the call if positive acceptance is required), the ITS-II starts the call timer and debits the inmate account by the cost of one minute for the call type. The FMU continues to debit the inmate's account every minute until the end of the call.

General Direct Dial Service Requirements

When the "accept required for direct dial" feature is turned on, the connection between the inmate station and the central office trunk will not be made nor will the inmate be charged until the called party accepts the call by dialing the accept digit or saying "yes". When the feature is turned off, the FMU connects the inmate station and the central office trunk upon approval of the call.

Charges for the call begin as soon as the call is answered by the called party.

The "accept required for direct dial" feature can be turned on and off by the BOP using the Class of Service tab on the ITS-II graphical user interface.

At the discretion of the BOP, this feature can be set nationally, by facility, for an individual inmate or group of inmates, telephone numbers, or for specific inmate telephones. The ability to modify this feature is determined by the user's access level.

The FMU will stop debiting the inmate's account when one of the following conditions is met:

(1) The FMU receives an end of call signal from the network trunk or the inmate station indicating that the calling or called party has hung up.

(2) The call duration timer has expired indicating that the inmate does not have sufficient funds to continue the call, the maximum duration for the call has expired, or the call is at the end of a calling schedule.

(3) The call is cut off because of extra dialed digits, the called party dials GOTU™, an administrator cuts off the call, or the inmate or called party has violated any other system specified call restriction.

The ITS-II provides a means for adopting out dial patterns to the FMU(s) for each call type as well as for selected area code and exchange combinations. This method provides maximum flexibility for meeting the needs of the BOP as well as for meeting ever-changing industry requirements. Each call type has its own dialing pattern used by the FMU to route calls. In addition to specifying the type of trunk for routing a call, such as FTS, local, collect, or international, the dialing pattern can also specify any additional routing codes required by the carrier, such as FTS authorization codes. These codes can consist of any number of digits and can be out dialed in any sequence (e.g. before the dialed number or after the dialed number) should the FTS2000 authorization code requirements change.

The Dialing Patterns tab on the Facility Information window on the ITS-II graphical user interface provides the BOP Central Office with a means for editing the FTS authorization code for each correctional facility. There is a field on the tab for activating and deactivating the code.

If an authorization code is deactivated or not entered for a site, the code will not be out dialed to the FTS network.

Digital signal processors on the FMU will be used to detect Special. Information Tones. When a SIT is detected, the inmate is not charged for the call. To prevent the possibility of an inmate accessing a live operator following a SIT from the network trunk, the "SIT action" feature can be set to cut off calls using the Calling Features tab on the ITS-II graphical user interface.

All direct dial long distance calls will be routed to the BOP provided FTS circuits.

Local Direct Dial Service

The ITS-II requires a subscription to a telecommunications database service in order to obtain pay phone calling area information on a monthly basis. The calling area data is used to provide monthly updates to the local calling areas table for all sites on the central database and at each site. The FMU then uses that information to identify a dialed number as local. For those sites not covered by the database service, the facility maintenance personnel must obtain the information directly from the local exchange carriers on a monthly basis.

In addition, the ITS-II maintenance personnel will maintain an exceptions table for those sites where the local exchange carrier calling area data differs from the data provided by the service. This table will be modified for changes to local calling areas that occur between the monthly updates. BOP users with the appropriate access level will also have the ability to add and delete area code and exchange combinations to the exceptions table for a site using the Local Calling Area Maintenance window on the ITS-II graphical user interface.

Once the FMU has identified a dialed number as a local call, it routes the call out the next available local trunk. The call is rated on a per minute basis using the rates specified on the Rate Table Maintenance window on the ITS-II graphical user interface.

International Direct Dial Service

The Approved Telephone Number Search Report (described below in the section entitled "Approved Telephone Number Search Report") includes a search criterion for approved toll free access numbers. The report output includes the inmate register number, inmate name, and approved toll free access numbers.

The Telephone Number Usage Report (described below in the section entitled "Telephone Number Usage Report") includes a search criterion for calls made to toll free numbers. The report includes the call details, including inmate name and register number, of all calls to toll free numbers meeting the selection criteria specified.

Toll Free Access

The Calling Features tab on the National and Facility Information Maintenance windows on the ITS-II graphical user interface provides BOP with the ability to block all calls to toll free numbers, including local access toll free numbers. In order to allow certain inmates the ability to place calls to designated toll free numbers, the BOP can override the block by turning on the "toll free allowed" feature for individual inmates or groups of inmates. When the "toll free allowed" feature is turned on for an inmate, that inmate will be restricted to calling toll free numbers that are on the inmate's allowed number list.

At the discretion of the BOP, the "toll free access allowed" feature can be turned on and off nationally, on a site by site basis, by individual inmate, by group of inmates, by inmate telephone, or by specific allowed telephone number. The ability to modify this feature is determined by the user's access level.

The Approved Telephone Number Search Report (described in section entitled "Approved Telephone Number Search Report", below) will include a search criterion for approved toll free access numbers. The report output will include the inmate register number, inmate name, and approved toll free access numbers.

The Telephone Number Usage Report (described in the section entitled "Telephone Number Usage Report", below) will include a search criterion for calls made to toll free numbers. The report will include the call details, including inmate name and register number, of all calls to toll free numbers meeting the selection criteria specified.

Collect Call Service

The ITS-II does not use human operators at any point during collect call processing. The ITS-II can be configured to support human operators.

For all collect calls, the connection between the inmate station and the network trunk will not be made nor will billing commence until the called party accepts the call by dialing the accept digit or saying "yes".

Called party billing for a collect call will stop when one of the following conditions is met: (1) the FMU receives an end of call signal from the network trunk or the inmate station; (2) the call duration timer has expired indicating that, the maximum duration for the call has expired, the inmate has exceeded his/her collect call minutes for the given time period, or the call is at the end of the system, facility or inmate schedule.

(3) the call is cut off because of extra dialed digits, the called party dials GOTU™, an administrator cuts off the call, or the inmate or called party has violated any other system specified call restriction.

The ITS-II provides the following services for collect calls. The ITS-II collect records for billing and out-clearing. The ITS-II performs real time (LIDB) verification through a (LIDB) gateway. In addition to the BOP stated requirements, the ITS-II is also configured to support the new Locked-Martin Local Number Portability (LNP) database for accurate billing of collect calls as Local Number Portability is deployed.

Wide Area Network

Connectivity among the ITS-II equipment at federal correctional facilities and support for system-wide ITS-II administrative operational and functional capability is achieved by a TCP/IP based wide area network that is designed to meet or exceed the BOP's requirements for fault tolerance and no single point of failure.

Equipment is located at each correctional facility, the MSTC, the BOP Central Office, the primary Central Operations Facility, and the backup Central Operations Facility. Since routing for the wide area network at the correctional facilities is built into the FMU, separate routers are not required at the facilities. The data circuit for a site is carried on one time-slot of an FTS2000 T-1, and this T-1 circuit is connected directly to the FMU. However, the FMU also supports the use of a separate and distinct data circuit: Routers are located at the Central Operations Facilities.

The inventor has selected Hewlett-Packard's OpenView (A trademark of Hewlett-Packard) platform for the ITS-II network management system. The network management system runs on a dedicated server at each of the Central Operations Facilities. The network management system is responsible for monitoring the operational aspects of each node on the network and its associated components. This includes: the primary and backup database servers, the archive server, the mail server, the routers at the Central Operations Facilities, the FMUs at the sites, the local area networks and intelligent hubs at the sites, and the workstations at the sites.

The OpenView platform addresses this requirement as follows:

network startup: The OpenView platform is able to do automatic device discovery, simplifying the creation of the network management database.

monitoring: The OpenView platform uses the Simple Network Management Protocol (SNMP) to query agents on the servers, FMUs and intelligent hubs, and can display information such as packet counts and system statistics both as instantaneous values and as trends over various time periods. If the queries to a device fail, or if the results indicate a problem, OpenView automatically alerts a network administrator (using a pager if necessary).

maintenance and operations: The OpenView platform, in conjunction with per-device interfaces, provides the ability to do operations such as adding or changing data circuit configuration and enabling and checking loop-back mode on data circuits.

The ITS-II WAN will be configured to use one 56 Kbit/s FTS2000 Dedicated Transmission Service link between the Primary Central Operations Facility and each correctional facility, including the MSTC and the BOP Central Office. An additional link of 1.5 Mbit/s will be required to connect the primary and backup Central Operations Facilities.

The ITS-II WAN is built around DARPA Internet technology, one of whose primary goals is the ability to build highly fault tolerant networks. All routers in the ITS-II WAN will run the OSPF routing protocol which allows rapid discovery of redundant data paths in case of primary path failure.

The WAN components are:

Site FMU, acting as a router to the site LAN (the BOP Central Office and the MSTC are treated as ordinary sites in this respect)

56 Kbit/s dedicated data circuit via FTS2000 from each site to the primary Central Operations Facility Primary Cisco router at the primary Central Operations Facility Hot-spare Cisco router at the primary Central Operations Facility Computer controlled switch for data circuits at the primary Central Operations Facility 1.5 Mbit/s dedicated data circuit via FTS2000 between the primary and backup Central Operations Facility Cisco router at the backup Central Operations Facility Modem at each site which can place calls over normal FTS2000 or carrier trunks Pool of 24 modems at the primary Central Operations Facility The data circuits coming into the primary Central Operations Facility are all normally connected to the primary Cisco router. The computer controlled switch allows the primary Central Operations Facility server to switch all of the data circuits to the hot-spare Cisco router.

Under this design, the WAN has no single point of failure:

If the data circuit to a site fails, the FMU will automatically place a call to the modem pool and establish a PPP connection. The remaining data circuits will continue to function normally.

If the primary Cisco router fails, the primary Central Operations Facility server will change the computer controlled switch to connect all circuits to the hot-spare Cisco router.

The time between a failure and the re-establishment of normal operations is less than five minutes. During network downtime, call processing continues uninterrupted; the FMUs maintain a local copy of all accounts, balances and restrictions so all ITS-II call processing features remain in full effect. When call records cannot be delivered immediately to the Central Operations Facility, they are buffered on the FMU disk and are automatically transmitted as soon as the data link becomes available. In addition, the call monitoring stations will continue showing calls in progress and providing as usual the ability to audibly monitor any selected inmate calls. The only function lost during network failure is administrative access to accounts.

When making dial up PPP connections, the ITS-II normally uses voice circuits on the FTS2000 network. The ITS-II can also be configured to make PPP connections via voice circuits on the carrier network if the FTS2000 network is not available.

All of the data link backup operations take place at a low level in the TCP/IP protocol and are transparent to users and applications, except as a delay. As described above, real-time call processing will be entirely unaffected. Workstation users will see any windows accessing the Central Operations Facility freeze when the data link goes down, then spontaneously resume operation when connectivity is restored. A user who does not want to wait for the data link to come back up may abort the current session locally, thereby preventing later unauthorized use of his session.

The Network Management system will be duplicated at the primary and backup Central Operations Facility. It will continually test each network connection, and will alert a customer service technician if there is a problem. The Central Operations Facility servers will monitor the Network Management Systems and will page Customer Service if it goes down.

HP OpenView workstations will be installed at the primary and backup Central Operations Facility, and at the BOP Central Office. These workstations will monitor the entire network continuously, collecting and displaying real-time network information from every device. In addition to monitoring the WAN, workstations installed at the primary and backup Central Operations Facility will be configured with the ability to set parameters as part of WAN maintenance.

The HP OpenView Network Management Platform continuously monitors the health of the entire network, collecting real-time network information from every device and displaying that data on a detailed map.

This map allows a user to view a graphical representation of the network displaying the current status of all network nodes and devices on the LAN and WAN and allowing the user to step through the network in a hierarchy of views representing subnetworks and basic network components. These components will be displayed as "clickable" icons of various colors, depending on their status.

HP OpenView provides real-time remote management of all DMI compliant workstations on the LAN. DMI extensions permit features such as health monitoring as well as network administrative alerting to allow for viewing of potential errors and problems. HP OpenView also provides full support for monitoring workstations which utilize the IPX protocol as well as TCP/IP.

The performance of a LAN's network can be further monitored through the Hub with full SNMP manageability. The Embedded Advanced Sampling Environment agent enables intelligent network traffic monitoring, performance optimization, and trend analysis capability for the LANs, without overly burdening the WAN. The main computers and associated equipment will also be fully managed by the use of HP OpenView application software as well as vendor supplied management software specifically designed for management of large scale servers and high end routers.

The inventor uses a Maximum Uptime Management System (MUMS)-based Remote Trouble Diagnostic and Trouble Identification System for hardware, allowing maintenance personnel to remotely diagnose any problems from the highest system level down to the phone level. The LAN design using 10baseT Ethernet and Smart Hub technology allows the ITS-II network management software to verify connectivity all the way to the individual workstations.

The WAN primarily uses the TCP/IP protocol, and uses the software built into the operating systems on the Central Operations Facility computers, the FMUs and the workstations. Ethernet hubs are provided at the sites, as well as Ethernet controllers for the workstations.

The inventor has selected the Kerberos network security system for the ITS-II WAN. The Kerberos system was designed at the Massachusetts Institute of Technology starting in the early 1980's specifically to address the security needs of client/server networks. It is widely used in the computer industry, and is directly supported by Oracle, the supplier of the ITS-II's database, and Digital Equipment Corporation, the supplier of the main ITS-II servers.

Kerberos does an excellent job of hiding the complexities of the cryptographic protocols from the users. In general, a user logs in with an ID and a password, and then has access to all appropriate network resources. Behind the scenes, Kerberos arranges to prove the identity of the user to all of the various servers that the user may access in a session. It does this without requiring the user to retype the password, and without storing the reusable password on the workstation or sending it over the network. The authentication protocol is designed to prevent both passive attackers (who might use a packet sniffer to capture authentication tokens and attempt to re-play them), and active attackers (who attempt to interpose themselves between the client and the server).

Kerberos provides an optional feature to use DES to encrypt all data between a client and server, and the ITS-II will enable this option for all connections.

The dial up modems will be configured to accept only PPP connections, and thus will be protected by Kerberos authentication and DES encryption as well.

Management of Inmate Telephone Accounts

The ITS-II graphical user interface provides the necessary windows for viewing and reporting on inmate account information, inmate call record detail and inmate financial transaction detail by authorized BOP users immediately upon completion of the transaction. Changes to inmate account information and inmate access to telephones are: (a) input on the ITS-II graphical user interface windows at workstations located at the correctional facilities, the BOP Central Office, and the MSTC, (b) stored on the database on the Central Operations Facility server, (c) downloaded to the inmate database on the FMU, and (d) replicated in real time to the database on the backup Central Operations Facility server and to the archive database. Inmate telephone account financial transactions and inmate transfers between correctional facilities are processed by the FMU and stored on the databases on the Central Operations Facility server and the backup Central Operations Facility server and copied to the archive database. Call detail records are generated immediately upon completion of inmate telephone calls and stored on the databases on the Central Operations Facility server and the backup Central Operations Facility server and copied to the archive database. Call records and financial transactions are also stored locally on the FMU for a minimum of 30 days.

Inmate Account Information

The Inmate Information Maintenance window contains inmate account header information and a file folder with tabs for querying, viewing and editing Inmate Profile Information, Inmate Telephone Numbers, Financial Transaction Information, Telephone Call Information, and Class of Service Information. All display fields are capable of being used for entering queries against the inmate database.

Inmate account header information is always visible, regardless of which tab is displayed. Access to each tab is determined by the user's access level. Users will see only those tabs to which they have been granted access. Any time a user changes inmate account information, the ITS-II stores the information on the central inmate database and copies the changes to the FMU at the facility to which the inmate is assigned.

Inmate Profile Information

All inmate profile information described in the sections below will be maintained on tables on the ITS-II database. The ITS-II database runs on an Oracle Relational Database Management System and resides on the Central Operations Facility, Backup Central Operations Facility and in the archive database. This RDBMS provides all of the ingredients of a centralized database the scale of the ITS-II inmate database: data integrity, true client/server architecture, database and network security, audit capabilities, and a flexible, scalable application development environment.

An example of the Inmate Profile Screen is given in FIG. 4A.

Inmate Profile Information-Inmate Register Number

The inmate's register number is entered and displayed on the header portion of the Inmate Information Maintenance window and is configured in the manner required by the BOP. The ITS-II graphical user interface displays the first five digits followed by a hyphen and the remaining three digits. When entering register numbers, the hyphen is displayed on the window and is not required for input. The inmate's register number is displayed regardless of which tab on the window is active. The ITS-II graphical user interface includes a separate menu function for changing an inmate's register number. When an inmate's register number is changed, all data for that inmate will reflect the new register number, including call records and transactions.

Inmate Profile Information-Inmate Name

The inmate's name is displayed on the Inmate Information Maintenance window in three fields, last name, first name and middle name. Similarly, each part of the inmate's name is saved a separate field on the database. The last name is stored and displayed in a 35 character or longer data field. The first and middle names is stored and displayed in 15 character or longer data fields. The inmate's name is displayed regardless of which tab on the window is active.

Inmate Profile Information-Correctional Facility

The facility code identifying the correctional facility to which the inmate is assigned is displayed on the header portion of the Inmate Information window. Using the Facilities tab on the National Information Maintenance window, the BOP Central Office can assign each correctional facility a three character designation to be used with the ITS-II. This designation, or facility code, is displayed as read-only to all correctional facility staff. All financial transactions and call records are stamped with the facility code of the correctional facility from which they were entered. The facility code will be used to identify all inmate data on the database by correctional facility. BOP staff have the ability to transfer access to inmate accounts among correctional facilities by initiating a transfer transaction. A transfer transaction changes the facility code for an inmate's account information. An inmate's financial transactions and call records will not be transferred.

Inmate Profile Information-Living Unit

The Inmate Profile tab on the Inmate Account Information window includes a 15 character living unit field. This field will be described in the database as an optional field. Therefore, entry of the field on the window will not be required. Each correctional facility has the capability of creating its own pick list of living units. When a living unit is entered on an inmate's profile, it will be selected from a drop-down list box.

Inmate Profile Information-Comments

The Inmate Profile tab includes a 1000 character text box for entering comments related to an inmate's ITS-II account and storing them on the inmate database.

Inmate Profile Information-Language Preference

The Inmate Profile tab on Inmate Information Maintenance window includes a drop-down list box for selecting a language preference of English or Spanish for the inmate. Users can select a language preference by clicking on the language or by entering the first letter of the language and pressing tab or clicking on a different field. All ITS-II voice messages will be played to the inmate in the language selected.

Inmate Profile Information-Alert

The Inmate Profile tab on the Inmate Information Maintenance window includes a check box for placing alerts on all calls placed by the inmate. When the alert box is checked on an inmate's profile, an alert flag is saved on the inmate database for the inmate along with the access level of the user who placed the alert. When the inmate places a call, an alert will be sounded to all users logged in with the same access level as the user who placed the alert. In addition, the call will be highlighted and flashed on the Calls in Progress display window of those users. An alert indicator will also be stored in the call record indicating the type of alert (inmate, telephone number, or both). This information will be used for reporting alerts as specified by the Alert Notification Report described in the section entitled "Alert Notification Report", below.

Inmate Profile Information-Account Activation Date

When an inmate's ITS-II account is created using the Inmate Information Maintenance window, the date of the account creation is stored in the inmate database. The activation date is displayed on the Inmate Profile tab as read-only to users of all access levels.

Inmate Profile Information-Date of Arrival

The inmate database maintains a separate field containing the inmate's date of arrival at a new institution. When a transfer transaction (transfer out and transfer in) is entered for an inmate, the ITS-II will automatically update the inmate's date of arrival. This field will be displayed on the Inmate Profile tab as read-only to users of all access levels.

Inmate Profile Information-Status Code

The Inmate Information window includes a drop-down list box for selecting a status code. The list box will contain the digits 0 to nine and the letters A–Z. Users will also have the option of typing the status code. The field then restricts users to inputting the digits zero to nine and the letters A to Z. By default, inmates will be assigned a status of A when their accounts are created. When a release transaction is entered for an inmate account, the inmate's status will automatically be set to Z on the database.

Inmate Profile Information-Suspension

The Inmate Profile tab includes a field for entering a temporary suspension of inmate calling privileges. BOP staff are able to suspend an inmate's calling privileges by entering the number of days for the suspension and the start date of the suspension. The suspension will take effect immediately. The date the suspension ends is calculated by the ITS-II and will appear as a read-only enable date on the Inmate Profile tab. The inmate's calling privileges will be reinstated automatically at midnight on the calculated end date of the suspension.

The Inmate Profile tab also includes a button for reviewing an inmate's suspension history. Each time an inmate is suspended, the suspension date and number of days are stored in the inmate database. When the Suspension History button is pressed, a pop-up window displays a scrolling list of past suspensions for the inmate.

Inmate Profile Information-Telephone List

BOP staff can access an inmate's allowed telephone number list from the Telephone Numbers tab on the Inmate Information Maintenance window. The Inmate Telephone Numbers tab includes fields pertaining to the list, such as the number of active allow numbers an inmate can have and whether or not the inmate has special list privileges. The tab also contains the following tabs for controlling the display of the telephone numbers: All, Allowed, Denied, Inactive. Users can elect to query, view and modify all numbers on an individual inmate's telephone number list, all allowed numbers, all denied numbers, and all inactive numbers. The Inmate Telephone Numbers list contains radio buttons for sorting the list of numbers. The ability to modify an inmate's telephone number list will be determined by the user's access level.

When the Telephone Numbers tab is active, the Report Generation button on the toolbar displays the Telephone Number List report generation window that allows users to print the Telephone Number Listing Report for the inmate whose list is displayed or to specify the inmate accounts whose telephone lists are to be included in the report.

In addition, the Facility Information Maintenance window for each facility includes a tab for maintaining the special list of telephone numbers that inmates with the special list feature enabled can call in addition to the numbers on their individual allow lists.

The ITS-II supports inmate telephone number lists of at least 30 numbers per inmate. However, the ITS-II database will support as many numbers as required by the BOP.

The list of Telephone Numbers contains a column indicating if a number is allowed, denied (including refused by the called party), or inactive (i.e. removed from the allowed list). A denied number can only be deleted or re-enabled by BOP staff with the appropriate access level. When a denied number is deleted or re-enabled, a dialog box prompts the user to confirm the action. Denied numbers are not counted towards the total number of active telephone numbers.

The Telephone Numbers tab at the national level, facility level and inmate level includes a field for entering the amount of active numbers allowed for inmates nationwide, site-wide or by individual inmate. The default for each site is the national value. If a different value is entered for the facility, it overrides the national value. The default for each inmate is the value set for the correctional facility. If a different value is entered for an inmate, it overrides the value for the facility.

Telephone numbers are displayed in a scrolling list on the Telephone Numbers tabs. The count of allowed numbers on the list is displayed on all Telephone Numbers tabs. The count is updated as allowed numbers are entered into the list. When a number is entered, the ITS-II verifies that the number is unique for the inmate. If the number is a duplicate, the ITS-II sounds an alert to the workstation and displays a dialog box explaining the error and prompting the user to select the action the ITS-II should take (such as cancel, allow the previous settings for the number to be overridden.)

The Allowed Numbers tab on the Telephone Numbers tab displays a scrolling list of telephone numbers and the information for each of the numbers in the order indicated by the sort radio buttons. BOP staff will use the list to enter, modify and delete numbers for individual inmates. The ability to modify the telephone numbers list is determined by the user's access level.

Telephone List-Allow Calls to Numbers on Special List

The Inmate Telephone Numbers tab includes a check box for allowing inmates to call numbers on the Special Numbers list in addition to the numbers on their individual allow lists. The Special Numbers list can be viewed and modified on the Telephone Numbers tab on the Facility Information window.

Telephone List-Telephone Number Information

The Telephone Numbers tab displays a scrolling list for querying, viewing, entering and modifying inmate telephone numbers. The list will be displayed in columns containing the information specified below. Each of the columns will be available for entering queries against the inmate database.

Telephone List-Telephone Number

The Telephone Numbers tab includes a column for entering and viewing the telephone number requested by the inmate. Domestic telephone numbers include the area code, exchange, and the four digit number. International telephone numbers start will 011 and include the country code, city code and phone number.

Telephone List-Comment

The comment field is displayed when the button in the comment column on the telephone number list is pressed. A text box up to 80 characters allows users to enter comments relating to the telephone number. The text box will be minimized when the user presses the tab key or clicks the mouse button on a new column.

Telephone List-Direct Dial/Collect/Both

The call type column on the telephone numbers list contains a drop-down list box for selecting the call type(s) with which the inmate is allowed to call the number. The values listed are direct dial, collect, or both. The Profile tab on the National Information Maintenance window includes a field for specifying the global default for all inmates.

Telephone List-Do Not Record

The "do not record" column on the telephone numbers list contains a check box for indicating that calls to that number are not to be recorded. When an inmate places a call to a number on his/her list that is flagged as a "do not record" number, the FMU disables the voice path from the inmate station to the BOP's recording equipment and to the recording and monitoring equipment on the FMU, preventing the call from being recorded. In its place, via the "attorney relay", the FMU sends a tone to the recorder to indicate that a call was placed but not recorded.

By default, the "do not record" column will be set to off (record all calls). In addition, BOP staff with the appropriate access levels can disable the "do not record" feature can be disabled nationally or by facility by removing the feature from the national or facility feature group on the National Information Maintenance and the Facility Information Maintenance windows.

Telephone List-Called Party Language Preference

The language preference column on the telephone numbers list indicates the language in which voices messages to the called party are played. A drop down list box will allow the user to select English or Spanish. The default setting for all telephone numbers will be English.

Telephone List-Allow Call

The allow/deny column on the telephone numbers list indicates if the number is an allowed number, denied number, or inactive number (removed from the allow list, but not explicitly denied). A drop-down list box provides the user with a choice between allow and deny. The default for all telephone numbers is allow. Telephone numbers that are set to "Deny" (Not Allow) or that have bee deactivated are not included in their count of allowed numbers and do not affect the amount of numbers on an inmate's approved list. Each inmate's ability to place calls is determined by the numbers on his/her list of allowed numbers and numbers that are blocked for the entire correctional facility. A number that is listed as not allowed for one inmate does not affect another inmate's ability to place a call to that number. The setting of the allow/deny column affects the telephone number for the selected inmate (the inmate whose register number appears in the window. Therefore, if a telephone number is denied for one inmate, it is not denied for other inmates unless it appears on those inmates' individual telephone numbers lists as a deny number.

The column also includes numbers that are denied as the result of a permanent refusal from by the called party through a selection made at the beginning of a phone call or by pressing GOTU™ during a call with the inmate. For more information regarding these features, please refer to the section entitled "Deny Future Calls", above.

Telephone List-Date of Activation or Deactivation

The date of activation or deactivation column contains the date the telephone number was allowed or the date the number was removed from the allow list. The ITS-II enters this date into the database when an allow number is added or changed to inactive. It is displayed as read-only on the list.

Telephone List-Alert

The alert column on the telephone numbers list is check box for indicating if the calls to that number by that inmate are to be alerted. When the alert box is selected, the alert indicator and the access level of the user placing the alert are stored on the telephone numbers database. The alert box can be expanded to display the user level.

If an inmate places a call to a telephone number that is alerted on his/her list, an alert will be sounded to all users logged in with the same access level as the user who placed the alert. In addition, the call will be highlighted and flashed on the Calls in Progress display window of those users. An alert indicator will also be stored in the call record indicating the type of alert (inmate, telephone number, or both). This information will be used for reporting alerts as specified by the Alert Notification Report described in section entitled "Alert Notification Report", below.

Total Number of Call Minutes Remaining

The Class of Service tab on the National, Facility and Inmate Information Maintenance windows provides BOP staff with the ability to enter the total number of minutes an inmate may call in a user specified time period. This time limit can also be specified to be unlimited, thereby automatically disabling the feature. The Class of Service tab is described in greater detail in the section entitled "Class of Service", below. The Inmate Profile window displays the total number of call minutes (collect and direct dial) remaining for the time period specified. The value displayed will be derived by adding the total collect minutes to the total direct dial minutes and subtracting the sum of collect minutes used in the current time period and the direct dial minutes used in the current time period.

"Minutes used" includes only the minutes for which calls were actually connected (or answered calls for direct dial calls not requiring called party acceptance). At the beginning of the next time period, the FMU automatically resets the total number of minutes remaining to the total number of minutes allowed for the time period.

Collect Minutes Remaining

The Class of Service tab on the National, Facility and Inmate Information Maintenance windows provides BOP staff with the ability to enter the number of collect minutes an inmate may call in a user specified time period. This time limit can also be specified to be unlimited, thereby automatically disabling the feature. The Class of Service tab is described in greater detail in the section entitled "Class of Service", below. The Inmate Profile window will display the number of collect call minutes remaining for the time period specified. The value displayed will be derived by subtracting the sum of collect minutes used from the total collect minutes allowed for the time period.

"Minutes used" includes only the minutes for which collect calls were actually connected (after called party acceptance). At the beginning of the next time period, the FMU automatically resets the collect number of minutes remaining to the collect minutes allowed for the time period.

Direct Dial Minutes Remaining

The Class of Service tab on the National, Facility and Inmate Information Maintenance windows provides BOP staff with the ability to enter the number of direct dial minutes an inmate may call in a user specified time period. This time limit can also be specified to be unlimited, thereby automatically disabling the feature. The Class of Service tab is described in greater detail in the section entitled "Class of Service", below. The Inmate Profile window will display the number of direct dial call minutes remaining for the time period specified. The value displayed will be derived by subtracting the sum of direct dial minutes used from the total direct dial minutes allowed for the time period.

"Minutes used" includes only the minutes for which direct dial calls were actually connected (after called party acceptance for direct dial calls requiring acceptance). At the beginning of the next time period, the FMU automatically resets the direct dial number of minutes remaining to the collect minutes allowed for the time period.

Total Number of Calls Remaining

The Class of Service tab on the National, Facility and Inmate Information Maintenance windows provides BOP staff with the ability to enter the total number of Calls an inmate may place in a user specified time period. The total number of calls an inmate can place can also be specified as unlimited, thereby automatically disabling the feature. The Class of Service tab is described in greater detail in the section entitled "Class of Service", below. System, Site and Inmate Information Maintenance windows provides BOP staff with the ability to enter the total number of calls an inmate may place in a user specified time period. This window is described in greater detail in the section entitled "Class of Service", below. The Inmate Profile window will display the total number of calls (collect and direct dial) remaining for the time period specified. The value displayed will be derived by adding the total collect calls allowed to the total direct dial calls allowed and subtracting the sum of collect calls placed for the time period and the direct dial calls placed for the time period.

"Total calls" includes only direct dial and collect calls that were actually connected (after called party acceptance for direct dial calls requiring acceptance). At the beginning of the next time period, the FMU automatically resets the total number of calls remaining to the total number allowed for the time period.

Number of Collect Calls Remaining

The Class of Service tab on the National, Facility and Inmate Information Maintenance windows provides BOP staff with the ability to enter the number of collect calls an inmate may place in a user specified time period. The number of collect calls an inmate can place can also be specified as unlimited, thereby automatically disabling the feature. The Class of Service tab is described in greater detail in the section entitled "Class of Service", below. The Inmate Profile window will display the number of collect calls remaining for the time period specified. The value displayed will be derived by subtracting the total number of collect calls placed for the time period from the number of collect calls allowed for the time period.

"Total collect calls" includes only collect calls that were actually connected. At the beginning of the next time period, the FMU automatically resets the number of collect calls remaining to the number of collect calls allowed for the time period.

Number of Direct Dial Calls Remaining

The Class of Service tab on the National, Facility and Inmate Information Maintenance windows provides BOP staff with the ability to enter the number of direct dial calls an inmate may place in a user specified time period. The number of direct dial calls an inmate can place can also be specified as unlimited, thereby automatically disabling the feature. The Class of Service tab is described in greater detail in the section entitled "Class of Service", below. The Inmate Profile window will display the number of direct dial calls remaining for the time period specified. The value displayed will be derived by subtracting the total number of direct dial calls placed for the time period from the number of direct dial calls allowed for the time period.

"Total direct dial calls" includes only direct dial calls that were actually connected (after called party acceptance for direct dial calls requiring acceptance). At the beginning of the next time period, the FMU automatically resets the number of direct dial calls remaining to the number of collect calls allowed for the time period.

Balance Transfers from FPPOS

The Class of Service tab will include a check box for enabling and disabling the an inmate's ability to transfer funds from a Commissary accounts to their ITS-II. For more details on the Class of Service tab, please refer to the section entitled "Class of Service", below. If the "balance transfer" feature is modified for a Class of Service, it will apply immediately to all inmates with that Class of Service. If the feature is modified for an individual inmate, that setting overrides the inmate's original Class of Service.

Balance Inquiry Allowed

The Class of Service tab will include a check box for enabling and disabling the an inmate's ability request and receive ITS-II and Commissary balance inquiries over the telephone. For more details on the Class of Service tab, please refer to the section entitled "Class of Service", below. If the "balance transfer" feature is modified for a Class of Service, it will apply immediately to all inmates with that Class of Service. If the feature is modified for an individual inmate's Class of Service, that setting overrides the inmate's original Class of Service.

Number of Telephone Initiated Fund Transfers

The Class of Service tab includes a check box for setting the number of times inmates are allowed to transfer funds from their Commissary accounts to their ITS-II accounts per day or per week. The class of service capability provides a means of configuring features (such as the number of telephone initiated transfers per day or per week) for individual inmates, groups of inmates, or entire correctional facilities. When the setting is modified for a Class of Service, it will apply immediately to all inmates assigned to that Class of Service. When the feature is modified for an individual inmate, that setting overrides the inmate's Class of Service. For more details on the Class of Service tab, please refer to the section entitled "Class or Service", below.

The Class of Service tab includes a Transfer Schedule window for scheduling the time of day and day of the week for allowing transfers, wherever the transfer schedule feature is included in the Class of Service's feature group (such as living unit or facility). For more details on the Class of Service tab, please refer to the section entitled "Class of Service", below. The schedule appears as a scrolling list, with a line for each day of the week. BOP staff with the appropriate access levels can enter time blocks during which transfers will be allowed. Multiple time blocks can be entered for each day of the week. In addition, time blocks can be entered for specific dates.

Assign Inmate to Telephone

The Class of Service tab includes a multiple selection list box for assigning inmates to individual telephones or groups of telephones. The class of service capability provides a means of configuring features (such as the number of telephone initiated transfers per day or per week) for individual inmates, groups of inmates, or entire correctional facilities. For more details on the Class of Service tab, please refer to the section entitled "Class of Service", below. When an inmate is assigned to telephones, that inmate will not be allowed to place calls from any other telephones. The telephones themselves, however, are not limited to use by those inmates.

Personal Identifier

The ITS-II uses Phone Access Codes to provide inmates access to telephones. The ITS-II uses the inmate's PAC to identify the inmate's account for all inmate-initiated transactions, such as telephone calls and account transfers. Inmates will not be able to place direct dial calls without entering a PAC after dialing a telephone number. Inmates will not be able to place collect calls without entering a PAC after dialing a telephone number unless the "PAC required for collect calls" feature has been disabled. When an inmate account is created, the ITS-II automatically generates a phone access code, or PAC, for the inmate.

Peronsal Identifier-Security of Phone Access Codes

Phone Access Codes are unique and secure across the entire ITS-II. The Oracle database provides a means for defining database fields as unique. Oracle controls the unique constraint by not permitting duplicate values for fields defined with the unique constraint. In addition, the phone access code is not printed on any reports other than the inmate dialing instructions, which are printed on a carbon transfer envelope with only the inmate's register number appearing on the outside of the envelope. Only users with a BOP Central Office specified user access level can view phone access codes on the Inmate profile tab.

In addition to PAC access, the FMU uses speaker verification to further identify the specific inmate accessing the ITS-II. After the PAC is entered the FMU plays a voice script which asks the inmate to repeat one of 720 possible number patterns. The inmates spoken biometric voice parameters are compared to the stored voice parameters for the PAC number entered. Less than one second is needed for the FMU to check matching parameters, which is necessary for the inmate to access the ITS-II.

The inmate voice parameters are captured on the first use of the ITS-II, when the FMU asks the inmate to repeat several number strings. These parameters are stored in the FMU and in the central database.

Personal Identifier-Function of Phone Access Codes

The Phone Access Code is the only means through which inmates can access their ITS-II accounts. This requirement is enforced by the FMU's call processing software which controls all inmate telephone activity. The call processing software uses the PAC dialed by the inmate for looking up an inmate's account information.

Personal Identifier-Transferability of Phone Access Codes

Because Phone Access Codes are unique in the central inmate database, an inmate's Phone Access Code can remain the same, regardless of transfers among correctional facilities. When an inmate is transferred to a different correctional facility, the only account information that will change is the facility code. Using the change PAC button on the Inmate Profile tab, BOP staff with the appropriate user level can generate a new PAC for an inmate whose PAC was lost or stolen.

Personal Identifier-Simultaneous Phone Access Codes

The call processing software on the FMU will not allow a PAC to be used to place simultaneous calls. If a simultaneous call is attempted, the FMU will play the appropriate error message and drop the inmate station.

Personal Identifier-Phone Access Code Format

The ITS-II will support Phone Access Codes between nine and twenty digits in length. The ITS-II assigns a unique PAC to an inmate upon creation of the account. Phone Access Codes: are selected randomly from a pool of numbers. Once a code is assigned to an inmate, the ITS-II flags it as used. A used PAC cannot be reused until it has been inactive for at least one year.

When an ITS-II an inmate account is created and stored on the database, selected account information fields and the inmate's PAC are printed on a secure, carbon transfer multi-part envelope which shows only the inmate's name and register number on the outside. The remainder of the information, including the PAC, are sealed on the inside.

Phone Access Codes are displayed on the Inmate Profile tab only to those users with the appropriate user access level.

Financial Transaction Information

The Transactions tab on the Inmate Information Maintenance window will include a scrolling list for viewing inmate financial transaction history, as well as for entering manual transactions for the selected inmate account. Columns in the list include the data described in section entitled "Transaction Information", below. Database queries can be entered in one or a combination of the columns on the list. The facility code indicating the correctional facility from which the transaction was entered is included for each transaction as well. Transaction entered at other facilities will not be accessible to BOP staff at the current facility.

The FMU sets a call countdown timer for all approved calls. The timer is derived from the combination of calling features and inmate account balance that affect the duration of a call. The countdown timer is started as soon as the inmate and called party are connected. The FMU debits the inmate's account at whole minute increments on the timer. As soon as the timer reaches 0, the FMU disconnects the call and generates a call record for the call. For more information regarding this process, please refer to the flowchart in FIGS. 6 through 17.

Financial Transaction Information-ITS-II Account Balance

The ITS-II maintains a separate and individual account balance for every inmate account. The inventor has designed a fail-safe account balancing system, Multi-Independent Balance Computation System (MIBCS). Under the MIBCS, inmate account balances are maintained in two locations: on the daily inmate balance table on the central inmate database and on the FMU. The daily inmate balance table includes the date, the inmate balance carried over from the previous day, the sum of all financial transactions made against each inmate account during the day and the sum of the cost of all telephone calls placed during the day. The inmate balance is equal to the previous balance plus the sum of transactions minus the sum of the telephone calls.

All inmate telephone calls, inmate-initiated financial transactions, and BOP staff-initiated financial transactions (regardless of the workstation from which the transaction was entered) are processed by the FMU at the site. This ensures that the FMU has the most up-to-date account balances for processing inmate calls and financial transactions. Immediately upon completion of a call or financial transaction, the FMU sends the call or transaction record to the database on the Central Operations Facility server and verifies the new account balance on the database with the account balance on the FMU. If the account balance does not match, an alert message is sent immediately to the technical support center.

Financial Transaction Information-Viewing Availability

The ability to view individual account information by authorized BOP users is available at all times and is not affected by any other ITS-II activity. This capability is ensured by a combination of the ITS-II architecture and performance tuning of the Oracle database. In addition, the network management system is constantly monitoring network activity. Any detected degradation of network performance generates an alert to the ITS-II maintenance support center to be remedied before it impacts system access by BOP staff at the correctional facilities.

Financial Transaction Information-Immediate Update of Financial Information

All inmate telephone calls, inmate-initiated financial transactions, and BOP staff-initiated financial transactions (regardless of the workstation from which the transaction was entered) are processed by the FMU at the site. This ensures that the FMU has the most up-to-date account balances for processing inmate calls. Immediately upon completion of a call or financial transaction, the FMU sends the call or transaction record to the databases on the Central Operations Facilities' servers and verifies the new account balance (the previous day's balance plus the sum of all financial transactions for the day minus the sum of all call charges for the day) on the database with the account balance on the FMU. If the account balance does not match, an alert message is logged and transmitted to the technical support center simultaneously.

Financial Transaction Information-Transaction Types

The Transactions tab on the ITS-II graphical user interface displays a scrolling list for viewing transaction details. BOP staff have access to transaction details for inmate transactions entered at facilities to which they have been granted access. Transaction details are displayed in reverse chronological order, with the most recent transaction first and the oldest transaction last. A list of radio buttons on the tab provides a means for viewing all transactions or one transaction type at a time. The Transactions tab displays a scrolling list of all inmate transactions, including: inmate initiated transfer of funds from the FPPOS to the ITS-II, Commissary-initiated electronic transfer of funds from the FPPOS to the ITS-II, direct dial calls, manual financial transactions on the ITS-II, transfer of funds from the ITS-II to the FPPOS, and refunds on the ITS-II. The Transaction tab on the Inmate Information window displays a scrolling list of transaction details for the inmate selected. The Transactions tab on the Facility Information window displays a scrolling list of transaction details (including the inmate register number) for all transactions entered from the facility.

The Report Generation button on the toolbar displays the Report Generation dialog box for the active tab, in this case, the Transactions tab. BOP staff can enter the report selection criteria and print or display the resulting report.

Financial Transaction Information-Transaction Information

The transaction list box on the Transactions tab includes the following columns of data: date of transaction, time of transaction, amount of transaction, individual initiating the transaction, the correctional facility from which the transaction was entered, the type of transaction, and a user specified reference number. The details for each transaction includes data in the columns relevant to the transaction type.

The Transaction tab on the Inmate Information Maintenance window displays transactions for the selected inmate. The Transaction Detail tab on the Facility Information Maintenance window displays transactions for all inmates at the correctional facility. The Transaction Detail tab on the System Information Maintenance window displays transactions for inmates nationwide.

All transaction lists include the ability to filter the data by entering a query on any of the displayed columns.

Telephone Call Record Information-Call Record Availability

Inmate call records are accessible and available for reporting, analysis and viewing immediately upon termination of an inmate telephone call. All inmate telephone calls are controlled by the Facilities Management Units at the correctional facilities. The FMU creates a call record on the FMU at the beginning of every inmate telephone call. The information in the call record is continuously updated during the call. Immediately upon termination of the call, the final call record is generated and simultaneously stored locally on the FMU and on the call records database on both the Central Operations Facility and the Backup Central Operations Facility.

Telephone Call Record Information-Call Record Data Structure for Direct Dial and Collect Calls The data structure for direct dial and collect calls is identical. A call type field indicates whether the call was direct dial or collect. Additional data fields required for recording fraud and LIDB information for collect calls are maintained, but unused, for direct dial calls.

The ITS-II graphical user interface provides three windows for viewing call records. BOP staff have access to call records for calls placed from facilities to which they have been granted access. Call records are displayed in reverse chronological order (most recent call first, oldest call last). The Call Records tab on the Inmate Information window displays a scrolling list of call records for the inmate selected. The Call Records tab on the Facility Information Maintenance window displays a similar list for calls placed by all inmates at the correctional facility. The Call Records tab on the National Information Maintenance window displays a similar list for all call records placed by inmates nationwide.

All call record lists will include the ability to filter the data by entering a query on a single column or a combination of the displayed columns.

Telephone Call Record Information-Call Record Storage

The ITS-II call record database on the servers at the Central Operations Facility and the Backup Central Operations Facility has been sized to hold call records for all BOP correctional facilities, the BOP Central Office, and the MSTC for at least 12 months. Call records are not generated for balance request calls. Inmate initiated financial transaction calls are stored as transactions on the database.

Telephone Call Record Information-Calls Not Completed

The list of inmate call records on the Call Records tab will include English constructs for indicating the status of a call, such as, "Call completed," "Telephone number denied for inmate," "Called party refused call." All information regarding the call will be displayed on the call record list and will not require cross referencing data on other windows.

Telephone Call Record Information-Call Record Format

Call records are generated for all calls where a PAC is used.

If the PAC entered is not valid (i.e. the PAC is not assigned to an inmate on the database), the call record is stored in an account designated for invalid PACs. Call records include the following information: Inmate register number; Inmate name; Correctional facility from which call was placed; Date; Time; Dialed digits (exactly as dialed by the inmate); Destination (city and state, or city and country for international calls); Reason for call not completed; Duration from answer or acceptance—stored in seconds; Trunk definition (FTS, local, international, etc.); Telephone location; Station set number; Charge for call; Description assigned to telephone number called; Call type (InterLATA, IntraLATA, local, etc.); Alert (whether an alert was issued for that call); Type of Alert (account or telephone number); and Recorder channel number In addition, call records will include: LIDB return code and Fraud return code.

C.2.2.2 Inmate Access to Telephones

The Calling Features tab on the National Information Maintenance window provides BOP staff with the appropriate user access level a list of all call control features listed and the ability to create, modify and delete feature groups from this list. Call control features are displayed by category. Users can select entire categories of features (such as inmate limits or fraud control) or individual features from a category to be included in a feature group.

Of course, additional call control features can be added to the master list of features.

Inmate Access to Telephones-Feature Groups

The Calling Features tab on the System Information Maintenance window provides means for viewing and modifying the features included in the defined feature groups. The tab also includes the ability to create new groups and add features from the master list to the group.

The ITS-II does not limit the number of feature groups that can be configured. The default feature groups include: living unit full (with all features enables), living unit basic (with the basic features), telephone (with all features enabled), telephone number (with all features enabled), facility basic, group of facilities, and national. The following table provides an example of feature groups and the features included in each.

| Feature Group | Features/Feature Groups Enabled | Applies To: |
|---|---|---|
| Inmate Full | Account Transactions | Selected inmates |
| | List required (D/C/B) | Selected inmates |
| | Schedule (D/C/B) | Selected inmates |
| | Time Between Calls (D/C/B) | Selected inmates |
| | Maximum Number of Calls (B/C/B) | Selected inmates |
| | Call Duration (D/C/B) | Selected inmates |
| | Prevent Extra Dialed Digits | Selected inmates |
| | Intermittent Message | Selected inmates |
| | Brand Calls | Selected inmates |
| Inmate Basic | Account Transactions | Selected inmates |
| | Schedule | Selected inmates |
| | Call Duration | Selected inmates |
| Telephones Full | Account Transactions | Selected telephones |
| | List required (D/C/B) | Selected telephones |
| | Time Between Calls (D/C/B) | Selected telephones |
| | Schedule (D/C/B) | Selected telephones |
| Telephones Basic | Account Transactions | Selected telephones |
| | List required (D/C/B) | Selected telephones |
| | PAC Required for Collect | Selected telephones |
| Telephone Number | Prevent Extra Dialed Digits | Telephone numbers |
| | Intermittent message | Telephone numbers |
| Facility Basic | Transfer Schedule | All inmates |
| | BOP Add-on rate for Direct Dial Calls | All inmates |
| Facility Group | Transfer Schedule | All inmates |

| Feature Group | Features/Feature Groups Enabled | Applies To: |
|---|---|---|
| Full | BOP Add-on rate for Direct Dial Calls | All inmates |
| | PAC Required for Collect | All inmates |

Example of Feature Groups

The Access Control tab on the National Information Maintenance window includes a multiple selection list box that allows the BOP Central Office staff to select the features that each user access level will be able to modify for individual inmates and/or telephone numbers.

Before the FMU allows a call to be processed, it validates all information regarding the call (the inmate, the telephone, the dialed number, the living unit, the facility, the group of facilities, the system) against all feature settings that apply to that specific call.

The ITS-II graphical user interface provides BOP staff with the appropriate access levels with the ability to configure classes of service for each of the different feature groups. A class of service is the combination of parameter settings associated with each of the features in the associated feature group. The Class of Service tab on the National Information Maintenance and Facility Information Maintenance windows provides the ability to view or modify an existing class of service or to create a new class of service. A field is included for displaying or entering the name of the class of service. Another field is provided for displaying or selecting the name of the feature group to be included in the class of service. The features displayed on the Class of Service: tab will be only those included in the feature group selected. If the user is viewing an existing class of service, the settings of the features are displayed. If the user is creating a new class of service, the default settings are displayed.

The Class of Service tab on the Inmate Information Maintenance window displays the class of service assigned to the selected inmate. If a class of service has not been assigned to the inmate, the tab will display the default class of service. BOP staff with the appropriate access levels can assign a different class of service to the selected inmate. Users can modify only those features to which their user level has been granted access privileges. An example of this Class of Service screen is given in FIG. 4C.

The Class of Service tab on the National Information Maintenance window provides the BOP Central Office with the ability to create and modify classes of service for feature groups nationally, by groups of facilities, by individual facility, by living unit, or by individual inmates.

The Class of Service tab on the Facility Information Maintenance window provides correctional facility staff with the ability to assign a class of service to a facility and to view, create and modify classes of service for inmates at the correctional facility or by living unit.

The Class of Service tab on the Inmate Information Maintenance window provides correctional facility staff with the ability to assign a class of service to the selected inmates and to view and modify the class of service for the selected inmate. Changes to the class of service settings for an individual inmate override over all other settings.

When the inmate's class of service is modified for all inmates with the same class of service, and the inmate's settings have been modified, the ITS-II will display a dialog box informing the user that some inmates with the class of service have individual settings and prompting the user to select an action: maintain the individual overrides or reset those inmates to the class of service settings.

In addition, the ITS-II has the ability to assign classes of service to inmate telephones or groups of telephones and to telephone numbers.

| Level | Default Class of Service |
|---|---|
| Inmates | living unit COS or Facility COS (if inmate is not assigned to a living unit) |
| Living Units | Facility COS |
| Correctional Facility | Group COS or National COS (if facility is not assigned to a group) |
| Group of Facilities | National COS |

Feature Descriptions

The Features Group tab on the System Information Maintenance window lists all the features specified in the sections below. It also includes a list of all the features included in the selected features group. If a feature has not been included in a group or has been deleted from a group, it will be treated as disabled and will not impact the processing of a call in any way.

Feature Descriptions-Inmate Access to Information

The Class of Service tab for the appropriate feature group will include the "ITS balance request" and the "FPPOS balance request" feature check boxes. The tab can be modified by BOP users with the appropriate access level. When a box is checked, the feature will be enabled for all inmates assigned to the selected class of service.

When the "ITS balance request" is enabled, inmates with the selected class of service will be granted access to their ITS-II account balances over the telephone. When the box is not checked, inmates will be denied access to their ITS-II account balances over the telephone. When the "FPPOS balance request" is enabled, inmates with the selected class of service will be granted access to their FPPOS account balances over the telephone. When the box is not checked, inmates will be denied access to their FPPOS account balances over the telephone.

Feature Descriptions-Require or Not Require Approved Telephone Number List

The Class of Service tab for the appropriate feature group includes the "allow list required" feature with radio buttons for selecting direct dial, collect or both. The tab can be modified by BOP users with the appropriate access Level. When the Direct Dial radio button is pressed, the ITS-II requires allow lists for all direct dial calls placed by inmates with the selected class of service. However, the ITS-II allows those inmates to place collect calls without requiring allow lists. When the Collect radio button is pressed, the ITS-II requires allow lists for all collect calls placed by inmates assigned to the class of service selected. However, the ITS-II allows those inmates to place direct dial calls without requiring allow lists. When the Both radio button is pressed, the ITS-II requires allow lists for all calls placed by inmates assigned to the class of service selected.

Feature Descriptions-Calling Schedules

When the "Calling Schedules" feature is included in a feature group assigned to a class of service, calling schedules can be edited for all calls, collect calls and direct dial calls on the Class of Service tab.

The Class of Service tab includes a window for entering calling schedules for individual inmates and for a whole correctional facility. Calling schedules can be entered for direct dial calls and/or collect calls. Radio buttons allow the user to select direct dial, collect or both. BOP staff with the appropriate access levels have the ability to enter time blocks during which inmates are allowed to place calls. Up to 12 time blocks can be set for each day of the week, as well as for selected dates. Inmates will be allowed to place calls during the time blocks entered for each day for their class of service or for the class of service assigned to the telephone from which they are calling. If a schedule is not entered for class of service or call type, the schedule for the default class of service will apply.

Feature Descriptions-Time Between Completed Calls

When the "time between completed calls" feature is included in a feature group assigned to a class of service, the time between completed calls parameters can be edited for all calls, collect calls and direct dial calls on the Class of Service tab.

The "time between calls" parameters include a check box and field for entering the number of minutes (from 0 to 9,999) an inmate must wait after a call is terminated before being allowed to place another call. When the check box is selected, the minutes field must be entered, and the setting will apply to all calls, direct dial and debit, placed by inmates with the selected class of service. When the minutes field is set to 0, the feature is disabled.

The "time between direct dial calls" parameters include a check box and field for entering the number of minutes (from 0 to 9,999) an inmate must wait after a direct dial call is terminated before being allowed to place another direct dial call. If the "time between calls" check box is selected, the ITS-II graphical user interface will prevent the "time between direct dial calls" check box from being selected. When the check box is selected, the minutes field must be entered, and the setting will apply to all direct dial calls placed by inmates with the selected class of service. When the minutes field is set to 0, the feature is disabled.

The "time between collect calls" parameters include a check box and field for entering the number of minutes (from 0 to 9,999) an inmate must wait after a collect call is terminated before being allowed to place another collect call. If the "time between calls" check box is selected, the ITS-II graphical user interface will prevent the "time between collect calls" check box from being selected. When the check box is selected, the minutes field must be entered, and the setting will apply to all collect calls placed by inmates with the selected class of service. When the minutes field is set to 0, the feature is disabled.

In addition, BOP staff with the appropriate access levels can disable the time between calls features by removing them from the features group list on the Features Group tab. When the feature is enabled for a feature group, the settings in all of the classes of service for that feature group will apply. When the feature is disabled for a feature group, the settings in all of the classes of service for that feature group will be disabled, but not deleted. Disabled features will not be displayed on the Class of Service tab.

Feature Descriptions-Maximum Number of Calls

When the "maximum number of calls" feature is included in a feature group assigned to a class of service, the maximum number of calls parameters can be edited for all calls, collect calls and direct dial calls on the Class of Service tab.

The "maximum number of calls" parameters include a check box, a drop-down list box listing time periods (day, week, month, etc.), and a field for entering the total number of calls (from 0 to 999) an inmate may place in the time period selected. When the check box is selected, all fields must be entered, and the setting applies to all calls, direct dial and collect, placed by inmates with the selected class of service. When the number of calls field is set to 0, the feature is disabled.

The "maximum number of direct dial calls" parameters include a check box, a drop-down list box listing time periods (day, week, month, etc.), and a field for entering the number of direct dial calls (from 0 to 999) an inmate may place in the time period selected. If the "maximum number of calls" check box is selected, the ITS-II graphical user interface will prevent the "maximum number of direct dial calls" check box from being selected. When the check box is selected, all fields must be entered, and the setting will apply to all direct dial calls placed by inmates with the selected class of service. When the number of calls field is set to 0, the feature is disabled.

The "maximum number of collect calls" parameters include a check box, a drop-down list box listing time periods (day, week, month, etc.), and a field for entering the number of collect calls (from 0 to 9,999) an inmate may place in the time period selected. If the "maximum number of calls" check box is selected, the ITS-II graphical user interface will prevent the "maximum number of collect calls" check box from being selected. When the check box is selected, all fields must be entered, and the setting will apply to all collect calls placed by inmates with the selected class of service. When the number of calls field is set to 0, the feature is disabled.

In addition, BOP staff with the appropriate access levels can disable the maximum number of calls feature by removing them from the features group list on the Features Group tab. When the feature is enabled for a feature group, the settings in all of the classes of service for that feature group will apply. When the feature is disabled for a feature group, the settings in all of the classes of service for that feature group will be disabled, but not deleted. Disabled features will not be displayed on the Class of Service tab.

Feature Descriptions-Maximum Number of Minutes

When the "maximum number of minutes" feature is included in a feature group assigned to a class of service, the maximum number of minutes parameters can be edited for all calls, collect calls and direct dial calls on the Class of Service tab.

The "maximum number of minutes" parameters include a check box, a drop-down list box listing time periods (day, week, month, etc.), and a field for entering the total number of billable minutes (from 0 to 9,999) an inmate can call in the time period selected. When the check box is selected, all fields must be entered, and the setting will apply to all calls, direct dial and debit placed by inmates with the selected class of service. When the number of minutes field is set to 0, the feature is disabled.

The "maximum number of direct dial minutes" parameters include a check box, a drop-down list box listing time periods (day, week, month, etc.), and a field for entering the number of billable direct dial calls (from 0 to 9,999) an inmate can call in the time period selected. If the "maximum number of minutes" check box is selected, the ITS-II graphical user interface will prevent the "maximum number of direct dial minutes" check box from being selected. When the check box is selected, all fields must be entered, and the setting will apply to all direct dial calls placed by inmates with the selected class of service. When the number of minutes field is set to 0, the feature is disabled.

The "maximum number of collect minutes" parameters include a check box, a drop-down list box listing time periods (day, week, month, etc.), and a field for entering the number of collect calls (from 0 to 9,999) an inmate can call in the time period selected. If the "maximum number of calls" check box is selected, the ITS-II graphical user interface will prevent the "maximum number of collect minutes" check box from being selected. When the check box is selected, all fields must be entered, and the setting will apply to all collect calls placed by inmates with the selected class of service. When the number of minutes field is set to 0, the feature is disabled.

In addition, BOP staff with the appropriate access levels can disable the maximum number of minutes features by removing them from the features group list on the Features Group tab. When the feature is enabled for a feature group, the settings in all of the classes of service for that feature group will apply. When the feature is disabled for a feature group, the settings in all of the classes of service for that feature group will be disabled, but not deleted. Disabled features will not be displayed on the Class of Service tab.

Feature Descriptions-Call Duration

When the "call duration" feature is included in a feature group assigned to a class of service, the call duration parameters can be edited for all calls, collect calls and direct dial calls on the Class of Service tab.

The "maximum call duration" parameters include a check box and a field for entering the maximum duration of a completed call (from 0 to 99). When the check box is selected, the duration field must be entered, and the setting will apply to all calls, collect and direct dial, placed by inmates with the selected class of service. When the duration field is set to 0, the feature is disabled.

The "maximum direct dial call duration" parameters include a check box and a field for entering the maximum duration of a direct dial call (from 0 to 99). If the "maximum call duration" check box is selected, the ITS-II graphical user interface will prevent the "maximum direct dial duration" check box from being selected. When the check box is selected, the duration field must be entered, and the setting will apply to all direct dial calls placed by inmates with the selected class of service. When the duration field is set to 0, the feature is disabled.

The "maximum collect call duration" parameters include a check box and a field for entering the maximum duration of a collect call (from 0 to 99). If the "maximum call duration" check box is selected, the ITS-II graphical user interface will prevent the "maximum collect duration" check box from being selected. When the check box is selected, the duration field must be entered, and the setting will apply to all collect calls placed by inmates with the selected class of service. When the duration field is set to 0, the feature is disabled.

In addition, BOP staff with the appropriate access levels can disable the maximum call duration features by removing them from the features group list on the Features Group tab. When the feature is enabled for a feature group, the settings in all of the classes of service for that feature group will apply. When the feature is disabled for a feature group, the settings in all of the classes of service for that feature group will be disabled, but not deleted. Disabled features will not be displayed on the Class of Service tab.

Feature Descriptions-Extra Dialed Digits Prevention

When the "prevent extra dialed digit" feature is included in a feature group assigned to a class of service for individual inmates and for individual telephone numbers, the prevent extra dialed digit parameters can be edited on the Class of Service tab.

The "prevent extra dialed digits" parameters include fields for entering the number of extra digits that must be detected and the time interval between the digits before the FMU cuts off a call. The number of digits and interval fields must be entered. The settings apply to all calls placed by inmates or telephone numbers with the selected class of service.

In addition, BOP staff with the appropriate access levels can disable the prevent extra dialed digits feature by removing it from the features group list on the Features Group tab. When the feature is enabled for a feature group, the settings in all of the classes of service for that feature group apply. When the feature is disabled for a feature group, the settings in all of the classes of service for that feature group are disabled, but not deleted. Disabled features will not be displayed on the Class of Service tab.

Feature Descriptions-Branding Calls with a BOP Message

When a call branding feature is enabled for a call, the ITS-II will play a BOP configured branding message at the beginning of the call. The call branding message can be modified by the BOP. In addition, several call branding messages can be set up and then selected to be played from a list.

When the "call branding" feature is included in a feature group assigned to a class of service for an individual inmate, groups of inmates, or all inmates, the call branding parameters can be edited for all calls, direct dial calls, and collect calls on the Class of Service tab. The "call branding" parameters include a check box for selecting the feature and a drop-down list box for selecting the branding message to be played, if the BOP requested more than one message. When the check box is selected, the setting will apply to all calls placed by inmates with the selected class of service.

When included in the associated feature group, the Class of Service tab includes the "call branding direct dial" feature with a check box for selecting the feature and a drop-down list box for selecting the branding message to be played, if the BOP requested more than one message. If the "call branding" check box is selected, the ITS-II graphical user interface prevents the "call branding direct dial" check box from being selected. When the check box is selected, the setting applies to all direct dial calls placed by inmates with the selected class of service.

When included in the associated feature group, the Class of Service tab includes the "call branding collect" feature with a check box for selecting the feature and a drop-down list box for selecting the branding message to be played, if the BOP requested more than one message. If the "call branding" check box is selected, the ITS-II graphical user interface prevents the "call branding collect" check box from being selected. When the check box is selected, the setting applies to all collect calls placed by inmates with the selected class of service.

In addition, BOP staff with the appropriate access levels can disable call branding features by removing them from the features group list on the Features Group tab. When the feature is enabled for a feature group, the settings in all of the classes of service for that feature group will apply. When the feature is disabled for a feature group, the settings in all of the classes of service for that feature group will be disabled, but not deleted. Disabled features will not be displayed on the Class of Service tab.

Feature Descriptions-Intermittent BOP Message

When the "play intermittent message" feature is enabled for a call, the ITS-II plays a BOP configured message at BOP specified intervals during an inmate telephone call. The intermittent message can be modified by the BOP. In addition, more than one intermittent message can be set up, and then the preferred message can be selected from a list of more than one message.

When the "play intermittent message" feature is included in a feature group assigned to a class of service, the intermittent message parameters can be edited for all calls, direct dial calls, and collect calls on the Class of Service tab.

The "play intermittent message" parameters include a check box for selecting the feature, a drop-down list box for selecting the message to be played if the BOP requested more than one message, and a field for entering the interval at which the message is to be played. When the check box is selected, the settings apply to all inmates and telephone numbers with the selected class of service.

The "play intermittent message direct dial" parameters include a check box for selecting the feature, a drop-down list box for selecting the message to be played if the BOP requested more than one message and a field for entering the interval at which the message is to be played. If the "play intermittent message" check box is selected, the ITS-II graphical user interface prevents the "play intermittent message direct dial" check box from being selected. When the check box is selected, the settings apply to all direct dial calls for inmates and telephone numbers with the selected class of service.

The "play intermittent message collect" parameters include a check box for selecting the feature, a drop-down list box for selecting the message to be played if the BOP requested more than one message, and a field for entering the interval at which the message is to be played. If the "play intermittent message" check box is selected, the ITS-II graphical user interface prevents the "play intermittent message collect" check box from being selected. When the check box is selected, the settings apply to all collect calls for inmates and telephone numbers with the selected class of service.

In addition, BOP staff with the appropriate access levels can disable the play intermittent message feature by removing it from the features group list on the Features Group tab. When the feature is enabled for a feature group, the settings in all of the classes of service for that feature group will apply. When the feature is disabled for a feature group, the settings in all of the classes of service for that feature group will be disabled, but not deleted. Disabled features will not be displayed on the Class of Service tab.

Feature Descriptions-Called Party Blocking

When the "deny future calls" is enabled for a call type (collect, debit or both), the FMU will play an additional instruction providing the called party with the opportunity to deny all future calls of that call type from the inmate placing the call. If the called party selects this option by dialing the designated digit, the call is denied and a called party deny flag is placed on the dialed number in the inmate's telephone number list for that call type. The flag prevents the number from being re-activated for the inmate by users other than those with a BOP specified access level. Calls blocked for an inmate account by the called party do not affect other inmates' ability to place calls to the same number. In addition, ITS-II call blocking applies only to calls placed from BOP correctional facilities with the ITS-II installed and does not alter or interfere with the ability of the called party to receive other collect calls from non-BOP correctional facilities. If an inmate attempts to call the numbers again, the FMU plays the appropriate deny message to the inmate.

When the "deny future calls" feature is included in a feature group assigned to a class of service, the deny future calls parameters can be edited for all calls, direct dial calls, and collect calls on the Class of Service tab.

The "deny future calls" parameter includes a check box for selecting the feature. When the check box is selected, the settings will apply to the selected class of service.

The "deny future calls direct dial" parameter includes a check box for selecting the feature. If the "deny future calls" check box is selected, the ITS-II graphical user interface prevents "deny future calls direct dial" check box from being selected. When the check box is selected, the setting applies to the selected class of service for all direct dial calls.

The "deny future calls collect" feature with a check box for selecting the feature. If the "deny future calls" check box is selected, the ITS-II graphical user interface prevents the "deny future calls collect" check box from being selected. When the check box is selected, the setting applies to the selected class of service for all collect calls.

In addition, BOP staff with the appropriate access levels can disable deny future calls feature by removing it from the features group list on the Features Group tab. When the feature is enabled for a feature group, the settings in all of the classes of service for that feature group will apply. When the feature is disabled for a feature group, the settings in all of the classes of service for that feature group will be disabled, but not deleted. Disabled features will not be displayed on the Class of Service tab.

Inmate Use of the Telephone

The ITS-II will provide inmates with a dialing sequence for accessing their ITS-II and Commissary accounts over the telephone. The dialing sequence will consist of a multi-digit transaction code followed by the inmate's PAC. Upon receipt of the account transaction digits and PAC, the FMU will play a menu of available transactions to the inmate, based on the inmate's class of service. Inmates can bypass the voice menu and voice prompts by pressing the appropriate digits without waiting for the messages to complete. The menu will include an option for obtaining ITS-II account balances, Commissary account balances, direct dial minutes remaining for the period, the number of direct dials calls remaining for the period, collect minutes remaining for the period, the number of collect calls remaining for the period, as well as for transferring funds between accounts.

Inmate Use of the Telephone-ITS-II Account Balance

When an inmate selects the ITS-II account balance information option, and the ITS-II account balance feature is enabled for the inmate, the FMU provides the inmate's current ITS-II balance, the cost of the inmate's last direct dial call in dollars and cents, the direct dial minutes remaining and the reference period, the number of direct dial calls remaining and the reference period, the collect minutes remaining and the reference period, and the number of collect calls remaining and the reference period. For example, "Your ITS-II account balance is 23 dollars and 15 cents. The cost of your last call was 2 dollars and 25 cents. You have 55 direct dial minutes remaining for September. You have 12 direct dial calls remaining for September. You have 23 collect call minutes remaining for September. You have 8 collect calls remaining for September."

The messages provided will depend on the feature settings in the inmate's class of service. If any of the minutes per period or calls per period features are disabled, those messages will not be played. In other words, the inmate will receive only the relevant messages.

Inmate Use of the Telephone-Commissary Account Balance

When an inmate selects the ITS-II account balance information option, and the Commissary account balance feature is enabled for the inmate, the FMU accesses the FPPOS system and provides the inmate's current Commissary account balance. If the Commissary system is not available work interface between the ITS-II and the FPPOS, please refer to the section entitled "Federal Prison Point of Sale (FPPOS) System", below:

Inmate Use of the Telephone-Placing Calls

ITS-II inmate dialing patterns take into consideration two factors governing the inmate's ability to place telephone calls: the frequency of inmate transfers and future NANP changes. Therefore, the ITS-II will enforce a consistent inmate dialing pattern that is unlikely to be changed in the foreseeable future. Inmates at every site correctional facility will place calls following the same rules, as defined in the table below:

| Call Type | Inmate Dials | FMU dials | Call is routed |
|---|---|---|---|
| Direct dial local | 1+NPA-NXX-XXXX PAC | local dialing rules | local |
| Direct dial IntraLATA toll | 1+NPA-NXX-XXXX PAC | IntraLATA dialing rules | FTS-2000 |
| Direct dial InterLATA | 1+NPA-NXX-XXXX PAC | 1+NPA-NXX-XXXX | FTS-2000 |
| Direct dial US Caribbean | 1+NPA-NXX-XXXX PAC | 1+NPA-NXX-XXXX | FTS-2000 |
| Direct dial international Caribbean | 1-NPA-NXX-XXXX PAC | 1-NPA-NXX-XXXX | international carrier |
| Direct Dial Canada | 1+NPA-NXX-XXXX PAC | 1+NPA-NXX-XXXX | international carrier |
| Direct Dial overseas (011) | 011+CC-XXXXX . . . #PAC | 011+CC-XXXXX . . . | international carrier |
| Collect local | 0+NPA-NXX-XXXX PAC | local dialing rules | local collect |
| Collect IntraLATA | 0+NPA-NXX-XXXX PAC | IntraLATA dialing rules | carrier |
| Collect InterLATA | 0+NPA-NXX-XXXX PAC | 1+NPA-NXX-XXXX | carrier |
| Collect US Caribbean | 0+NPA-NXX-XXXX PAC | 1+NPA-NXX-XXXX | carrier |
| Collect Canada | 0+NPA-NXX-XXXX PAC | 1+NPA-NXX-XXXX | international carrier |
| Collect Overseas | 01+CC-XXXXX . . . #PAC | 01+CC-XXXXX . . . | international carrier | or the time is outside of the schedule for accessing FPPOS accounts, the FMU will play the appropriate error message to the inmate.

Inmate Use of the Telephone-Funds Transfer to ITS-II Account

When an inmate selects the ITS-II funds transfer option from the transaction menu, the FMU verifies that the transfer transaction can be entered at the time. Validation checks include: Is the inmate authorized to transfer funds? Has the inmate reached the maximum number of times per day or week for transferring funds? Is the current day and time within the schedule for transferring funds? Does the inmate have funds available for transfer? Is the ITS-II account active (i.e. the inmate's status code is not ='Z')?

If the validation fails, the FMU plays the appropriate error message to the inmate and disconnects the inmate telephone. If the FMU approves the request, it then provides the inmate with his/her ITS-II and Commissary account balances and prompts the inmate for the amount to be transferred. The inmate then enters via the telephone keypad the amount to be transferred in whole dollar amounts. After verifying that the amount entered does not exceed the inmate's Commissary account balance, the FMU repeats the amount entered by the inmate and prompts the inmate to confirm the transfer. If the amount exceeds the inmate's Commissary balance, the system aborts the transaction, plays the appropriate deny reason to the inmate and disconnects the inmate station. Once the amount is verified, the FMU deducts it from the inmate's Commissary account and adds it to the inmate's ITS-II account. Immediately, upon completion of the transaction, the FMU stores a transaction detail record on the inmate database on the Central Operations Facilities' servers and appends a record to the FPPOS file on the Commissary system. It also plays a message to the inmate confirming the transaction and providing the new ITS-II and Commissary account balances. For more information regarding the net- Dialing instructions will be included on the carbon transfer PAC envelope printed for each inmate upon account creation, as well as upon request. Inmate dialing instructions will also be affixed to every inmate station set.

As soon as the inmate dials the first digit of a telephone call, the FMU cuts off dial tone to the inmate station. The inmate telephone must go on-hook again before dial tone will be restored. The FMU provides voice prompts to the inmate to assist with the dialing sequence. Inmates can elect to listen to the prompts or dial through them. When the inmate enters the last digit of his/her PAC, the FMU validates the call against the inmate account and performs the checks required for processing the call. If the call fails any of the validation checks, the FMU plays the appropriate voice message to the inmate, generates a call record, and disconnects the inmate station.

If the call is approved, the FMU completes the out dialing of the digits to the appropriate network trunk. If the call is a direct dial call and acceptance from the called party is not required, the FMU connects the inmate station to the network trunk, allowing the inmate to hear the progress of the call. If special information tones are detected, the FMU will take the action specified by the "SIT action" feature described above in the section entitled "General Direct Dial Service Requirements".

If the call is a collect call or a direct dial call that requires acceptance by the called party, the FMU listens for the call progress tones from the dialed number. If the FMU detects busy, it plays a recorded busy signal to the inmate station. If it detects ringing, it plays an informational message to the inmate station. Otherwise, it plays the appropriate error message to the called party, disconnects the network trunk and drops the inmate station.

When a call is within 60 seconds of termination due to time limits or the exhaustion of funds, the FMU will send a warning tone to the inmate station. The warning tone will be repeated when there are 30 seconds remaining before termination. A warning tone was selected over a voice message because tones can be audible to the inmate without interfering with the inmate's conversation.

FIGS. 6 through 17 contain flowcharts detailing call processing by the ITS-II from call initiation to call termination.

Voice Response and Message Capability

The FMU is configured with independent voice channels capable of playing pre-recorded voice messages to 48 trunks simultaneously. Based upon the BOP's voice messaging requirements, a ratio two inmate stations to one voice channel provides more than sufficient resources for playing voice messages. In most cases, the ratio will actually be one-to-one. The FMU is designed to provide sufficient storage and access capacity to support requirements for the processing of all calling services and account management functions to preclude any delays to inmates in placing calls or accessing accounts.

Voice Response and Message Capability—Capability to Change Messages

The exact wording of all voice messages can be determined by the BOP. The voice messages will then be recorded professionally and installed on the ITS-II. Changes to voice messages will be handled in a similar manner. Any time the BOP desires a change to a voice message, a professional recording of the message can be made and installed on the ITS-II. Alternatively, the BOP may provide its own voice message recording. In this alternative, a means for installing pre-recorded voice messages on the ITS-II may be included in the ITS-II.

In addition, the ITS-II graphical user interface includes the capability of listening to all voice messages on the ITS-II. The System Messages tab on the System Utilities window provides a scrolling list of all voice messages with the option of selecting a message to be played at the workstation.

Voice Response and Message Capability-Responding to Voice Prompts

The ITS-II includes the capability of accepting DTMF and rotary input from the called party, for the purpose of answering FMU-provided questions and prompts. All calls requiring called party acceptance can be accepted by dialing either a DTMF or rotary digit. The rate information option can be selected by dialing a sequence of DTMF digits or remaining on the line. Alternatively, called parties have the option of accepting call by saying the word "yes".

In addition to responding to the prompt to enter a telephone number and PAC, the ITS-II also includes the capability of accepting DTMF input from inmate stations for responding to the account transaction menu.

In addition to PAC access, the FMU uses speaker verification to further identify the specific inmate accessing the ITS-II. After the PAC is entered the FMU plays a voice script which asks the inmate to repeat one of 720 possible number patterns. The inmates spoken biometric voice parameters are compared to the stored voice parameters for the PAC number entered. Less than one second is needed for the FMU to check matching parameters, which is necessary for the inmate to access the ITS-II.

The inmate voice parameters are captured on the first use of the ITS-II, when the FMU asks the inmate to repeat several number strings. These parameters are stored in the FMU and in the central database.

Voice Response and Message Capability-Use of Voice Messaging

The ITS-II includes call setup voice messages for the inmate. The FMU prompts the inmate to enter a telephone number, to enter a PAC, to make a menu selection for account transactions, and to record his/her voice to be played to the called party.

The FMU provides the called party with: carrier branding, call branding, and call type announcement messages; the inmate's recorded name; instructions for accepting a call, refusing a call, permanently refusing a call, and receiving collect call rates over the telephone; and collect call rating information. The ITS-II also provides intermittent messages to the called party and/or inmate during calls as determined by the BOP.

The FMU provides appropriate messages to the inmate any time a call is denied as the result of the validation checks or called party refusal, or a call cannot be completed.

Voice messages are played to the inmate throughout the account transaction process to provide a menu of transactions available, confirm transactions, and play error messages.

FIGS. 6 through 17 and FIGS. 18 through 25 provide flowcharts of the ITS-II call and account transaction processing. The flowcharts include the decision branches identifying where voice messages are played.

Voice Response and Message Capability-Keypad Input

Inmates will use the ITS-II keypad for obtaining account balances, placing telephone calls, and performing ITS-II and Commissary account transactions.

In addition to PAC access, the FMU uses speaker verification to further identify the specific inmate accessing the ITS-II. After the PAC is entered the FMU plays a voice script which asks the inmate to repeat one of 720 possible number patterns. The inmates spoken biometric voice parameters are compared to the stored voice parameters for the PAC number entered. Less than one second is needed for the FMU to check matching parameters, which is necessary for the inmate to access the ITS-II.

The inmate voice parameters are captured on the first use of the ITS-II, when the FMU asks the inmate to repeat several number strings. These parameters are stored in the FMU and in the central database.

Inmate Telephone Account Financial Transactions-System Interfaces

The ITS-II LAN has been designed to be compatible with the Novell Version 3.2 network software. Connectivity between the FPPOS LAN and the ITS-II LAN will be achieved through the intelligent hub. The ITS-II will be able to open, close, read, and edit files on the Commissary system, as well as add records to and delete records from those files in order to complete each transaction, maintain an accurate account of each transaction and ensure the accountability of funds on both the ITS-II and the FPPOS system. If at any time there is a problem with the FPPOS-ITS-II interface at a correctional facility, an alert message will be displayed on the designated workstation and sent to the technical support center at the Central Operations Facility.

Inmate Telephone Account Financial Transactions-Accountability of Transactions

All ITS-II financial transactions are processed by the FMU. Immediately upon completion of each transaction, the FMU generates a transaction record and simultaneously stores it on the inmate databases at the Central Operations Facilities. Each transaction is stored by date, time, and inmate number. The information stored for each financial transaction is described in the section entitled "Transaction Information", above. The information stored for each call record is described in the section entitled "Call Record Format", above. At the same time the transaction and calls records are stored on the databases, the ITS-II updates the inmate's daily account balance summary record and verifies the new balance on the database with the balance on the FMU. A discrepancy between the two results in an immediate alert to the technical support center, and the inmate is denied further transactions or calls until the discrepancy is resolved. For a complete description of this dual balance check procedure, please refer to the MIBCS description in the MUMS description in the section entitled "Miscellaneous Features", below. As part of the daily account reconciliation process, the system maintains a daily account balance summary record for each active inmate. The daily account balance summary records contains the date, the facility code of the correctional facility to which the inmate is assigned, the inmate's register number, the previous day's balance, the net sum of all transactions for the day, and the sum of charges for all direct dial calls for the day.

Summary reporting of all transactions is reportable to the BOP Central Office for the account reconciliation process as described in the section entitled "BOP Central Office Reconciliation", below.

Inmate Telephone Account Financial Transactions-Negative Balances

At no time will the ITS-II allow an inmate's account balance to go negative. Before the ITS-II will process a financial transaction entered for an inmate's account, it verifies that the account is not being used by any other financial process (such as transactions and telephone calls) and then calculates the inmate's current balance from the daily account balance summary record (account balance equals the previous day's balance plus the net sum of the day's transactions minus the sum of direct dial call charges). If the account is not in use, the ITS-II places a lock on the account to prevent another process from attempting financial updates to the same account. If the transaction entered would result in a negative balance for the inmate, it is not processed, and the ITS-II plays the appropriate message to the inmate or displays the appropriate message to the user entering the transaction. If there is not sufficient funds for the inmate to complete a two minute direct dial call, the call is denied and the FMU plays the appropriate deny reason to the inmate. In addition, the FMU uses the inmate's balance to determine how much time the inmate can talk before running out of funds. If the inmate is still on the phone with one minute's worth of funds available, the FMU issues a warning tone to the inmate. The warning is repeated 30 seconds later. As soon as the inmate's balance reaches 0, the FMU disconnects the call and sets the call end type on the call record to reflect the exhaustion of funds.

Inmate Telephone Account Financial Transactions-Financial Flowcharts

Detailed flowcharts of all inmate account financial transactions are included in FIGS. 18 through 25.

Inmate Telephone Account Financial Transactions-Site Specific Codes

The three character facility code from which a transaction or call record was initiated is stored with each financial transaction and with each call record on the inmate database. All transactions and call records are traceable to the correctional facility through the facility code. When an inmate is transferred to a new facility, the inmate's transactions and call records remain assigned at the originating facility. In other words, the facility code is not changed on the transactions or call records.

Inmate-Initiated Transfer of Funds From the Commissary Account to the ITS-II Account An inmate will be able to transfer funds between his/her Commissary account and ITS-II account through the ITS-II telephone set only if the balance transfer feature on the inmate's class of service is turned on and the inmate's account is active (the inmate's status code is not 'Z'.) Inmate dialing instructions include the dialing sequence for transferring funds from the Commissary system to the ITS-II. The ITS-II provides voice instructions to inmates during the transfer process. Inmates have the option of listening to the instructions before proceeding through each step of the transfer or of dialing through the voice prompts.

When an inmate dials the prescribed account transaction code followed by his/her PAC, the ITS-II validates the inmate's account against the inmate database (validation checks include: did the inmate enter a valid PAC? Is the account active? Is the inmate authorized to call from that station? Is the station authorized for account transactions?). If any of the account validation checks fail, the FMU plays the appropriate deny message to the inmate and disconnects the inmate station.

The FMU next prompts the inmate to enter the transaction code (ITS-II account balance, Commissary account balance, funds transfer). The inmate selects funds transfer. The FMU then verifies that the Commissary system is available and that transfers are allowed at the time (both the transfer schedule and transfer frequency are checked). If verification checks fail, the FMU plays the appropriate deny message to the inmate and disconnects the inmate station. If the transaction is allowed, the FMU connects to the Commissary system and verifies that the inmate's Commissary account is not in use. If the account is in use, the FMU plays the appropriate deny message to the inmate and disconnects the inmate station.

The FMU prompts the inmate to enter, in a whole dollar amount, the amount to be transferred and then verifies that the amount entered is not greater than the inmate's Commissary account balance. If the amount is greater than the Commissary account balance, the FMU plays the appropriate deny message to the inmate, aborts the transaction and disconnects the inmate station. If the amount entered is less than or equal to the Commissary account balance, the FMU deducts the funds from the Commissary account and updates the Commissary account balance, and verifies the new Commissary balance. If the transaction did not go through properly, the FMU creates an error record on the Commissary system and aborts the transaction. If the transaction was successful, the FMU appends a record to the temporary file on the Commissary system and adds the transaction amount to the inmate's account balance summary record and stores a transaction record on the FMU and on the inmate databases on the Central Operations Facilities' servers.

The Transactions tab on the Facility Information Maintenance and the Inmate Information Maintenance windows on the ITS-II graphical user interface provides a complete listing of all transactions originating at the selected correctional facility, including inmate-initiated electronic transfers. By selecting the query button from the toolbar and entering the transaction type in the transaction type column, BOP staff with the appropriate user access level can view only inmate-initiated funds transfers. For more details on the Transactions tab and viewing inmate transactions, please refer to the section entitled "Financial Transaction Information", above.

When the Transactions tab is active, the Report Generation button on the toolbar brings up the report generation dialog box for transactions report. By entering the relevant report parameters BOP staff can generate the Electronic Transfer Report at the correctional facility for a user-specified date range. The Electronic Transfer Report includes the following information: (1) Inmate Register Number; (2) Inmate Name; (3) Date of Transaction; (4) Time of Transaction; (5) Amount of Transaction; (6) Telephone initiating transfer; (7) Correctional facility code.

The Calling Features tab on the Facility Information Maintenance window provides a window for entering and modifying a daily transfer schedule for all inmates at the facility. Multiple schedules can be entered for each day of the week, as well as for selected dates. The tab also includes a check box for manually disabling and enabling funds transfers on an as needed basis for the entire correctional facility.

BOP Initiated Electronic Transfer of Funds From the Commissary Account to ITS-II Account The ITS-II is capable of receiving the end of day ASCII file from the FPPOS system at each correctional facility. When the BOP initiates the transfer from the FPPOS system, the FMU receives the file and processes each record in the batch file as is processes all inmate transactions. Each transaction is validated against the inmate database and for availability (validation checks include: Is the inmate assigned to the correctional facility? Is the inmate's account active? Is the inmate on the telephone? Are there any other transaction locks on the account). If the account is invalid or unavailable, it will be recorded as an exception to be reported on the Commissary Electronic Funds Transfer Exception report (CEFTE). The CEFTE report includes the inmate's name (if the register number exists on the database), the inmate register number, the amount of the transaction, and the reason for the rejection (such as inmate on the phone, inmate assigned to a different facility). All exceptions can be entered manually on the Transactions tab on the Facility Information Maintenance or Inmate Information Maintenance window on the ITS-II graphical user interface, when the account becomes available.

When a transfer transaction is approved, the FMU simultaneously stores the transaction record locally and on the databases on the Central Operations Facilities servers and updates the net transaction amount for the day on the inmate's daily account balance summary record.

Upon completion of the FPPOS file processing, the ITS-II automatically generates and prints the CEFTE report and the Commissary Electronic Funds Transfer (CEFT) report. The CEFT report includes the inmates name, the inmate's register number, the transaction date, and the amount of the transaction. A summary report listing the number of transactions and the total amount of funds transferred is printed at the end of the individual transactions listing. This report can be reprinted from the Report Generation button on the toolbar on the ITS-II graphical user interface when the Transactions tab is active.

Debiting ITS-II Accounts for Telephone Charges

When an inmate initiates a direct dial call through the ITS-II telephone set, the FMU uses the Phone Access Code dialed by the inmate to determine whether the PAC is valid, the inmate's ITS-II account is active (the status code is not 'Z') and to verify that the inmate has sufficient funds to complete a two minute call. The inmate's account balance is derived from the inmate's daily account balance summary record by adding the previous day's balance to the net transaction amount for the day and subtracting the total direct dial call charges for the day. If the call is not valid or the inmate does not have sufficient funds to complete a two minute call, the call is denied and the FMU plays the appropriate deny reason to the inmate, disconnects the inmate station, and generates a call record reflecting the reason the call was denied.

The FMU next validates the call against the inmate's administrative account information. If any of the validation checks fail, the FMU plays the appropriate deny message to the inmate, disconnects the inmate station, and generates a call record reflecting the reason the call was denied.

In addition, the FMU uses the inmate's balance and other administrative restrictions (such as allowed numbers list, call duration, maximum number of direct dial minutes, calling schedule) to determine how long the inmate can talk. Based on that information, the FMU sets a call countdown counter for each call. When the inmate telephone and called party are connected, the FMU starts the countdown timer and debits the account for the cost of a one minute call. As each minute on the timer elapses, the FMU continues to debit the account. If the inmate is still on the phone with one minute's worth of funds available, the FMU issues a warning tone to the inmate. The warning is repeated 30 seconds later. As soon as the inmate's does not have enough funds for an additional minute, the FMU disconnects the call and sets the call end type on the call record to reflect the exhaustion of funds.

Immediately upon completion of the call, the FMU stores the call record on FMU and the databases on the Central Operations Facilities' servers in real time. The call record is available for viewing immediately after the call is completed. At the same time, the call charges are added to the total call charges on the inmate's daily account balance summary record.

If the inmate hangs up or otherwise terminates call setup prior to being connected to the called party, the account will not be debited, and the deny reason on the resulting call record will indicate an incomplete direct dial call. The BOP may elect not to store call records for incomplete calls. The Calling Features tab on the National Information Maintenance window provides a means for enabling and disabling the "store incomplete call" feature.

BOP Initiated Manual Transactions Made Directly to the ITS-II Accounts (Deposits, Withdrawals and Exceptions)

The Transactions tab on the Facility Information Maintenance window and the Inmate Information Maintenance window on the ITS-II graphical user interface provides BOP staff with the appropriate user access level with a means for entering transactions manually in the event the ITS-II and the Commissary system cannot communicate or the need arises for some other reason. BOP staff with the appropriate user access level can press the "Enter Transaction" button and then select the Manual, Release or Refund transaction entry radio button.

Transactions cannot be entered for inmates who are on the telephone or whose accounts have been locked by another transaction process. When that happens, the appropriate error message is displayed on the workstation.

The manual transaction entry line on the Facility Information Maintenance window includes columns for entering the inmate's register number, a drop-down list box for selecting the transaction type, a numeric field for entering the amount of the transaction (withdrawal transactions are indicated with a minus sign), and a comments field. The transaction type defaults to the transaction type selected for the previous transaction. The ITS-II automatically generates the inmate's name and date columns.

The manual transaction entry line on the Inmate Information Maintenance for the selected inmate includes a drop-down list box for selecting the transaction type, a numeric field for entering the amount of the transaction, and a comments field. The transaction type defaults to the transaction type selected for the previous transaction. The inmate name and register number appear on the header portion of the Inmate Information window.

When the user presses the enter key on the last column of a transaction line, the ITS-II processes the transaction, generates a transaction record, simultaneously updates the inmate's account balance on the FMU and on the databases on the Central Operations Facilities' servers, and generates a line for the Manual Transaction report. A new transaction is now available for input. When all transactions have been entered, the ITS-II automatically completes the Manual Transaction report. The report consists of a line item for each transaction entered including: the inmate's register number. The inmate's name, the date of the transaction, the transaction type, and the amount of the transaction. After printing the last transaction line, the ITS-II prints a summary of all transactions, including the net transaction amount and the total number of transactions.

BOP Initiated Transfer of ITS-II Account Funds to the Commissary Accounts for Inmate Releases Inmate release transactions are entered from the Transactions tab on the Facility Information Maintenance window (for releasing one or more inmates) and the Inmate Information Maintenance window (for releasing an individual inmate). BOP staff with the appropriate user access level can press the "Enter Transaction" button and then select the Manual, Release or Refund transaction entry radio button.

From the Transactions tab on the Facility Information Maintenance window, the release transaction entry box includes a column for entering the inmate's register number. If the inmate is not currently on the telephone and there are no other transaction locks on the account, the ITS-II puts a lock on the account (preventing the inmate from placing telephone calls) and fills in the inmate's name, the release transaction type, the amount of funds to be released (calculated from the inmate's daily account balance summary record as the previous day's balance plus the net sum of all transactions for the day minus the sum of direct dial call charges for the day.) The cursor then flashes on the comments column, allowing the user to enter comments on the release.

From the Transactions tab on the Inmate Information Maintenance window, the user selects the "Release" button. If the inmate is not currently on the telephone and there are no other transaction locks on the account, the ITS-II puts a lock on the account (preventing the inmate from placing telephone calls) and fills in the release transaction type, the amount of funds to be released (calculated from the inmate's daily account balance summary record as the previous day's balance plus the net sum of all transactions for the day minus the sum of direct dial call charges for the day.) The cursor then flashes on the comments column, allowing the user to enter comments on the release.

If the inmate is on the telephone when a release transaction is attempted, or another process has a transaction lock on the account, the release transaction will not be processed, and the ITS-II will display the appropriate error message on the workstation. At the option of the BOP, the release process can be configured to hold release transactions in queue when the account is in use. A message will be displayed on the workstation indicating that the account is in use and that the transaction will be processed as soon as the account becomes available. When the lock on the account is dropped, the transaction will automatically be processed using the latest account balance information, and the Release Transaction Report will be generated automatically.

When the release transaction is processed, the FMU generates a transaction record, subtracts the release amount from the net sum of transactions for the day on the inmate's daily account balance summary record, and sets the inmate's status to 'Z'. At the same time, the FMU accesses the Commissary, generates a transaction record and appends a line item to the transaction report print file. Finally, the FMU generates a Release Transaction Report for all successful releases. The report output includes: the inmate's register number, the inmate's name, the transaction date, the release transaction type, the amount the transaction, and the comments entered by the user.

In addition, the ITS-II allows an alternate method for releasing inmates. Inmate release transactions entered by BOP staff on the Commissary system and transmitted to the ITS-II in real time to generate the release transaction on the ITS-II. The ITS-II would then process the release transaction as described above. BOP personnel can make the necessary modifications to the FPPOS system to enable Commissary release transactions to be processed on the ITS-II.

BOP Initiated Call Charge Refunds Made Directly to ITS-II Accounts

Figure 4B:
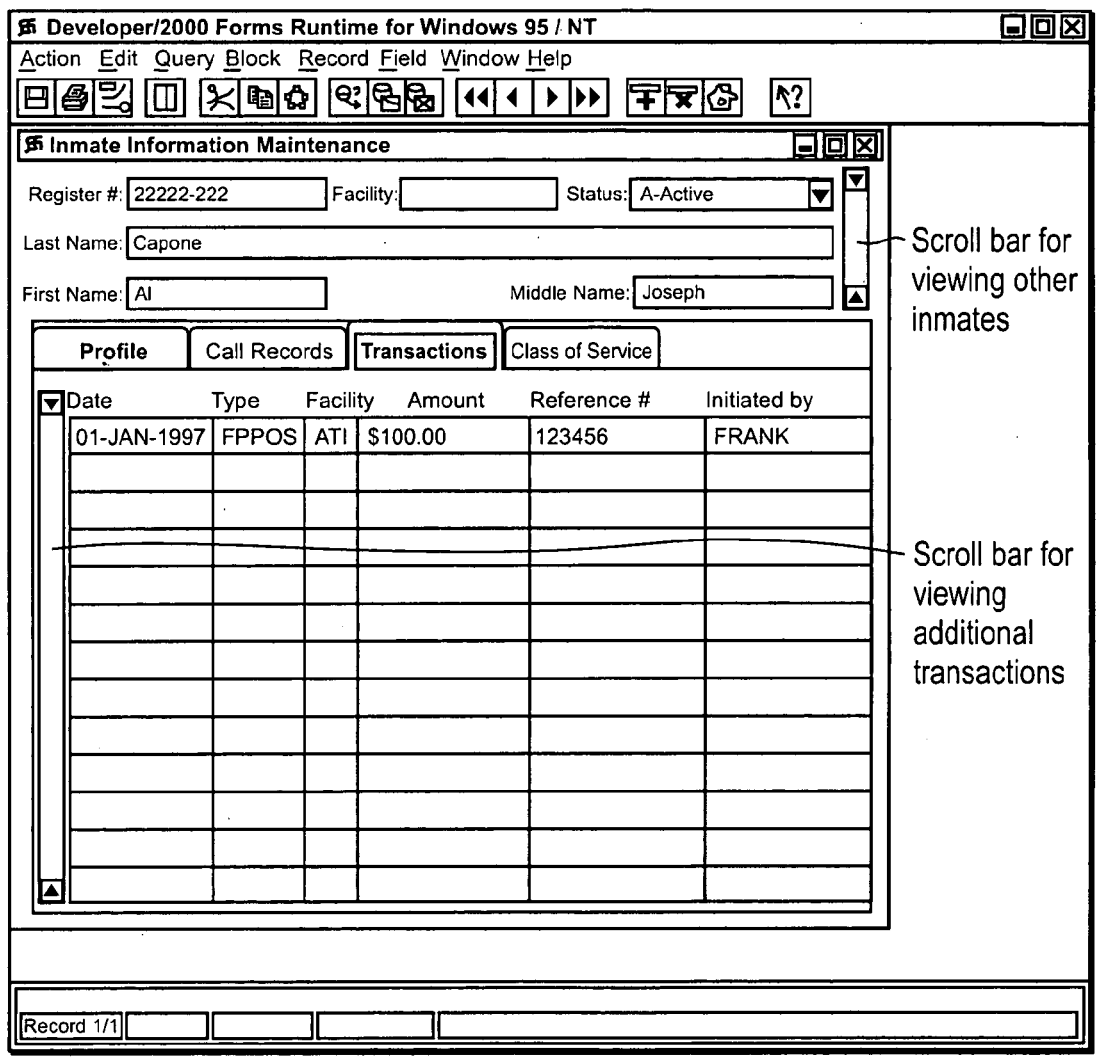
Figure 4C:
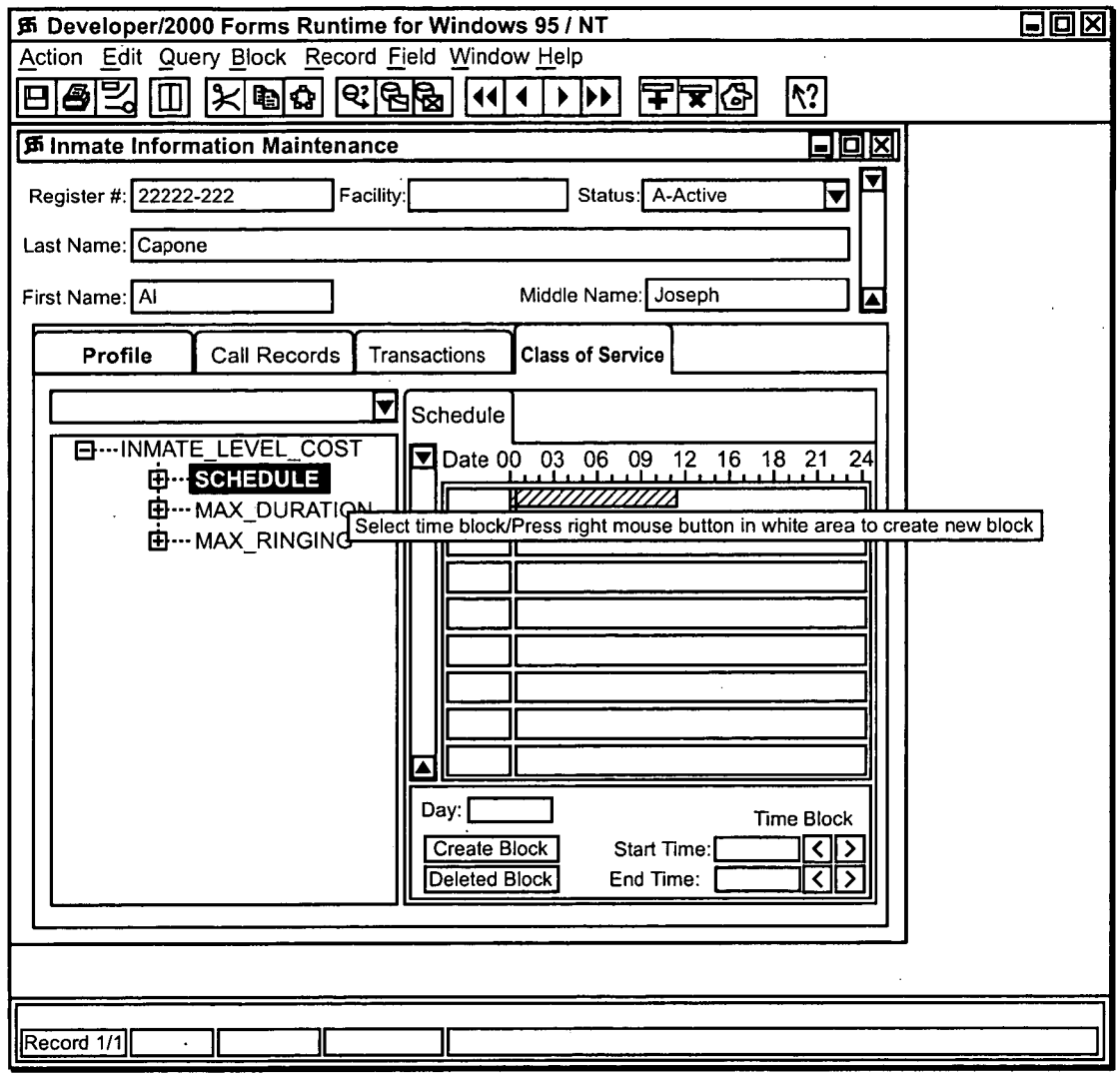

Inmate refund transactions are entered from the Transactions tab on the Facility Information Maintenance window (for refunding one or more inmate accounts) and the Inmate Information Maintenance window (for refunding an individual inmate account). An example of this screen is shown in FIG. 4B. BOP staff with the appropriate user access level can press the "Enter Transaction" button and then select the Manual, Release or Refund transaction entry radio button.

From the Transactions tab on the Facility Information Maintenance window, the refund transaction entry line includes a column for entering the inmate's register number, the phone number for which the refund is being given, and the number of minutes to be refunded. The ITS-II automatically enters the inmate's name column and the puts the current date in the date of call column. The ITS-II calculates and displays the amount of the refund. If the user has entered an earlier date in the date of call column, the ITS-II will use the direct dial rates that were in effect on the date entered to calculate the amount of the refund. The cursor then flashes on the reason column, allowing the user to enter the reason for the refund.

The process is similar from the Transactions tab on the Inmate Information Maintenance window for entering refunds for an individual inmate.

The ITS-II will not process refunds for inmates whose accounts have been released (status code="Z".)

When the refund transaction is processed, the FMU generates a transaction record and simultaneously stores it on the databases on the Central Operations Facilities' servers and updates the inmate's daily account balance summary record. The ITS-II then generates a summary transaction report on the correctional facilities printer. The refund report generates a line item for each refund transaction entered, including: the inmate's register number, the inmate's name, the date and time of the transaction, the date of the call, the type of the transaction, the amount of the refund, comments (the reason for the refund), telephone number called, and name of the user who entered the transaction (automatically generated from the log-in and stored with the transaction record.)

BOP Central Office Account Reconciliation

The ITS-II provides a two-phased daily account balance and activity summary reporting process for each correctional facility. The first phase closes inmate accounts for the previous day and records the total inmate balance per correctional facility. The first phase also opens active inmate accounts for the current day. The second phase of the daily account balance and activity summary reporting process is the tally of all transaction amounts and call charges by type. Neither phase of the reconciliation process requires the ITS-II process to shut down at any time. The only way the ITS-II will be affected is that any calls connected before midnight and still in progress at the time the nightly processes begin may be subject to being cutoff (with the appropriate warnings). Daily reports are available to the BOP Central Office by correctional facility as the processes are completed for each facility. Because of the different time zones in which the facilities are located, from Puerto to Hawaii, reporting for all facilities will not be available for at least seven hours.

A daily inmate account summary record is maintained on the central database for all active inmate accounts (all inmate whose account status code is not set to 'Z'). The daily account summary record includes the inmate's register number, the correctional facility, the date, the inmate's account balance from the previous day, the sum of all financial transactions for the inmate for the day, and the sum of all call charges for the inmate for the day.

The daily reconciliation processes for a correctional facility can begin any time after 00:15:00 (facility local time). By default, the account reconciliation will begin at 00:15:00 (facility local time) for each correctional facility. The BOP Central Office has the ability to set the schedule for each facility. All inmate accounts will be closed as of 23:59:59 (facility local time) each day. To maintain date consistency with carrier (including FTS-2000) call records, calls and financial transactions will be included in the daily account reconciliation for the day on which they were originated. Therefore, accounts cannot be closed until all calls and financial transactions originating before 00:00:00 have ended. In order to provide timely daily account reconciliation, The inventor recommends allowing calls in progress before midnight to continue until 00:14:59, at which time they will be terminated. All calls and transactions started after 00:00:00 are allowed to continue normally and will be included in the next day's balancing.

At 00:13:59, the daily process verifies that there are no calls in progress that originated before midnight. If there are calls in progress, the FMU issues a warning tone to the inmate station(s) indicating to the inmate that there is one minute left on the call. Thirty seconds later, the FMU issues a second warning to the inmate and cuts off the call thirty seconds after that. The call end type on the call record will indicate daily account closing as the reason the call was cutoff. As soon as the call is cutoff and the call record stored on the central database, the account is closed for the previous day. The FMU opens daily account records for all inmates accounts with transaction or direct dial call activity after 00:00:00 and before the nightly balance process completes.

Next, the reconciliation process creates a summary account record for the facility. The summary record includes: Facility code, Reconciliation date, Sum of the previous day's account balances, Sum of inmate transaction amounts for the reconciliation date, and Sum of inmate call charges for the reconciliation date.

Finally, the first phase of the daily account balance and activity summary reporting process "opens" a new daily account summary record for each active inmate account effective at 00:00:00 each day (facility local time) whose daily account record has not already been opened by the FMU. When an inmate account is opened, a new summary record is created for the current date and facility with the inmate's balance carried over from the previous day. The sum of financial transactions and the sum of call charges are initialized to 0. As financial transactions are entered against the account and calls records stored for the account during the day, the account record is updated to include the transaction amounts and the call charges.

The second phase of the daily account balance and activity summary reporting process tallies the sums of transactions at each facility by transaction type into a transaction and call records summary record for the day's activities. The process reads each inmate financial transaction entered on the reconciliation date and adds the transaction amount to the summary field for the corresponding transaction type in the transaction summary record. Transaction amounts are stored as signed numeric fields (withdrawals are negative numbers, deposits are positive numbers.) It then processes call records in a similar manner, adding the charges for each direct dial call to the summary field for the corresponding call type in the call summary record. Call charges are stored as positive numbers. All transaction processing calculations treat call charges as negative. A description of the summary records maintained follows.

The daily transaction summary record includes: Facility code, Reconciliation date, Sum of inmate electronic transfers for the reconciliation date (+), Sum of Commissary electronic transfers for the reconciliation date (+), Sum of releases by electronic transfers for the reconciliation date (−), Sum of local call refunds for the reconciliation date (+), Sum of long distance call refunds for the reconciliation date (+), Sum of international call (excluding Canada and Mexico) refunds for the reconciliation date (+) Sum of Canada refunds for the reconciliation date (+), Sum of Mexico refunds for the reconciliation date (+), Sum of manual deposit transactions for the reconciliation date (+), Sum of manual withdrawal transactions for the reconciliation date (−), and Sum of manual exception transactions for the reconciliation date (+/−)

The daily call summary record includes: Facility code, Reconciliation date, Sum of local direct dial calls for the reconciliation date (−), Sum of long distance calls for the reconciliation date (−), Sum of international calls (excluding Canada and Mexico) for the reconciliation date (−), Sum of Canada calls for the reconciliation date (−), and Sum of Mexico calls for the reconciliation date (−).

Inmate daily account summary records and daily transaction and call records summary records are maintained on the active database for at least one year and will be available for viewing and reporting by date and by individual correctional facilities or for all facilities.

In order to provide the same level of accounting for account balances, transaction amounts and call charges nationally as is maintained for each correctional facility, the daily processes generate daily national summary records.

Daily national balances and activity summary processing begins as soon as the daily processing for all correctional facilities is completed (at approximately 06:30 EST each day The daily national transaction summary record, includes: Reconciliation date, Sum of inmate electronic transfers for the reconciliation date (+), Sum of Commissary electronic transfers for the reconciliation date (+), Sum of releases by electronic transfers for the reconciliation date (−), Sum of local call refunds for the reconciliation date (+), Sum of long distance call refunds for the reconciliation date (+), Sum of international call (excluding Canada and Mexico) refunds for the reconciliation date (+), Sum of Canada refunds for the reconciliation date (+), Sum of Mexico refunds for the reconciliation date (+), Sum of manual deposit transactions for the reconciliation date (+), Sum of manual withdrawal transactions for the reconciliation date (−), and Sum of manual exception transactions for the reconciliation date (+/−).

The daily national call summary record includes: Reconciliation date, Sum of local direct dial calls for the reconciliation date (−), Sum of long distance calls for the reconciliation date (−), Sum of international calls (excluding Canada and Mexico) for the reconciliation date (−), Sum of call to Canada for the reconciliation date (−), and Sum of calls to Mexico for the reconciliation date (−).

The daily national account balance summary record includes: Reconciliation date, Sum of the previous day's account balances, Sum of inmate transaction amounts for the reconciliation date, and Sum of inmate call charges for the reconciliation date.

Once the national summary records for a reconciliation date have been generated, the data will be available for viewing and inclusion in the BOP Central Office reconciliation report. The National Balances tab National Information Maintenance window displays a list of summary records for a selected date and selected facility or nationwide. The display includes the previous day's balance, subtotals by transaction type, a grand total of all transactions, and the sum of all account balances nationally or for the selected facility for the selected date. The sum of all account balances is calculated as the sum of the previous day's account balances plus the sum of inmate transaction amounts for the selected date minus the sum of inmate call charges for the selected date.

The Report Generation button on the toolbar displays the Report Generation window for the Account Reconciliation Report when the National Balances tab is active. The BOP Central Office can specify the date range for the periodic report. The data for each date specified includes account balance and transaction and call summary data from 00:00:00 to 23:59:59 for all facilities, based on facility local time. The report summarizes the data for all days included in the specified date range as follows:

Previous balance (from previous report)

Electronic transfers
  Inmate
  Commissary
  Releases

Subtotal of electronic transfers.

Refunds
  Local.
  Long distance.
  International (excluding Canada and Mexico)
  Canada
  Mexico Subtotal of refunds.

Manual transactions
  Deposits
  Withdrawals
  Exceptions

Subtotal of manual transactions

Direct dial calls
  Local.
  Long distance.
  International (excluding Canada and Mexico)
  Canada
  Mexico Subtotal of direct dial calls Net sum of transactions (*)

ITS-II account balances (**)

* The sum of the transaction subtotals minus the subtotal of direct dial calls

** The balance from the previous report plus the sum of all transactions from the daily national account balance summary record for each date of the report period minus the sum of all call charges from daily national account balance summary record.

Each time an Account Reconciliation Report is run, the output of the report is stored on the database by report sequence number. Reports can be regenerated by selecting the report sequence number from a list of previously run Account Reconciliation reports. Reports are listed by sequence number and date range.

Management of Inmate Transfers Between Correctional Facilities

Inmate PAC's are assigned and maintained on the central inmate database. When a transferred inmate arrives at a new correctional facility before a transfer transaction has been entered for the inmate's account, he/she has collect calling privileges only. In other words, when the FMU looks up a PAC for an inmate and determines that the inmate is not assigned to that facility, it allows the inmate to place collect calls only. All calling restrictions other than the inmate stations to which the inmate is assigned will apply to collect calls. If an inmate attempts to place a direct dial call, the FMU will inform the inmate that only collect calls can be placed at the time.

All calls and call attempts will be alerted to BOP administrative staff at the facility, and the resulting call record will include the alert type as "new facility". BOP staff will then be informed of the need to create a transfer transaction for the inmate or that an inmate is attempting to commit fraud.

An inmate's account belongs to the facility to which the inmate has been assigned. The facility code is carried throughout the database for all inmate account information and activity. A single transaction entry is required to successfully transfer an inmate's account information from one facility to another. The transfer transaction must be entered by BOP staff at the receiving facility. When the transfer transaction is entered, two transaction records are created. The first transaction record is a "transfer out" transaction, similar to a release transaction. The transfer out transaction contains the inmate's original facility code. It closes an inmate's account at the original facility by creating a withdrawal transaction equal to the inmate's current balance. The inmate's daily account balance record is updated to reflect the transfer transaction.

The "transfer in" transaction transfers the inmate account information to the new facility and opens a new daily account balance record for the inmate with the date of the transfer, the new facility code and the transfer amount (as a deposit). The information transferred includes all inmate profile information and the inmate's telephone number lists. The inmate is assigned the default class of service for the transfer to facility. Inmate transaction records, call records and daily account balance records will always belong to the original facility. BOP staff at the transfer to facility will not have access to that information.

If an inmate attempts to enter a Commissary transaction from an inmate station at a correctional facility other than the facility to which the inmate has been assigned, the FMU will deny the transaction and play the appropriate error message to the inmate. The FMU will generate a transaction record indicating the attempt. The transaction amount will be $0.00. At the same time, the FMU will issue a warning to the designated user level that an inmate not assigned to the facility has attempted a transaction at the facility. BOP staff will then be alerted to the need to create a transfer transaction for the inmate or that an inmate is attempting to commit fraud.

Similarly, if a staff member attempts to enter a transaction for an inmate whose account is assigned to another facility, the ITS-II sends a message to the workstation that the inmate is assigned to a different facility and the name of the facility to which the inmate is assigned. The staff member will then have the option of entering a transfer transaction for the inmate as described above.

The ITS-II Accounts Transferred and Received report available through the Report Generation window on the ITS-II graphical user interface will query the transaction records for the selected date range and facilities, and will select all "transfer out" and "transfer in" transactions for reporting. The report will be sorted by correctional facility and include "transfer out" and "transfer in" transactions by date for each date in the date range selected. In addition, an automatic nightly process will be run for each facility reporting on the day's transfer out and transfer in transactions for that facility. The report will print on a pre-designated printer at each facility for which transfer transactions were entered. The report includes the following data: inmate name, inmate register number, transaction type (transfer in or transfer out), receiving or originating facility, ITS-II account balance (from the daily account balance record), Count of transfer out transactions, Sum of transfer out amounts, Count of transfer in transactions, and Sum of transfer in amounts.

The ITS-II also provides a report available through the Report Generation window listing all valid PACs used at correctional facilities other that those to which they were assigned. This information will be extracted from transaction records with the "transaction attempted from new facility" transaction type and call records with the appropriate alert type (call attempted from new facility).

Queries and Reports

In addition to the query and reporting capabilities built into the ITS-II graphical user interface windows, the ITS-II includes commercially available query and report applications software. These tools have been developed specifically to provide an end-user friendly means of accessing complex data structures and will be integrated into the ITS-II graphical user interface and will not require BOP staff to run any additional software applications.

The ITS-II architecture has been designed with consideration to the need for flexible and rapid data storage and retrieval. The entire ITS-II inmate database resides on an Oracle RDBMS on the Central Operations Facility server, with a fully replicated copy on the server housed at the Backup Central Operations facility. Oracle's database replication software keeps the two databases synchronized and available for running queries and reports.

Queries and Reports-Queries

In addition to the ability to enter queries on each window on the ITS-II graphical user interface that displays data from the ITS-II database, the ITS-II includes a query facility specifically designed to provide BOP users with quick retrieval of selected data through the ITS-II graphical user interface, in formats that make it easy to analyze and report. There are simple-to-use retrieval, analysis, and reporting tools to aid the BOP user. Query and report wizards, similar to those found in Microsoft applications, will help guide BOP staff through the process of structuring queries and reports.

The ITS-II graphical user interface provides the required capability through two query methods. The first query method allows BOP staff with the appropriate user access level to enter queries on all data fields displayed on the ITS-II windows, including, but not limited to, ITS-II telephones, inmate call records, call types, and calling restrictions.

The second query method provided with the ITS-II is a query tool executed from the Utilities menu on the ITS-II graphical user interface. This tool allows users to generate queries from data fields from an end-user view of the database, or meta database, to be displayed in a user-defined format. This view of the database was designed to provide end users with access to the database from a business, rather than database, point of view. A query "wizard" walks first time users through the process of writing a query. Query results can also be printed and saved in a variety of file formats.

The levels to which queries can be ordered are limited only by the number of data columns selected to be retrieved by the query.

ITS-II query results are displayed on the window from which they were generated. The print screen and report generation buttons on the toolbar provide a means for printing the results of a query, either in a report format or print screen format.

The query tool provided in the Utilities menu of the ITS-II graphical user interface allows end users to save queries locally to their workstation's disk drive, as well as on the databases on the Central Operations Facilities' servers. When a query is saved, the user level that created the query and the facility where it was created are also saved. When a user selects the query tool from the Utilities menu, a dialog box provides the option of opening a query saved on the workstation or one saved on the central database. If the user selects a locally saved query, a list of query files on the workstation's hard drive is displayed. If the user chooses to open a query saved on the central database, a pick list of queries available to the user's access level is displayed.

When a query is saved on the central database, the user can grant a user access level access to the query. The query will then appear in the drop-down pick list of queries for all users with that access level.

When the query tool is invoked from the Utilities menu on the ITS-II graphical user interface, a dialog box provides the BOP staff with the option of selecting and executing a query from a list of queries stored on the workstation's hard drive, selecting and executing a query from a list of queries stored for the local correctional facility on the central database, selecting and executing a query from a central list on the central database, or creating and saving a new query. The level of access to stored queries is determined by a user's assigned access level. Once a query has been selected, a pick list or generated from scratch, users with the appropriate access level can either modify the query and save it under a different name either locally or centrally for local facility use or for all facilities to use.

ITS-II users with sufficient knowledge of the ITS-II database tables can execute Oracle's SQL*Plus (a trademark of Oracle) from the Utilities menu. SQL*Plus is a utility that provides a means of querying the database with structured query language statements. The ITS-II query tool includes a meta database, which can be custom-designed. This database will "sit" on top of the ITS-II database and provide the BOP with an English language, business view of inmate and call records data. The query tool provides pick lists from the end-user view of the database for selecting data as well as logical operators and relationships among the data fields. A "wizard" is also provided to assist user when putting queries together.

In addition, the ITS-II graphical user interface provides a query capability on the data fields displayed in its windows. To enter a query from a user interface window, the user selects the query button on the toolbar, enters the desired query criteria on the data field(s) and presses the execute query button. All records on the database that meet the query criteria are returned by the query and displayed on the window. The scroll bar to the right of each applicable window can be used to scroll through the records.

The integrated query tool that can be invoked from the Utilities menu on the ITS-II graphical user interface, provides drill-down query capability. By selecting the drill-down function, the user creates a query and then uses the result to formulate a second query involving the same or different database tables. The number of levels of drill-down is limited only by the depth of the data being queried.

In addition to the query capability on the user interface windows the ITS-II provides the two query methods under the Utilities menu described in this section: the end-user query tool and Oracle SQL*Plus queries. In creating user access levels (see description of Access Control, below) the BOP can grant the different query capabilities to different access levels.

Regardless of the query method used, the user's menu, database and correctional facility access level apply at all times. Users are restricted to querying and viewing the data to which they have been granted access.

Regardless of the query method used, the user's menu, database and correctional facility access level apply at all times. BOP Central Office personnel are assigned the highest access level to all of the data for all correctional facilities. Therefore, BOP Central Office users have access to all ITS-II data nationwide.

The query software for the ITS-II is capable of retrieving and displaying any individual inmate account on the Inmate Account Information Maintenance window in less than 10 seconds or any individual inmate call record(s) on the Call Records tab from the fully loaded central database in less than 10 seconds. This capability is possible through the WAN capacity for data transmission, the high speed I/O of the disk drives and the optimization of the Oracle database.

C.2.2.7.2 General Report Capabilities

The ITS-II database server utilizes specially enhanced hardware, CPU and I/O capabilities. The database must be optimized by ITS-II maintenance personnel, in order to improve the speed and ease with which standard reports are generated. In addition, an integrated third party report writing tool provides the BOP with a means for generating and saving customized reports. The report software of the ITS-II utilizes a folder orientation to provide easy access to objects, including calculated objects, formatting attributes and functions. Templates containing formatting, logic and calculations make it easy for users to quickly generate reports.

Users who have been granted access to more than one facility have the ability to run reports by the facilities to which they have access, depending on their menu and database access level. Reports can be generated for data from one or more facilities or all facilities. BOP Central Office users with access to all facilities have the ability to generate ITS-II-wide reports. When a user with access to data from more than one correctional facility selects a report from the Report Generation window in the ITS-II graphical user interface, the ITS-II prompts the user to enter the facility or facilities for which the report is to be run. Access to data from any facilities than those to whom the user has been granted access is denied.

When BOP Central Office staff create or modify user access levels on the Access Control tab on the National Information Maintenance window, a multiple selection list box is provided for granting access to individual reports and/or entire report groups user level. The User Administration tab includes a multiple selection list box for assigning specific users access to a correctional facility or facilities and/or facility groups.

Whether generating standard reports or customized reports, the user's menu, database and correctional facility access privileges will be enforced at all times.

The integrated third party report tool allows BOP users to create unique reports with special information, sorted in a specific sequence and presented in a format of their choosing. The custom report generation tool offers a report writing wizard to guide users through the report writing, process, from selecting the data to be included in the report to formatting the report output. Users can also create, save and reuse report format templates. The data selected using the report tool is selected from the end-user meta database. The meta database presents the inmate financial and administrative data and call record data from the business application point of view. Meaningful English names are used for the tables and data fields in the tables.

The Report Generation window includes a Report Group tab for grouping reports under BOP defined categories. The tab includes a field for entering a group name to create, view or modify and the list of reports in the group. When a user enters the name of a new report group, the ITS-II displays a multiple selection list box for selecting the reports to include in the group. Each report group will then appear as a single menu item under the reports menu. The Access Control tab on the National and Facility Information Maintenance windows provides a means for assigning individual reports or report groups to user access levels.

The ITS-II allows the BOP to program reports to be generated automatically. These reports are printed, as determined by BOP personnel, when a certain call is made, when a certain transaction with the Commissary system and/or the AIMS is made, or at a certain time of day. This capability is intended to act as a notification to BOP staff when targeted circumstances occur.

The Calling Features tab on the National and Facility Information Maintenance windows on the graphical user interface includes parameter settings for specific features to enable and disable the automatic printing of reports when alert conditions specified by the BOP occur.

The Calling Features tab on the Facility Information Maintenance window provides the ability to configure the automatic report generation parameters for specific features at each correctional facility. The Calling Features tab on the National Information Maintenance window provides the ability to configure the automatic report generation parameters for specific features at all correctional facilities.

All ITS-II printed reports will include the required information and report data. There will be no blank pages inserted into reports.

The design of the database, as well as the disk I/O configuration for the ITS-II server has been optimized for the rapid generation and printing of the required standard reports. Oracle provides several methods for optimizing queries and reports, such as transferring the selected data to be processed on the client, or processing the data on the server and then transferring the results to the client. These decisions will be fully automated for the standard reports and as much as possible for the customized reports. Computer systems maintenance personnel will need to work with the BOP staff on an on-going basis, in order to improve the performance of customized report generation.

The Report Generation menu provides a window for exporting the results of a report to an ASCII file format on any electronic storage medium. Additional export file formats include Microsoft Excel (a trademark of Microsoft Corp.) and HTML.

The output of all reports saved on the central database can be viewed on-line at workstations by BOP staff Users with the proper access level and shall be able to be printed, when desired by BOP staff. The Report Generation window on the ITS-II graphical user interface provides a drop-down list box for selecting a previously generated report for viewing.

Reports can be regenerated from the original data as long as the data used in the original report is not dated before the earliest data stored on the database. Standard reports can be regenerated by entering the same report generation parameters on the report generation dialog box for the report. Custom reports can be regenerated by selecting and executing the custom report from the pick list of custom reports.

FIG. 5 provides a sample of the standard report output of the ITS-II. The standard report template includes the following information: time the report was generated, the terminal or workstation from which the report was generated, the report parameters entered on the report generation dialog box for the report, the page number and total number of pages, the report heading of the report selected, the end of report footer, the report heading on each page, and the report title on each page.

All reports generated from the Report Generation window on the ITS-II graphical user interface are displayed on the screen or printed using this template. In addition, custom report templates can be created, saved and recalled using the ITS-II custom report generation tool.

The header of each report contains the following information: the correctional facility name for which the report was generated, the name of the report, the date and time of the report, the page number, and the headings of the report columns.

The footer at the end of each report includes the following information: a sum of all columns containing dollar values; the total count of inmates included in the report, where appropriate; the total call duration; and/or counts of calls, where appropriate.

The Report Generation window on the ITS-II graphical user interface includes the ability to create groups of related information, including telephone numbers, inmate register numbers, correctional facilities, and living units. When a group is created, the user has the choice of saving the group configuration locally on the workstation's hard disk or on the central database to be used by other users. The groups can then be used as selection criteria for reports whose parameters include the type of data contained in a group.

Specific Reports

Each of the standard reports listed below is included in the pick list of reports on the Report Generation window. These reports can be selected to be included in a report group. The Access Control tab on the National Information Maintenance window provides a means for assigning reports to specific user access levels. When a user selects the Report Generation menu, the window displays only those reports and report groups that have been assigned to the user's access level.

Specific Reports-Chronological List of Calls Report

The Chronological List of Calls Report is included in the list of standard reports provided with the ITS-II. When the report is selected from the Report Generation window on the ITS-II graphical user interface, the report generation dialog box prompts the user to enter the date range of calls to be included in the report by start date and time and end date and time.

The output of the report includes the following call record data for calls within the date range selected for the correctional facility for which the report was generated: Inmate register number; Date of call; Time call started; Duration of call; Dialed number; Call type (local, long distance, international, or free); Trunk; Station set number; Cost of call; and Recorder channel number.

The totals printed on the report footer include: number of calls, call duration, and cost.

Specific Reports-Daily Call Volume and Charge Report

The Daily Call Volume and Charge Report is included in the list of standard reports provided with the ITS-II. When the report is selected from the Report Generation window on the ITS-II graphical user interface, the report generation dialog box prompts the user to enter the correctional facility or facilities to be included in the report and the date range of calls to be included in the report by start date (starting at 0:00:00) and end date (ending at 23:59:59). The output of the report includes data from the daily direct dial and collect call summary records for each date of the date range selected and each correctional facility selected. The daily direct dial and collect call summary records include the total call charges and the count of calls and the total call duration for each call type.

Daily Call Volume and Charge Report totals will be printed for each day for each facility and for all facilities. Grand totals for the report will be printed for each facility and for all facilities. The totals include the total direct dial call charges, the total count of direct dial calls, the total direct dial call duration, the total collect call charges to called parties, the total count of collect calls, and the total collect call duration.

The totals include the total direct dial call charges, the total collect call charges to called parties, the total count of direct dial calls, and the total count of collect calls.

Specific Reports-Telephone Account Statement

The Telephone Account Statement is included in the list of standard reports provided with the ITS-II. When the report is selected from the Report Generation window on the ITS-II graphical user interface, the report generation dialog box prompts the user to enter the inmate register number, group of inmate register numbers or all register numbers at the facility, the start date of the statement, and the end date of the statement. A check box is included for selecting the "include zero dollar transactions" option in the report.

For each inmate account selected, the report lists the beginning balance on the start date specified. The balance is taken from the inmate's daily account balance summary record. It then lists the following information for each transaction in chronological order: Date of transaction, Time of transaction, Transaction type (call, deposit, transfer), Correctional facility site code (where transaction occurred), Call duration (if applicable), Dialed number (if applicable), Amount, and Inmate balance after transaction.

After the last transaction is printed, the report provides a summary of all transaction amounts by transaction type, of all call charges by call type, and the count of all calls and transactions.

If the statement is longer than one page, the inmate's register number, the date range included in the statement, and the page number are printed at the top of the page.

Specific Reports-ITS-II Accounts Transferred and Received

The ITS-II Accounts Transferred and Received Report is included in the list of standard reports provided with the ITS-II. When the report is selected from the Report Generation window on the ITS-II graphical user interface, the report generation dialog box prompts the user to enter the date range (start date and end date) of inmate transfers nationwide to be included in the report. The Transferred and Received report queries the transaction records for the selected date range and facilities, and selects all "transfer out" and "transfer in" transactions for reporting. The report is sorted by correctional facility and date and includes "transfer out" and "transfer in" transactions by date for each date in the date range selected. The report includes the following information: Inmate register number, Inmate name, Transferred from correctional facility code, Transferred to correctional facility code, Date of transfer, ITS-II account balance at the time of transfer, Total amount of transferred account balances, Total amount of received account balances, and Net amount.

Specific Reports-Frequently Dialed Numbers Report

The Frequently Dialed Numbers Report is included in the list of standard reports provided with the ITS-II. When the report is selected from the Report Generation window on the ITS-II graphical user interface, the report generation dialog box prompts the user to enter the date range (start date and end date) of calls to be included in the report, and the minimum number of times a telephone number must have been called to be included in the report. The report detail includes the following information regarding each call listed in the report: the inmate name, the inmate's register number, the date, the start time of the call, the recorder channel number, and the facility code from which the call was placed. The information will be sorted by telephone number and start date and time in chronological order.

In addition, the Frequently Dialed Number Summary Report is also provided. The summary report includes the dialed numbers and the number of times each number was called. The summary report is sorted by the number of times a telephone number was called, with the most frequently dialed number first.

An example of the Frequently Dialed Number Summary Report is provided in FIG. 5.

Specific Reports-Telephone Number Usage Report

The Telephone Numbers Usage Report is included in the list of standard reports provided with the ITS-II. The Telephone Numbers Usage Report provides call record information for calls to the telephone number(s) specified on the report generation dialog box. When the report is selected from the Report Generation window on the ITS-II graphical user interface, the report generation dialog box prompts the user to enter one or more of the report parameters. The report parameters include: the dialed number, or a number pattern with wildcards to "fill in the blanks", the date range (start date and end date) of calls to be included in the report, the inmate station from which the call was placed, call type, call completion code (reason for call not completed, and call duration (with logical operators). The call type parameter is a drop-down list box that includes all call types, including toll free calls (for more details regarding toll free access, please refer to the section entitled "Toll Free Access", above.)

The report searches the call record database using the combination of search criteria specified (all search criteria must be met for all call records included in the report), If a wildcard is specified for the telephone number, the report output includes all dialed numbers that match the pattern. For example, if the pattern 01144% was entered, calls to 0114414123, 011442222, etc. will be included in the report.

The report is sorted by telephone number and date and includes the following: Inmate name, Inmate register number Telephone number(s), Date of call, Time of call, Inmate telephone station used, Recorder channel number, Cost of call, and Correctional facility code from which the call was placed.

The footer at the end of the report includes the total number of calls listed and the total cost of all calls listed.

Specific Reports-Suspended Telephone Accounts Report

The Suspended Telephone Accounts Report is included in the standard list of reports provided with the ITS-II. The Suspended Telephone Accounts Report lists all inmate accounts at the correctional facility whose calling privileges have been suspended either temporarily or indefinitely. When the report is selected from the Report Generation window on the ITS-II graphical user interface, the report generation dialog box prompts the user to select active suspensions, expired suspensions, or all suspensions. The report is sorted by inmate register number and date of suspension and includes the inmate register number, the date of the suspension, the number of days for which calling privileges have been suspended, and the date the suspension was or is scheduled to be lifted. The report footer includes the total number of accounts that are currently suspended.

Specific Reports-Approved Telephone Number Search Report

The Approved Telephone Number Search Report is included in the standard list of reports provided with the ITS-II. The Approved Telephone Number Search Report lists all inmates who are authorized to call a specified telephone number or numbers based on the search criteria entered for the report. When the report is selected from the Report Generation window on the ITS-II graphical user interface, the report generation dialog box prompts the user to enter the exact telephone number, NPA-NXX-XXXX or 011-CC-XXXX . . . , or a telephone number pattern with wildcards to "fill in blanks". Alternatively, the user can select the Toll Free Access check box to list all toll free numbers on inmate allow lists. The report will also indicate if the inmate is authorized to place toll free calls. The report searches the allow lists for all inmates at the correctional facility. If a number matches the specified number exactly or the number pattern, it is included in the report detail. The report is sorted by telephone number and inmate resister number and includes the telephone number, the inmate's register number, and the inmate's name.

The footer at the end of the report includes the total count of numbers that matched the search criterion.

For more information on allowing calls to toll free access numbers, please refer to the section entitled "Toll Free Access".

Specific Reports-Alert Notification Report

The Alert Notification Report is included in the standard list of reports provided with the ITS-II. The Alert Notification Report lists all calls that generated an alert status. When the report is selected from the Report Generation window, the report generation dialog box prompts the user to enter the date range (start date and time and end date and time) of call records to search. The report searches the call records for the correctional facility and date range specified. The report details are listed in chronological order and include:

Type of alert (inmate or dialed number)

Inmate name, Inmate register number, Telephone number dialed, Date of call, Time of call, Inmate telephone station used, Recorder channel number, and Cost of call.

The report also includes the count of alerts for each date specified, as well as the count for the report.

Specific Reports-Telephone Numbers Called by More Than One Inmate

The Telephone Numbers Called by More Than One Inmate Report is included in the standard list of reports provided with the ITS-II. The report lists all calls by more than one inmate to the same number within the specified date range. When the report is selected from the Report Generation window, the report generation dialog box prompts the user to select the summary, detail report or both and to enter the minimum number of inmates placing calls to the same number and the date range (within the past thirty days) of calls to be included in the report.

The Telephone Numbers Called by More Than One Inmate Report searches the call record database for the facilities and date range specified. Only numbers dialed by the specified minimum number of inmates or more within the date range specified and from the correctional facilities specified are selected for the report. The report output is sorted by dialed number and call start date and time and includes the following call record details: Inmate register number, Inmate name, Date of call, Time of call, Inmate telephone station used, Recorder channel number, Cost of call, and Correctional facility code from which the call was placed.

Specific Reports-Telephone Numbers Listed on More Than One Telephone Account

The Common Telephone Numbers Listed on More Than One Telephone Account Report is included in the standard list of reports provided with the ITS-II. The report lists allowed telephone numbers. The report includes all telephone numbers that appear on more than one inmate's telephone number list and is sorted by telephone number and inmate. The report detail includes: the telephone number, the inmate's register number, the inmate's name, the telephone number activation date, and the correctional facility code.

Specific Reports-Quantity of Calls Placed

The Quantity of Calls Placed Report is included in the standard list of reports provided with the ITS-II. The report lists the number of calls by all inmates whose call volume has exceeded the minimum number of calls specified within the date range specified. When the report is selected from the Report Generation window, the report generation dialog box prompts the user to enter the minimum number of calls each inmate must have placed to be included in the report, the date range (start date and time and end date and time) of call records to search, and the call type(s) to be included. Radio buttons are provided for the user to select the detail or summary report. The report searches all call records within the date range specified, for the call type(s) specified, and for the correctional facilities specified and tallies the number of calls placed by each inmate. The report details are listed by the number of calls by inmate in descending order. The detail report lists all calls placed by the selected inmates and includes the count of calls for each inmate, The summary report includes the number of calls for each inmate, the inmate's register number, the inmate's name, and the correctional facility to which the inmate is assigned.

Specific Reports-Quantity of Minutes Called

The Quantity of Minutes Called Report is included in the standard list of reports provided with the ITS-II. The report lists the total minutes called by all inmates whose total call duration exceeds the minimum number of minutes specified within the date range specified. When the report is selected from the Report Generation window, the report generation dialog box prompts the user to enter the minimum number of minutes each inmate must have placed to be included in the report, the date range (start date and time and end date and time) of call records to search, and the call type(s) to be included. Radio buttons are provided for the user to select the detail or summary report. The report searches all call records within the date range specified, for the call type(s) specified, and for the correctional facilities specified and sums the call duration for each inmate. The report details are listed by the total call minutes per inmate in descending order. The detail report lists all calls placed by the selected inmates and includes the total call duration for each inmate. The summary report includes the total call duration in minutes, the inmate's register number, the inmate's name, and the correctional facility to which the inmate is assigned.

Specific Reports-Blocked Telephone Numbers

The Blocked Telephone Numbers Report is included in the standard list of reports provided with the ITS-II. The report lists all telephone numbers or ranges of numbers that are blocked from being called by inmates either ITS-II-wide or by individual inmate account. The report searches the blocked numbers table on the database as well as the individual inmate telephone number lists and lists the following details for each blocked number found: the blocked telephone number or range of numbers, the reason for the block (as listed in the database for ITS-II-wide or facility blocked numbers or deny type for called party blocks), the user who placed the block, the register number of the inmate (for blocks on inmate telephone number lists), the inmate's name (for blocks on inmate telephone number lists), and the facility code of the inmate or origination of the blocked number.

Specific Reports-Extra Dialed Digits Report

The Extra Dialed Digits Report is included in the standard list of reports provided with the ITS-II. The report lists all inmate telephone calls during the course of which the FMU detected extra dialed digits. When the Extra Dialed Digits Report is selected from the reports list, the report generation dialog box prompts the user to enter the date range of calls to be searched for extra dialed digits. The report searches the call records for the date and time range entered and reports on all calls placed from the selected correctional facilities with a call end reason of extra dialed digits detected. The call record details are listed in chronological order and include: date, time, dialed number, inmate register number, inmate name, inmate telephone station, recorder channel number, and the correctional facility from which the call was placed.

Specific Reports-Local Exchanges

The Local Exchange Report is included in the standard list of reports provided with the ITS-II. The report lists all NPA NXX combinations that are included in the local calling area for the correctional facility for which the report is generated. This report can also be generated from the Local Calling Area Maintenance window under the Utilities menu.

Specific Reports-Percentage Grade of Blocking Report

The Percentage Grade Blocking Report is included in the standard list of reports provided by the ITS-II. The report lists all inmate telephone stations and the percentage of calls blocked for selected hourly time periods by call type (FTS Long Distance, local, international, etc.) Radio buttons are used to select the type of report, by telephone or by call type. When the Percentage Grade Blocking Report is selected from the reports list, the report generation dialog box prompts the user to enter the date range of call records to be searched as well as the time interval in minutes within each day for reporting the percentage blocking.

The report searches all call records for the selected facility or facilities within the selected date range and totals the number of calls placed at the time interval for each hour and the total number of calls that were denied due to all trunks busy for each inmate telephone station. The telephone station report lists all inmate stations, the number of calls attempted, number of times the station reported all trunks busy for at the specified interval each hour, and the percentage of calls reporting trunks busy. The call type report lists the percent of all calls by call type reporting all trunks busy at the selected interval within each hour of the specified date range.

C.2.2.7.4 BOP Central Office Administrative Reports

The custom report generation tool included with the ITS-II provides the BOP with the capability to create custom reports that can be run against data for all facilities nationwide, as well as individual facilities or groups of facilities.

The BOP can use the Report Schedule feature in the Reports menu to schedule any custom or standard report to be generated automatically at specific times of the day or days, as well as on specific dates and times. These reports can also be included on the reports menu and generated on an ad-hoc basis.

Because user access levels are assigned to specific users rather than specific workstations, a user can log onto any workstation at any correctional facility and have access to the reports assigned to the user's access.

BOP Central Office users have access to the data for all correctional facilities. When they run queries and reports, they have the option of selecting the individual facility or group of facilities whose data is to be included in the report or query. The results of the queries and reports will include only the data from the selected facilities.

Each correctional facility accesses the database through the ITS-II wide area network (WAN) using Oracle's SQL*Net (a trademark of Oracle). The number of users and facilities that can access the ITS-II central database simultaneously is limited only by the number of workstations.

C.2.2.7.5 General Revenue Reports

In addition to the monthly maintenance reports described elsewhere in this specification, the ITS-II can provide the monthly reports described in the following sections.

The ITS-II can produce these reports in both hard copy and electronic medium formats. All revenue figures are calculated and displayed in U.S. dollars and cents.

For the purposes of the general revenue reports described in the following sections, direct dial call types are defined as: direct dial local, direct dial long distance, direct dial international (excluding Canada and Mexico), direct dial Canada, and direct dial Mexico.

For the purposes of the general revenue reports described in the following sections, collect call types are defined as: collect (other than international), collect Canada, and collect Mexico.

Additional call types can readily be added as necessary.

Specific Monthly Revenue Reports

The ITS-II can provide the Monthly Revenue reports described below:

Specific Monthly Revenue Reports-Summary Minutes by Call Type

The Summary Minute by Call Type report includes the total number of calls for each call type, the total minutes called for each call type, and the total monthly revenue for each call type.

The Total column on the Summary Minutes by Call Type report displays the calculated totals for direct dial calls and collect calls. The Grand Total column displays the calculated total of all calls for each correctional facility for the month being reported on.

The Total column on the Summary Minutes by Call Type report displays the calculated totals for direct dial minutes, collect minutes and total minutes for each correctional facility for the month being reported on. The Grand Total column displays the calculated total of all minutes called for each correctional facility for the month being reported on.

The Total footer of the Summary Minutes by Call Type report includes the total calls for each direct dial and collect call type, all direct dial calls, all collect calls, and all calls for all correctional facilities. The footer also includes the total minutes called for each direct dial call type, collect call type, all direct dial calls, all collect calls, and all calls for all correctional facilities.

Specific Monthly Revenue Reports-Monthly Distribution of Revenues

Monthly Distribution of Revenues Reports can be submitted to the BOP within 60 days of the end of each month in which the calls occurred. The reports provide a summation of all calls placed through the ITS for the entire BOP. The information included for each call type includes: Totals minutes by call type for direct dial, Rate per minute due the telephone service provider by call type for direct dial, Amount due the telephone service provider by call type for direct dial, Grand totals for direct dial minutes and amount due the telephone service provider, Gross billable revenue by call type for collect calls, Percent due the BOP by call type for collect calls, Amount due BOP by call type for collect calls, and Grand totals gross billable revenue and amount due BOP. The net revenues due to the telephone service provider or the BOP are included at the end of the report.

In addition, the Monthly Distribution of Revenues Report includes the following details for each correctional facility: Correctional facility name, Direct dial minutes by call type, Rate charged to the BOP by the telephone service provider for direct dial calls by call type, Amount due the telephone service provider for direct dial calls by call type, Summary totals for direct dial calls (minutes and amount due the the telephone service provider) by correctional facility, Summary totals for direct dial calls (minutes and amount due the the telephone service provider) across all correctional facilities, Collect call minutes by call type, Summary of collect call minutes by correctional facility, Summary of collect call minutes across all correctional facilities, Gross billable collect call revenue by call type, BOP percentage of gross billable collect call revenue by call type, Amount due the BOP by the telephone service provider for collect calls, Summary totals for collect call revenues (gross billable and due the BOP) by correctional facility, and Summary totals for collect call revenues (gross billable and due the BOP) across all correctional facilities.

Specific Monthly Revenue Reports-Monthly ITS-II Direct Dial and Collect Revenue Analysis The monthly revenue reports include the Monthly ITS-II Direct Dial and Collect Revenue Analysis Report includes a column for each month in the fiscal year, starting with October (October 1) and ending with the end of the current month (or September 30). The data in each column includes the total revenue for each correctional facility by call type (direct dial and collect). A 'totals' line for each call type includes the total revenue for each call type for each month included in the report. The Fiscal Year Total column includes the total revenue for each facility for all months included in the reports by call type. The 'grand total' lines include grand totals for all correctional facilities for all direct dial call types, all collect call types and all calls for each month as well as for all months included in the report.

Specific Monthly Revenue Reports-Direct Dial Sales by Correctional Facility

The Direct Dial Sales by Correctional Facility Report is included with the monthly revenue reports. This report is sorted by correctional facility and includes the fiscal year average inmate population to date (derived from the number of ITS-II accounts that have had any activity during the time period), the direct dial revenue for each direct dial call type, the annualized revenue per inmate for each direct dial call type, and the number of active inmate accounts with no activity during the period for each direct dial call type. Totals for each direct dial call type are calculated and displayed, and grand totals for all direct dial call types are included at the end of the report.

Specific Monthly Revenue Reports-Inmate Usage

The monthly Inmate Usage Report is sorted by category (collect and direct dial) and correctional facility and includes the following information for each inmate for collect and direct dial calls: the minutes called for the month for each collect and direct dial call type, the total minutes for all collect and direct dial call types for the month, the number of calls for each collect and direct dial call type for the month, and the total calls for all collect and direct dial call types. Grand totals are included for minutes calls and number of calls for each inmate for all calls (collect and direct dial). In addition, the report includes the number of ITS-II accounts that have had activity and the number of active inmates with no activity during the reporting period for each correctional facility.

Totals and averages are calculated and displayed for each column, including the minutes called and the number of calls.

Specific Monthly Revenue Reports-Cumulative Usage For Fiscal Year

The monthly revenue reports includes the Cumulative Usage for Fiscal Year Report which includes the percentage of total call minutes of each direct dial call type, each collect call type, all direct dial call types, all collect call types. This report includes a column for each fiscal month starting with the beginning of October and ending with the end of the reporting month (or September). Totals and averages are calculated and displayed for each field and each month and all months included in the report.

Administrative Requirements-Data Security

The ITS-II includes a comprehensive system of controlling and backing up all data within the ITS-II, as described in the sections entitled "ITS-II Backup Capability" and "Data Archiving", below. Control is maintained for all ITS-II data, whether it is stored on the FMU, the COF servers, on backup media, or on archive equipment.

The following measures are followed in order to maintain data integrity: (1) All hard disks are degaussed or reformatted ("wiped") prior to being used in any other system. (2) All hard disks are degaussed or reformatted ("wiped") prior to being shipped to any outside vendor. (3) All hard copy (paper) reports are shredded prior to their disposal at the telephone service provider's.

All backup and archive data is maintained in a fire proof compartment and in an area separate from the ITS-II equipment.

The ITS-II network will not be accessible from, nor have access to the public Internet; however, the PCOF internal network will be attached to both the ITS-II network and the public Internet. The ITS-II includes a very restrictive firewall between the ITS-II network and the PCOF internal network. This firewall will block packets which contain a source or destination address that is not part of the ITS-II network or the PCOF internal network. In addition, the ITS-II firewall will block the traditional log-in and file transfer protocols, so only the Kerberos authenticated versions will be allowed to pass. The firewall will also allow E-mail to pass between the PCOF internal network and the ITS-II network.

The PCOF internal network is separated from the public Internet by another firewall, and only a controlled small number of PCOF machines are directly connected to the Internet.

The connection between the ITS-II network and the PCOF internal network is present to ease maintenance activities. However, in case of a major transient problem on the public Internet (such as the Internet worm of 1988), the ITS-II network can be disconnected from the PCOF network, or the PCOF network can be disconnected from the public Internet without affecting ITS-II call processing.

ITS-II Backup Capability

The ITS-II includes two DEC ALPHA 8200 database servers, each with 300 GB of RAID level 5 disk storage to be used as the ITS-II central servers. These two servers are geographically isolated from each other. The primary server replicates data to the geographically remote secondary server in real time. In the event of the loss of the primary server, this arrangement allows the secondary server to take over the operations of the primary server without first going through a recovery process. The speed of the servers are such that the backup activities described in the following paragraphs have no impact on the ITS-II applications running on the servers.

The primary server includes two TL812 DLT (digital linear tape) multiple-tape backup units, which each have 1.94 terabytes of storage capacity and which are each fed data as it comes into the PCOF. The TL812 DLT is an automated tape library using four DLT drives. It has a capacity of 52 tape cartridges. Each tape holds 20 GB of uncompressed data and more than twice that amount, uncompressed.

One DLT tape unit is used to create a real time backup of database records as they come into the server, and the other DLT multiple-tape backup unit is used to create an archive record of the database records as they come into the server. The remote server also includes a DLT multiple-tape backup unit that creates a backup of the remote server as records are passed from the primary to the secondary server. In the case of a disaster, the database can be restored from the tape backup units in less than 8 hours.

The speed of the server processors and the tape drive bus speeds are such that database records can be continuously updated on the three separate DLT backup units without causing a degradation of system performance.

In addition, the ITS-II provides an additional backup strength in that each site FMU has the disk capacity to store 30 days of the most recent database records.

The extensive backup capability, as explained above, will protect against the loss of data at both central server locations and at any BOP correctional facility for any type of system failure.

Each database record in the database is concurrently available in six locations, limited only by the transmission speeds on the links and operating speed of the tape drives:

on the site FMU (30 days of the most recent data,
on the primary central server,
on the DLT backup unit on the primary server,
on the remote central server, and
on the DLT backup unit on the remote server.

Because the ITS-II stores data in the redundant locations listed above, the BOP will be able to recover all data, to the point of full system operation, using any one, or a combination of the six unit data storage and backup techniques.

C.2.3.3 Data Archiving

The ITS-II provides hardware and software to support archiving of all inmate data. The ITS-II archiving system provides the BOP with real-time access to all current and archived data. The archiving system supports in excess of seven (7) years of on-line storage.

Archived data on the Archive Server can be viewed, queried, and reported by the BOP Central Office staff in the same manner as the ITS-II real time operations, without having to disrupt ongoing operations. The BOP staff simply choose the "Archiving" menu option, and they are given a window to view, query, or report on the archived data.

The ITS-II data archival capability is provided through the PCOF Digital Equipment 8200 computer (A trademark of Digital Equipment Corporation). This computer has a two terabyte Digital Linear Tape (DLT) magnetic storage unit connected as part of its I/O subsystem. The DLT unit will be configured with an Oracle RDBMS. This RDBMS will contain all of the archived data from the primary inmate database. Thus, all BOP archived data will always be on line. The DLT unit supports search and retrieval functions of historical inmate telephone account information.

The ITS-II Archiving system's RDBMS contains all relevant inmate data copied from the main RDBMS. The same full administrative query and reporting functions can be performed on the ITS-II Archiving system that the main RDBMS supported.

The ITS-II will automatically archive all inmate data from the working database to the Archive database each day. This daily archiving provides an additional level of data redundancy in the event of a system failure. The ITS-II main working databases always contain, at a minimum, the twelve most current months of data.

The ITS-II updates, or creates if no record previously exists, a record in each inmate account whenever financial data is deleted from the Central server databases.

ITS-II External Interfaces

The ITS-II interfaces to the FPPOS, to institution voice recording equipment, to the BOP Automated Intelligence Management System, and the BOP LAN/WAN at each site.

ITS-II External Interfaces-Federal Prison Point of Sale (FP-POS) System

At all correctional facilities, the ITS-II will be connected to the LAN supporting the FPPOS. The BOP Central Office has access to all FPPOS servers through the ITS-II WAN.

The ITS-II can access the FPPOS file systems as a NetWare user. NetWare client operations are part of the LINUX operating system utilities.

The ITS-II is capable of performing the open, close, edit, delete, and create record operations on Btrieve files.

ITS-II External Interfaces-Multiple FPPOS Systems at BOP Facilities

Because the intelligent hub associated with the FMU has 16 ports that are each capable of interfacing with an FPPOS system, the ITS-II is capable of interfacing with multiple FPPOS systems. In addition, a second intelligent hub can be installed, permitting the ITS-II to interface with up to 32 FPPOS systems at a single site.

ITS-II External Interfaces-FPPOS Transactions

The ITS-II s configured to interface with FPPOS files to perform financial transactions. The following transactions are implemented through the interface:

(1) Inmate-initiated transfer of funds from the Commissary account to their ITS-II account.

(2) BOP initiated electronic transfer of funds from the Commissary account to the ITS-II account.

(3) BOP initiated transfer of ITS-II account funds to the Commissary account for inmate releases.

(4) Inmate Commissary account balance inquiries. The ITS-II will be able to read existing FPPOS Btrieve data files.

(5) Inmate initiated transfer of funds from their ITS-II account to their Commissary account. This function requires writing to existing FPPOS Btrieve data files.

Refer to the section entitled "Inmate Telephone Account Financial Transactions", above, for the manner in which these transactions will be accomplished.

ITS-II External Interfaces-Institution Voice Recorder Channel Number

The ITS-II provides an analog voice path to the correctional facility recording equipment so that each inmate call can be recorded as it is in progress. The recorder channel number, upon which each inmate station channel is being recorded, which is assigned to each inmate telephone within the correctional facility, can be entered and modified through the "circuits tab" feature on the Facility Information Maintenance window. The channel number will be stored on each call record on the ITS-II database. The call date, time, and the recorder channel number of the telephone is displayed on reports and displayed on the screen through the use of the graphical user interface, in order to help with investigations.

ITS-II External Interfaces-Automated Intelligence Management System (AIMS)

The ITS-II provides data to the BOP Special Investigative Supervisor (SIS) AIMS system at each individual site.

The AIMS system is connected to the ITS-II via a serial port with a minimum transfer speed of 300 Kbps. Through this serial port, data about the inmate calls is transferred to the AIMS system. Where necessary, due to the distance from the ITS-II to the SIS office, a modem can be connected to transmit the data.

The data transferred to the AIMS system at a given correctional institution will consist of the following for each inmate call made at that institution: the inmate register number, the data of the call, the time the call was initiated, the call duration, the telephone number dialed, the station set number, and the channel number on which the call was recorded.

The SIS staff at each correctional facility have the ability to, at any time, use the provided graphical user interface to request that data be transferred from the ITS-II to the AIMS system. The information will be transferred in chronological order for the period requested. The staff can request this information transfer for a defined time and date.

The FMU also incorporates an integrated Alert Recording System (ARS) which will help the institution SIS staff by making it possible for them to listen to recent inmate telephone conversations without loading and listening to tapes. The FMU has the ability to store in excess of 400 hours of conversations, automatically eliminating older recorded calls so that new calls can be recorded. This capability, together with the ARS real time alert notification capability allows the SIS staff to select and listen to recent "alert" calls without loading tapes. For a full description of the ARS capabilities, see the section entitled "Miscellaneous Features", below.

The FMU also has the capability to supply a real time feed to the AIMS system, so that AIMS data can be continuously updated.

The ITS-II will enable the BOP staff with the appropriate access level to set a user defined time and date range for the data transmission to the AIMS system. The data will be output in chronological order for the date range entered. The data transfer rate can be set from 100 baud to 1.4 megabits per second. The data transfer rate may also be set at a standard rate (i.e. 300 Kbs) BOP system-wide, ITS-II External Interfaces-BOP LAN/WAN The ITS-II is able to interface with the BOP's WAN and LAN at each correctional facility upon request.

Access Control

The ITS-II uses Oracle's capability of granting roles to users in providing the BOP with ITS-II access control. Oracle does not limit the number of user levels that can be defined. The Access Control tab on the National Information Maintenance window includes multiple selection list boxes for granting access to the following ITS-II objects: graphical user interface menus, windows and tabs; reports; features.

The ITS-II will be configured with the BOP Central Office access level and a BOP Central Office user. The BOP Central Office user will be granted the highest access level, with access to all ITS-II menus, windows, database tables, reports, and features. BOP Central Office users can use the Access Control tab on the National Information Maintenance window to create lower levels of access. Pick lists are provided for selecting ITS-II objects and access privileges to those objects for each access level.

The User Administration tab on the National and Facilities Information Maintenance window provides the BOP Central Office the ability to create individual users (by user name and password) and assign each user to a user access level. The User Administration tab is also used to assign users to correctional facilities.

The Access Control tab on the National Information Maintenance windows provides the BOP Central Office with pick lists for assigning menu, window, tab, report, and feature access to each lower level along with a corresponding access privilege. Access privileges include: read only, query, data entry, update, report generation.

ITS-II database access is hierarchical in that the BOP Central Office will create lower access levels as subsets of BOP Central Office access. Lower access levels can then be created as subsets of those access levels. This process continues until the BOP Central Office has created the desired access levels. Additional access levels can be created as needed.

When an authorized BOP user launches the ITS-II graphical user interface, the ITS-II log-in window prompts the user to enter a user name and password.

Users are added to the ITS-II using the User Administration tab on the National and Facility Information Maintenance window. The BOP Central Office will create "Accounting Supervisor" level user(s) at all correctional facilities. As long as the Accounting Supervisor access level has been granted access to the User Administration tab, all users with the Accounting Supervisor access level have the ability to create users for all other BOP Central Office defined access levels at the correctional facility.

The ITS-II will use Oracle passwords for access to the ITS-II graphical user interface and ITS-II database. All passwords must contain between 4 and 8 characters. Passwords are composed of the letters A–Z (uppercase and lowercase and the digits 0–9. By default, all passwords will expire after 6 months, at which time the user be prompted to enter a new password. The ITS-II-wide expiration term can be changed at the request of the BOP Central Office. Passwords are assigned to individual user names. All BOP staff with access to the ITS-II will be assigned a unique user name/password combinations. The user name/password combination serves as the user's only means with which to access the ITS-II. Passwords are stored on the database using DES encryption. The password display is masked on the window when the password is entered into the ITS-II upon creation of a user account as well as when the password is entered to gain access to the ITS-II. The BOP has the choice of transmitting passwords over the wide are network from the workstations at the correctional facilities to the central servers as clear text or encrypted. The BOP Central Office assigns the Accounting Supervisor access level to a user and grants the user access privileges to the data for the correctional facility. The Accounting Supervisor then has user administration privileges for the correctional facility for creating users and passwords. The Accounting Supervisor can only assign access levels to users that are the same as the Accounting Supervisors or lower. When the Accounting Supervisor assigns user access levels to individual users at the facility, those users are automatically restricted to data for that correctional facility unless the Supervisor has access rights to data for other facilities. The Accounting Supervisor can assign users access to data for one or all of those facilities.

The ability to configure the ITS-II to allow either multiple of single instance log-ons for BOP users can be specified in the Oracle profile.

Passwords used for authentication will comply with the requirements of Federal Information Processing Standards Publication (FIPS PUB) 112, Passwords Usage, or its successor.

PCOF and BCOF personnel's access to the ITS-II database will be by user name and password as assigned by the BOP Central Office. The user level assigned to the PCOF and BCOF staff will be the same or lower than that assigned to BOP Central Office staff. Staff access can therefore be monitored and controlled in the same way BOP staff access is monitored and controlled.

The network management system is capable of identifying all remote terminals and network workstations.

DES encryption is used for to protect all information during data transfers regardless of the network used to transfer the data.

When the ITS-II application is launched at a workstations or remote terminals, the ITS-II displays the following banner: "WARNING! By accessing and using this computer system you are consenting to system monitoring for law enforcement purposes. Unauthorized use of, or access to, this computer system may subject you to criminal prosecution and penalties."

In order to log onto the ITS-II, all users are prompted to agree with the consent statement or to quit. Only upon user consent is the log-in dialog box displayed.

Oracle's Audit capability maintains an audit trail on the database of all user activities from the time a user is connected to the time the user logs off. In addition, the Audit captures all failed access attempts and attempts to breach ITS-II security.

All audit trail log tables on the database are maintained on the central database for the number of days specified by the BOP without requiring manual intervention or a degradation in the use of the ITS-II.

A copy of all audit trail logs is maintained on the archive database for seven years.

The ITS-II graphical user interface includes a browser for reviewing all audit trail log files. English language searches can be performed using a Find function similar to that found in word processing applications. In addition, audit trail logs can be exported to report files for viewing online or printing.

BOP Central Office users are granted access privileges to the data for all BOP correctional facilities. When the Central Office staff creates Accounting Supervisor users on the User Administration tab on the National Information Maintenance window, a multiple selection list box allows them to select the correctional facility or facilities or facility groups to which to grant Accounting Supervisor users access privileges. An Accounting Supervisor with access to the data for more than one correctional facility can then use the User Administration tab on the Facility Information Maintenance window to grant lower level users access to one or more of those facilities.

Users with access to data for more than one correctional facility are capable of performing functions and running reports for all of those facilities or any combination of those facilities. When a user with access to data for more than one correctional facility enters a query from an ITS-II graphical user interface window, the query tool, or the SQL*Plus utility, that user can view and modify the data for all facilities to which he/she has access. When the user enters report selection criteria, the report generation dialog box includes a multiple selection list box listing the facilities to which the user has access privileges. The report will include the data for the selected facility or facilities.

Fraud Detection

The ITS-II has several features and reports that assist the BOP in detecting and eliminating fraud perpetrated by inmates and their accomplices. There are many different potential types of fraud and misuse of inmate phone systems. The major categories are fraudulent use of the ITS-II, fraudulent use of systems outside of the BOP, and acts that circumvent the intended use of the ITS-II.

The ITS-II utilizes its graphical user interface to enable or disable each of the features listed below. There are two methods for reporting the detected activity that are each turned on or off by the use of graphical user interface. Only the appropriate level is granted access to these features. The second methodology utilized for fraud activity report generation is that the BOP staff can manually run one of the standard supplied fraud reports.

The BOP staff that have been granted access to the real time fraud detection notification can enable or disable the feature through the ITS-II graphical user interface.

In addition, the ITS-II provides the BOP with the ability to send the real time fraud detection notification to the user or users that have been listed in the graphical user interface.

Each of the fraud features can be enabled to terminate or not terminate the phone call in progress.

The detection and prevention capabilities included in the ITS-II, related to fraudulent, illicit, or unauthorized activity, are described in the following paragraphs.

In each of paragraphs below may be found the specific activities and the methodology and capabilities of the ITS-II to detect and/or prevent the activity.

The ITS-II continually monitors both the inmate station and the network side of the line for any extra digits dialed by either party. DTMF digit detection occurs with DTMF levels as low as −25 Dbm.

In addition to meeting typical commercial requirements the ITS-II DTMF detection capabilities are of central office quality.

Central office quality DTMF detection provides significantly less talk off (false digit detection) and also allows the ITS-II to detect much lower DTMF levels than conventional DTMF receivers. The result is that the ITS-II can detect extra dialed digits with far greater precision than conventional DTMF detectors.

Through the graphical user interface, the BOP can set the number of extra dialed digits that must be detected before call termination and/or report generation are initiated.

In addition, the BOP can also set two additional parameters: the time between each extra dialed digit, and the total time for the number of digits to be detected before the ITS-II terminates and/or reports on the detected activity.

Stop All Digits (SAD): The ITS-II Alert Recording System (ARS) (see the section entitled "Miscellaneous Features", below, for a complete description of ARS) feature can also be enabled for SAD as well as extra dialed digit detection. ARS will be activated after the event is detected; the previous 10 seconds of the call just before activation will also be recorded.

The ITS-II includes a standard report which lists the calls which have met the BOP-set requirements for the number of extra digits dialed. This report, entitled "Extra Digits Dialing Report" is described in the "Specific Reports" section above. The report includes the recorder channel as well as the date and time of the occurrence.

In addition, the ITS-II Alert Recording System (ARS) feature can be enabled as well to record the previous 10 seconds of the call just before the extra dialed digit detection threshold was met.

This feature will enable the BOP staff investigating the detection to quickly review the ITS-II recording to determine if further listening on the SIS recorders is needed. This feature will enable SIS or other BOP staff to preview the occurrence before having to unnecessarily reload tapes.

The ITS-II contains a suspicious dialing detection feature. This feature can be enabled or disabled through the ITS-II graphical user interface. When enabled, the ITS-II monitors the inmate stations for a programmable number of unsuccessful attempts at call completion. For example, if an inmate station goes on and off hook three times in a row within a programmed time frame, the ITS-II will generate a suspicious dialing alarm. Additionally, if three invalid PIN/phone number attempts are made within a programmed time frame by an inmate that will also activate a suspicious dialing alarm.

The ARS feature can be enabled through the graphical user interface to record all attempts after the threshold has been met for suspicious dialing. This will assist the BOP staff in quickly investigating suspicious dialing attempts. All programmable parameters for this suspicious dialing pattern detection feature are configurable through the graphical user interface. Report generation and real time notification are also configurable through the graphical user interface.

Fraud Detection-Inmate-to-Inmate Detection

The ITS-II has a feature called Inmate-To-Inmate Detection (ITID) that is designed to detect when two or more inmates on different inmate stations anywhere throughout the BOP system, including different facilities, make calls through the ITS-II and are conversing on the same phone call.

The basic operation of the feature is as follows. The ITS-II places an inmate-inaudible signal on the outbound phone connection towards the telephone company network. This extremely low level signal serves as a pilot signal for other ITS-II detection circuits on the BOP inmate network. Each ITS-II outbound circuit contains transmitter and receiver circuitry for ITID. When an ITID receiver detects a pilot signal from another ITID transmitter, the ITID transmitter on the receiving end generates a very short duration high level burst signal that transmits the correctional facility number, inmate register number and call sequence number. The high level burst signal sounds like a brief bit of static or noise on the phone line to the callers. In the FMU, the digital signal processors carry out the "transmit" and the "receive" functions.

The ITID feature can be enabled or disabled by the BOP through the graphical user interface. Real time notification and report generation can also be enabled or disabled through the ITS-II graphical user interface. The ITID report and real time notification contain information on the date, time, station number, recorder channel and corresponding information for the distant end ITID detected caller(s). In addition, the ITS-II Alert Recording System can also be enabled or disabled for ITID detected calls. ARS will be activated if enabled after ITID detection occurs, and the previous 10 seconds of audio prior to ITID detection will also be recorded. This feature makes it easier for SIS to determine the nature of the call.

Fraud Detection-Added Call Detection

The inventor has done extensive research into the problem of inmates who gain access to unauthorized phones outside of the inmate phone systems. While there is no current technical methodology for stopping 100% of this activity, there are ways of reducing the activity.

The inmate phone call industry has primarily focused its efforts to date around detecting 3-way calls by click detection. The telephone systems currently deployed in the industry "listen" for a click, silence, and then another click, and if this sequence is detected, these systems will either disconnect the call or alert the correctional facility of the 3-way call. The major problem with this detection methodology is that the U.S. Telephone industry is upgrading its switching infrastructure to central offices that do not produce clicks when customers utilize their 3-way calling. The majority of the industry will most likely have completed its upgrades within the next 4 years.

Three way call detection is only one way that inmates are able to reach authorized phone numbers. Call conferencing with a second phone line by the called party, call forwarding to another number by the called party, or utilization of a new upgraded central office which does not generate clicks when 3 way calling is activated are a few of the alternatives available to inmates who want to circumvent the 3-way call detection schemes.

There are two separate components to the problem. The first component deals with called parties who want to receive calls from inmates that are not on the inmate's pre-approved list. The second component deals with called parties that do not want to receive calls from inmates who are not on the inmate's pre-authorized list. The first piece is solved through the GOTU™ process (see description of the Deny Future Calls feature, above, for a detailed description of GOTU™).

The second piece of the problem is solved with a new technology called Added Call Detection (ACD). Once answer supervision is received by the FMU, the FMU enables its ACD Technology. ACD utilizes Digital Signal Processors that are continuously monitoring the network side of the call for any type of call progress network signaling. This includes dial tone, DTMF digits, ringing tones, busy tones, and/or SIT tones. If the FMU detects any of these conditions, the call can be terminated by the FMU, the call can be immediately alerted for investigative use, or the call will be allowed to continue and the call record will be flagged with an appropriate message indicating that the FMU has detected an added call. ARS can be activated for this feature as well.

ACD will continue to provide added call detection even when the entire U.S. Telephone infrastructure is upgraded to clickless 3-way calling.

ACD will reliably detect very low level call progress signals as well. Its detection capabilities continue to operate on signals as low as −25 Dbm.

Another new technology incorporated within the FMU is called Bypass Elimination. Bypass Elimination is a process that verifies that local calls dialed by inmates are not being remotely call forwarded to other numbers. See the section entitled "Miscellaneous Features", below, for a detailed description of the use of the Bypass Elimination feature to stop call forwarding.

The ITS-II's ability to detect the five typically fraudulent types of calls are as follows:

A. Call forwarding to telephone numbers which have been automatically forwarded to another telephone number by the local telephone company: Controlled by the Bypass Elimination feature described in the section entitled "Miscellaneous Features", below.

B. Call forwarding to telephone numbers which have been automatically forwarded by called parties through the use of feature groups provided by the local telephone company: Controlled by the Bypass Elimination feature.

C. Calls to telephone numbers which "hook flash," dial another number and complete the three way call: 100% detected by ACD technology when call progress tones are present and detected.

D. Conference calls facilitated through customer provided switching equipment: 100% detected when call progress tones are present and detected.

Display of Calls in Progress

Certain BOP staff, as designated by the BOP Central Office, shall have real-time access (via a display) to information on all calls in progress. This feature will give BOP staff with the proper access level the capability to see, real time, the following information at a minimum on all telephone calls currently in progress: Inmate register number, Inmate name, Telephone number called, Called party information, Any association with a silent monitor number, Recorder channel number, Duration of call, Charge of call, Correctional facility account assigned to, Location of telephone, Type of call, and Call denial reason.

The ITS-II features one of the most advanced and sophisticated real time Display of Calls In Progress System (DOCIPS) in the industry. The real time display system provides all of the information requested by the BOP as well as several other non-requested features. The display system incorporates a graphical user interface for control and option selection, and includes the BOP's minimum requirements of displaying the inmate register number, inmate name, telephone number called, called party information, the silent monitor number assigned to the telephone, recorder channel number, duration of call, charge of call, correctional facility account is assigned to, location of telephone, type of call, and call denial reason.

The ITS-II display is refreshed at a minimum rate of once per second. During refresh, all display fields that require updating are written to the screen. The screen is also refreshed for new calls and calls that have ended. The DOCIPS has several different modes of operation. It can be set to run in Summary Facility Mode where a brief summary of all calls is provided. The DOCIPS can be set to run in Normal Mode where more information per call is provided. The third mode provides the greatest level of detail, this is called Detail Mode. Detail Mode includes a pre-loaded image of the inmate. This image can be transferred from existing BOP systems or can be taken with digital imaging equipment.

The Detail Mode of operation of the display system also supplies information related to other features described in the section entitled "Miscellaneous Features", below, such as the Alert Recording System (ARS) activation, and the Bypass Elimination feature. Fraud detection is also displayed on the DOCIPS.

The final mode of operation supported on the DOCIPS is called the System Wide mode. This level displays a summary of all calls in progress across all institutions.

The DOCIPS supports a mode of displaying only alert calls. If the ITS-II staff wants to only view alert calls, the display system can be placed in Alerts Only Mode.

Call Cutoff Capability

The ITS-II provides BOP staff with the appropriate access level the capability to immediately and remotely turn telephones off and on by individual telephones, groups of telephones, or for an entire correctional facility. This capability is provided through the ITS-II Display Calls in Progress feature and described in the paragraph entitled "Display of Calls in Progress", above. The ITS-II system has an option to immediately cut-off calls in progress.

In addition, the ITS-II also enables the BOP staff to disable phone calls. The disable feature allows the present call to finish and then prevents further calls from being processed. Inmates who attempt to make calls while the phones are disabled are provided a message indicating that the system is currently disabled for calling.

BOP Number Blocking

The Calling Features tab on the National Information Maintenance window provides the BOP with a means for editing feature groups on a national basis, by groups of facilities, or by individual facility. Feature groups are created and modified in the Feature Group tab. The Calling Features tab includes: a drop-down list box for selecting an individual facility name, the name assigned to a group of facilities, or "All" for all facilities; a drop-down list box for selecting or displaying the feature group (such as National, Facility Group, Facility) assigned nationwide, to the group of facilities, or to the individual facility.

The "Number Blocking" feature allows BOP staff with the appropriate user access level to enter telephone numbers that will be automatically blocked from being called by inmates even when a blocked number or blocked NPA NXX combination is on an inmate's allow list.

When the "number blocking" feature is included in the feature group selected, the Calling Features tab includes a window for viewing, entering, and modifying blocked numbers and ranges of blocked numbers (by NPANXX) and the reasons for blocking the numbers or ranges of numbers. Ranges of NPANXX combinations are blocked by putting a minus sign in front of the NPANXX. For example, −800 000 through 800 999, which blocks all calls to 800 numbers. Exceptions to the ranges can be made by putting a plus sign in front of the non-blocked range. For example, +800 233 through 800 233, which tells the FMU not to block calls to 800-233 numbers. If an allow list is required for an inmate, the numbers must be on the inmate's allow list in order for the inmate to place calls to the numbers. BOP staff with the appropriate users access level can add, modify and delete blocked numbers and ranges of blocked numbers for the selected facility, group of facilities, or all facilities. Blocked number lists apply to all inmates at the selected facilities.

If an individual facility does not have a blocked numbers list, the blocked numbers list for the facility group to which the facility is assigned applies. If the facility is not assigned to a group or the group does not have a blocked numbers list, the blocked numbers list specified for all facilities applies. The blocked number list for a facility or group of facilities can be disabled by removing the "number blocking" feature from the feature group in the Feature Group tab. When the list is disabled, the list for the next higher level (facility group or all facilities) applies.

When the Number Blocking feature window is active, the Report Generation button on the toolbar brings up the Report Generation dialog box for the Blocked Numbers report allowing BOP staff to run the Blocked Numbers report for all blocked numbers in the database by inmate, by facility, by facility group, or for all facilities. The report includes the blocked numbers and reason for each block.

System Requirements

None of the ITS-II data, such as account information and balances, are stored on smart cards or magnetic swipe cards, and inmates do not use swipe cards to access the telephone.

All inmate account information and call records are stored on hard disks on the central server. A second copy of the database is stored on the secondary remote server by updating this server continuously from the primary server. Both database servers store this information in a RAID configuration. In addition, the primary server is continuously backed up by two DLT (Digital Linear Tape) systems and the secondary server is continuously backed up by one DLT system. Finally, the FMU at each site contains hard disk storage that is used to store the most recent 30 days of database records.

Inmates access the telephone by using a PAC (Personal Access Code), that has been determined by the BOP.

The remote monitoring and diagnostic capabilities of the ITS-II system minimize the amount of monitoring needing to be done by the BOP staff by giving the ITS-MOCC technicians the tools to identify problems before they are reported by the correctional facilities.

This is accomplished by setting up automatic, periodic processes of electronic data communications between the "ITS-MOCC" (Maintenance Operations Control Center), the centralized servers, and the correctional institutions. These communication processes monitor various aspects of the system and generate alarms when defined thresholds are reached. The various alarms generated by the monitoring tools are delivered to the ITS-MOCC's technicians via alarm messages that automatically appear on monitoring screens and a via automatic pages that are sent directly to the technicians, no matter where they are located at the moment.

These tools allow the ITS-MOCC technicians to monitor various memory, disk space, and database conditions on the central servers, remote workstations, and the call handling process on the FMU at each of the correctional facilities. The ITS-II is capable of remotely monitoring whether each individual inmate telephone is physically connected to the system and is capable of simulating an individual inmate telephone going off hook in order to remotely monitor the network. Finally, the network management system monitors the communications links and equipment, system wide, creating an alarm fault when there is a problem or degradation in service. These tools can also be tuned in various ways to different levels to allow the ITS-MOCC technicians to monitor specific conditions more or less closely, as issues require.

For a more detailed discussion of the ITS-II program to maximize up-time, please refer to the section entitled "Miscellaneous Features", below.

The ITS-II contains a number of redundant system components that provide on-line recovery of the database during a failure, allowing the system to continue to operate while a failed portion is recovered. Each site FMU contains a copy of the most recent 30 days of call records. The two central database servers (the primary and remote server) each operate with RAID disk arrays to provide another level of redundancy. The RAID in the primary server provides redundancy to allow the system to continue operation in the event of a failure and the secondary server can back up the primary server to provide another level of on-line recovery from the loss of data.

For a more detailed discussion of the ITS-II program to maximize up-time, please refer to the section entitled "Miscellaneous Features", below.

The ITS-II equipment uses Category III wiring for all data and voice services.

System Capacities

The ITS-II has been designed to meet or exceed all BOP requirements for system capacity. If capacities are exceeded due to unanticipated utilization by the BOP, the system capacities will immediately be increased. As part of the MUMS philosophy, all ITS-II components affecting system capacity and performance are regularly monitored for appropriate system operation. When a component or components show degradation in performance or a system capacity appears that it may eventually be exceeded, maintenance personnel can take action to assure proper operation and continued compliance with the desired performance level.

A. Individual Inmate Accounts

The ITS-II Digital Equipment Corporation ALPHA 8200s, along with their respective 300 gigabyte RAID 5 disk arrays have a virtually unlimited capacity for storage of inmate accounts. Each inmate account takes approximately 1,000 bytes of information for storage. The initial configuration of the Oracle RDBMS will be established with an inmate account capacity of approximately 300,000. This may be increased or decreased as system storage capacity needs change over time.

The online Archive RDBMS is initially configured for storage of approximately 2,000,000 individual inmate accounts.

Each FMU supports 20,000 inmate accounts.

B. Call Records

The Main Server Oracle RDBMS will be initially configured to support the storage of approximately 300,000,000 call records. Each call record consumes approximately 150 bytes of disk space. This may be increased or decreased as system storage capacity needs change over time.

The online Archive RDBMS is initially configured for storage of approximately 2,000,000,000 individual call records.

Each FMU supports a backup call record storage capacity of approximately 333,000 individual call records.

C. Simultaneous Users (Administrative, Not Telephone)

The maximum number of simultaneous users the ITS-II system supports nation-wide is determined by a number of factors. The first factor is the number of workstations connected to the ITS-II network. The second factor is the processes the workstations are performing. The third factor is the volume of data being transmitted over the WAN. An initial analysis of the BOP's projected utilization of the system suggests that the ITS-II will support in excess of 1,500 simultaneous users. This analysis assumed 600 workstations performing a variety of tasks including report generation, transaction activity, query generation, account creation, and Alert Recording System review. The silent monitoring analysis assumed 900 workstations performing various aspects of silent monitoring.

The maximum number of simultaneous users the ITS-II system supports at a correctional facility is limited primarily by the 10 megabit/second Ethernet LAN. This LAN has significant excess capacity to handle up to 20 total workstations and silent monitoring workstations. The LAN is not normally used for silent monitoring, but when more than 8 silent monitoring stations are required, a terminal concentrator can be added to the LAN for additional silent monitoring workstations. The intelligent hub supports up to 16 workstations. If additional workstations have to be added, another hub can be installed.

The FMU's router functionality supports up to 100 simultaneous workstations.

D. Maximum Number of Workstations

The maximum number of workstations the ITS-II system supports nation-wide is determined by a number of factors. The TCP/IP implementation under DEC UNIX (A trademark of Digital Equipment Corporation) will support a virtually unlimited number of workstation accesses. The practical limit is measured in thousands of users. The ITS-II is designed to take advantage of distributed processing wherever possible. Workstations take the majority of the load for the graphical user interface, the local application processing, post query sorting, report display, and ARS functions. The bulk of the processes are off loaded to the workstations. Access to the central servers only occurs when absolutely necessary.

The second factor impacting the maximum number of workstations supported is the bandwidth available over the 56 Kb dedicated point to point circuits. Considering the bandwidth requirements for a workstation, and the silent monitoring application's requirements, and the projected average BOP staff and call processing utilization of the WAN. Fifteen total workstations and silent monitoring workstations per site can be supported over the current WAN design.

The maximum number of workstations the ITS-II system supports at a correctional facility is limited primarily by the LAN. A 10 megabit Ethernet LAN has been specified for each facility. This LAN has significant excess capacity to handle up to 20 total workstations and silent monitoring workstations. The LAN is not normally used for silent monitoring, but when more than 8 silent monitoring stations are required, a terminal concentrator can be added to the LAN for additional silent monitoring. The Intelligent Hub supports up to 16 workstations. If additional workstations are to be added, another hub can be installed.

E. Maximum Number of Silent Monitors

The maximum number of silent monitors that can be supported is a function of two elements. Each silent monitor utilizes one of the spare FMU station ports. Each silent monitor utilizes a serial port on the FMU or a port on an additional terminal concentrator when more than 8 silent monitors are installed at a site. Each FMU supports a total of 96 stations. Multiple FMUs can be added at a site so there is no theoretical limit to the number of silent monitoring stations at a site. Terminal concentrators can also be added to the LAN to support multiple silent monitoring workstations. The basic FMU is configured with 10 serial ports: one is used for AIMS, the other for the dial backup modem. That leaves 8 spare ports for silent monitors. Silent monitors can also be configured to run on the LAN when their proximity to the LAN is within acceptable distance limits of 10baseT specifications.

The practical limit for silent monitoring is 15 silent monitors at a site.

F. Maximum Number of Silent Monitor Users

The ITS-II silent monitoring system utilizes the Time Division Multiplex Data Bus of the FMU for silent monitoring. As a result, no additional load is placed on the FMU for silent monitoring. The phone conversation is already present on the TDM highway; the station interface port for the silent monitor simply pulls off the conversation(s) of interest. Therefore the maximum number of silent monitor users is the same number as the maximum number of silent monitors listed above.

G. Maximum Number of Nation-Wide Telephones

The maximum number of nationwide telephones is virtually unlimited because an unlimited number of phones and FMUs can be added to the ITS-II. The call processing central server load created by the inmate calls, balance inquires, and transfers is minimal compared to the administrative workstation and silent monitoring load. As a result, a practical limit of 8,000 phones per site is contemplated.

H. Maximum Number of Correctional Facility Phones

The maximum number of correctional facility phones is also virtually unlimited because theoretically an unlimited number of phones and FMUs can be added to the site. The first significant limitation encountered would be the bandwidth of the 56 Kb dedicated circuit(s). If the BOP were to increase the number of 56 Kb circuits, this limitation would no longer exist. The practical limit for the maximum number of telephones at a correctional facility is 8,000 phones minus the number of phones installed or anticipated to be installed at the BOP.

I. Maximum Number of Line Cards

The maximum number of line (station) cards that can be installed in an FMU is 16. Each station card supports 6 inmate stations, providing a total of 96 stations per FMU. Since FMUs can be connected together, there is no real limit to the number of station cards at a site.

J. Maximum Number of Central Office Cards

Each FMU has 16 slots that can be used for analog station and/or analog central office cards. The analog central office card supports 6 circuits. The analog cards support up to 6 ground start and/or loop start circuits per card. The practical limit for central office circuits is 48 per FMU. Since multiple FMUs can be supported, there is no real limit.

Each FMU also contains 3 slots for dual T1 cards. A total of 6 T1s can be supported on each FMU. Since FMUs can be interconnected, no theoretical limit exists for the number of T1s that can be supported. The practical limit could be computed by taking the total maximum number of inmates phones in the entire ITS-II system, subtracting the number of existing and planned installation of phones in the rest of the BOP, and then dividing the result by 24 (number of DSOs per T1).

K. Maximum Number of Simultaneous Calls Nation-Wide

The maximum number of simultaneous calls nationwide is theoretically unlimited. The limiting factors are the bandwidth of the WAN and the sizing of the central servers. Since both factors are scalable, there is no theoretical limit. The practical limit is 7,200 simultaneous calls per site since the BOP has specified in the section entitled "Trunk Group Availability", above, that a 10% blocking factor is acceptable in the provisioning of network connectivity.

The FMU has been designed to be non-blocking. The FMU has been designed with DTMF detection capability for inmate out dating on every station circuit. FMU system resources have been designed to allow simultaneous out dating and call processing on all channels at once. The limit of simultaneous call processing on an individual FMU is 96 stations. Since multiple FMUs can be connected together the upper limit is equal to the 7,200 calls minus the number of simultaneous calls in progress at all ITS-II sites.

Hardware

The hardware for the ITS-II system is listed and described in detail in Section D of this specification.

Hardware-Documentation of Hardware Engineering

The specifications of all the major components comprising the preferred embodiment of the ITS-II system are listed in Section D of this application. These specifications provide data describing each component's ability to adequately perform the requirements of the ITS-II. However, the components described are merely exemplary and are not intended to be limiting or represent an exhaustive enumeration of all aspects of the invention. The scope of the invention shall be defined solely by the claims below.

The architectural configuration of these components is also illustrated in Section D.

Hardware-Switching Equipment

The ITS-II switching equipment is integral to the FMU provided at each site. The CPU within the FMU does all trunk assignment, switching and rotation, i.e., provides the capability of rotating a specific inmate telephone to a different line so that a line outage does not reduce the number of inmate phones that are available. It also provides an interface with the public telephone network and the FTS-2000/Post FTS 2000 network.

All of the ITS-II switching equipment provided by the FMU is integrated with all other ITS-II components, including telephone set equipment, IVR equipment, CTI equipment and call monitoring equipment. The design and performance characteristics of the FMU have been carefully integrated into the overall ITS-II architecture.

Software-Personnel Information

The ITS-II software is a combination of industry software products which include ORACLE RDBMS, Digital UNIX (a trademark of Digital Equipment Corporation), Hewlett-Packard OPENVIEW (a trademark of Hewlett-Packard), and Microsoft Windows (a trademark of Microsoft Corp.). The inventor is providing the call processing software, the ITS-II graphical user interface, the ITS-II database, and some components of the central database management system software. The inventor is also managing the integration of the above-mentioned commercial software into the overall ITS-II.

Software Features

The ITS-II graphical user interface includes two help facilities. When help mode is on, and the user clicks the mouse on a data entry field, context-sensitive help provides a brief explanation of the field along with instructions for filling in the field. Tool tips are also provided to identify the functions of the ITS-II toolbar.

The ITS-II Reference Help accessed from the Help menu provides online end-user documentation of the ITS-II graphical user interface.

The print screen button on the toolbar provides a printout of the displayed window. The Print dialog box lets the user specify printer on which the hard copy is to be printed. Displays that require scrolling to view all of the data can be locked so that information does not scroll off the window. All displayed reports can be scrolled using the scroll bar or the down arrow keys. In addition to the page up and page down keys, paging buttons is provided for moving between pages.

The Report Generation window includes a button for canceling reports that are in the print queue or are still in progress.

The ITS-II is a Microsoft Windows graphical user interface. It employs the full range of features and functions available to Windows applications, such as menu-based command structures, multiple window display, scroll bars, tool bars, command buttons, and context-sensitive help. Function keys, where used, have the same meaning throughout the ITS-II graphical user interface.

The ITS-II graphical user interface supports multiple display windows. For example, two Inmate Information windows can be displayed at the same time (one overlapping the other), each showing information for a different inmate.

The ITS-II graphical user interface supports Point and Click technology. All menus, windows, data fields, buttons, and tool bars can be selected for data entry or execution by moving the cursor over the object and clicking the mouse button.

In addition to moving the cursor and clicking the mouse button, the Tab key can be used to move between fields on a window.

The Escape key can be used to escape from all ITS-II dialog boxes before a command (such as commit or print) has been launched. Database changes will be rolled back, and print jobs will be canceled without any adverse effect on the system.

The inventor has developed special purpose tools, programs and procedures to allow implementation of software changes and updates at individual sites without affecting all other sites.

This process is accomplished with a number of different methodologies. The specific procedure and tools utilized depend on the nature of the software update. If the software update involves changes to the Database Schema, a new Database instance is created and run for the period of the test. If the software update only affects call processing software, a special test mode is started that enables an entire Facility Management Unit (FMU) or a portion of the FMU to run the new software. If the software update only affects the Client workstation or silent monitoring workstation then a specific workstation or workstations can be set up to run the new software. If the software update involves a combination of the above then a combination of the procedures described above are utilized.

The inventor also has a test bed platform that utilizes the same software that is running on the Central Server systems. Thus, extensive tests may be run on in-house systems rather than live systems prior to implementation at the sites.

Operating System Software

The ITS-II software primarily uses off-the-shelf, industry-standard software whenever possible. The ITS-II operating systems are all UNIX or Windows; the network is built out of Ethernet and standard data circuits and the network protocols are based on TCP/IP. The software is written in C, and is platform-independent.

The servers and Facility Management Units (FMU) have been designed with spare processing capacity, and can easily run additional applications. Their multi-process architecture has been carefully assessed to insure that the applications will not interfere with each other.

The server software runs on both Intel and Digital ALPHA processors, and has been designed to minimize problems that might occur when porting to other processor architectures. The server software is built on POSIX standards to minimize problems that might occur from changing the software environment.

Operating System Software-Time of Day and Date Changes

The ITS-II maintains consistent and accurate time and date stamping—consistent nationwide for all ITS-II sites—through a multitude of protocols and synchronization methodologies described in the next three paragraphs. These collections of programs assure consistent nationwide accurate time for all ITS-II sites and the Central Operations Facilities.

The ITS-II uses the Network Time Protocol (NTP), which is a widely deployed Internet protocol, to distribute the current time to the servers, FMUs and workstations. The primary time reference is a Global Positioning System (GPS) receiver at the Central Operation Facility, which provides Universal Time to sub-millisecond accuracy. The status of the GPS receiver will be monitored with the network monitoring system, and should it fail, the free-running clock in the primary server will automatically take over as the system time reference.

The servers, FMUs, workstations, and silent monitors continually use NTP to make sub-second resolution adjustments to their system clocks to keep their time accurate. This is important because the FMU clocks are used to establish time-of-day discount periods for collect calls. The workstations use NTP to set their system time upon booting, and can be expected to say within a few seconds of true time.

The servers and FMUs use the standard UNIX package "tz" for time services. This package fully and automatically handles leap years and time changes due to daylight savings time. The daylight savings time rules are held in time zone files, which can be easily updated when there are statutory changes, and which cover the time rules for all United States locations, including those that do not observe daylight savings time.

The workstations handle time changes internally. The Windows NT operating system manages the daylight savings time rules. When the workstation is initially configured the Date/Time control panel is entered and the current time and time zone are set. The Date/Time Properties window has a check box that if enabled will automatically adjust for local time changes. For locations such as Phoenix, Ariz. that do not honor the time change rules, the check box would not be enabled.

Time of day and date changes can be accomplished without causing interruption to system operations. Accurate time is so very critical to a call processing application doing billing that the ITS-II takes extensive precautions (via the NTP protocol) to prevent the need to make a time or date change while the system is in operation. The ITS-II utilizes the following strategy to prevent billing errors if a time change is made while calls are in progress: The most critical issue is to prevent the change from affecting the duration of a call record. When a call record is created, the ITS-II captures the current system time as the end time, then uses time offsets to compute the start time and answer time. Thus, all of the time fields of a call record will be correct with respect to the new system time, and the duration will be accurate.

The other system components have simpler constraints, but are also designed to work properly after a system time or date change.

The switching control software will reside in the FMU. Many details of switching may be controlled by entries in the Central Operations Facility database or by configuration files. For example, it is a simple matter to configure different out-dialing patterns for various subsets of local exchanges in order to comply with dialing conventions at the LEC. Changes to these values do not interfere with calls in progress, and take effect for all calls initiated after the change is made.

When a completely new requirement appears, the FMU software will be modified, tested, then downloaded by maintenance personnel to the sites over the WAN. In most cases, the new software is installed in such a way that it does not interfere with calls in progress, and will apply to all calls initiated after the software is installed. In rare cases, it may be necessary to schedule an hour of downtime to install new software.

The switching software is designed so that sites can be upgraded individually. This allows for single-site beta testing of new software, and allows for an orderly upgrade process. The degree of difficulty is related to the extent of the changes.

Where practical, the trunks connected to the ITS-II will be configured at the carrier to block incoming calls. However, in case incoming calls are delivered anyway, the FMU has safeguards to prevent connecting an incoming call to an ITS-II telephone. For T-1 and ground start trunks, the FMU uses glare-free trunk seizure protocols, thus preventing an incoming call from being inadvertently answered when starting the out dial portion of a call. For loop start trunks, the FMU takes the trunk out of service whenever ring voltage is present, and it automatically aborts the out dial attempt if no dial tone is detected.

The switching software is fully compatible and functions efficiently with these entities:

*carrier services: see the following paragraph.

*ITS-II computer software and computer-telephony function: The switching software and the software associated with other ITS-II functions (for example, the database and the user interface) have been developed in parallel by one engineering organization, with interfaces tailored to meet completely the needs of each component.

*automated messages function: The switching software, which runs on the FMU, is in direct control of the telephony hardware. Thus, it is able to play messages when necessary with accurate timing.

The FMU has interfaces to T-1 digital trunks, and to ground start and loop start analog trunks. The trunk protocols are configurable for simple seizures or wink start, and digits may be out dialed with DTMF or MF tones, or with rotary pulses. The FMU has been designed to support Primary Rate ISDN as well. This feature allows the BOP to take advantage of advanced network services as the United States Telephone system is enhanced.

The ITS-II software contains lists of local exchanges for each site, along with a list of all international office codes in the NANP. This information, along with the dialed number, is examined by the FMU at the start of a call to choose the appropriate outgoing trunk.

After an inmate has dialed a call, the FMU performs the full range of validity checks outlined in this specification. For example, the account number is verified, the balance is checked, the allow list is enforced, the current time is checked against the schedules, etc. If all of these checks are passed, the switching software computes the maximum allowed talk time based on the balance and other factors, and finally out dials the call. If the maximum time elapses, then the call is automatically cut off.

The status of the call, including the declining balance, may be viewed in real-time using the workstation or monitoring station interface. At the conclusion of the call, a call record is stored in the central database. The new balance is immediately available for any report.

The inmate may dial a special phone number if they have been granted access to the feature, along with a valid PIN to hear a recording stating the balance and the charges for the last call. The call flow chart section shows the details of this feature.

The switching software and the computer-telephony application have been designed together, and the protocol has been tailored specifically for their use. Therefore, no protocol conversions are necessary.

The mechanism connecting the switching software to the computer-telephony application is WAN based on TCP/IP and protected with DES encryption.

Traffic measurement reports will be derived from the call record database at the central server. The ITS-II stores call records for all attempts, even when all trunks are busy, so all of the data needed for accurate traffic measurement is available.

Standard traffic measurement information is available on-line and as a printed report. This report, entitled "Percentage Grade of Blocking Report" is described in the "Specific Reports" section above.

Standard telephone call accounting information is available on-line and as printed reports. Specific reports are described in the "Specific Reports" section above.

Correctional Facility Requirements-Quantity of Station Sets

The system contains sufficient station sets to provide a nation-wide average of 1 station set for every 20 inmates. Some correctional facilities may require more or less than the nation wide average.

Correctional Facility Requirements-Station Set Features

The ITS-II uses Quadrum Telecommunications, Inc. (QTI) model 6Q2 telephones (a trademark of QTI). These telephones:
 are wall mounted,
 are made of heavy gauge steel case (14 GA),
 include a heavy duty metal keypad (armor style with 1/8 inch vandal resistant plate and metal keys,
 include a bonded handset which is connected to common ground path on the case, handset cord, terminal strip, and backplate. The external ground is connected to the terminal strip mounted on the backplate of the telephone.
 are steel reinforced with heavy gauge steel backplates (14 GA) and multiple attaching screw mounting holes integrated into the design. The handset mounting base is welded into the telephone case. The case is a single piece of stamped steel for extra reinforcement.
 include a metal wrapped cord. The cord is stainless steel wrapped with internal lanyard cable designed to withstand eight hundred (800) pounds of pull force.

All of the telephones that will be installed as part of the ITS-II system are dual-tone multi-frequency (DTMF) compatible.

The 6Q2 Inmate Station is not programmable and is what is known in the industry as a "dumb" telephone.

The 6Q2 Inmate Station is not capable of being used to program any feature of the ITS-II system.

The 6Q2 Inmate Station does not have card reader capabilities. The inmate identifies herself by entering a BOP determined access identification number into the telephone when prompted for this number by the ITS-II system.

Each telephone at a correctional institution is provided with a unique number for identification purposes. This number is imprinted on each telephone in such a way as to be readily visible so that the BOP staff can report any problems with the telephone. When a telephone is replaced, or in the case where new telephones are installed at the site, the telephones will be renumbered by maintenance personnel. Information about any new telephones will also be added to the configuration management system and the appropriate records will be updated to reflect the addition.

In addition to the stated requirements, the ITS-II systems provides an option that allows BOP staff or ITS-II maintenance technicians to determine the telephone number of a specific phone. Once this option is enabled at an ITS-II workstation, any inmate telephone will announce its own telephone number after a specific sequence of digits is entered into the telephone keypad. This allow the BOP staff or a technician to determine the telephone number of a unit even after the unit has been defaced.

The 6Q2 Inmate Station includes a confidencer function. This feature is provided in the electronics of the telephones and may be adjusted on the telephone itself.

The 6Q2 Inmate Station includes a volume control, which can be adjusted by the inmate.

The ITS-II workstations allow the BOP staff access to the ITS-II system over the local site network to perform administrative functions. Refer to Section D for a description of the workstation hardware platform.

Each ITS-II workstation has a 15 inch color monitor, a standard-extended keyboard, a 3.5 inch floppy disk drive, a mouse, a dot matrix printer, and an optional sound card. The 3.5 inch disk drive is be used to perform electronic transfer of data to and from removable media.

All of the ITS-II workstations operate independently of each other. Each workstation is independently connected through an intelligent hub to the site FMU, which provides the network connection through the wide area network, to the central server sites. Each workstation operates independently from all other ITS-II workstations.

Call Monitoring

The call monitoring function of the ITS-II has been designed as an integral part of the overall system. The Call Monitoring program that runs on the monitoring stations will provide on-screen information for every active phone line assigned to that monitoring station, as well as the ability to monitor audibly any selected inmate calls.

Each call monitoring station's display indicates the activity of every phone in use assigned to the user logged in to that monitoring station. This display includes the number of active lines plus each telephone identification, recording channel, calling number, city, call duration, cost, and the inmate's register number and name.

The FMU can support well over ten monitoring stations at each correctional facility. Each monitoring station will be capable of monitoring any telephone in operation at that facility.

Call monitoring capability is an integral part of the ITS-II and requires no additional wiring to the ITS-II for the addition of station sets.

Each monitoring station requires local power, an analog phone connection to the FMU plus a data connection to the FMU via two category-3 cable pairs. No additional wiring is required beyond this FMU connection.

The call monitoring stations are fully self contained compact multimedia laptop computers. The model chosen is an HP2000 notebook which contains a sound card with headphones and built-in speakers to provide the BOP with a totally self contained Silent Monitoring station.

Any inmate call in progress can be audibly monitored via, at the user's option, built-in speakers or headphones on the silent monitoring stations. The user may select for audible monitoring any active phone on the line monitor display.

Audible monitoring will be accomplished by tapping into the FMU, in which the audio signal is present in digital form. This will not impact the voice path for the inmate's call. The transmit side of the digital connection is completely isolated from the receive side.

The audio sampling will be accomplished digitally within the FMU and so will not affect voice signal quality or voice transmission levels or cause external background interference. Therefore, it will be undetectable to either party in the call.

A BOP staff member can select using the cursor any active phone line on a monitoring station's on-screen display and thereby can easily access the voice path for that call.

Silent monitoring station on-screen displays show in real time every active phone line assigned to that monitoring station. Calls placed by inmates to alerted numbers and/or from alerted accounts will cause a beeping alarm on the monitoring station to notify the BOP staff of the call in progress, and the phone line involved will be highlighted on the monitoring station's display.

The FMU displays the status of a call less than one second after the first possible detection of a call in process by the remote telephone equipment.

The display screen shows the number of active lines. Even if a new call does not fit on the screen, the active line counter on the screen will be incremented showing there is an additional call and the alert beeper will be activated immediately if necessary.

The main call monitoring display shows a one line summary for each call in progress. This summary includes the register number, name of inmate, telephone number called, identification of telephone, duration of call, recorder channel number, and cost.

The user may select a call using the cursor or mouse, then request a detail screen. In addition to the information above, this screen also displays the location of the telephone, the start time of the call, an indication of when the call will be terminated and why (e.g. system time limit or available balance), the cost per minute for the call, and the real-time account balance.

If the alternate feature, Video Display of Inmate described in the section entitled "Miscellaneous Features", below, is enabled, the details screen will also display the inmate's picture.

Call Monitoring-Equipment Requirements

The call monitoring stations are fully self contained compact multimedia laptop computers. The model chosen is an HP2000 notebook which contains a sound card with headphones and built-in speakers to provide the BOP with a totally self contained Silent Monitoring station. No additional equipment such as external speakers or detached keyboard or mouse is required.

The call monitoring stations will be connected to the FMUs via category-3 cable using RS232 protocol and short-haul modems as necessary. This will allow operation of monitoring stations at distances greater than two miles from the station set being monitored. Monitoring stations that are within the 10Baset distance limitations of the LAN will utilize the LAN for connectivity.

The ITS-II is designed to support well over ten monitoring stations at a correctional facility. The call monitoring stations will be compact multimedia laptop computers with headphones as well as built-in speakers.

Each call monitoring system will be connected to the FMU and will be able to monitor any telephone in operation at the correctional facility served by that FMU.

BOP Central Office Requirements

An ITS-II workstation is located at the BOP Central Office to oversee administrative system wide operations and service.

The ITS-II provides a group of features that enables the Central Office staff to operate the workstation as though it were located at a specific site of their choosing. The ITS-II also allows the BOP staff to pre-create groups of sites; for example, the Central Office staff could create a group of sites for a specific geographic region, by institution mission or type of institution, by time zone, or by any other grouping category. These groups are then accessible through a number of different graphical user interface windows. Groups are created through the Facilities tab on the System Information maintenance window. These groups can be used in queries and reports as well.

For ad hoc reports and queries, and ITS-II administrative operations, the system allows the BOP Central Office staff to select whatever site or sites they want during the facility entry part of the window they are working on. If the BOP staff wanted to create a report of inmates who had been transferred during the last month from institutions on the West Coast, they would enter the report generation screen, select the sites on the West Coast, define the time frame for the previous month, and choose the transferred flag. This would enable the staff member to generate a multi-site report. The same mechanism for facility selection applies to the Inmate Information window.

The ITS-II allows the BOP to compile data on inmate use of the system, reconcile financial activities, facilitate training of BOP staff on ITS-II operation and capabilities, and perform system tests. The Central Office administrative workstation(s) provides the capability for site selection by a single site, a group of sites, a bunch of groups of sites, or all sites.

The ITS-II provides the BOP Central Office staff with the ability to remotely call into the system. The remote access to the ITS-II will be conducted through PC laptops or standard PCS. The BOP staff laptops or PCS have to run Windows NT, Windows 95 or a later compatible version of the Windows environment to take full advantage of all ITS-II graphical user interface features. The workstations contain all the necessary ITS-II client software required for remote access. This includes the ITS-II application software, the encryption software, and remote dial-in software. Remote access will be supported through the PPP communications protocol. The ITS-II dial-in modems support 56 Kbs data transmission.

In addition, the ITS-II can limit BOP remote staff access to dial-in access via FTS-2000 credit card access only. This limited access will increase access security to the system. A dial-back only service can also be incorporated, to achieve a higher level of remote access security.

The Oracle RDBMS is designed to support specialized partitioning of the data bases. Partitioning of the BOP Central Office system and the BOP MSTC system from the rest of the sites is supported through the Oracle RDBMS partitioning system. The BOP Central Office system and the BOP MSTC system can be grouped together as though they were two independent facilities in a fictitious Bureau Wide System. Inmate transfers, monetary transfers, call records and other ITS-II relevant transactions and activities can be performed as though they were two actual sites. However, data will be totally separate from actual BOP sites.

Testing, report generation, account reconciliation, query generation, and virtually all other activities can be performed on the two fictitious sites.

The ITS-II interfaces with the BOP Central Office Windows 95 operating environment and workstations.

The ITS-II supports the BOP's requirement for 23 workstations at the BOP Central Office.

The ITS-II provides the BOP Central Office staff access to the ITS-II E-mail system. Central Office PCS, as well as ITS-II workstations, operate with the ITS-II E-mail system. The ITS-II E-mail system provides each workstation with the capability to correspond with individual correctional facility staff, BOP defined user groups, appropriate user access levels and specific terminals. The E-mail system also supports electronic notification when mail arrives for the workstation. The ITS-II system installed at the BOP Central Office facility contains the same hardware, software and services installed at a typical BOP correctional facility. Local lines for collect and debit calls are installed as well as a T1 to the PCOF network.

Management and Specialty Training Center

A complete system that is comparable to an actual BOP facility is installed at the MSTC. This system is to be used for BOP staff training only.

The MSTC location will be configured to support 35 workstations. The MSTC is configured with the standard ITS-II client application software running at the correctional facilities.

The ITS-II can configured to accept the same keystrokes for the same functions from all workstations simultaneously. The ITS-II will also support simultaneous printing by all PCs. The ITS-II client application utilizes the Windows 95 and/or Windows NT operating environment.

The ITS-II system is designed to support multiple simultaneous logons of the same user types. The ITS-II will also allow multiple logons of the same user name and password, where this option is selected in the Oracle profile.

The MSTC location has a function that will completely refresh the ITS-II MSTC database and set it back to a state for new classes.

The ITS-II system installed at the BOP MSTC facility contains the same hardware, software and services installed at a typical BOP correctional facility. Local lines for collect and debit calls are installed as well as a T1 to a common telephone carrier's network. Similarly, FTS-2000 T1 facility and appropriate number of WAN circuits are also installed.

The Oracle RDBMS is designed to support specialized partitioning of the database. Partitioning of the BOP Central Office system and the BOP MSTC system from the rest of the sites is supported through the Oracle RDBMS partitioning system. The BOP Central Office system and the BOP MSTC system can be grouped together as though they were two independent facilities in a fictitious Bureau-wide System. Inmate transfers, monetary transfers, call records and other ITS-II relevant transactions and activities can be performed as though they were two actual sites; however, data will be totally separate from actual: BOP sites. Training, report generation, account reconciliation, query generation, and virtually all other activities can be performed on the two fictitious sites.

Central Operations Facility (COF)

The ITS-II includes two Central Operations Facilities (COF). Each COF will contain servers and central database for the operation of the ITS-II system. Central inmate and call record data will be stored at each COF. Section D of the specification provides additional detail on the equipment at the primary and backup facilities.

Maintenance Requirements

The ITS-II system is designed in such a way as to require no on-site support under normal operating conditions after the initial installation. This is accomplished through the use of our hardware and network design which eliminates single point of failure components and through the availability of our remote diagnostic and tuning capabilities. For a more detailed discussion of the ITS-II program to maximize up-time, please refer to the section entitled "Miscellaneous Features", below.

Onsite Administrator

The ITS-II System has been designed to not require an on-site administrator for any reason. The only access to the correctional facilities that will be necessary will be that access needed to repair or upgrade existing services and equipment. Because the ITS-II system is designed to eliminate single point of failure components and includes remote diagnostic and tuning capabilities, the need for on-site repair of services is minimized.

In general, the ITS-II System is designed with state-of-the-art, solid-state electronic components that do not require routine or preventative maintenance.

The only preventive maintenance that will be required will be the replacement of batteries in the FMU and the replacement of fan filters in the FMU. The batteries are expected to require replacement at every site every four years.

System analysis

The ITS-II incorporates a large number of remote and local diagnostic tools:

to monitor telephone line connectivity at the sites, to monitor the ambient temperature of the systems, to monitor the status of the power supply and UPS battery condition, to do multiple independent computation of inmate balances to detect call processing problems, to use Intelligent Hub technology to monitor network characteristics and verify connectivity to the individual site work stations, to monitor the inmate telephone sets, to verify communication paths for all internal cross-points in the FMU, etc.

Technicians also have access to event log files on the servers and on the FMUs, allowing them to trace a problem to the point at which it first started to occur. This ability provides helpful information that is used to shorten the required corrective action.

The ITS-II is able to remotely turn on a LED display light on a failed board so that, when a technician arrives at the site, the failed board can quickly and accurately be replaced.

Spare Parts

Because the ITS-II system is designed with state-of-the-art, solid-state electronic components that are highly reliable, and further, because the hardware design provides redundant components to eliminate single point of failure elements, it is anticipated that the need for spare parts will be minimal. Nevertheless, maintenance personnel have strategically located spare components available in order to provide the BOP with the Service Level ordered. Furthermore, when there are spare slots available in the FMU rack, the space will be used to store spare boards so that local technicians have parts immediately available at the site.

Maintenance Operations Control Center

A Maintenance Operations Control Center ("ITS-II MOCC") provides technical support and maintenance services for the ITS-II system. This ITS-MOCC is the single focal point for all trouble reporting and resolution. It is equipped with (1) trained technicians, (2) access to the ITS-II trouble tracking system to assist in monitoring and resolving problems, (3) all technical and operational documentation regarding the ITS-II program, (4) direct access to the hardware and software engineers who designed the ITS-II system, (5) access to locally contracted support technicians, and (6) access to the computer and communications equipment to be used to monitor the ITS-II systems at the correctional facilities.

The remote monitoring and diagnostic capabilities of the ITS-II system minimize the amount of monitoring needing to be done by the BOP staff by giving the ITS-MOCC staff the tools to discover problems before they are reported by the correctional facilities.

This is accomplished by setting up automatic, periodic processes of communications between the ITS-MOCC, the centralized servers, and the correctional institutions. These communication processes monitor various aspects of the system and generate alarms when defined thresholds are reached. The various alarms generated by the monitoring tools are delivered to the ITS-MOCC's technicians via alarm messages that automatically appear on monitoring screens and a via automatic pages that are sent directly to the technicians, no matter where they are located at the moment.

These tools allow the ITS-MOCC technicians to monitor various memory, disk space, and database conditions on the central servers, remote workstations, and the call handling process on the FMU at each of the correctional facilities. The ITS-II is capable of remotely monitoring whether each individual inmate telephone is physically connected to the system and is capable of simulating an individual inmate telephone going off hook in order to remotely monitor: the network. Finally, the network management tool monitors the communications links and equipment, system wide, creating an alarm fault when there is a problem or degradation in service. These tools can also be tuned in various ways to different levels to allow the ITS-MOCC technicians to monitor specific conditions more or less closely, as issues require.

The PCOF will also serve as a secondary (backup) ITS-MOCC, in the event that the primary ITS-MOCC becomes unavailable due to a disaster of some kind.

General Requirements-Quality Assurance

The ITS-II consists of primarily commercially manufactured hardware and software that has been integrated with special manufactured software and hardware (the FMU). Because the resulting system operates over a telecommunications network, the ITS-II also integrates network components such as routers and circuits.

The ITS-II is designed to run on or in conjunction with certain commercial off the shelf (COTS) products that are designed, manufactured, and produced by major computer and telecommunications manufacturers. For example, the central database servers are model 8200 ALPHA servers manufactured by Digital Equipment Corporation. The COTS products used in the design of the ITS-II system are chosen for their high quality and reliability.

Because COTS products are widely sold and used throughout the industry, there is a large audience of customers that report problems back to the manufacturer. In all cases these manufacturers put their products through a continuous process of correcting problems that are reported and releasing upgrades to correct problems, improve performance, and add functionality as demanded by the marketplace.

C.6.5 Configuration Management

A. Software Configuration Information:

All hardware will be inventoried prior to its installation anywhere in the ITS-II system. For each major "unit" of hardware, such as a FMU, a server, a work station, etc., an "as built" bill of materials will be created at the level at which the item will be maintained. That is, if the unit will be maintained at the board level, all boards will be inventoried and this information will be maintained in the configuration database.

All major sub-components of the FMUs contain electronic serial numbers for use in remotely tracking board level FMU components. The components tracked include station cards, CO cards, T1 cards, CPU cards, DSP resource cards. PC workstations and silent monitoring workstations can also be remotely tracked.

B. Software Configuration Information:

The ITS-II software is a large body of software code that is built from individual programs and data files, for example, the rate center files. The inventor uses a special application called CVS (Concurrent Version System) to maintain an audit trail of all changes and updates to these individual programs and data files. As each software engineer makes upgrades to a software module the CVS system is used to manage the upgrades so that the most recent copy can be identified or a decision can be made to go back to a previous version.

The configuration information maintained for each program and file will at a minimum include the following information: the name of the file, a copy of the file, the version number, the date of this version, and the changes that were applied to this file to create this version from the last version of the program or file.

C. Firmware Configuration Information:

Because firmware is specially programmed hardware, the configuration information maintained regarding ITS-II firmware will include the same information as maintained for both hardware and software, as described previously in paragraphs A and B. The revision information for all FMU firmware can be verified remotely.

D. Circuit Configuration Information:

The configuration management system will contain all relevant network configuration information. The information maintained includes a host name to IP address cross reference table, a cross reference table for each site that details the location within the institution of each inmate telephone, how that telephone circuit is cross-connected to the FMU and a recording circuit. For the workstations and tower monitoring devices, there will be a correlation chart that records to which port in the hub each is connected. For the wide are network, all circuit identifiers will be maintained for all circuits from the sites to the primary and remote central ITS-II servers, as well as the circuit between the two servers.

The appropriate configuration management data will be updated when ever the hardware, software, firmware or circuit information changes. The BOP will be notified of all changes made to the configuration of the ITS-II system.

The ITS-II system includes an automated auditing function. This audit function runs periodically to verify that the configuration information stored in the Configuration Management System is consistent with what is in the field. Any deviation detected during the automated auditing process, is logged, investigated, and resolved by the personnel overseeing the configuration management of the systems.

Year 2000 Compatibility

Before selection for incorporation into the ITS-II system, the selected software and hardware components which comprise the ITS-II have been carefully evaluated for year 2000 compatibility. The evaluation included three major requirements for hardware/software combination: (1) the ability to generate, retain, and manipulate data generated in multiple geographic time zones by the system prior to the year 2000; (2) the ability to assign dates and times within multiple geographic time zones to data generated by the ITS-II after Jan. 1, 2000; and, (3) to be able to uniformly combine and process data which has been generated before and after the year 2000 for billing, queries, and reports.

Miscellaneous Features

Miscellaneous Features—Maximum Uptime Management System (MUMS)

The inventor's design and support strategy and program called MUMS (Maximum Uptime Management System) influenced all aspects of the design.

Maximum system uptime is achieved by maximizing reliability and maintainability. The MUMS approach strives to design the most reliable system possible using state-of-the-art technology. Generally, no matter how reliable a system, parts can still fail. For that reason, the MUMS approach also builds self-diagnostic capabilities into the design of its systems. These features have been incorporated early in the ITS-II design rather than waiting to add them later.

The MUMS approach, highlighted briefly below, encompasses all MUMS factors contributing to system uptime. These include:

Hardware Design; Software Design; LAN Design; WAN Design; Telephone Network Implementation; Trouble Tracking, Diagnostic and Repair Procedures and Methodologies; Spares Planning; and Technician Dispatch.

1. An overview of some of the major system components listed above is provided below.

Hardware Design

The FMU (Facilities Management Unit), a Central Office-quality telephone switching system, is designed under the MUMS approach and with the BOP's requirements in mind. The design for the FMU exceeds the design standards for commercial PC and telephony systems, and incorporates the following reliability elements, under MUMS:

Gas Tube-based telephone line interface protection (minimizes detrimental effects of lightening).
PTC self-resetting fuses (avoids manual fuse replacement in the event of surges).
Dual independent CPUs
Dual independent Hard Disks
Telephony Cards are provided in 6-line increments. Smaller size line cards minimize the impact of a card failure.
Dual redundant power supplies.
Un-interruptible Power Supply (UPS) provides 2 hours battery backup
Internal UPS used to filter AC power line transients (reduces power surge problems)
The system runs on continually charged AC batteries, in the same manner as a telephone company Central Office.
Integrated component design (reduces number of separate components and separate failure points) For example, the FMU integrates router technology which creates fewer separate parts and failures and reduced number of FTS2000 WAN circuits and related points of failure.
Error correcting memory to eliminate parity errors.

The design for the FMU incorporates the following maintainability elements, under MUMS:

Hot swappable telephony and computer boards (avoids taking system down to replace circuit boards).
Automatic monitoring of telephone line connectivity (reports to central monitoring facility immediately).
System fan airflow measurements and alarm reporting to predict high temperatures (high temperatures decrease product's life).
Power supply and battery condition monitoring and alarm reporting (detects slow degradation).
Spare part storage within the FMU (avoids delays waiting for replacement parts).

Software Design

The design and review of the ITS-II software and software architecture is also based on the MUMS philosophy and on the following two critical requirements:

1) No inmate data can ever be lost.
2) Two independent methods of calculating inmate balances are necessary.

Some specific software reliability design features supporting MUMS goals are summarized below:

Data storage reliability—Rather than simply using mirrored disks and tape backups, identical inmate data is stored in 6 independent systems. This design assures that even in the event of two simultaneous and unrelated failures, the system would have multiple on-line and off-line storage. While this level of redundancy may seem excessive, an analysis of past experience concluded that under no circumstances could transactions be lost, so this approach is warranted. These six systems are:
1. on the FMU (data stored for over 30 days)
2. Primary Server 1 (RAID protected, stored indefinitely)
3. Remote Secondary Server 2 (RAID protected, stored indefinitely)
4. Three (3) DLT tape backup systems for the above servers (stored indefinitely)

Multi-Independent Balance Computation System (MIBCS)—This design has the ITS-II performing two entirely separate balance computations for all inmate calls and transactions. This design concept for MIBCS came from a NASA design where multiple computers monitor identical tasks and if there is a difference in their comparisons, an error condition is logged for investigation. The MIBCS implementation in the ITS-II is as follows:

1. The FMU performs a balance calculation for every call, using internally stored data
2. The completed call record is stored in the Oracle RDBMS on the servers.

3. A balance calculation is performed from data stored in the server and compared against the FMU calculation done in step 1.
4. If the results are equal, the system continues to process call records for the account.
5. If the results differ, then an error log entry is made for investigation by technicians.

The MIBCS therefore provides an element of both reliability and maintainability. It provides a critical "early warning" auditing function which will immediately identify (on the next call), any discrepancy in the inmate accounts. This MIBCS "early warning" will catch any database level tampering with inmate account balances. This is similar to the continuous auditing functions that exist in the banking industry.

LAN Design

Highly reliable LAN connectivity to the FMU is achieved by using 10BaseT Ethernet connectivity rather than lower cost coax. This technology will prevent any workstation wiring faults from taking down the entire LAN.

For maintainability, the ITS-II Ethernet design incorporates Smart Hub technology to achieve the highest level of remote diagnostic capabilities. The smart hubs also allow the ITS-II network management software to verify connectivity all the way to the individual workstations and FPPOS server.

WAN Design

The ITS-II reliable Wide Area Network Design incorporates the MUMS philosophy as highlighted by the following strategies:
   The Primary Central Operations Facility is equipped with a bank of 24 dial-up modems to provide backup dial-in capability for the data circuits to each site.
   If a FTS2000 dedicated data circuit fails for any reason, an alternate backup dial-in circuit is available from a telephone service provider.
   A dedicated FTS2000 point-to-point data circuit from each BOP site to both the primary and remote secondary Central Operations Facility create a truly fault tolerant WAN.

These measures create the truly fault tolerant ITS-II WAN design necessary to deliver the required ITS-II uptime performance.

The choice of HP OPENVIEW as the network management system, and smart hub technology will enable the controller to immediately pinpoint problems as well as perform data transmission analysis down to the individual workstation level.

2. Trouble Tracking, Diagnostic and Repair Procedures and Methodologies

The application of the MUMS philosophy to the trouble tracking, diagnostic and repair procedures for the ITS-II system has resulted in several new concepts. These ideas can be categorized as proactive and reactive abilities.

The proactive approach focuses on improvements to detect problems before they occur and is based on a detailed analysis of years of trouble tickets generated from current customers, including the BOP. These proactive tools improve our ability to monitor and report problems:
   Proactive Monitoring:
   Continuous fan airflow is monitored (as a predictor of remote ambient temperatures) through the FMU at each site and an alarm is sent to the ITS-MOCC when the danger threshold is reached.
   AC input power to the FMU is monitored to allow The controller to notify the correctional institution to a potential problem.
   A speaker in the FMU provides warning announcements to personnel in the ITS-II room when, for example, the AC power has been removed from the FMU.
   Circuitry in the telephony circuit boards instantly detect telephone set or internal BOP wiring problems.
   Automated auditing and reporting of each site's software and hardware configuration is sent to the ITS-MOCC to verify that the software and hardware at each site is at the appropriate revision level.
Proactive Reporting:
   A single monitoring and trouble tracking system is shared for tracking manually and automatically opened trouble tickets. This system is accessible by both organizations for all ITS-II locations.
   The ability to automatically open a trouble ticket incident report if a system malfunction is detected by the automatic network monitoring application, allows The controller to resolve problems quickly. Often, problems can be corrected before they become apparent to the correctional institution.

The reactive aspects of the MUMS strategy focuses on the process used when a problem is first discovered. The ITS-II includes a Remote Trouble Diagnostic and Trouble Identification System in place for hardware, enabling a technician to remotely diagnose problems from the highest level in the system down to the level of the individual telephone. The process works as follows:
1. A problem is automatically detected by the system.
2. An alarm is sent to the ITS-MOCC.
3. Further diagnosis pinpoints the source of the problem.
4. Problems that can be corrected remotely are handled immediately.
5. If the problem cannot be repaired remotely, as is the case with on-site hardware problems, a fault light on the remote FMU is activated. This enables a field service repair technician to immediately identify which module needs replacing without additional diagnosis.
6. When the field technician reaches the site, the FMU panel is opened and the card with the LED fault light activated is replaced. The spare parts built into the FMU avoid delays in waiting for replacement parts.

In most cases the fault can be located remotely to the board or telephone level. This minimizes the amount of time the field technician spends diagnosing the problem and calling for instructions and assistance, because the problem is diagnosed while the field service repair person is en route to the site.

Carrier Bypass Elimination Feature

Some carriers are currently offering bypass service to BOP inmates and their families. One company offering this service has run national advertisements informing inmates and their families and friends of a means to obtain less expensive phone rates than that offered by the BOP. This poses a problem to the BOP for ITS-II security as well as a potential loss in revenue.

The bypass works as follows. The carrier has the recipient of the inmate call order phone service that is local to the institution where the inmate is incarcerated. The carrier then has the recipient order call forwarding on the new local line. The local line then gets forwarded to the recipient's actual number. The inmate requests that the new local number be added to their allow list. Once the number is added, the inmate calls the local number, gets billed for a local call, and the call gets forwarded over the carrier network instead of the BOP's FTS2000 network. The called party pays for the transmission from the local number to their own phone. Current rates being offered are as low as $0.09 a minute.

This bypass poses a significant threat to the BOP. As word spreads throughout the inmate population about this service, the entire BOP telephone billing system is in jeopardy.

The ITS-II Solution is as follows:

The methodology described below will prevent this type of call forwarding, and is the subject of copending application Ser. No. 08/726,217, filed Oct. 4, 1996, entitled COMPUTER-BASED METHOD AND APPARATUS FOR CONTROLLING, MONITORING, RECORDING, AND REPORTING TELEPHONE ACCESS.

The first time a call is made to this local number and the call is answered, an automated messaging system provides the called party with a PIN and an 800 number to call to verify that the called party wants to receive calls from this inmate. When the called party dials the 800 number their phone number is electronically forwarded to the 800 number. The calling party is asked to enter their phone number and the PIN. All three numbers are checked for consistency. If the PIN, electronically transmitted number, and the manually entered number don't match the calling party is informed of the mismatch and asked to try again. If the calling party fails to enter the number combination three times in a row, they are informed of the failure and a log is made in the ITS-II of the failed attempt. The inmate is informed of this failure the next time they attempt to call this number.

The Bypass feature can be enabled and disabled through the ITS-II graphical user interface. Automated reporting and real time notification of this feature can also be enabled or disabled through the ITS-II graphical user interface.

Alert Recording System (ARS)

The ITS-II includes an integrated Alert Recording System which the inventor estimates can save the Bureau an estimated several thousand man hours a year of loading and listening to tapes. The Facility Management Unit (FMU) contains in excess of 400 hours of digital voice recording capability. The FMU also features a digital recording buffer that is continuously updated during the call. This buffer always contains the last 10 seconds of every call as the call is in progress.

When certain fraud detection events occur such as extra dialed digit detection, 3-way call detection, and/or suspicious dialing, the system can begin recording the last 10 seconds in the buffer and the rest of the call from the point of the event detection. The conversation of this call is stored digitally on the internal hard drives of the system. BOP staff who want to listen to these calls simply bring up the ARS graphical user interface, select the ARS call, and can playback the call through their workstation. Both a head set for private listening and a built in speaker in the workstation for listening are provided. ARS can be configured to support remote operation as well. If the BOP wants to centrally or remotely review ARS calls, they would simply perform the same operations as a user at a site.

ARS can also be configured to record all alert calls as well. ARS reporting, real time notification and enabling or disabling by feature can be controlled through the ITS-II graphical user interface.

ARS features an automatic deletion feature to make room for the new calls being recorded. The oldest calls are automatically deleted from the system. The ARS system has an adjustable storage allocation size for the storage of alert calls and for the first and last 10 seconds of every call feature. If the BOP wants to record more of one type of call versus another type the adjustable storage allocation size can be set appropriately.

ARS will record up to 10 simultaneous conversations per FMU.

Prisoner Video Image Integration into ITS-II Files (Digital Image Capture and Display of Inmates)

In addition to the BOP stated requirements, the ITS-II has the capability of displaying previously captured digital images. This feature assists in verification of the inmate.

If the BOP has electronic systems in place that are already capturing digital pictures of inmates, the BOP could electronically transfer those images to the ITS-II along with the inmate register number. As an alternative, a one digital camera, tripod, a workstation equipped with a digital image download card, and other necessary hardware and software could be provided to capture and load the image into the ITS-II.

Once the image is captured by the ITS-II, it will be available for display in the Calls In Progress Display and several ITS-II Inmate Information screens, as determined by the BOP.

GOTU™

GOTU™ is an integrated feature of the ITS-II. Its purpose is to enable a party who has been called and harassed by a prison inmate to prevent that inmate from calling them a subsequent time without requiring the manual intervention of corrections officers or administrative staff.

Conceptually, there are two events which must take place for this feature to work: first, the general public (called party) must be informed that the capability exists and must be provided with the knowledge of how to use the capability. Secondly, when called by an inmate, the party must perform the action of entering the required digits into their telephone keypad to the ITS-II not to allow a call to that number to be completed again.

Once the called party enters the digits (GOTU™ or 4688, or any other predetermined digits) into their telephone, the ITS-II will associate the party's number with the pre-approved phone number and specific inmate telephone account from which the call originated.

With the account and pre-approved phone number identified, the system will disable (block) the (pre-approved) number from being called again from within that inmate's account. The called number may be the pre-approved number of the harassed party (wife, husband, friend, etc.). Or, the inmate may dial a pre-approved number and have the responding party forward the call to a second (not pre-approved) party whose number is not listed in the inmate's account and harass the second party (described as three-way calling). In either case, ITS-II will block the pre-approved number to which, or through which the call was made from receiving further calls.

In addition to identifying and blocking the pre-approved number within the inmate's telephone account, the system will also label the (now) blocked number with a dated code that will indicate to investigative staff that the number was blocked by the destination party's action.

Once the GOTU™ digits have been entered by the destination party, ITS-II will not permit the inmate from accessing the (blocked and labeled) pre-approved number from within the inmate's account until such blocking of the number is removed. Removal of the blocked number requires BOP administrative staff access the inmate's account and change the appropriate field via the Graphical User Interface.

Stop All Digits (SAD)

Because of the unique digital implementation of the Facilities Management Unit, which includes digital signal processors located on the modular cards, the ITS-II is able to completely eliminate all DTMF tones which an inmate may attempt to dial. This feature is accomplished by the DSP on the Hex Analog Station Card via a digital signal processing filtering algorithm.

Additional Interfaces

Because of the open architecture ST-BUS around which the FMU is designed and because of the ports available at the FMU, additional interfaces can easily be added for many purposes.

One useful interface might be a fiber optic interface. A "Fiber Optic Interface Card" could be added to the system, which would connect the calls on the fiber optic cable onto the ST-BUS in a manner similar to that used in the T1/E1 Interface Card.

Another interface might be added to integrate a cellular or PCS scanner within the system, so as to determine (1) whether wireless telephone calls are being made from within the facility and (2) whether the calls are permitted calls or non-permitted calls. Alternatively, the FMU architecture would support the addition of a modular card specifically designed to interface wireless calls to the FMU calling system. Naturally, these options would require the addition of supporting equipment, such as antennae, amplifiers, and perhaps even an interface to the local cellular network; however, cellular calls which are not permitted by the institutional authorities might be reduced or eliminated in this way.

Section D. Suggested Equipment for use With the Present Invention

D.0 Disclaimer

While the equipment of the preferred embodiment of the invention is here described, such embodiment is merely exemplary and is not intended to be limiting or represent an exhaustive enumeration of all aspects of the invention. The scope of the invention, therefore, shall be defined solely by the claims below.

D.1 General Description of Equipment

The ITS-II is configured to provide system-wide simultaneous inmate telephone and administrative services in real time operation to all correctional facilities indicated by the BOP. The ITS-II system has been carefully designed. The equipment and configurations at the Central Operations Facilities and at the individual site locations provide a well planned and integrated series of subsystems that will work together in a unified manner to provide the most optimum system performance and reliability that will support the Bureau's technical and performance requirements.

The Central Operations Facilities:

The system incorporates two geographically-dispersed Central Operations Facilities which together contain the system's database management, mail, and network management servers for all 100+ corrections facilities. The two database management servers are connected to the correction facilities via the Bureau's WAN. The Primary Central Operations Facility also contains the mail server and one of the two network management servers. The combination of the two Central Operations Facilities provide fault-tolerant overall system operation for the central inmate account information and the call record database. A network management server at each of these locations provides fault-tolerant operation for the network management system.

Located at each of two Central Operations Facilities and central to operation of the entire ITS-II system, is an arrangement of five servers. Two of the servers maintain their own copy of system-wide inmate information and call records database and operate simultaneously. The database server at the Primary Central Operations Facility functions as the primary server while the database server at the backup Central Operations Facility functions as the backup server. Replication software automatically maintains a copy of data at the two server locations. The two servers are in continuous operation, each server maintaining a current version of the entire inmate and call record database as a backup to the other. In the event that either of the servers fail, the remaining server will continue full database management operation for the ITS-II system-wide until service to the other server is restored.

These servers are manufactured by Digital Equipment Corporation and have been carefully evaluated for long-term sustainable performance and scaleability to accommodate system expansion. Each server has a high level of redundancy incorporated into its design. Each server will maintain its own copy of the up-to-the-minute centralized system-wide inmate database and call records. The database for each server has a minimum storage of one year's inmate information and call records, and will be stored on a Redundant Array of Independent Disks. RAID storage technology is typically used where critical data (e.g., financial, banking, etc.) must be securely maintained and be retrievable in the event of a disk failure.

Additional database protection is provided by large-scale backup tapes for each server. The database management server at the PCOF has two large-capacity Digital Linear Tape drives, one to perform database backups, and the other to archive 7 years of data for immediate on-line access. The ALPHA server at the backup location also has a Digital Linear Tape drive to archive continuous daily/weekly backups.

To ensure high throughput in system performance, particularly for speed in query and report generation, both servers have been configured for sufficient I/O capacity to handle the level of transactions and demands imposed by the entire ITS-II.

A third server provides e-mail service and operates independently of the call processing hardware and software of the ITS-II. Its purpose is to provide the Bureau with an efficient means of inter- and intra-site, on-line, workstation-to-workstation communication. While the server is located at the Primary Central Operations Facility, the e-mail network links all correctional facilities, the MSTC, and the Bureau's Central Office in Washington. The capacity of the mail system will be sized to the projected number of BOP user accounts.

A fourth and fifth server provide network management capability; one is located at each of the two Central Operations Facilities. The network management system is responsible for monitoring the operational aspects of each node on the network and its associated components. Information concerning network performance is monitored at both the Primary Operations Facility and at the maintenance support center so that problems associated with the network can be rapidly identified and remedied by the technical support organization. The Bureau has access to network status data via the PC workstations.

While the servers are protected by surge and UPS protection, a backup generator will be provided at the PCOF to power all of the ITS-II equipment at this site in the event of a utility power failure to the facility. In the event of such a failure, the UPS will provide sufficient power duration until the generator's transfer switch can automatically start the generator. Once in operation, the generator can essentially provide continued power until the utility service is restored to the facility.

Each Correctional Facility:

Each correctional facility will be connected to the system's data network via the WAN, while voice communications will be provided at each facility by T-1 connections to the FTS as well as to the local telephone service provider's network and LEC service. The ITS-II architecture has been designed to be fault tolerant for all critical points of operation. Fault tolerant here is defined to mean that in the event of a server or network failure, the ITS-II will continue system operation without interruption or significant degradation in performance.

Each BOP correctional facility will be equipped with one or more Facility Management Units (FMUs) which serve as the site-based call processing controller and local inmate information storage manager. In addition to providing call processing, FMUs provide multiple T-1 interfaces to the WAN, FTS and local telephone service provider's network, and local service lines (an alternate method can be provided by an external CSU/DSU;) local call control, data storage, local audio recording and monitoring capability, an interface through the intelligent hub to the administrative and FPPOS workstations, to AIMS, the remote audio monitoring stations, and to the inmate phones. The FMUs have been designed to be fault resistant, and incorporate redundant components which will automatically be switched into service in the event of a primary component failure. FMUs store a minimum of 30 days of call data records for rapid access and retrieval by site Bureau personnel in the event of a problem with the WAN or central servers. Each FMU has its own battery UPS incorporated into its design.

In addition to the FMU, each site has the requisite number of inmate telephones, a backup modem, administrative workstations and printers, a dot matrix printer, audio monitoring equipment, line surge protection, and an intelligent hub. An intelligent hub that provides full Simple Network Management Protocol (SNMP) was selected to enable viewing and managing hub-level and port-level security level features, intruder prevention, auto port disabling, network management alarm, eavesdrop protection, assigned port access, and password protection. The intelligent hub is fully compatible with the Hewlett-Packard: OPENVIEW network management and monitoring platform.

At the Bureau's Central Office:

The Bureau's central office will be equipped with an ITS-II system that will allow Bureau personnel to operate the ITS as they would at any one of the correctional facilities. Equipment will consist of inmate telephones, administrative workstations, an FMU, e-mail, system software, silent monitoring station, printer, and interface with individual BOP correctional facilities. While the ITS-II will be provided with workstations, it will also interface with the Bureau's existing PCS running on a Microsoft Windows environment. The Central Office equipment will also be able to exchange data with the Bureau's FPPOS and AIMS systems.

At the MSTC:

The MSTC will be equipped with a full ITS-II system capability that will allow Bureau personnel to operate the ITS as they would at any one of the correctional facilities for the purpose of instructing ITS trainees. Equipment will consist of inmate telephones, an FMU, system software, silent monitoring stations, printers, and interface with individual BOP correctional facilities. Trainees will be able to utilize all workstations simultaneously.

D.2 Hardware

The following equipment constitutes suggested components of the ITS-II for both of the Central Operations Facilities, each correctional facility, the network interfaces, and the training center.

Equipment at the Central Operations Facilities:

Database Management Servers

Primary Interface: The database management server at each of the two Central Operations Facilities will communicate with each other through a router over a T-1 facility. Servers will communicate with each correctional facility via the WAN's 56 kb lines. Emergency backup will be via modem pool.

Manufacturer: Digital Equipment Corporation

Model Number: 8200

Processors: 4–440 MHz CPU

RAM: 1616

Operating System: Digital UNIX

Disk Storage Capacity: In excess of 1-yr on-line storage capacity using 300 usable Gigabytes per server with RAID architecture.

Digital Linear Tape Drives

DLT tape drives provide large-scale data storage to the database management servers.

Manufacturer: Digital Equipment Corporation

Model Number: TL812 (A trademark of Digital Equipment Corporation)

Storage Capacity: 1.94 Terabytes

Network Manager Server

Interface: The Network Management Servers interface with the facility router to the all nodes on the WAN, through the WAN to the FMUs, intelligent hubs, and each component at each facility. Monitoring stations will be at the Bureau's Central Office facility in Washington, and at the BOP technical support facilities.

Manufacturer: Hewlett-Packard

Model Number: HP 9000-D270 (A trademark of Hewlett-Packard)

Processors: single CPU, 64-bit.

Operating System: HP-UNIX (A trademark of Hewlett-Packard)

Network Management Software: HP OPENVIEW

RAM: 128 MB with Error Correcting Code

Disk Storage Capacity: 4 Gigabytes

Mail Server

Interface: Connectivity through the Network Management server and system and router at the Primary Central Operations Facility to each correctional facility, to the Bureau's Central Office in Washington, and to the MSTC.

Manufacturer: Digital Equipment Corporation

Model Number: ALPHA Server 1000

RAM: 128 MB

Operating System: Digital UNIX

E-mail System: Sendmail

Processors: 1–21164, 300 MHz CPU

Disk Storage Capacity: 16 Gigabytes

Router

Interface: Routers connect the two database management servers to each other and to the WAN, and through the WAN to each respective correctional facility.

Manufacturer: Cisco

Model Number: 7500 (A trademark of Cisco)

System Processor Type: 100 MHz R4600

Memory: RSPI; 16 MB, expandable to 128 MB

System Bandwidth: 1.066 Gbps

Modem Pool

Interface: In the event that the WAN should fail, the modem pool serves as the backup line of communication between the equipment at both of the Central Operations Facilities, between the Central Operations Facilities and the individual correctional facilities, to the LIDB service, the Bureau's Central Office, and the MSTC.

Manufacturer: US Robotics

Model Number: MP/16-I (A trademark of US Robotics)

Size: 12.6"×17.5" 3.5"

Equipment at Each Correctional Facility

Facility Management Unit (FMU)

Interfaces: Through multiple T-1 connections and its built-in router capability, the FMU interfaces to the WAN and FTS and local service lines; through the WAN to the network monitoring server; through an intelligent hub to the administrative and FPPOS workstations, and through a local network to the AIMS and the audio monitoring stations; and through central-office quality station cards to the inmate phones.

Manufacturer: Internal

Model Number: 6500

Telephone line capacity: configurable up to 96 lines

Central Office Interface:
  T-1
  Analog (loop start, ground start)

Performance: 96 lines, simultaneous operation, 100% non-blocking

Database connectivity to central servers: 56 KB or frame relay

Alert Call Recording: call recorded/retained for 24 hours

Station Cards: 6 phones per card to a maximum of 96 phones

Station Card Type: Central Office quality

Reliability:
  dual power supplies
  dual CPUs
  dual hard disks
  gas/carbon-based lightning protection for T-1 and analog interfaces Maintenance:
  supports remote diagnostics
  environmental monitoring with automatic alarm reporting to technical support center
  boards are hot-swappable
  LED fault indicators for specific components Expansion: Connection to additional FMU as required to accommodate site size Integral UPS: 2-hour rated, self-contained with FMU in rack Intelligent Hub Interface: Intelligent hub connecting the administrative workstations/printers and FPPOS workstation to the site FMU. Provides hub-level and port-level security features such as intruder prevention, audio port disabling, network management alarm, eavesdropping protection, assigned port access, and password protection.

Manufacturer: Hewlett-Packard

Model Number: J2611B AdvanceStack 10-Base-T Hub-8U/16U SNMP

Communication: IEEE 802.3 Type 10Base-T

Capacity: 16 ports

PC Workstations

Manufacturer: Hewlett-Packard

Model Number: HP D3991N Vectra XA (a trademark of Hewlett-Packard), desktop

Operating System: Microsoft Windows

Specifications:
  Processor: 166 MHZ Pentium
  RAM: 32 MB
  Disk Storage: 2.5 Gigabytes
  Removable Media: 3.5" floppy and CD-ROM
  Audio: Sound card and headphones
  Local Network Interface: 10/100 Base-T
  Interaction: Extended keyboard and mouse
  Monitor: 15" color Notebook PC Manufacturer: Hewlett-Packard Model Number: HP 2000 (A trademark of Hewlett-Packard)

Operating System: Microsoft Windows

Processor: 133 Mhz Pentium

RAM: 16 Mbytes

Disk Storage: 1.86 Gigabytes

Removable Media: CD-ROM

Audio: Sound card and headphones

Power: DC Battery, power cord and adapter

Surge Protector and UPS-Workstations

Manufacturer: American Power Conversion

Model Number: Pro 650 (a trademark of American Power Conversion)

Technical Characteristics:
   Capacity: 650VA
   Input Voltage window: 88 Vac, 148 Vac
   Transfer time: 2 ms (typical), 4 ms (maximum)
   Surge response time: 0 nanoseconds (instant)
   Battery backup: 30 minutes (min.)

Surge Protector—Laptop Monitoring Stations

Manufacturer: American Power Conversation

Model Number: Pro 7 (a trademark of American Power Conversion)

Technical Characteristics:
   IEEE Let-through voltage: <85V
   Normal Line voltage: 120 Vac, 50–60 Hz
   Max line current: 15 Amps, continuous Modem, Site Backup Interface: In the event that the WAN should fail, this modem works in conjunction with the modem pool at the COFs over either the FTS or other telephone service provider's lines to provide backup to the FMU.

Manufacturer: US Robotics

Model Number: Desktop

Modem, Short Haul

Interface: Extends the range of the monitoring equipment from the FMU.

Manufacturer: South Hills Datacomm

Mounting: rack-mounted

Format: synchronous

Backup Generator for the Central Operations Facility

Automatic cut over via transfer switch

Manufacturer: Kohler Power Systems

Model Number: Series 40ROZP (a trademark of Kohler Power Systems)

Voltage: 120/208, 3 Phase, 60 Hz

Standby Amps: 139

Standby kW/kVA: 40/50

Prime kW/kVA: 36/45

Printer—Administrative

Manufacturer: Hewlett-Packard

Model Number: LaserJet 6Pse (a trademark of Hewlett-Packard)

Processor: 24-MHz Intel RISC

Memory: 2 Mbytes

Ports: two fast ECP IEEE 1284-compliant parallel ports

Printer—Dot Matrix

Manufacturer: Okidata

Model Number: ML320 (a trademark of Okidata)

Interface: IEEE 1284 bi-directional parallel, Windows plug/play compatible

RAM: 64 K

Inmate Telephones

Manufacturer: Quadrum Telecommunications Inc

Model Number: 6Q2

Transmit/Receive Response at Normal Volume: meets EIA-470

Operating Loop Current Range: 20 mA and 80 mA

D.3 SOFTWARE

Central Database Software

Resides at both Central Operations Facilities on Database Management Servers 1 and 2

Product Description: Relational Database Management Software

Function: full-featured professional database, contains and manages inmate information, call records, and account balances Manufacturer: ORACLE Application Software Resides in the Facility Management Unit Product Description: system control software Function: provides call control and interactive voice response Manufacturer: Internal Linux Operating System Software Resides on the CPU board in the FMU Product Description: Linux (a trademark of Red Hat)

Function: UNIX operating system for the FMU

Manufacturer: Red Hat

Speaker Verification Software

Resides in the Facility Management Unit

Product Description: Biometric personnel verification

Function: Matches processed speech parameters of inmate to stored voice statistics for a PIN assignment to confirm system access Manufacturer: Verivoice Workstation Operating System Resides on each PC workstation Product Description: Microsoft Windows '95 or NT (trademarks of Microsoft Corp.)

Function: controls operation of the hardware platform

Manufacturer: Microsoft

Network Management Software

Resides at both Central Operations Facilities on Network Management Servers 5 and 6 and their workstations Product Description: OPENVIEW Network Management System Function: provides the ability to monitor network performance, preempt network disruption and anticipate network realignment through an intuitive graphical interface, continuously monitors network status and displays real time information critical to effective network management, collects and forwards alarms, events, device discovery and error information to the OPENVIEW Network Manager for processing.

Manufacturer: Hewlett-Packard

Mail System Software

Resides at the primary Central Operations Facility on the mail server (Server 4)

Product Description: Sendmail

Function: for use by BOP personnel; provides e-mail messaging capabilities between all Bureau facilities, the Central Office, and the MSTC.

Manufacturer: associated product of Digital UNIX

Mail Client Software

Resides on all workstations that will use the e-mail system (administrative workstations, etc.)

Product Description: Zmail Pro (a trademark of Netmanage)

Function: Provides a method for users to send and receive e-mail messages, allows local manipulation of remotely located mail box data, allows message access and management from more than one computer, and has full IMAP4.X support.

Manufacturer: Netmanage

Query Generation Support Software

Resides at both Central Operations Facilities on Database Management Servers 1 and 2, and on each PC workstation Function: provides database query generation using "drag & drop" technique on a Windows interface. No knowledge of SQL is required to make database queries.

Product Description: Discoverer (A trademark of Oracle)

Manufacturer: ORACLE

Report Generation Software

Resides at both Central Operations Facilities on Database Management Servers 1 and 2, and on each PC workstation Function: provides database query and report generation using the "drag & drop" technique on a Windows interface. No knowledge of SQL is required to generate database queries or reports.

Product Description: I/Q Objects (a trademark of I Q Software)

Manufacturer: I Q Software

Graphical User Interface Software

Resides on each PC workstation

Function: provides users with an easy-to-use click and point interface to the ITS-II Manufacturer: Internal

What is claimed is:

1. A method, provided by an institutional telephone system, of managing telephone activity between a calling party and a called party, wherein the calling party is an institutional party and the called party is a non-institutional party, the method comprising:

providing an account for the calling party, wherein the account comprises calling party entitlements, at least some entitlements based on the calling party's class;

creating an institutional communication connection with an institutional terminal following initiation by the calling party, wherein the institutional communication connection comprises an external communication request from the calling party, the communication request sufficient to establish communication between the calling party and the called party;

identifying the calling party;

analyzing the external communication request received from the calling party to determine its called party parameters;

comparing the called party parameters to the calling party entitlements to determine whether the calling party is entitled to communicate with the called party and denying the external communication request if the comparing returns a negative result;

determining whether the account is active and denying the external communication request if the determining returns a negative result;

placing the calling party on hold;

establishing communication with the called party;

calculating a rate to charge the called party for the communication;

announcing the rate to the called party;

prompting the called party for acceptance or refusal of the rate;

receiving a response from the called party; and establishing communication between the calling party and the called party based on the response.

2. A method, provided by an institutional telephone system, of managing telephone activity between a calling party and a called party, wherein the calling party is an institutional party and the called party is a non-institutional party, the method comprising:

providing an account for the calling party, wherein the account comprises calling party entitlements, at least some entitlements based on the calling party's class;

creating an institutional communication connection with an institutional terminal following initiation by the calling party, wherein the institutional communication connection comprises an external communication request from the calling party, the communication request sufficient to establish communication between the calling party and the called party;

identifying the calling part;

analyzing the external communication request received from the calling party to determine its called party parameters;

comparing the called party parameters to the calling party entitlements to determine whether the calling party is entitled to communicate with the called party and denying the external communication request if the comparing returns a negative result;

establishing the communication based on the comparing;

determining whether the account is active and denying the external communication request if the determining returns a negative result:

placing the calling party on hold;

initiating the connection with the called party;

detecting completion of the connection;

providing identification of the calling party to the called party;

prompting the called party for acceptance or refusal of communication with the calling party; and receiving a response from the called party to the prompting,
wherein the response determines whether the calling party and the called party are connected.

3. A method according to claim 2, wherein the comparing comprises:
identifying the institutional terminal; and
determining whether the calling party is entitled to use the institutional terminal,
wherein the communication is denied if the determining returns a negative result.

4. A method according to claim 2, wherein the method further comprises providing the called party with an option to prohibit any future calls from the calling party.

5. A method according to claim 2, wherein the method further comprises providing the called party with an option to prohibit future calls from a location of the calling party.

6. A method according to claim 2, wherein the method further comprises replaying a call origination message to the called party.

7. A method according to claim 2, wherein the account contains data representative of telephone numbers.

8. A method according to claim 2, wherein the account contains data representative of personal identities.

9. A method according to claim 2, wherein the account contains data indicating whether to record a communication from the calling party.

10. A method according to claim 2, wherein the account contains data indicating whether to record a communication to the called party.

11. A method according to claim 2, wherein the account contains data indicating whether to monitor a communication from the calling party.

12. A method according to claim 2, wherein the account contains data indicating whether to monitor the institutional terminal.

13. A method according to claim 2, wherein the account contains data indicating whether to monitor a communication to predetermined telephone numbers.

14. A method according to claim 2, wherein the account contains data indicating whether to monitor a communication to the called party.

15. A method according to claim 2, wherein the account contains data indicating a called party to whom communications should be not recorded.

16. A method according to claim 2, wherein the method further comprises providing administrative control to initiate recording of the communication.

17. A method according to claim 2, wherein the method further comprises providing administrative control to initiate administrative monitoring of the communication.

18. A method according to claim 2, wherein the method further comprises providing administrative control to terminate the communication.

19. A method according to claim 2, wherein the method further comprises monitoring the communication for a fraud detection event.

20. A method according to claim 2, wherein the method further comprises storing, in the account, data representative of the communication.

21. A method according to claim 2, wherein the method further comprises storing a keyword in the account.

22. A method according to claim 21, wherein the method further comprises monitoring the communication for the keyword.

23. A method according to claim 2, wherein the identifying comprises biometric voice verification, and wherein the biometric voice verification occurs continuously during the communication.

24. A method, provided by an institutional telephone system, of managing telephone activity between a calling party and a called party, wherein the calling party is an institutional party and the called party is a non-institutional party, the method comprising:
providing an account for the calling party, wherein the account comprises calling party entitlements, at least some entitlements based on the calling party's class;
creating an institutional communication connection with an institutional terminal following initiation by the calling party, wherein the institutional communication connection comprises an external communication request from the calling party, the communication request sufficient to establish communication between the calling party and the called party;
identifying the calling party;
analyzing the external communication request received from the calling party to determine its called party parameters;
comparing the called party parameters to the calling party entitlements to determine whether the calling party is entitled to communicate with the called party and denying the external communication request if the comparing returns a negative result;
determining whether the account is active and denying the external communication request if the determining returns a negative result;
digitizing a first sample of the calling party;
storing the first sample;
digitizing a second sample of the calling party from the communication;
storing the second sample; and
comparing the first sample to the second sample for verifying identification of
the calling party.

25. A method, provided by an institutional telephone system, of managing telephone activity between a calling party and a called party, wherein the calling party is an institutional party and the called party is a non-institutional party, the method comprising:
providing an account for the calling party wherein the account comprises calling party entitlements, at least some entitlements based on the calling party's class;
creating an institutional communication connection with an institutional terminal following initiation by the calling party, wherein the institutional communication connection comprises an external communication request from the calling party, the communication request sufficient to establish communication between the calling party and the called party;
identifying the calling party;
analyzing the external communication request received from the calling party to determine its called party parameters;
comparing the called party parameters to the calling party entitlements to determine whether the calling party is entitled to communicate with the called party and denying the external communication request if the comparing returns a negative result;
determining whether the account is active and denying the external communication request if the determining returns a negative result;

digitizing a first sample of the called party;
storing the first sample;
identifying the called party;
digitizing a second sample of the called party from the communication;
storing the second sample; and
comparing the first sample to the second sample second sample for verifying identification of the called party.

26. A method, provided by an institutional telephone system, of managing telephone activity between a calling party and a called party, wherein the calling party is an institutional party and the called party is a non-institutional party, the method comprising:
providing an account for the calling party, wherein the account comprises calling party entitlements, at least some entitlements based on the calling party's class;
creating an institutional communication connection with an institutional terminal following initiation by the calling party, wherein the institutional communication connection comprises an external communication request from the calling party the communication request sufficient to establish communication between the calling party and the called party;
identifying the calling party;
analyzing the external communication request received from the calling party to determine its called party parameters;
comparing the called party parameters to the calling party entitlements to determine whether the calling party is entitled to communicate with the called party and denying the external communication request if the comparing returns a negative result;
determining whether the account is active and denying the external communication request if the determining returns a negative result;
identifying the called party;
digitizing a first sample of the calling party;
storing the first sample;
digitizing a second sample of the called party;
storing the second sample;
digitizing a third sample of the communication;
storing the third sample; and
comparing the first sample and the second sample to the third sample.

27. A method according to claim 26, wherein the comparing detects an unauthorized party to the communication.

28. A method, provided by an institutional telephone system, of managing telephone activity, between a calling party and a called party, wherein the calling party is an institutional party and the called party is a non-institutional party the method comprising
providing a plurality of institutional terminals, a plurality of telephone lines, an administrative database, and an administrative interface, wherein the database comprises an individual account for each calling party and wherein each account provides individual entitlements to the calling party;
placing a communication request to the called party from one of the institutional terminals by the calling party, wherein the placing comprises entering numeric data into one of the institutional terminals:
accepting the communication request;
identifying the calling party;
analyzing the communication request to determine parameters;
comparing the parameters with entitlements;
conditionally establishing communication between the called party and the calling party;
providing a digital recording buffer and a digital mass storage device;
monitoring the system for active calls; and
recording the active calls in the buffer.

29. A method according to claim 28, wherein the recording is continuous.

30. A method according to claim 28, wherein the method further comprises:
monitoring an active call for a fraud detection event;
storing the buffer contents in the mass storage device if the monitoring returns a positive result; and
recording the remainder of the active call in the mass storage device if the monitoring returns a positive result.

31. A system for managing institutional telephone activity between a calling party and a called party, wherein a calling party is an institutional party and a called party is a non-institutional party, comprising:
an interface component confirmed to accept an external communication request from a calling party, the communication request having at least one called party parameter, and the communication request sufficient to establish communication between the calling party and the called party;
a database storing a plurality of accounts associated with calling parties, each account storing permissible calling party parameters for each calling party, wherein at least some calling party parameters are based on the calling party's class; and
a screening component in communication with the interface component and the database, configured to read each external communication request, query the database for the permissible calling party parameters associated with the calling party and determine whether at least one called party parameter is a permissible calling party parameter and configured to determine whether the calling party has an active account, the screening component denying the calling party's external communication request if the active account determination returns a negative result, wherein one of the permissible calling party parameters is a telephone number and wherein the account includes a suspicious word associated with the calling party and the screening component is further configured to scan a digital sample for a suspicious word;
a communications component, in communication with the screening, component, and configured to process the communications request following determination by the screening component that the communication request contains permissible parameters; and
a digital conversion component configured to receive a voice sample from the calling party and convert the voice sample to a digital format, wherein sample in a buffer.

32. The system of claim 31, wherein one of the permissible parameters is a telephone number.

33. The system of claim 31, wherein the screening component is further configured to perform biometric voice identification on the sample generated by the digital conversion component and further configured to confirm an identity of the calling party based upon the results of the biometric voice identification.

34. The system of claim 31, wherein the database stores the digital sample in a file associated with the caller account.

* * * * *

UNITED STATES PATENT AND TRADEMARK OFFICE
CERTIFICATE OF CORRECTION

| | | |
|---|---|---|
| PATENT NO. | : 7,106,843 B1 | Page 1 of 1 |
| APPLICATION NO. | : 09/144313 | |
| DATED | : September 12, 2006 | |
| INVENTOR(S) | : Jay L. Gainsboro and Charles Margosian | |

It is certified that error appears in the above-identified patent and that said Letters Patent is hereby corrected as shown below:

Column 130,

Line 48, please delete: "part" and insert: -- party --.

Column 133,

Line 7: please delete duplicate wording: "second sample".

Column 134,

Line 21: please delete: "confirmed" and insert -- configured --.

Column 134,

Line 54: please insert: -- the digital conversion component is further configured store the digital -- after "wherein".

Signed and Sealed this

Sixteenth Day of January, 2007

JON W. DUDAS
*Director of the United States Patent and Trademark Office*